(12) United States Patent
Doraiswamy et al.

(10) Patent No.: US 12,527,690 B2
(45) Date of Patent: Jan. 20, 2026

(54) EMULSIFICATION DEVICES AND METHODS FOR CRYSTALLINE LENS REMOVAL

(71) Applicant: Lhotse Medical, Inc., Dallas, TX (US)

(72) Inventors: Anand Doraiswamy, Oakland, CA (US); Azhar Meyer, Oakland, CA (US)

(73) Assignee: Lhotse Medical, Inc., Dallas, TX (US)

( * ) Notice: Subject to any disclaimer, the term of this patent is extended or adjusted under 35 U.S.C. 154(b) by 0 days.

(21) Appl. No.: 19/244,937

(22) Filed: Jun. 20, 2025

(65) Prior Publication Data

US 2025/0387263 A1    Dec. 25, 2025

Related U.S. Application Data

(60) Provisional application No. 63/662,943, filed on Jun. 21, 2024.

(51) Int. Cl.
*A61F 9/007*     (2006.01)
*A61M 1/00*      (2006.01)

(52) U.S. Cl.
CPC ........... *A61F 9/00763* (2013.01); *A61M 1/77* (2021.05)

(58) Field of Classification Search
CPC .............. A61F 9/00763; A61M 5/142; A61M 5/16827; A61M 5/19; A61M 1/77; A61M 1/85; A61M 1/89; A61B 17/3203; A61B 2018/046; A61B 2018/048; A61B 2018/00011; A61B 2018/00017
See application file for complete search history.

(56) References Cited

U.S. PATENT DOCUMENTS

| | | |
|---|---|---|
| 3,937,222 A | 2/1976 | Banko |
| 4,465,470 A * | 8/1984 | Kelman ............. A61F 9/00736 604/27 |
| 4,538,608 A | 9/1985 | L'Esperance, Jr. |
| 4,955,883 A | 9/1990 | Nevyas et al. |
| 5,257,988 A | 11/1993 | L'Esperance, Jr. |
| 5,437,678 A | 8/1995 | Sorensen |

(Continued)

FOREIGN PATENT DOCUMENTS

| | | |
|---|---|---|
| AU | 2017-232627 | 10/2018 |
| AU | 2020-277300 | 5/2020 |

(Continued)

OTHER PUBLICATIONS

Hughes et al., "Awualase for cataract extraction", EYE Dated 2007, vol. 21, pp. 191-194.

(Continued)

*Primary Examiner* — Ashley L Fishback
*Assistant Examiner* — Chima U Igboko
(74) *Attorney, Agent, or Firm* — Wilson Sonsini Goodrich & Rosati

(57) ABSTRACT

This disclosure relates to thermal fluid emulsification systems and methods for cataract removal. The thermal fluid emulsification systems can deliver heated fluid to the crystalline lens within the capsular bag of the eye, resulting in the emulsification of the crystalline lens. The emulsified crystalline lens can be aspirated from the capsular bag of the eye. The thermal fluid emulsification systems can include tips configured to localize heat to avoid unintentional damage to other ocular components and cellular structures of the eye.

4 Claims, 81 Drawing Sheets

(56) References Cited

U.S. PATENT DOCUMENTS

| | | | |
|---|---|---|---|
| 5,616,120 A * | 4/1997 | Andrew | A61F 9/00736 604/35 |
| 5,865,790 A | 2/1999 | Bair | |
| 5,885,279 A | 3/1999 | Bretton | |
| 6,074,358 A | 6/2000 | Andrew et al. | |
| 6,331,171 B1 | 12/2001 | Cohen | |
| 6,440,103 B1 | 8/2002 | Hood et al. | |
| 6,527,766 B1 | 3/2003 | Bair | |
| 6,544,211 B1 | 4/2003 | Andrew et al. | |
| 6,676,628 B2 | 1/2004 | Sussman et al. | |
| 6,860,868 B1 | 3/2005 | Sussman et al. | |
| 9,125,720 B2 | 9/2015 | Jia et al. | |
| 9,629,747 B2 | 4/2017 | Clauson et al. | |
| 10,016,300 B2 | 7/2018 | Kuebler et al. | |
| 10,231,870 B2 | 3/2019 | Clauson et al. | |
| 10,736,777 B2 | 8/2020 | Keller | |
| 10,881,551 B2 | 1/2021 | Kraemer et al. | |
| 2002/0099400 A1 | 7/2002 | Wolf et al. | |
| 2004/0254532 A1 | 12/2004 | Mehier | |
| 2011/0144632 A1 | 6/2011 | Bourne et al. | |
| 2011/0213359 A1 | 9/2011 | Ben-Nun | |
| 2013/0178841 A1 | 7/2013 | Reid, Jr. | |
| 2019/0269557 A1 | 9/2019 | Clauson et al. | |
| 2019/0365567 A1 | 12/2019 | Balkenbush et al. | |
| 2020/0306083 A1 | 10/2020 | Clauson et al. | |
| 2022/0233353 A1 | 7/2022 | Carter et al. | |
| 2023/0028279 A1 | 1/2023 | Govari | |
| 2024/0050142 A1 | 2/2024 | Zhang et al. | |

FOREIGN PATENT DOCUMENTS

| | | |
|---|---|---|
| EP | 0398975 | 11/1990 |
| WO | WO 2001-76518 | 10/2001 |
| WO | WO 2018-211507 | 11/2018 |
| WO | WO 2018-217579 | 11/2018 |
| WO | WO 2024-163362 | 8/2024 |

OTHER PUBLICATIONS

Spirochkin, "Hydrodynamic Analysis and Irrigation Device Design for the Coaxial and Bimanual Phacoemulsification Techniques in Cataract Surgery", Engineering Centre of Nuclear Equipment Strength (ENES).

International Search Report and Written Opinion for International Application No. PCT/US2024/013383 dated May 15, 2024.

* cited by examiner

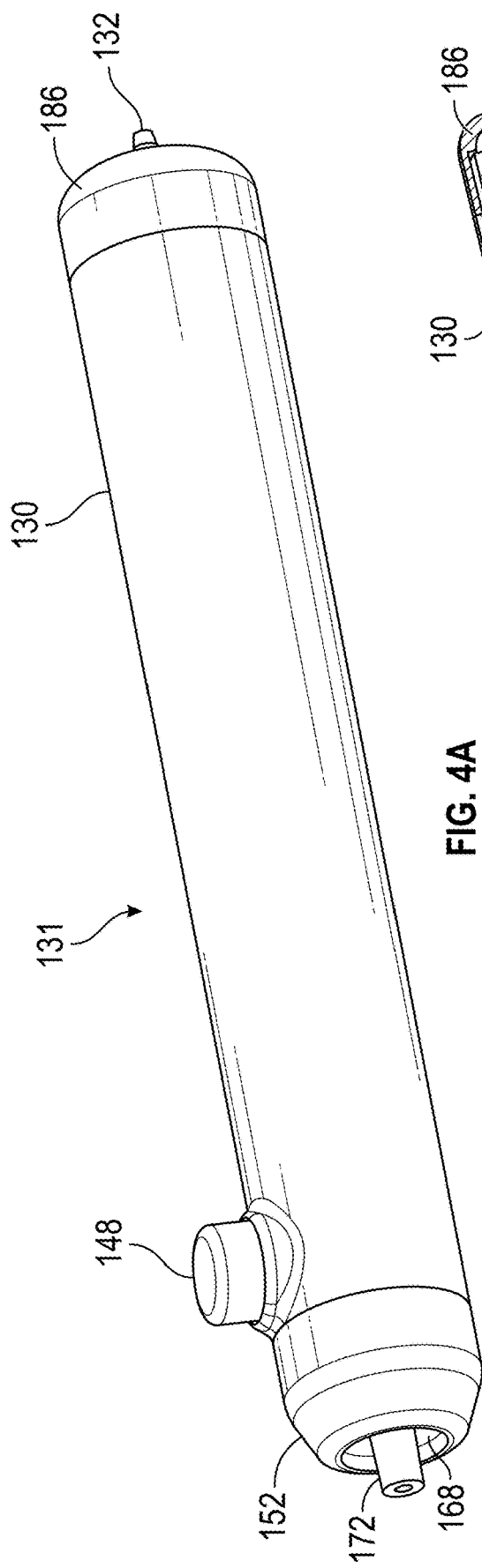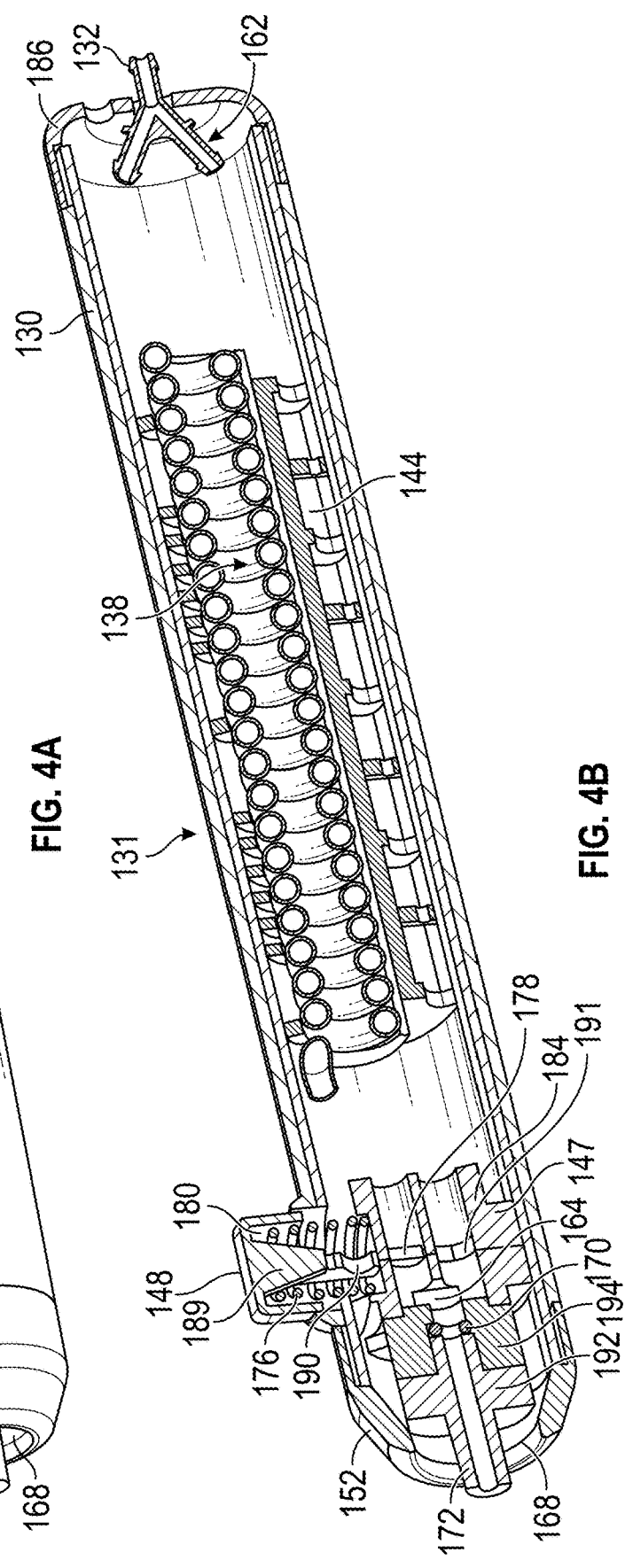
FIG. 4A
FIG. 4B

Saline Temp

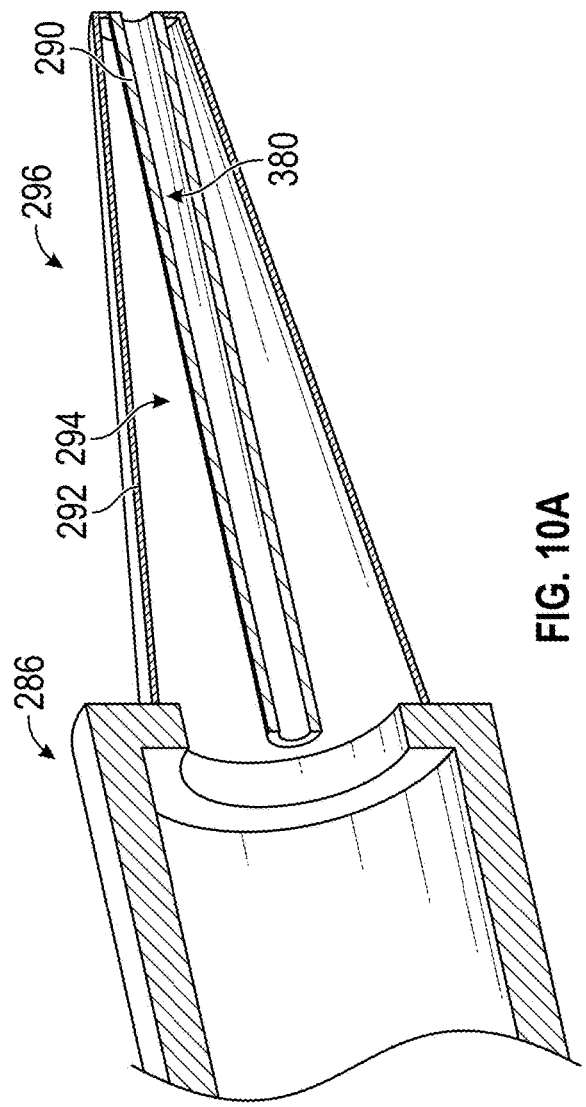
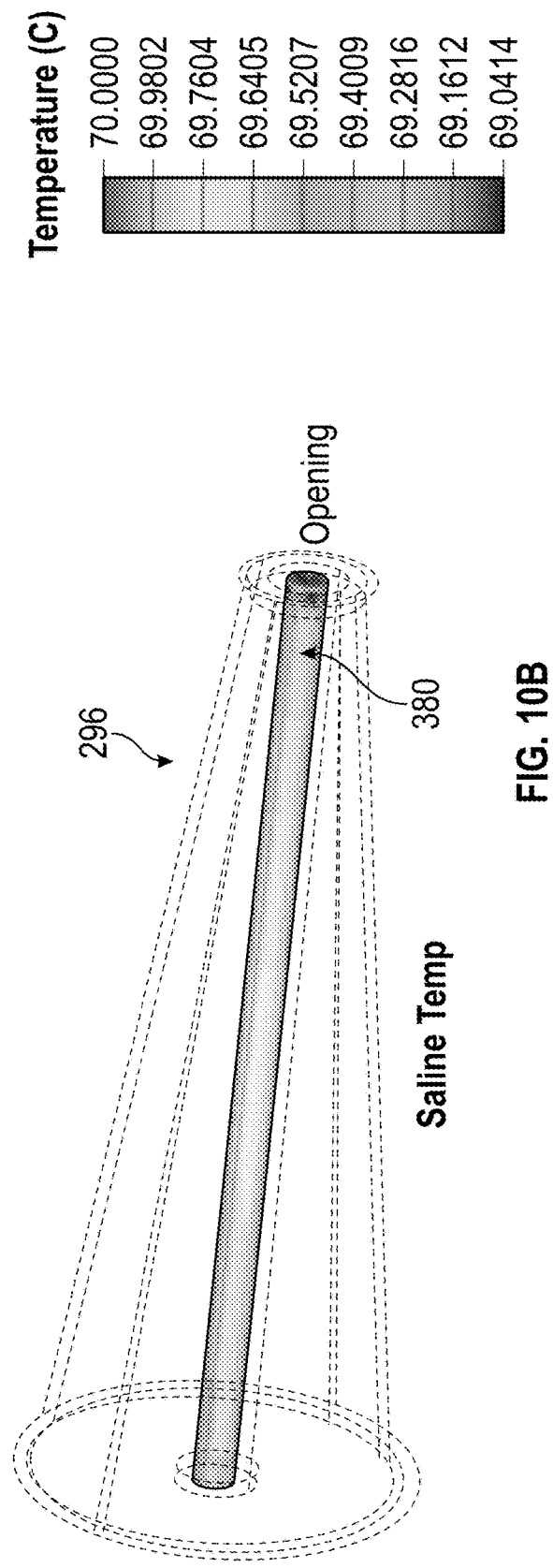
FIG. 10A
FIG. 10B

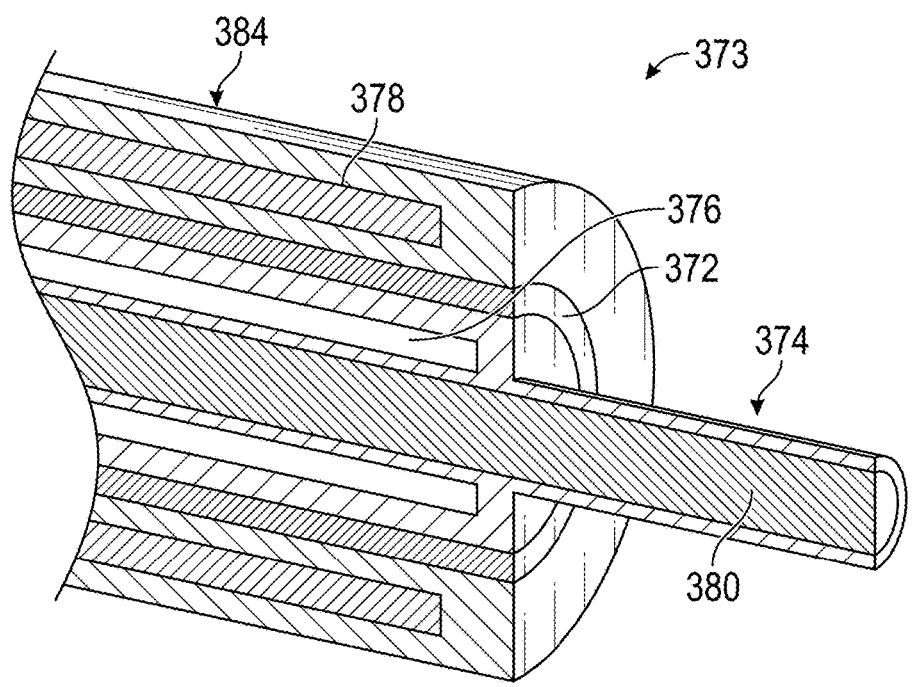
FIG. 21A
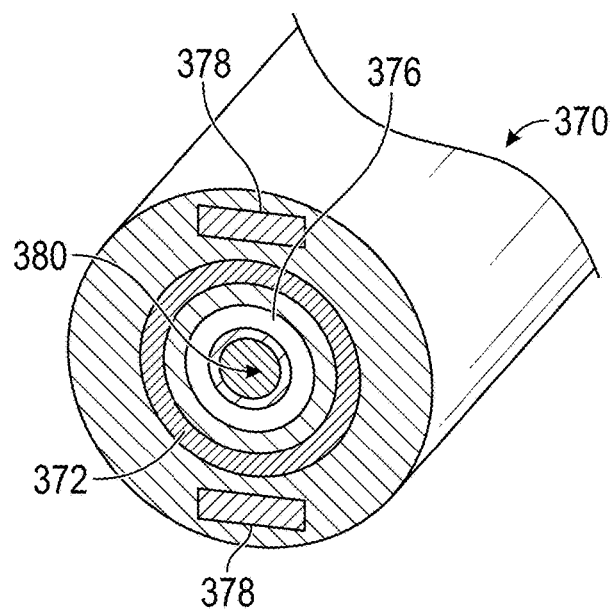 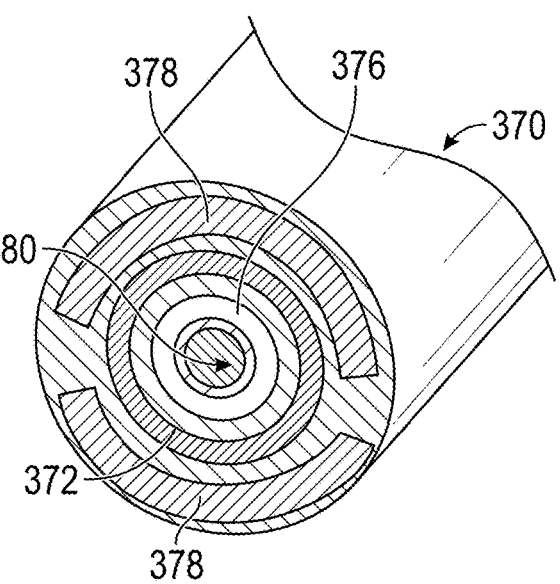
FIG. 21B  FIG. 21C

EMULSIFICATION DEVICES AND METHODS FOR CRYSTALLINE LENS REMOVAL

CROSS REFERENCE

This application claims the priority benefit of U.S. Provisional Application No. 63/662,943, filed Jun. 21, 2024, which is hereby incorporated by reference in its entirety. All applications for which a foreign or domestic priority is identified in the Application Data Sheet as filed with the present application are hereby incorporated by reference under 37 CFR 1.57.

FIELD

This disclosure relates to systems and methods for removing the natural lens of an eye.

BACKGROUND

As the eye ages, proteins in the crystalline lens begin to break down and clump together. This clumping of proteins makes a cloudy area in the crystalline lens known as a cataract that negatively impacts vision. This condition may be addressed with cataract surgery, wherein the crystalline lens with the cataract is removed from the eye and an intraocular lens ("IOL") is implanted in its place.

SUMMARY

During a cataract surgery, an incision may be made through the cornea (e.g., corneal margin) and/or sclera to access inside the eye. An ultrasonic emulsification tool, which may be a phacoemulsification probe, may be inserted through the incision and apply ultrasound to the cataract, breaking the cataract into fragments to be aspirated out of the eye. Ocular components and cellular structures (e.g., ocular organelles) are delicate and can be easily damaged by the ultrasound energy. Accordingly, cataract removal solutions that avoid unintentional damage to ocular components and cellular structure are desirable.

Additionally, applying ultrasound energy to the cataract and removing by way of aspiration may take ten minutes or longer, which may be nearly eighty percent of the time to perform a cataract surgery and, as such, may be prone to safety issues, which can at least include breakage of the capsular bag, damage to zonules, iris rupture, synechia uveitis, etc. Accordingly, cataract removal solutions that shorten the time to remove cataracts and/or case removal of cataracts are desirable. Further, cataract removal solutions that preserve the capsular bag are desirable. Additionally, cataract removal solutions that reduce damage to surrounding ocular tissue (e.g., capsular bag, zonules, iris, etc.) are desirable.

The emulsification devices (e.g., thermal devices, thermal emulsification devices, thermal systems, thermal emulsification systems, irrigation devices, irrigation and aspiration devices, etc.) and/or components thereof (e.g., distal tips) described herein may at least address one or more of the issues identified above. The emulsification devices described herein may apply heat (e.g., localized heat, ultra-localized heat) to the crystalline lens to soften, melt, liquefy, emulsify, flow, and/or case removal (e.g., aspiration) of the crystalline lens.

The crystallin lens of the eye may emulsify when exposed to heat. Crystallins are the predominant structural proteins in the crystalline lens, which may at least include alpha-crystallins, and betagamma-crystallins. Crystallins and/or other proteins, biopolymers, and/or other natural lens material may emulsify when exposed to heat. The lens may emulsify when exposed to a heated fluid (e.g., 60-90 degrees Celsius or more, 65-75 degrees Celsius). The application of heat may be localized (e.g., ultra localized) to avoid unintentional damage to the ocular components (e.g., capsular bag) and cellular structures, which may avoid the damage that can be incurred with the application of ultrasound. The emulsification of the lens may enable the lens (e.g., proteins, biopolymers, other components of the lens) to cleanly separate from the capsular bag while preserving the capsular bag.

The emulsification devices described herein can utilize a heated fluid (e.g., saline solution) to emulsify the lens of the eye. The emulsification devices can include a handpiece with a distal tip. The distal tip can include an irrigation lumen, aspiration lumen, and/or coolant circulation lumen. The aspiration lumen can be disposed radially outward of the irrigation lumen. The coolant circulation lumen can be disposed radially toward of the aspiration lumen. Heated and unheated fluid can alternately be irrigated into the capsular bag through the irrigation lumen of the distal tip, which can be accomplished by actuating a valve. The aspiration lumen can aspirate contents (e.g., emulsified lens material, heated fluid, unheated fluid, ocular fluid) from the capsular bag. Fluid, such as ambient saline, can be directed to and away from the distal tip to circulate through the coolant circulation lumen of the distal tip to reduce a temperature of the distal tip at an exterior surface thereof.

The emulsification device can include a first fluid line and a second fluid line, which can each be in fluid communication with reservoirs of fluid. Fluid from one or more of the reservoirs can flow distally through the first fluid line to a valve unit (e.g., pinch valve). Upstream of the valve unit, a coolant delivery line can branch off the first fluid line to deliver fluid to the coolant circulation lumen of the distal tip. The fluid can flow through the coolant circulation lumen of the distal tip to cool an exterior of the distal tip and then exit into a coolant return line that directs the flow of fluid proximally away from the distal tip. The second fluid line can flow to a heater unit that heats fluid in the second fluid line to a temperature for emulsifying the natural lens. The second fluid line can direct fluid flowing therethrough to flow around a heater (e.g., coil around a heater) to raise a temperature of the fluid. The second fluid line can include a temperature sensor disposed therein to detect a temperature of the fluid downstream of the heater, which can be used to control the heater to hit desired temperatures. The second fluid line can direct the heated fluid therein to flow distally to the valve unit. The valve unit can alternately permit flow through one of the first fluid line and the second fluid line to the irrigation lumen of the distal tip for delivery into the eye while impeding flow through the other, which can enable a clinician to alternately irrigate the capsular bag with heated and unheated fluid. When the flow of heated fluid through the second fluid line to the irrigation lumen is impeded, the heated flow through the second fluid line can be diverted to a third fluid line that directs the heated fluid away from the distal tip. When the flow of heated fluid through the second fluid line to the irrigation lumen is permitted by the valve unit, the valve unit can impede flow through the third fluid line. Accordingly, the valve unit can alternately permit and impede flow through the second fluid line and third fluid line. The emulsification device can include an aspiration line that directs aspirated contents of the capsular bag received through the aspiration lumen of the distal tip away from the distal tip. The emulsification devices can include and/or operate with pumps, such as peristaltic pumps, to control flow along the first fluid line, second fluid line, and/or aspiration line.

In some variants, the emulsification devices described herein can include a fluid inlet that receives fluid (e.g., saline) into the handpiece. The fluid inlet can be fluidically coupled with a splitter that directs fluid flowing into the fluid inlet to a heated fluid conduit and a bypass fluid conduit disposed inside the handpiece.

The fluid in the heated conduit can at least be heated by way of direct heat, conduction, radiation, convection, etc. For example, the heated fluid conduit can be disposed around (e.g., coiled around) a heater (e.g., heater cartridge) that heats the fluid flowing through the heated fluid conduit to a temperature. The bypass fluid conduit can bypass the heater to avoid being substantially heated. The heated fluid conduit and bypass fluid conduit can direct fluid to a valve assembly.

The valve assembly can selectively impede the flow of fluid through the heated conduit and bypass conduit past the valve assembly. The valve assembly can, in some variants, alternate between permitting fluid flowing through the heated fluid conduit to flow past the valve assembly and permitting fluid flowing through the bypass fluid conduit to flow past the valve assembly. In some variants, the valve assembly can selectively block fluid flow through the heated fluid conduit or bypass fluid conduit but not both the heated fluid conduit and bypass fluid conduit at the same time, which can maintain a flow of fluid through the emulsification device and into the eye (e.g., capsular bag) to maintain pressure within the eye (e.g., capsular bag). In some variants, the valve assembly can be biased to impede fluid flow through one of the heated fluid conduit and bypass fluid conduit while permitting fluid flow through the other of the heated fluid conduit and bypass fluid conduit. For example, in some variants, the valve assembly can be biased to impede fluid flow through the heated fluid conduit while permitting fluid flow through the bypass fluid conduit. The valve assembly can include a member (e.g., gate, protrusion, flange) that can be biased by a spring to impede flow through one of the heated fluid conduit and bypass fluid conduit, which can include pinching the heated fluid conduit or bypass fluid conduit. The handpiece can include a user interface (e.g., button, lever, etc.) that can be manipulated to reconfigure the valve assembly to permit and/or impede fluid flow through the heated fluid conduit and/or bypass fluid conduit. For example, in some variants, the user interface can be manipulated to move the member of the valve assembly from a first position blocking flow through one of the heated fluid conduit and bypass fluid conduit to a second position that blocks flow through the other of the heated fluid conduit and bypass fluid conduit while permitting flow through the one of the heated fluid conduit and bypass fluid conduit. In some variants, the member can be biased by a spring force to block flow through the heated fluid conduit (e.g., pinch the heated conduit) while permitting flow through the bypass fluid conduit, and the user interface can be manipulated to overcome the spring force to move the member to permit flow through the heated fluid conduit while blocking flow through the bypass fluid conduit (e.g., pinch the bypass fluid conduit). In some variants, the user interface can be released to permit the spring to move the member to block flow through the heated fluid conduit (e.g., pinch the heated conduit) and permit flow through the bypass fluid conduit. In some variants, the emulsification device does not include a bypass fluid conduit. In some variants, the heated fluid conduit and/or bypass fluid conduit can include a flexible tube. The flexible tube, in some variants, can be pinched closed by the valve assembly. In some variants, the valve assembly can simultaneously block flow through the heated fluid conduit and the bypass fluid conduit. In some variants, the valve assembly can simultaneously permit flow through the heated fluid conduit and the bypass fluid conduit.

Fluid flowing through the heated conduit and bypass conduit can flow through a distal tip and into the eye (e.g., capsular bag). The distal tip can be inserted into the capsular bag to deliver fluid from the heated fluid conduit and/or bypass fluid conduit to the natural lens. The heated fluid can emulsify the natural lens for removal by aspiration. In some variants, the distal tip can be disposable. In some variants, the distal tip can be reusable after cleaning. The distal tip can include an irrigation passageway, which may be disposed through an elongate portion of the distal tip, through which fluid from the heated conduit and bypass conduit can flow into the capsular bag. The distal tip can include one or more insulation features to protect the proximate anatomy of the eye (e.g., capsular bag, zonules, iris, etc.) from heat. For example, the elongate portion through which the irrigation passageway can flow can include a poor conducting material (e.g., polymer such as silicone). The distal tip can include one or more air gaps (e.g., air pockets, air-filled cavities) disposed radially outward of the irrigation passageway. The distal tip can include one or more vacuum gaps (e.g., vacuum pockets, vacuum cavities) disposed radially outward of the irrigation passageway. The distal tip can include one or more coolant passageways disposed radially outward of the irrigation passageway through which coolant can be circulated. The distal tip can include one or more aspiration passageways radially outward of the irrigation passageway to facilitate aspiration of substance (e.g., emulsified lens, heated fluid, ocular fluid, etc.) from the capsular bag. The distal tip can include various shapes such as a tapered shape. The tapered shape can be configured such that a proximal portion of an outer wall of the distal tip can be spaced further away from the irrigation passageway compared to a distal portion of the outer wall of the distal tip.

Neither the preceding summary nor the following detailed description purports to limit or define the scope of protection. The scope of protection is defined by the claims.

BRIEF DESCRIPTION OF THE DRAWINGS

The abovementioned and other features of the embodiments disclosed herein are described below with reference to the drawings of the embodiments. The illustrated embodiments are intended to illustrate, but not to limit, the scope of protection. Various features of the different disclosed embodiments can be combined to form further embodiments, which are part of this disclosure.

FIG. 4A illustrates an emulsification device.

FIG. 4B illustrates a sectioned view of the emulsification device of FIG. 4A.

FIG. 10A illustrates a distal tip with an inner conduit with an irrigation passageway, a tapered outer wall made of metal, and an air gap between the inner conduit and the tapered outer wall.

FIG. 10B illustrates a temperature of heated fluid flowing through the irrigation passageway of the distal tip of FIG. 10A.

FIG. 21A illustrates a distal tip with an inner conduit with an irrigation passageway, an aspiration passageway, a vacuum gap between the inner conduit and the aspiration passageway, an outer wall, and a coolant passageway between the aspiration passageway and the outer wall.

FIG. 21B illustrates a cross-section of the distal tip of FIG. 21A with an example coolant passageway configuration.

FIG. 21C illustrates a cross-section of the distal tip of FIG. 21A with an example coolant passageway configuration.

DETAILED DESCRIPTION

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

Figure 1A:
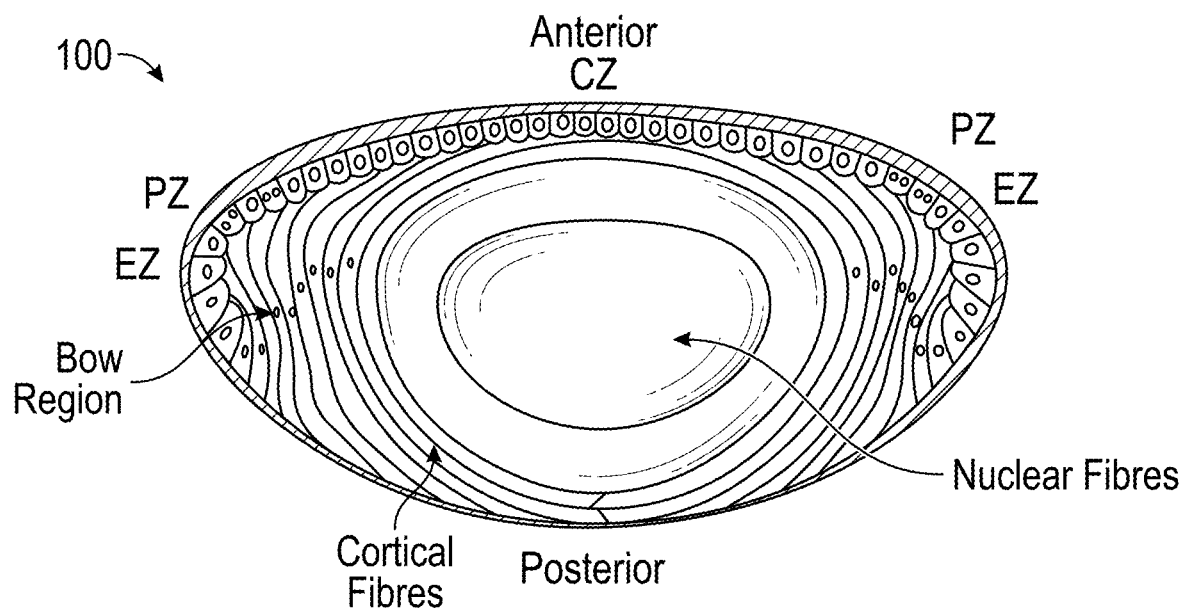
FIG. 1A schematically illustrates a sectioned view of a natural lens of an eye.

FIG. 1A schematically illustrates a sectioned view of a natural lens 100 of an eye. As the eye ages, proteins (e.g., crystallins) and/or biopolymers in the crystalline lens can begin to break down and clump together. This clumping can make a cloudy area in the crystalline lens known as a cataract that negatively impacts vision. The lens 100 can be removed from the capsular bag and replaced by an artificial lens (e.g., intraocular lens).

Figure 1B:
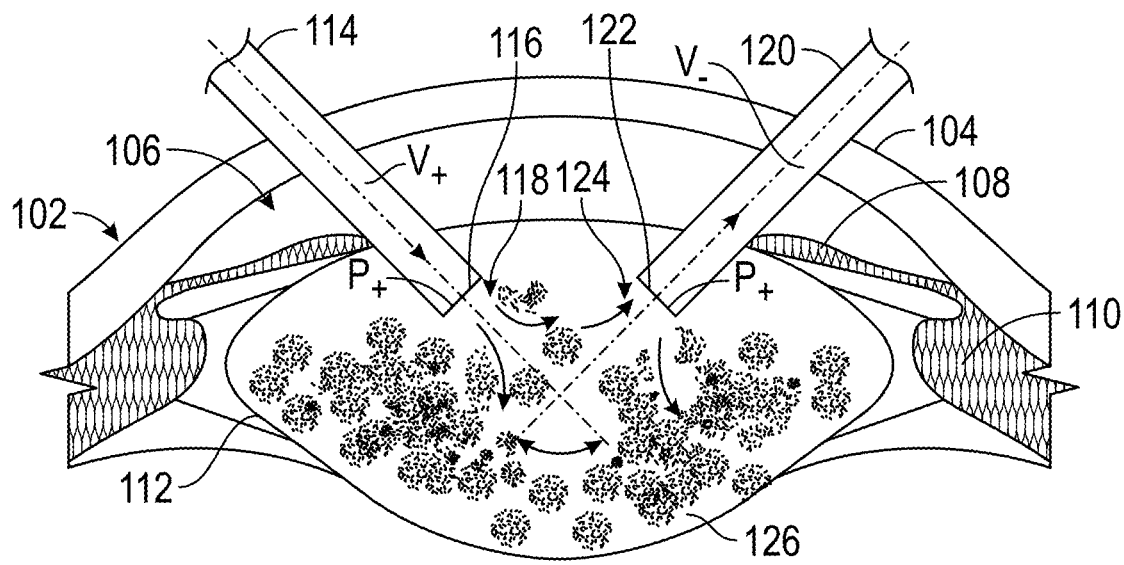
FIG. 1B illustrates an irrigation tip introducing a heated fluid within the capsular bag to emulsify the natural lens and an aspiration tip aspirating the emulsified natural lens.

FIG. 1B illustrates certain anatomy of the eye 102, including the cornea 104, anterior chamber 106, iris 108, and ciliary muscle 110. The natural lens can be removed from the capsular bag 112 with heated fluid 118, as shown in FIG. 1B. An irrigation tip 114 (e.g., irrigation cannula) can be inserted through a small hole in the cornea 104, which can be off the optical axis, and into the capsular bag 112 (e.g., through an anterior hole in the capsular bag 112, through a side hole in the capsular bag 112, through a side hole off the optical axis of the capsular bag 112, through a side hole out of the optical zone of the capsular bag 112). The heated fluid can flow out of the irrigation tip 114 to the natural lens within the capsular bag 112. The heated fluid can emulsify the lens, which can include breaking the lens into lens fragments 126. The heated fluid can be directed at a nucleus of the lens to begin emulsification, which can insulate the capsular bag 112 from heat. The fluid can include a saline solution. The fluid can be delivered at various temperatures, which can at least include 60-90 degrees Celsius (e.g., 60-75 degrees Celsius). The emulsified lens can be aspirated from the capsular bag 112. For example, an aspiration tip 120 (e.g., aspiration cannula) can be inserted through a small hole in the cornea 104 and into the capsular bag 112 ((e.g., through an anterior hole in the capsular bag 112, through a side hole in the capsular bag 112, through a side hole off the optical axis of the capsular bag 112, through a side hole out of the optical zone of the capsular bag 112) to aspirate one or more substances (e.g., emulsified lens, lens fragments, ocular fluid, heated fluid, fluid, etc.) from the capsular bag 112. The aspiration tip 120 can aspirate while the irrigation tip 114 is delivering fluid to the capsular bag 112, which can maintain a pressure within the capsular bag 112. In some variants, the irrigation tip 114 can selectively deliver fluid that is not heated (e.g., fluid at an ambient temperature) and/or cooled. In some variants, the delivery of heated fluid by the irrigation tip 114 can alternative between delivering heated and unheated fluid. In some variants, the irrigation tip 114 can deliver heated fluid in pulses. With the lens removed from the capsular bag 112, an artificial lens can be introduced therein.

Figure 2A:
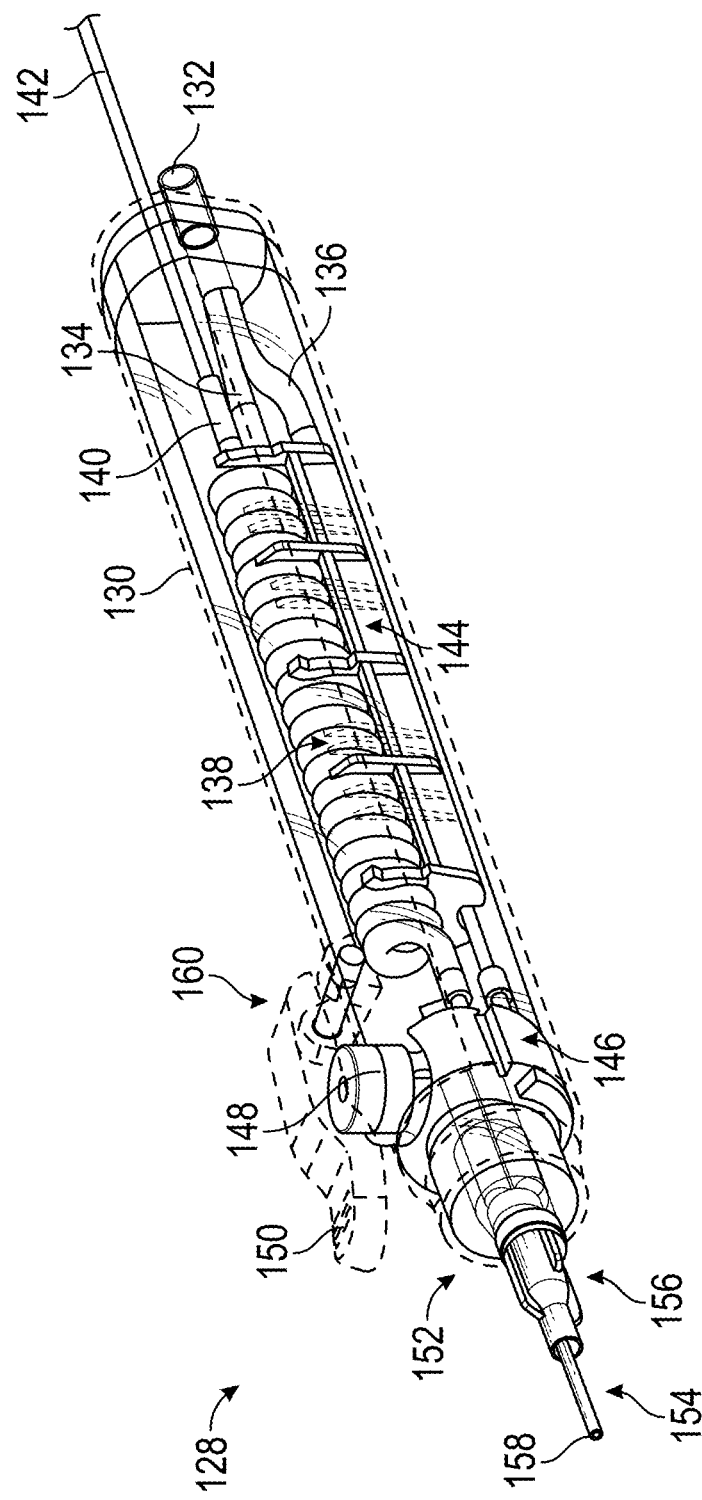
FIG. 2A illustrates an emulsification device with internal components thereof visible.
Figure 2B:
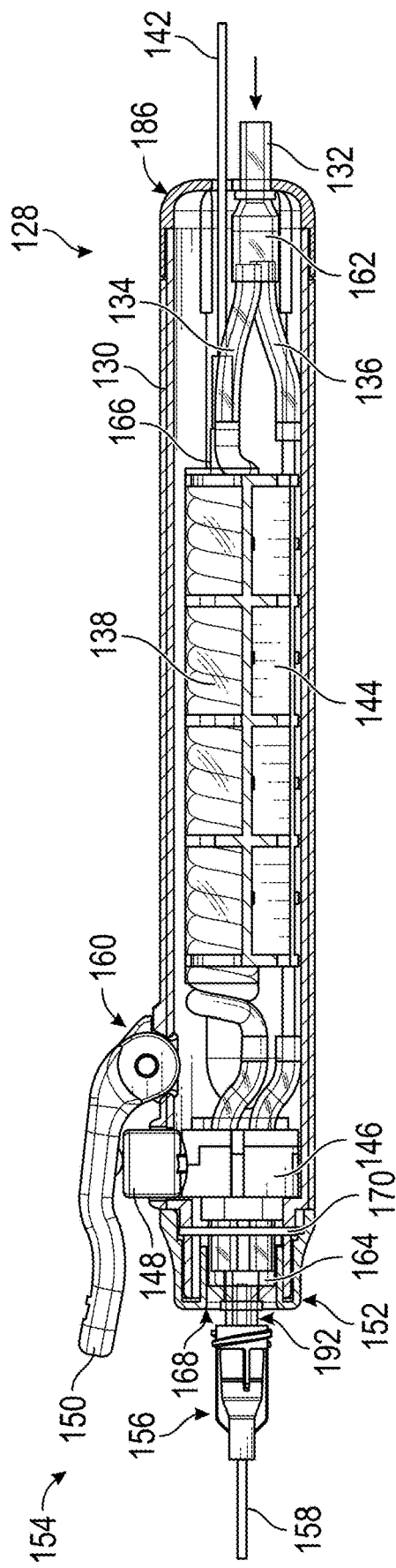
FIG. 2B illustrates a sectioned view of the emulsification device of FIG. 2A.

FIGS. 2A and 2B illustrate views of an emulsification device 128, which can also be referred to as a thermal device, thermal emulsification device, thermal system, emulsification system, handpiece, thermal handpiece, irrigation device, and/or irrigation handpiece. The emulsification device 128 can deliver fluid at an ambient temperature and/or heated fluid at an elevated temperature.

The emulsification device 128 can include a housing 130. The housing 130 can house internal components of the emulsification device 128 within an interior of the housing 130. The housing 130 can be ergonomically shaped to be held by a user (e.g., surgeon). The housing 130 can include a proximal cap 186 that can be removably coupled to the housing 130. The proximal cap 186 can be removed from the housing 130 to permit access into an interior of the housing 130.

The emulsification device 128 can include a fluid inlet 132. The fluid inlet 132 can extend outside of the housing 130, which can include extending through the proximal cap 186 of the housing 130. The fluid inlet 132 can be fluidically coupled to a source of fluid (e.g., fluid reservoir, bag of fluid, IV bag, fluid container, etc.). For example, a tube can fluidically couple the fluid inlet 132 and a source of fluid. The source of fluid can be positioned higher than the emulsification device 128 to urge a flow of fluid from the source to the fluid inlet 132 of the emulsification device 128.

The emulsification device 128 can include a splitter 162, which can also be referred to as a splitter component and/or Y component. The splitter 162 can be fluidically coupled to the fluid inlet 132. The splitter 162 can split the flow of fluid flowing through the fluid inlet 132 into two flow paths. In some variants, the splitter 162 can split the flow of fluid flowing through the fluid inlet 132 into more than two flow paths (e.g., three, four, or more). The splitter 162 can be coupled to a first fluid conduit 134, which can also be referred to as a heated fluid conduit, first fluid tube, and/or heated fluid tube, to direct fluid flowing through the fluid inlet 132 into the first fluid conduit 134. The splitter 162 can be coupled to a second fluid conduit 136, which can also be referred to as a bypass fluid conduit, ambient fluid conduit, cooled fluid conduit, to direct fluid flowing through the fluid inlet 132 into the second fluid conduit 136.

Fluid flowing through the first fluid conduit 134 can be heated to a temperature, which can at least include any of those described herein. For example, the emulsification device 128 can include a heater 166 (e.g., heater cartridge) that can heat fluid flowing through the first fluid conduit 134 to at least any of the temperatures described herein. The heater 166, in some variants, can be heated by electricity. For example, the emulsification device 128 can include one or more conductors 142 that can deliver electrical energy to the heater 166 to heat the heater 166. In some variants, the heater 166 can be powered by a battery, which can be rechargeable. The first fluid conduit 134, in some variants, can be disposed around the heater 166 to facilitate the heater 166 heating fluid in the first fluid conduit 134. For example, the first fluid conduit 134 can be wrapped around the heater 166. In some variants, the first fluid conduit 134 can include a coil 138 disposed (e.g., coiled) around the heater 166. In some variants, a portion of the first fluid conduit 134 can include a material to facilitate efficient heat transfer from the heater 166 to the fluid in the first fluid conduit 134. For example, the first fluid conduit 134 can include a metal (e.g., stainless steel, aluminum, anodized aluminum, etc.), ceramic, and/or other material. In some variants, the coil 138 can include a material to facilitate efficient heat transfer from the heater 166 to the fluid in the first fluid conduit 134. In some variants, the coil 138 can include a material to facilitate efficient heat transfer from the heater 166 to the fluid in the first fluid conduit 134. In some variants, proximal and/or distal portions of the first fluid conduit 134 can include a material that has insulating properties (e.g., a polymer) to reduce heat transfer. In some variants, the first fluid conduit 134 can include portions with different material, which can include one portion with a good conductor (e.g., metal, metal alloys) for heat transfer and one or more other portions (e.g., distal and/or proximal portions of the good conductor) that include an insulating material such as a polymer.

The second fluid conduit 136 can bypass the heater 166 to avoid being heated. In some variants, the second fluid conduit 136 can include an insulating material to impede heat from the heater 166 significantly heating the fluid in the second fluid conduit 136. In some variants, the second fluid conduit can include portions with different materials with different conducting characteristics.

In some variants, the emulsification device 128 can include a carrier 144, which can also be described as a coil carrier and/or fluid conduit carrier. The carrier 144 can hold the first fluid conduit 134 and/or second fluid conduit 136. For example, the carrier 144 can hold the coil 138 in a position. In some variants, the coil 138 can snap into the carrier 144. In some variants, the carrier 144 can physically separate the first fluid conduit 134 (e.g., coil 138) and the second fluid conduit 136 which can help prevent fluid in the second fluid conduit 136 from being heated by the heater 166, first fluid conduit 134, and/or fluid in the first fluid conduit 134. The emulsification device 128 can include a barrier separating the first fluid conduit 134 and second fluid conduit 136.

The emulsification device 128 can include a valve assembly 146 (e.g., switch valve assembly, pinch valve assembly). The valve assembly 146 can stop or permit fluid flow through the first fluid conduit 134 and/or second fluid conduit 136. The first fluid conduit 134 and/or second fluid conduit 136 can be fluidically coupled with the valve assembly 146. In some variants, the valve assembly 146 can prevent or permit fluid flow through the first fluid conduit 134 and second fluid conduit 136 simultaneously. In some variants, the valve assembly 146 can switch between stopping flow through one of the first fluid conduit 134 and second fluid conduit 136 and permitting flow through the other of the first fluid conduit 134 and second fluid conduit 136. In some variants, the valve assembly 146 can be biased to permit flow through one of the first fluid conduit 134 and second fluid conduit 136 and stop flow through the other of the first fluid conduit 134 and the second fluid conduit 136, but the valve assembly 146 can be manipulated to overcome the biasing force to block flow through the one of the first fluid conduit 134 and the second fluid conduit 136 and permit flow through the other of the first fluid conduit 134 and the second fluid conduit 136. In some variants, the valve assembly 146 can be biased to block flow through the first fluid conduit 134 and permit flow through second fluid conduit 136 as a default, but the biasing force can be overcome by the user to permit flow through the first fluid conduit 134 and block flow through the second fluid conduit 136. For example, the valve assembly 146 can include a user interface 148, which can be a button, switch, or the like, that can be manipulated (e.g., pushed) to overcome the biasing force to reconfigure the valve assembly 146 to permit flow through the first fluid conduit 134 and block through the second fluid conduit 136. In some variants, the emulsification device 128 can include a lever 150. The lever 150 can be coupled to the housing 130 at a pivot 160. The lever 150 can contact the user interface 148. The lever 150 can contact the user interface 148 and extend a distance away from the user interface 148. The lever 150 can be pushed to apply a force to the user interface 148 to reconfigure the valve assembly 146 to alter (e.g., permit, block) flow through the first fluid conduit 134 and second fluid conduit 136. The lever 150 can amplify the force the user applies to manipulate (e.g., push) the user interface 148 to reconfigure the valve assembly 146 to adjust flow, which can decrease the force the user applies to manipulate the user interface 148 to adjust flow.

The emulsification device 128 can include a junction component 192 (e.g., junction component, Y-junction). The junction component 192 can be fluidically coupled to the valve assembly 146. The junction component 192 can direct fluid from the first fluid conduit 134 and the second fluid conduit 136 to a common flow path. For example, the fluid flowing through the first fluid conduit 134, when flowing through the valve assembly 146, can flow into a receiving region 164 of the junction component 192 and the fluid flowing through the second fluid conduit 136, when flowing through the valve assembly 146, can flow into the receiving region 164 of the junction component 192. Fluid directed into the receiving region 164 of the junction component 192 can flow distally out of the junction component 192. In some variants, the junction component 192 can include a single distal flow path out of the junction component 192. In some variants, the junction component 192 can include a plurality of distal flow paths out of the junction component 192.

The emulsification device 128 can include a tip 154, which can also be referred to as a distal tip, attachment, and/or distal attachment. Fluid can be delivered from the emulsification device 128 into an eye (e.g., capsular bag of the eye) by way of the tip 154. The tip 154 can be coupled to the junction component 192 such that fluid flowing through the junction component 192 can flow into the eye. The tip 154 can include an attachment portion 156 (e.g., proximal portion, coupling portion, luer attachment). The attachment portion 156 can facilitate coupling the tip 154 to the emulsification device 128. For example, the attachment portion 156 can be coupled to a distal cap 152 (e.g., distal collar) of the housing 130 and/or junction component 192. The attachment portion 156 can be inserted through an opening 168 of the distal cap 152 to engage with the junction component 192. The distal cap 152 can be coupled to the housing 130, which can include disposing an O-ring 170 between a portion of the distal cap 152 and the housing 130 to provide a seal. In some variants, the attachment portion 156 can receive a portion of the junction component 192 therein. In some variants, the attachment portion 156 can include one or more features to facilitate coupling to the distal cap 152 and/or junction component 192. For example, the attachment portion 156 can include external threads to facilitate coupling to the distal cap 152 which can have internal threads. The attachment portion 156 can include internal threads to facilitate coupling to the junction component 192 which can have external threads. In some variants, the attachment portion 156 can receive a portion (e.g., cylindrical structure, distal portion) of the junction component 192 with a push fit. The tip 154 can include a cannula 158, which can also be referred to as an irrigation cannula, tube, and/or irrigation tube. The cannula 158 can extend distally from the attachment portion 156. The cannula 158 can have a variety of diameters. The cannula 158 can be inserted into an eye (e.g., capsular bag) to deliver fluid. The tip 154 can be disposable (e.g., for use during one surgical procedure). The tip 154 can be, in some variants, decoupled form the emulsification device 128, cleaned, and recoupled to the emulsification device 128 for use.

In some variants, the emulsification device 128 can include one or more thermocouples to monitor temperature. For example, the emulsification device 128 can include one or more thermocouples at the fluid inlet 132, splitter 162, first fluid conduit 134, second fluid conduit 136, valve assembly 146, junction component 192, and/or tip 154 to monitor temperatures. For example, the emulsification device 128 can include one or more thermocouples within the first fluid conduit 134 proximal of the coil 138, within the coil 138, within the first fluid conduit 134 distal of the coil 138, at the tip 154, and/or at the cannula 158 (e.g., distal end and/or outlet of the cannula 158) of the tip 154. The one or more conductor(s) 142 can be operatively connected to the one or more thermocouples. The temperatures sensed by the one or more thermocouples can be used to control the heater 166 (e.g., control the heater 166 on a closed loop). For example, the output of the heater 166 can be automatically adjusted (e.g., increased or decreased) based on temperature(s) sensed by the one or more thermocouples. In some variants, the sensed temperature(s) can be communicated (e.g., by way of a loudspeaker, display, indicator, indicator light, etc.) to the user and the user can adjust the output of the heater 166. In some variants, the valve assembly 146 can be automatically controlled based on temperature(s) sensed by the one or more thermocouples. For example, if a sensed temperature is too high, the valve assembly 146 can block flow through the first fluid conduit 134 and permit flow through second fluid conduit 136 to prevent injury and/or discomfort. In some variants, the emulsification device 128 can communicate to the user that a sensed temperature is too high, and in response, the user can manipulate the valve assembly 146 to block flow through the first fluid conduit 134 and permit flow through second fluid conduit 136.

Figure 2C:
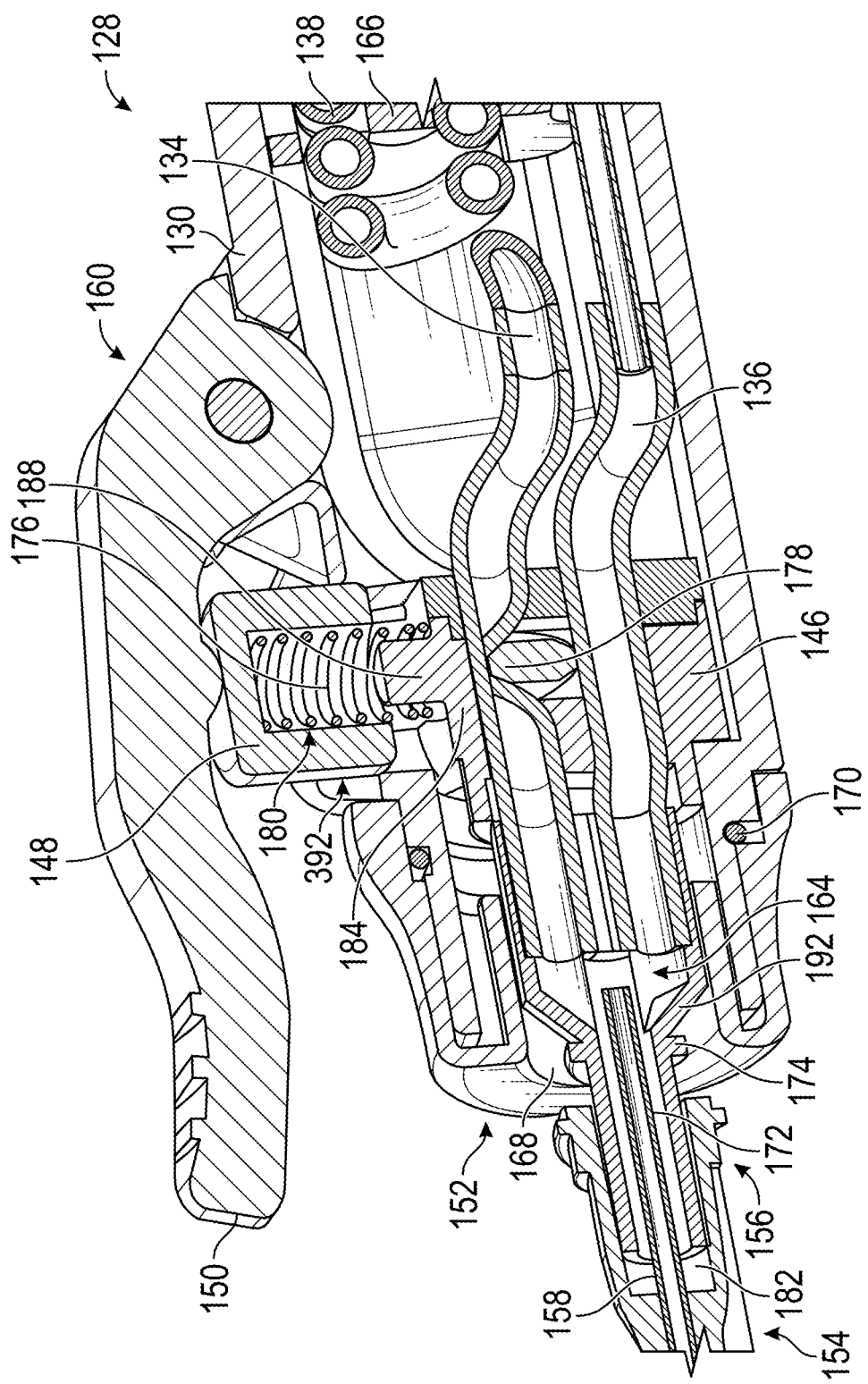
FIG. 2C illustrates a sectioned and enlarged view of the valve assembly and other components of the emulsification device of FIG. 2A.

FIG. 2C illustrates a sectioned and enlarged view of the valve assembly 146 and other components of the emulsification device 128. As shown, the valve assembly 146 can include a member 178 (e.g., gate, protrusion, flange). The member 178 can be moved to block flow through the first fluid conduit 134 and second fluid conduit 136. The member 178 can be moved to close (e.g., pinch closed, block, impede flow through) the first fluid conduit 134 and second fluid conduit 136. The member 178 can be biased by a spring 176 (e.g., helical spring) to close one of the first fluid conduit 134 and second fluid conduit 136. For example, the member 178 can be biased by the spring 176 to close (e.g., pinch close) the first fluid conduit 134. The spring 176 can push the user interface 148 (e.g., button) upward (e.g., through an opening 392 of the housing 130). The spring 176 can extend into a receiving region 180 of the user interface 148 which can have a cylindrical shaped structure. The spring 176 can be disposed around a protrusion 188 (e.g., projection, cylinder) of the frame 184 of the valve assembly 146 which can help maintain the positioning of the spring 176. The user interface 148 can be coupled to the member 178 such that the member 178 is biased upward with the user interface 148 by the spring 176 to close (e.g., pinch closed, block, impede flow through) the first fluid conduit 134. As described herein, the user can manipulate (e.g., push) the user interface 148, which can include pushing the lever 150 down, to overcome the biasing force of the spring 176 (e.g., compress the spring 176) to push the user interface 148 down. The member 178 can move (e.g., move down) with the user interface 148 to open (e.g., unblock, un-pinch) the first fluid conduit 134 and close (e.g., pinch close, block, impede flow through) the second fluid conduit 136. The user can release the user interface 148 (e.g., release the lever 150) to permit the spring 176 to push the user interface 148 upward to move the member 178 upward to open (e.g., unblock, un-pinch, permit flow through) the second fluid conduit 136 and close (e.g., block, pinch close, impede flow through) the first fluid conduit 134. The first fluid conduit 134 and second fluid conduit 136 can pass through the valve assembly 146. The first fluid conduit 134 and second fluid conduit 136, at least at the valve assembly 146, can include a material that is flexible and/or insulating. A flexible material can enable the member 178 to pinch closed the first fluid conduit 134 and second fluid conduit 136 (e.g., close flow path by deflecting peripheral wall of the first fluid conduit 134 and second fluid conduit 136).

As shown in FIG. 2C, the junction component 192 can include a distal conduit 172 (e.g., distal tube, distal portion). The distal conduit 172 can be disposed within a receiving region 182 of the tip 154 (e.g., attachment portion 156 of the tip 154). The distal conduit 172 can include a stop 174 (e.g., projection, protuberance, annular structure). In some variants, the tip 154 can be advanced over the distal conduit 172 until the tip 154 (e.g., attachment portion 156) contacts the stop 174. The cannula 158 of the tip 154 can extend through the receiving region 182 of the tip 154 and through the distal conduit 172 of the junction component 192 which can include extending to the receiving region 164 of the junction component 192. Fluid flowing through the first fluid conduit 134 and second fluid conduit 136 distal of the valve assembly 146 can flow into the receiving region 164 of the junction component 192 and then out of the tip 154 by way of the cannula 158 of the tip 154.

The emulsification device 128 can include features to facilitate aspiration as described herein. The emulsification device 128 can include features to insulate the tip 154 as described herein, which can include features to cool the tip 154.

Figure 3A:
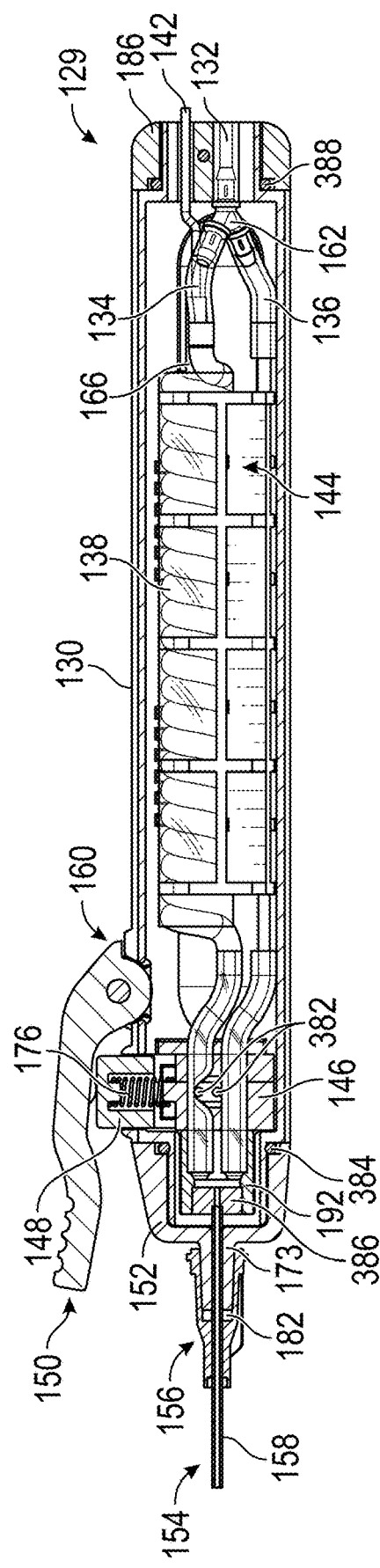
FIG. 3A illustrates a sectioned view of an emulsification device.
Figure 3B:
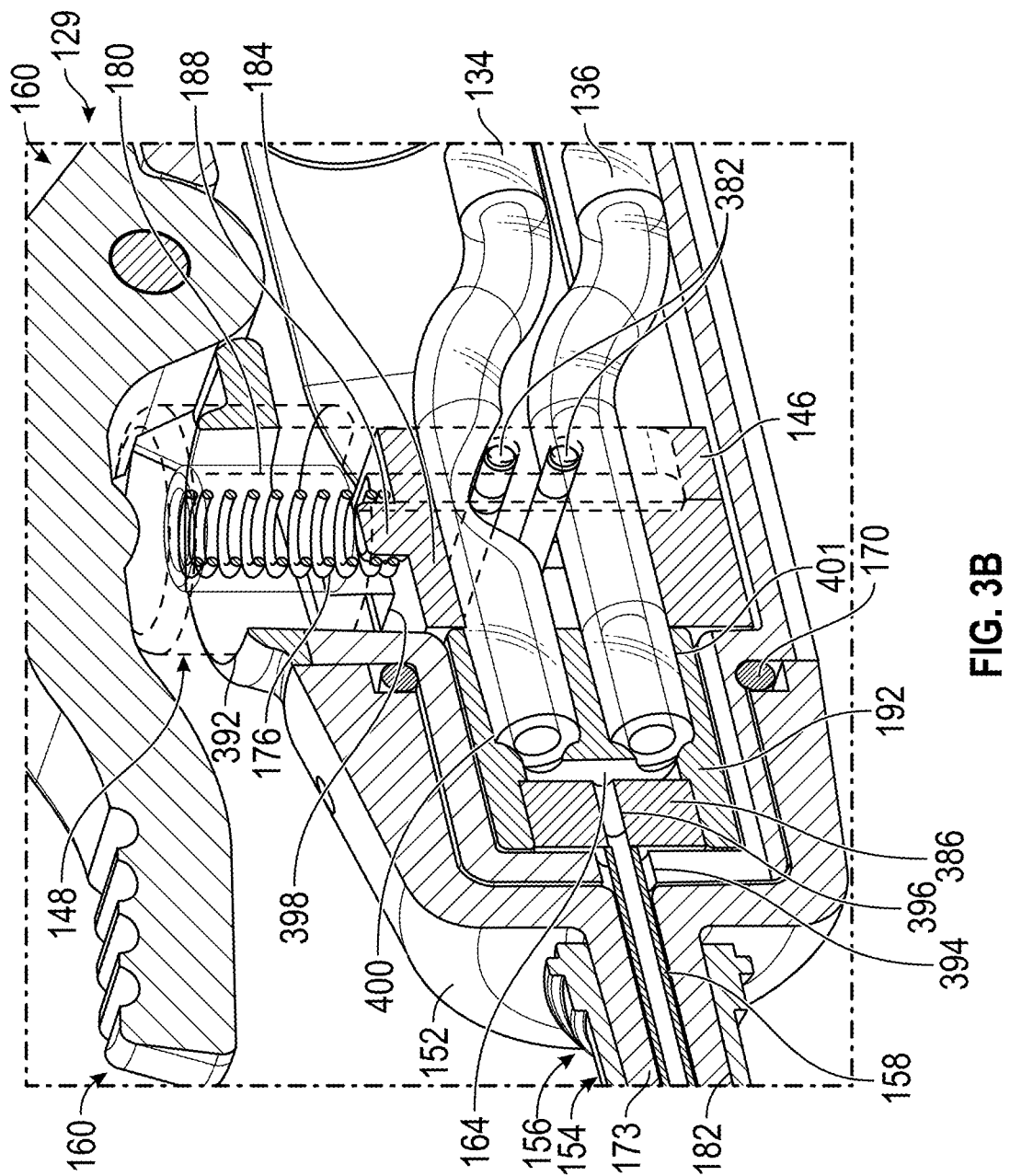
FIG. 3B illustrates a sectioned and enlarged view of the valve assembly and other components of the emulsification device of FIG. 3A.

FIG. 3A illustrates a sectioned view of an emulsification device 129, which can also be referred to as a thermal device, thermal emulsification device, thermal system, emulsification system, handpiece, thermal handpiece, irrigation device, and/or irrigation handpiece. FIG. 3B illustrates a sectioned and enlarged view of the valve assembly 146 of the emulsification device 129 and other features. The emulsification device 129 can include the features of emulsification device 128 and/or other emulsification devices described herein.

As illustrated in FIG. 3B, the valve assembly 146 can include one or more member(s) 382 (e.g., gate(s), protrusion(s), pin(s)). For example, the valve assembly 146 can include two members 382. In some variants, the valve assembly 146 can include more than two members 382. The members 382 can be spaced apart from each other which can include being spaced apart from each other vertically. The one or more members 382 can be coupled to the user interface 148 (e.g., button) and be used to impede and permit flow through the first fluid conduit 134 and second fluid conduit 136 similar to the member 178 described in reference to the emulsification device 128.

The junction component 192 can include a seal 386. The seal 386 can include a lumen 396 (e.g., channel, lumen) into which the cannula 158 can be inserted. The seal 386 can form a seal around the cannula 158 of the tip 154 to prevent leakage of fluid between the cannula 158 and the seal 386. The seal 386 can include a deformable material (e.g., a polymer such as silicone) to facilitate creating a seal. The seal 386 can be disposed at the receiving region 164 of the junction component 192. Fluid flowing through the first fluid conduit 134 and second fluid conduit 136 distal of the valve assembly 146 can flow into the receiving region 164 of the junction component 192, through the lumen 396 of the seal 386, and out of the tip 154 by way of the cannula 158. The first fluid conduit 134 can be received into a hole 400 of the junction component 192. The second fluid conduit 136 can be received into a hole 401 of the junction component 192.

The distal cap 152 can be disposed over a distal portion of the housing 130. As illustrated in FIG. 3B, the distal cap 152 can include a distal conduit 173 (e.g., distal tube, distal portion). The distal cap 152 can include the distal conduit 173 instead of the junction component 192 including the distal conduit 172 as described in reference to the emulsification device 128. The tip 154 (e.g., attachment portion 156) can be coupled to (e.g., disposed over) the distal conduit 173. For example, the tip 154 can be positioned with the distal conduit 173 positioned within the receiving region 182 of the tip 154. The distal conduit 173 can be aligned (e.g., coaxially aligned) with an opening 394 of the housing 130. With the tip 154 coupled to the distal cap 152, the cannula 158 of the tip 154 can extend through the distal conduit 173 and opening 394 of the housing 130 and into the lumen 396 of the seal 386 such that fluid flowing into the receiving region 164 can flow through the lumen 396 and out the tip 154 by way of the cannula 158. The tip 154 can be coupled to the distal cap 152 (e.g., distal conduit 173) with a variety of techniques, which can at least include a luer lock connection, threaded connection, push fit connection, and/or others.

The emulsification device 129 can include an O-ring 388 to seal the interface between(s) the proximal cap 186 and the housing 130. The proximal cap 186 can include a collar shape disposed around a proximal portion of the housing 130.

Figure 4C:
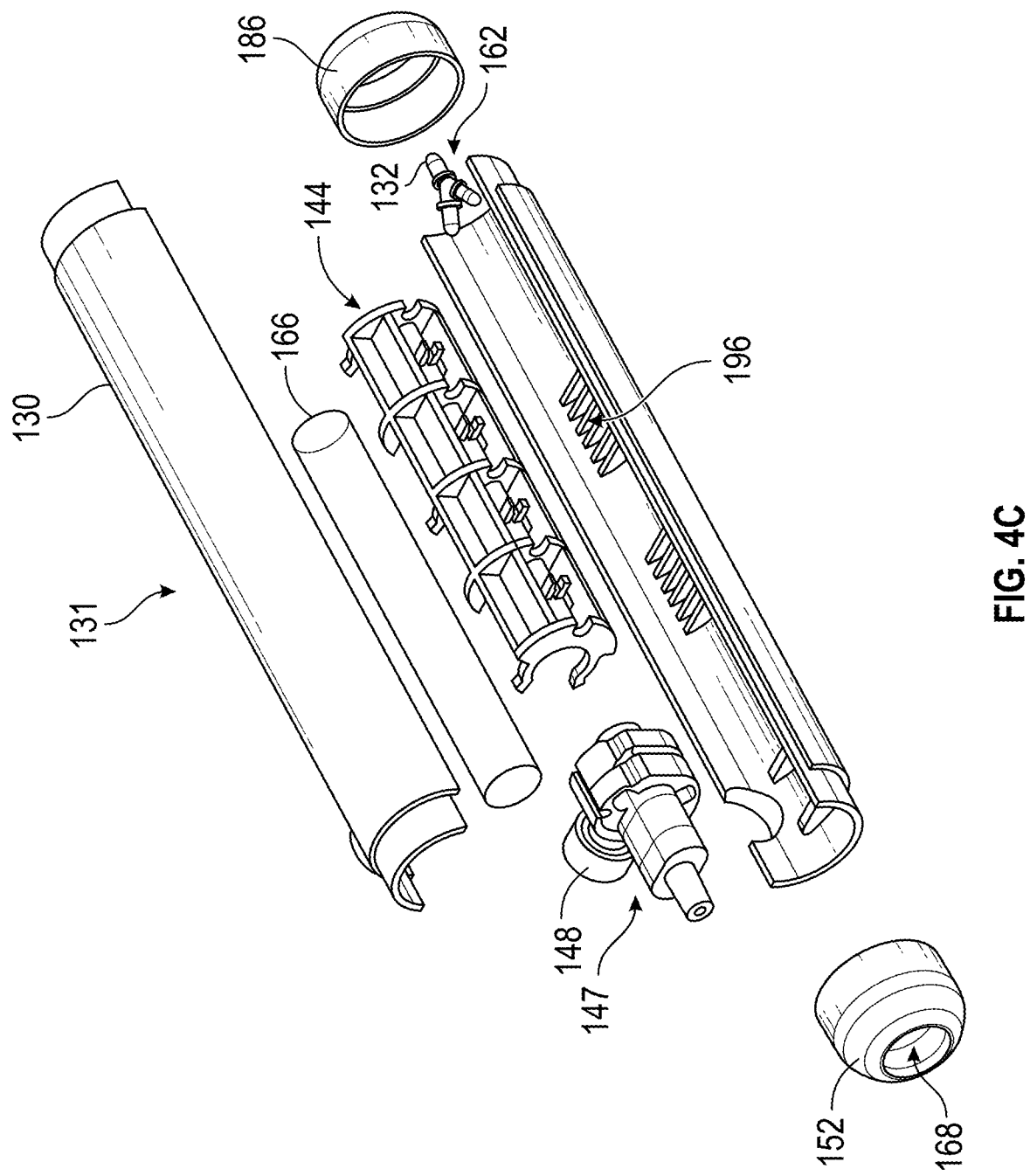
FIG. 4C illustrates an exploded view of the emulsification device of FIG. 4A.

FIGS. 4A-4C illustrate views of an emulsification device 131, which can also be referred to as a thermal device, thermal emulsification device, thermal system, emulsification system, handpiece, thermal handpiece, irrigation device, and/or irrigation handpiece. FIG. 4A illustrates a perspective view of the emulsification device 131. FIG. 4B illustrates a sectioned view of the emulsification device 131. FIG. 4C illustrates an exploded view of some features of the emulsification device 131. The emulsification device 131 can include the features of emulsification devices 128, 129 and/or other emulsification devices described herein.

As illustrated in FIG. 4A, the distal conduit 172 of the junction component 192 can protrude at least partially out of an opening 168 of the housing 130. The distal conduit 172 of the junction component 192 can extend distal of the housing 130.

Figure 5B:
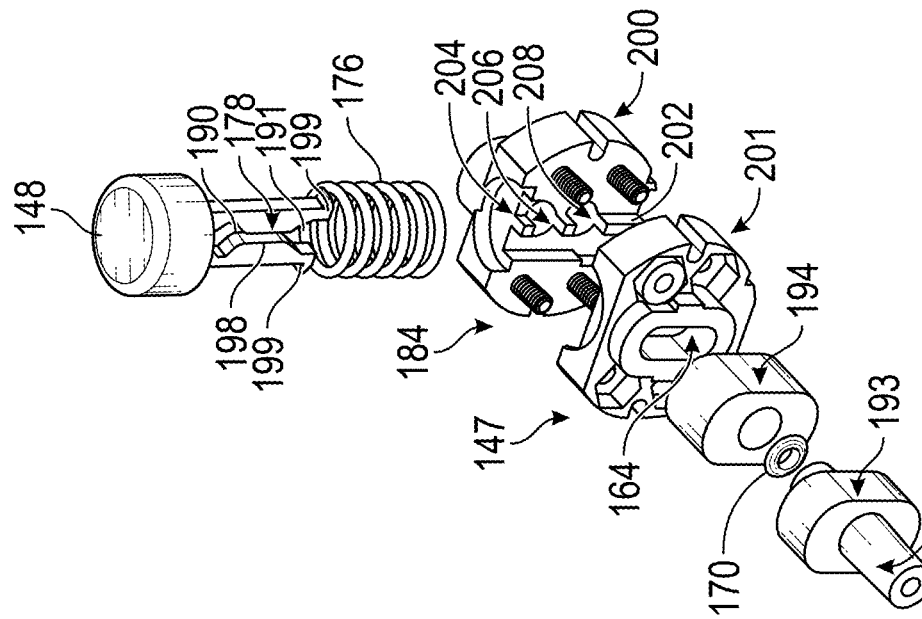
FIG. 5B illustrates an exploded view of the valve assembly of FIG. 5A.
Figure 5A:
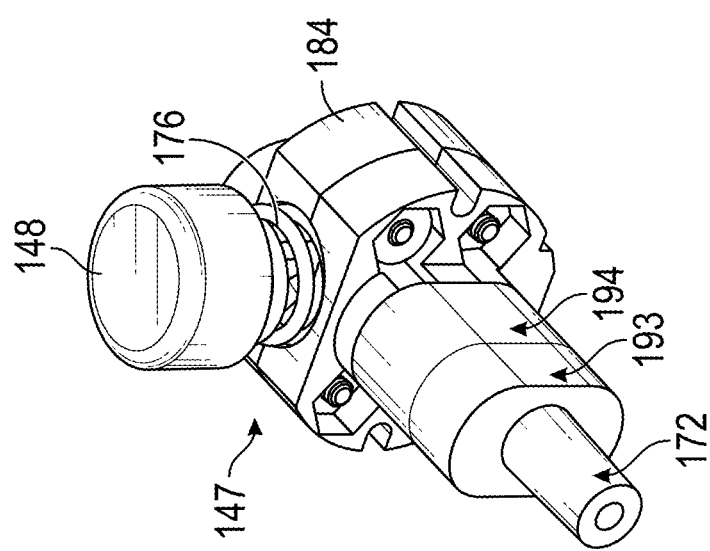
FIG. 5A illustrates a valve assembly of the emulsification device of FIG. 4A.
Figure 5C:
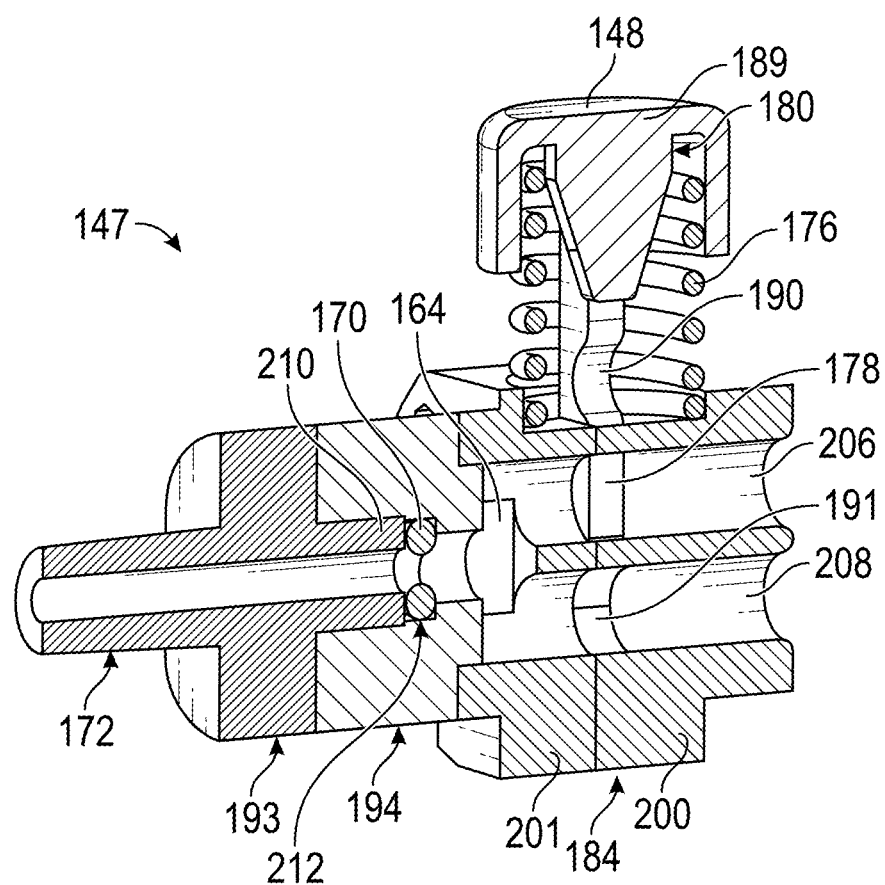
FIG. 5C illustrates a sectioned view of the valve assembly of FIG. 5A.

FIGS. 4B, 4C, and 5A-5C illustrate a valve assembly 147 (e.g., switch valve assembly) of the emulsification device 131, which can include any of the features of the valve assembly 146 described herein. As illustrated in FIGS. 5B and 5C, the frame 184 of the valve assembly 147 can include an opening 206 (e.g., lumen) and/or opening 208 (e.g., lumen). Fluid (e.g., heated fluid) flowing through the first fluid conduit 134 can be directed into the opening 206. Fluid flowing through the second fluid conduit 136 can be directed into the opening 208. The opening 206 can receive the first fluid conduit 134. The opening 208 can receive the second fluid conduit 136.

The valve assembly 147 can include a member 178 (e.g., gate, flange), which can be coupled to the user interface 148 (e.g., button), that can be used to impede or permit fluid flow from the first fluid conduit 134 and/or second fluid conduit 136. For example, the member 178 can be used to block and/or unblock the opening 206 and/or opening 208 to permit and/or impede fluid flow from the first fluid conduit 134 and/or second fluid conduit 136 through the valve assembly 147. The member 178 can include an opening 190 (e.g., upper opening, first opening) and/or opening 191 (e.g., lower opening, second opening). The opening 190 of the member 178 can be aligned with the opening 206 of the frame 184 to permit fluid flow from the first fluid conduit 134 through the valve assembly 147 by way of the opening 206. When the opening 190 is not aligned with the opening 206, the member 178 can block the opening 206 to impede fluid flow from the first fluid conduit 134 through the opening 206. The opening 191 of the member 178 can be aligned with the opening 208 of the frame 184 to permit fluid flow from the second fluid conduit 136 through the valve assembly 147 by way of the opening 208. When the opening 191 is not aligned with the opening 208, the member 178 can block the opening 208 to impede fluid flow from the second fluid conduit 136 through the opening 208. The member 178 can include a channel 198 (e.g., slot), which can extend between the opening 190 and the opening 191, that can receive one or more guides 202 (e.g., protrusions, projections, flanges) of the frame 184. The one or more guides 202 can be disposed in the channel 198 of the member 178 as the member 178 is translated relative to the frame 184 to alter flow within the valve assembly 147. The interface between the one or more guides 202 and the channel 198 can maintain an orientation of the member 178 with respect to the frame 184 as the member 178 is moved with respect to the frame 184.

The member 178 can be biased by a spring 176 to block one of the opening 206 and/or opening 208 to control flow through the valve assembly 147. For example, the spring 176 can bias (e.g., push) the user interface 148 (e.g., button) upward to position the member 178 to block fluid flow (e.g., heated fluid flow) from the first fluid conduit 134 through the opening 206 and to position the opening 191 at the opening 208 to permit fluid flow (e.g., unheated fluid flow) through the opening 208 such that fluid from the second fluid conduit 136 (e.g., unheated fluid) flows out of the distal conduit 172 and into the eye. The spring 176 can be disposed within a receiving region 180 of the user interface 148. The spring 176 can be disposed around a protrusion 189, which can be a tapered structure such as a cone, of the user interface 148 to maintain an orientation of the spring 176. The spring 176 can be disposed within a recess 204 of the frame 184 to maintain an orientation of the spring 176. The user can move (e.g., push, push downward) the user interface 148 to overcome the biasing force of the spring 176 to position the member 178 downward to block the opening 208 to impede fluid flow (e.g., unheated fluid flow) from the second fluid conduit 136 through the opening 208 and position the opening 190 at the opening 206 to permit fluid flow (e.g., heated fluid flow) from the first fluid conduit 134 through the opening 206 such that the fluid from the first fluid conduit 134 (e.g., heated fluid) flows out of the distal conduit 172 and into the eye. The user can release the user interface 148 to enable the spring 176 to push the user interface 148 upward with the member 178 to block the opening 206 with the member 178 to impede flow through the opening 206 and unblock the opening 208 (e.g., position the opening 191 at the opening 208) to permit flow through the opening 208.

The fluid flow paths through the opening 206 and opening 208 can join together distal of the member 178 within the receiving region 164 of the valve assembly 147 and out a single flow path through the distal conduit 172. As described herein, in some variants, the valve assembly 147 permits fluid flow through one of the opening 206 and opening 208 but not simultaneously through both. In some variants, the valve assembly 147 can permit simultaneous flow through the opening 206 and opening 208 as the member 178 is moved between positions (e.g., moved from blocking the opening 206 to blocking the opening 208 or moved from blocking the opening 208 to blocking the opening 206).

In some variants, the member 178 can include one or more catches 199 (e.g., hooks, edges). The one or more catches 199 can be disposed at an end portion of the member 178. The one or more catches 199 can prevent the member 178 and user interface 148 from being decoupled from the frame 184. The one or more catches 199 can be deflected toward each other to facilitate positioning the member 178 within a slot disposed between a first component 200 and a second component 201 of the frame 184 that are coupled together (e.g., coupled with fasteners). The one or more catches 199 can deflect outward after insertion into the slot, which can prevent removal of the member 178 from the slot.

In some variants, the valve assembly 147 can include a bridge 194 (e.g., bridge component, intermediate component). In some variants, the bridge 194 can be disposed between the frame 184 and a distal component 193 of the valve assembly 147. The bridge 194 can include a receiving region 212 to receive a proximal conduit 210 of the distal component 193, as shown in FIG. 5C. The proximal conduit 210 can be on an opposing side of the distal component 193 as the distal conduit 172. A lumen can extend through the distal conduit 172 and proximal conduit 210. The distal conduit 172 and proximal conduit 210 can be coaxial. An O-ring 170 can be disposed between the proximal conduit 210 and the bridge 194 (e.g., wall of the receiving region 212 of the bridge 194) to help prevent leaks.

Figure 6A:
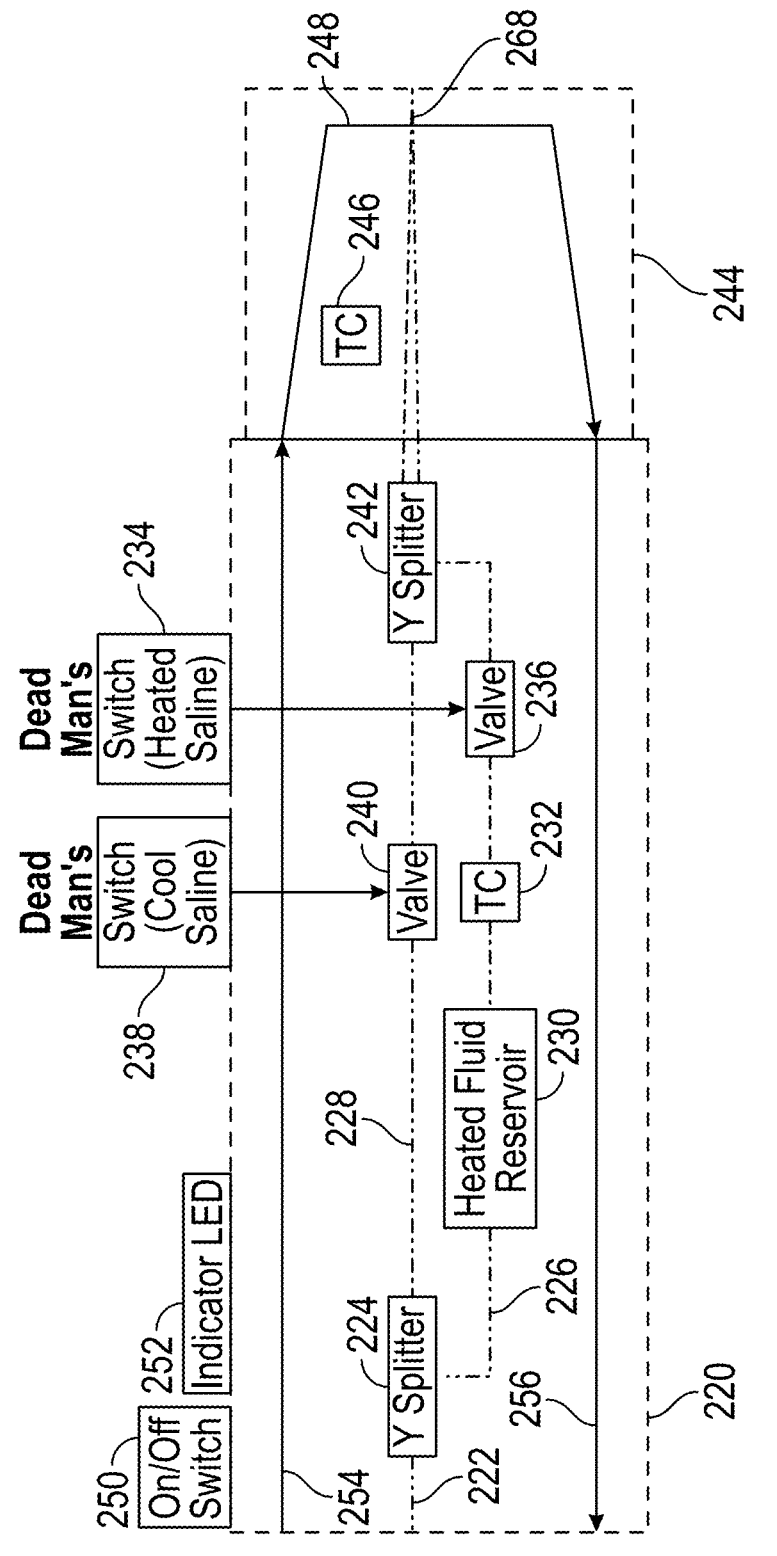
FIG. 6A schematically illustrates an emulsification device.

FIG. 6A illustrates a schematic of an emulsification device 218, which can also be referred to as a thermal device, thermal emulsification device, thermal system, emulsification system, handpiece, thermal handpiece, irrigation device, and/or irrigation handpiece. The emulsification device 218 can include the features of emulsification devices 128, 129, 131, and/or other emulsification devices described herein. The emulsification device 218 can include features to cool a distal tip of the emulsification device 218. For example, the emulsification device 218 can circulate a fluid through the distal tip to cool.

The emulsification device 218 can include a housing 220. The housing 220 can include an interior to house components of the emulsification device 218. The housing 220 can be a handpiece for a user.

The emulsification device 218 can include an inlet 222 to receive fluid from a fluid supply (e.g., fluid reservoir). The emulsification device 218 can include a splitter 224 (e.g., Y splitter, Y component) that can be fluidically coupled to the inlet 222. The splitter 224 can direct fluid flowing through the inlet 222 into a first fluid conduit 226 (e.g., bypass fluid conduit, unheated fluid conduit) and second fluid conduit 228 (e.g., heated fluid conduit). The first fluid conduit 226 can include a reservoir 230 (e.g., heated fluid reservoir). Fluid flowing through the first fluid conduit 226 can flow into the reservoir 230 to be heated. A heater can be disposed at the reservoir 230 to heat fluid disposed therein. The emulsification device 218 can include one or more thermocouples 232 to monitor temperatures at any location of the emulsification device 218. For example, the emulsification device 218 can include a thermocouple 232 along the first fluid conduit 226 distal of the reservoir 230 to monitor a temperature of the heated fluid flowing out of the reservoir 230. The emulsification device 218 can adjust the heater heating the fluid within the reservoir 230 to adjust the temperature of fluid exiting the reservoir 230 based on the temperature sensed by the thermocouple 232. The emulsification device 218 can include a junction 242 (e.g., Y component, Y splitter) that can join the flows from the first fluid conduit 226 and second fluid conduit 228 into a single flow path of an outlet 268 (e.g., outlet conduit) of the emulsification device 218. The outlet 268 can direct fluid distally out of a tip 244 (e.g., distal tip) of the emulsification device 218 and into the eye. Each of the second fluid conduit 228 and first fluid conduit 226 can include a valve to control flow. For example, the first fluid conduit 226 can include a valve 236 (e.g., pinch valve, spring-loaded pinch valve, spring-loaded valve) distal of the reservoir 230 and proximal of the junction 242 that can be opened, closed, and/or partially closed to control flow through the first fluid conduit 226. The second fluid conduit 228 can include a valve 240 (e.g., pinch valve, spring-loaded pinch valve, spring-loaded valve) proximal of the junction 242 that can be opened, closed, and/or partially closed to control flow through the second fluid conduit 228. In some variants, the valve 236 can pinch the first fluid conduit 226 closed. In some variants, the valve 240 can pinch the second fluid conduit 228 closed. In some variants, the valve 236 and/or valve 240 can be biased by a spring to a closed configuration. In some variants, the valve 240 and/or valve 236 can be automatically operated based on detected temperatures by the thermocouple 232. In some variants, the emulsification device 218 can include a switch 238 (e.g., user interface, button) to operate the valve 240 and/or a switch 234 (e.g., user interface, button) to operate the valve 236 to enable the user to control the valve 240 and/or valve 236.

The emulsification device 218 can include a coolant fluid conduit 248 (e.g., conduit). The coolant fluid conduit 248 can circulate fluid (e.g., unheated, cooled, etc.) through the tip 244 to cool the tip 244. Fluid can flow into the coolant fluid conduit 248 by way of a coolant inlet 254. The coolant fluid conduit 248 can direct fluid from the coolant inlet 254 to the tip 244 to cool the tip 244 and then direct the fluid to a coolant exit 256. The coolant inlet 254 and/or coolant exit 256 can be disposed at a proximal portion of the housing 220. In some variants, the coolant fluid conduit 248 can include a first conduit from the coolant inlet 254 to the tip 244 and a second conduit from tip 244 to coolant exit 256. The coolant fluid conduit 248 can direct fluid radially outward of the outlet 268 of the tip 244 to insulate an outer portion of the tip 244 from heated fluid flowing through the outlet 268. In some variants, fluid can be circulated through the coolant fluid conduit 248 when the emulsification device 218 is in use.

The emulsification device 218 can include a thermocouple 246 at the tip 244 to monitor a temperature at the tip 244. The emulsification device 218 can automatically control the valve 240, valve 236, heater, and/or circulation of fluid through the coolant fluid conduit 248 based on temperatures sensed by the thermocouple 246.

The emulsification device 218 can include a power switch 250 to turn the emulsification device 218 on and off. The emulsification device 218 can include one or more indicators (e.g., loudspeaker(s), light(s), display(s), etc.) to communicate information to the user. For example, the emulsification device 218 can include an indicator light 252 (e.g., LED). The indicator light 252 can indicate when the valve 236 is open and heated fluid is flowing out of the outlet 268. The indicator light 252 can indicate when the emulsification device 218 is turned on. The indicator light 252 can indicate when the thermocouple 232 and/or thermocouple 246 have detected a temperature above or below a threshold.

Figure 6B:
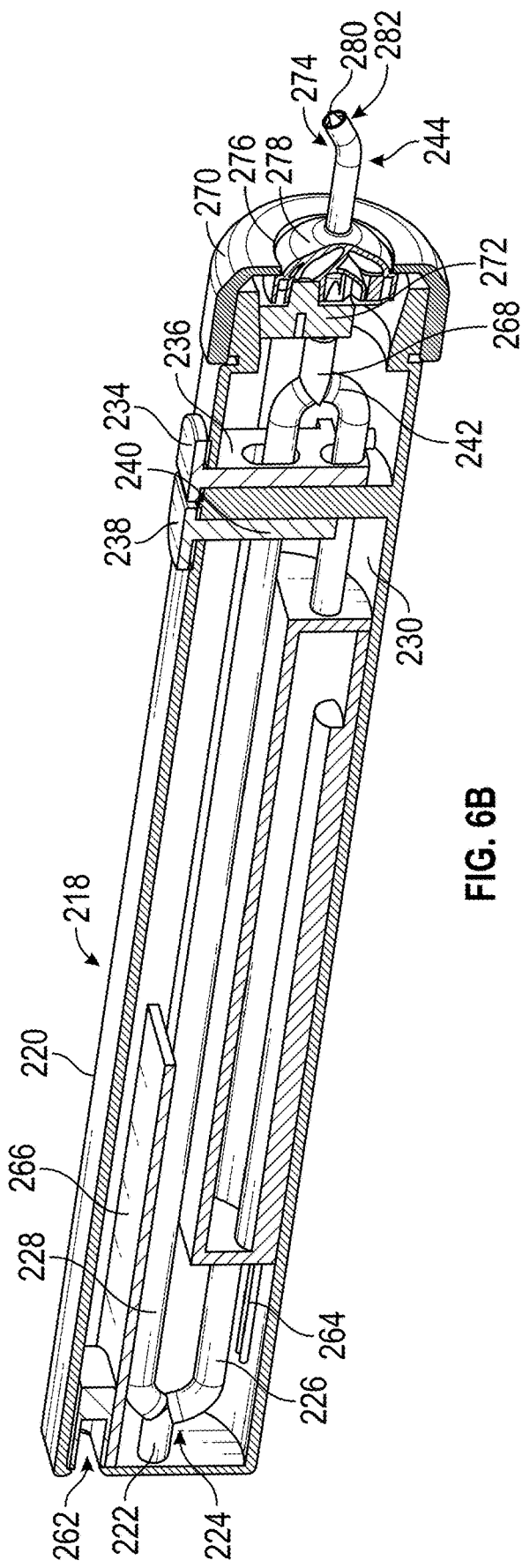
FIG. 6B illustrates a sectioned view of an emulsification device corresponding to FIG. 6A.

FIG. 6B illustrates an example of the emulsification device 218 schematically illustrated in FIG. 6A. As shown, the emulsification device 218 can include a coupler 272 (e.g., tip interface, interface, interface component). The coupler 272 can be fluidically coupled to the coolant fluid conduit 248 and/or outlet 268 (e.g., outlet conduit). The distal tip 274 can be coupled to the coupler 272 to fluidically couple with the outlet 268 and/or coolant fluid conduit 248. The coupler 272 can, in some variants, be coupled to an interior of the housing 220. The coupler 272 can direct coolant fluid from a first conduit of the coolant fluid conduit 248 into the tip 244 and direct coolant fluid from the tip 244 to a second conduit of the coolant fluid conduit 248 after circulation through the tip 244 to flow to the outlet 268. The fluid from the coolant fluid conduit 248 can circulate through one or more lumens in the tip 244, which can be radially outward of a flow path of fluid from the outlet 268 through the tip 244. The tip 244 can include a proximal portion 278 that is coupled to the coupler 272. Fluid from the outlet 268 can flow through the 272 and into the tip 244 for delivery into the eye.

The tip 244 can include an elongate portion 274. The elongate portion 274 can extend from the proximal portion 278. The elongate portion 274 can be straight. The elongate portion 274 can include a straight portion and an angled portion oriented at an angle relative to the straight portion. The elongate portion 274 can include a curved portion and/or bend. The elongate portion 274 include a distal end 280. The distal end 280 can include an opening through which fluid from the outlet 268 can flow into the eye. The distal end 280 can include a tapered shape, which can include a cone shape. The elongate portion 274 can include a peripheral wall 282. The peripheral wall 282 can be disposed radially outward of the distal end 280. In some variants, a portion of the distal end 280 can extend more distally than the peripheral wall 282 such that another portion of the distal end 280 is proximal of the distal-most portion of the peripheral wall 282.

The emulsification device 218 can include a distal cap 270 (e.g., distal collar, collar). The distal cap 270 can be coupled to the housing 220. The distal cap 270 can help secure the tip 244 to the emulsification device 218. The distal cap 270 can include an opening 276 through which the tip 244 can extend when coupled to the coupler 272.

The emulsification device 218 can include a port 262 (e.g., USB port, USB-C port). The port 262 can be used to couple the emulsification device 218 to a computer, such as a controller, proportional-integral-derivative (PID) controller, portable electronic device, etc. The emulsification device 218 can include an electronics board 266, which can support the port 262. The computer, in some variants, can control the emulsification device 218. In some variants, the emulsification device 218 can be powered by a battery, which can include heating fluid with power from the battery. In some variants, the port 262 can be used to charge the battery.

Figure 6D:
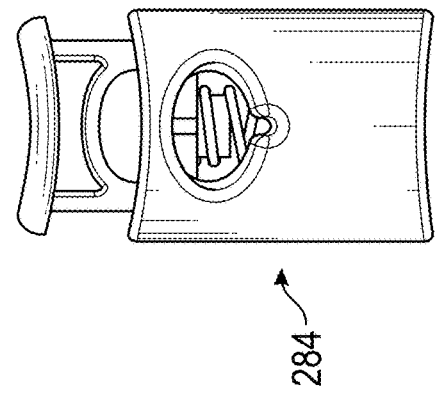
FIG. 6D illustrates an example valve.
Figure 6C:
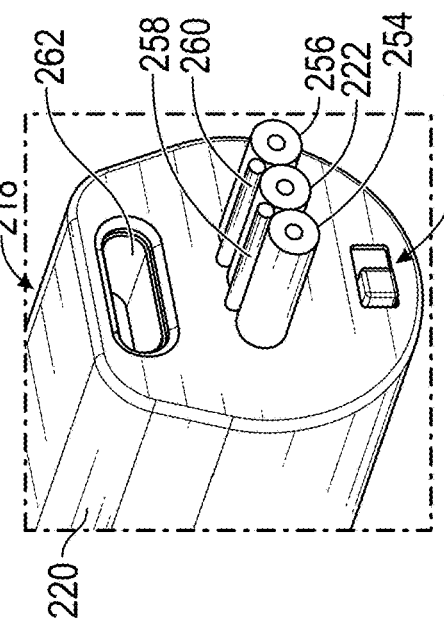
FIG. 6C illustrates a proximal portion of the emulsification device of FIG. 6B.

As shown in FIG. 6C, the power switch 250 can be disposed at the proximal portion of the housing 220 of the emulsification device 218. The coolant inlet 254, inlet 222, and/or coolant exit 256 can, in some variants, be disposed at the proximal portion of the housing 220.

The emulsification device 218 can include a thermocouple conduit 258 and/or heater conduit 260. The thermocouple conduit 258 can provide power to the thermocouple 232 and/or thermocouple 246 and/or communicate data from the thermocouple 232 and/or thermocouple 246 to another device such as a computer. The heater conduit 260 can provide electrical power to heat the heater 264.

FIG. 6D illustrates a representation of a pinch valve, the features of which can be incorporated into the switch 238, valve 240, switch 234, and/or valve 236.

Figure 7:
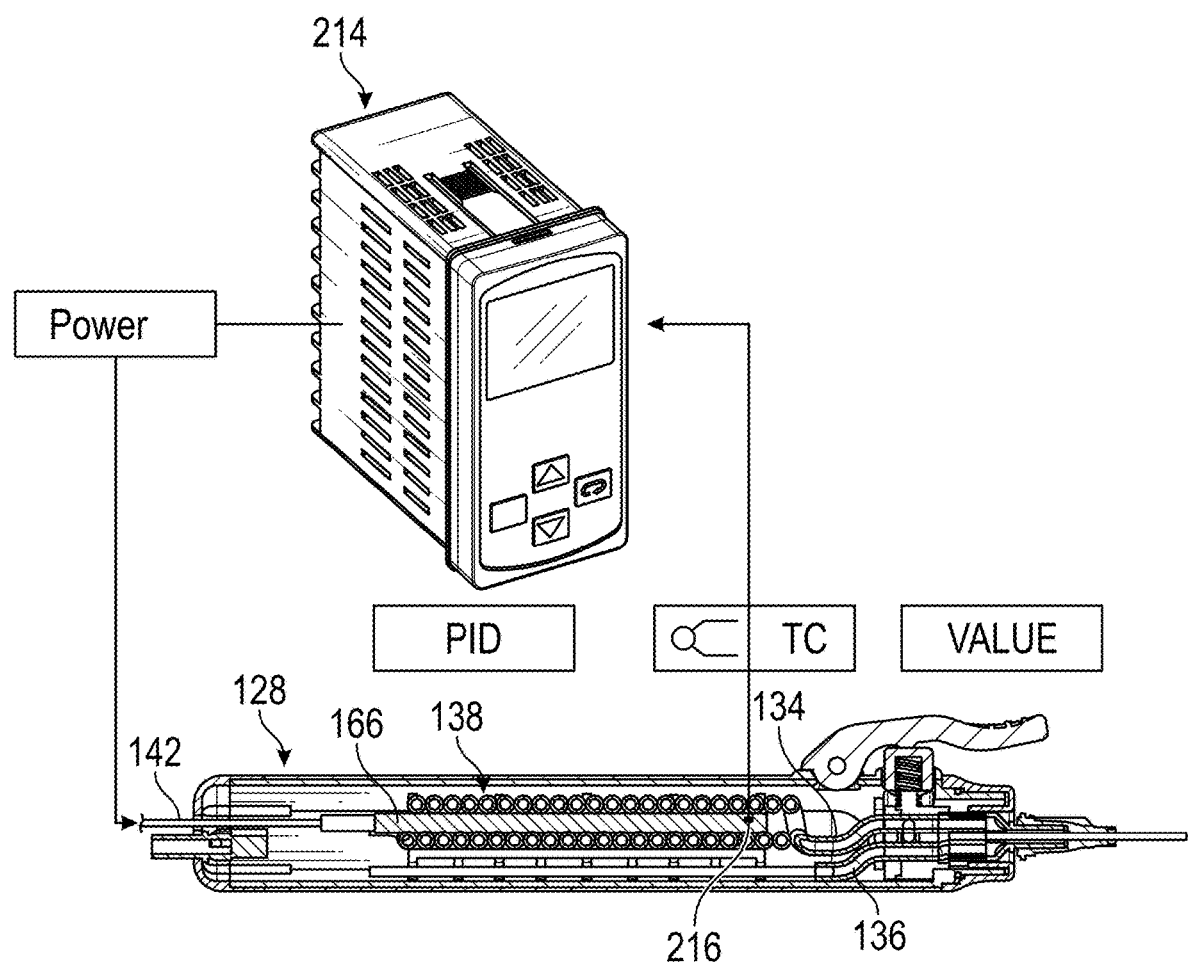
FIG. 7 illustrates a controller of an emulsification device.

FIG. 7 illustrates an example controller 214 (e.g., proportional-integral-derivative (PID) controller). The controller 214 can receive data (e.g., feedback) from one or more thermocouples of the emulsification device 128, which can be communicated to the emulsification device 128 by way of a wired or wireless technique. The controller 214 can power the heater 166 of the emulsification device 128. One or more conductor(s) 142 can electrically couple the controller 214 to the heater 166 of the emulsification device 128. The controller 214 can receive data from the one or more thermocouples of the emulsification device 128 and adjust power delivered to the heater 166 based on the data. The controller 214 can, with the emulsification device 128 and/or controller 214 powered on, preheat the heater 166 and/or coil 138 such that fluid in the coil 138 is heated to a target temperature.

Different events can correspond to different statuses of the controller 214 and one or more valves of the emulsification device 218. For example, for a system reset, the controller 214 can be powered off and the one or more valves for the heated fluid can be open. For tuning the controller 214, the controller 214 can be tuned and the one or more valves for the heated fluid can be open. For pre-heating the coil 138, the controller 214 can be powered on and heat the coil 138 with the one or more valves for the heated fluid closed and the one or more valves for the unheated (e.g., cooled) fluid open. For irrigating the eye with heated fluid, the controller 214 can be powered on and heat the coil 138 and the one or more valves for the heated fluid can be open and the one or more valves for the unheated (e.g., cooled) fluid can be closed. For irrigating the eye with unheated (e.g., cooled) fluid, the controller 214 can be powered on and heat the coil with the one or more valves for the heated fluid closed and the one or more valves for the unheated (e.g., cooled) fluid open. For power down, the controller 214 can be powered off and the one or more valves for the unheated (e.g., cooled) fluid can be open.

Figure 8A:
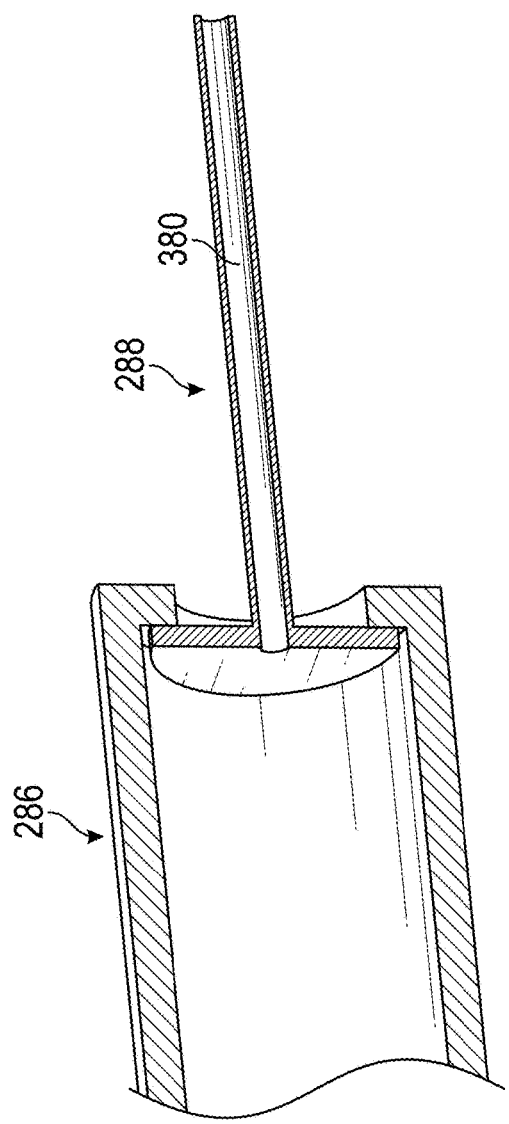
FIG. 8A illustrates a distal tip of an emulsification device.
Figure 8B:
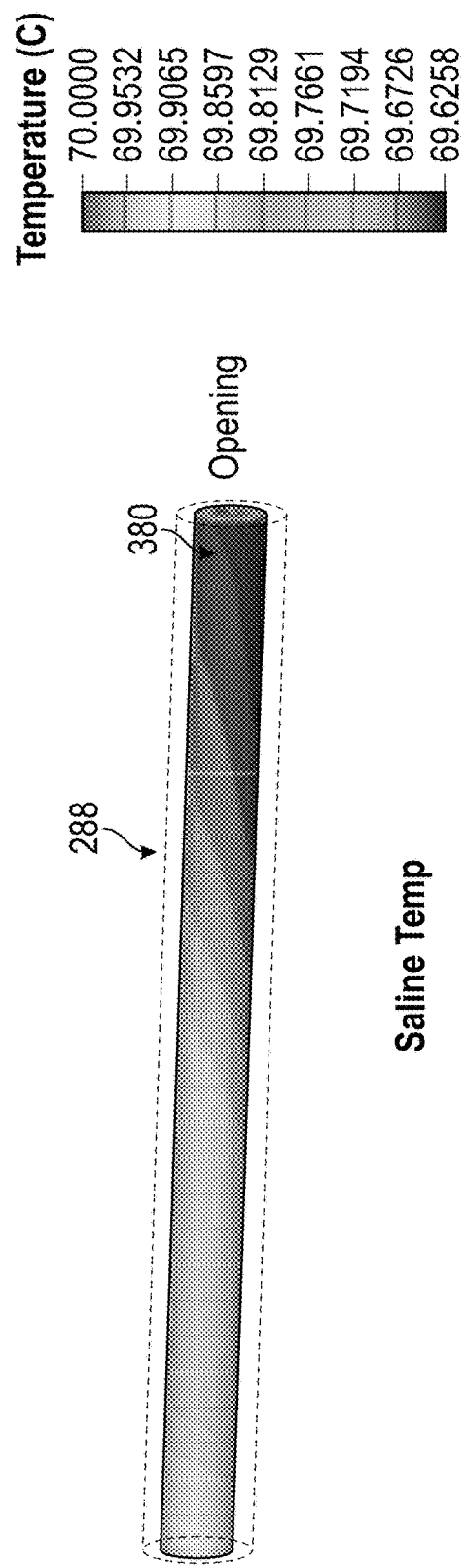
FIG. 8B illustrates temperatures of heated fluid flowing through the irrigation passageway of the distal tip of FIG. 8A.
Figure 8C:
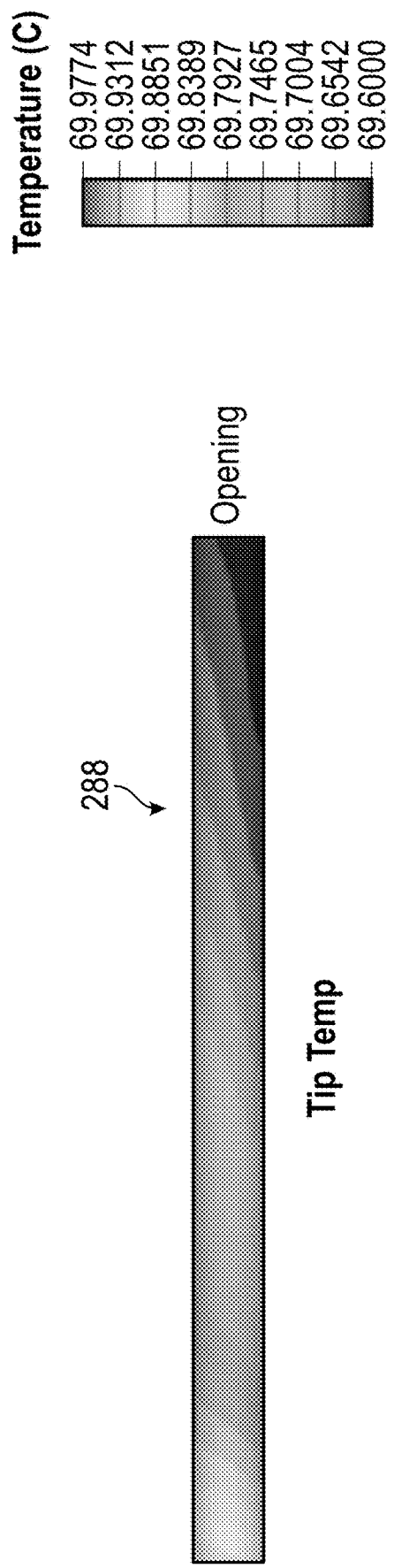
FIG. 8C illustrates temperatures at an outside surface of the distal tip of FIG. 8A with heated fluid flowing through the irrigation passageway.
Figure 8D:
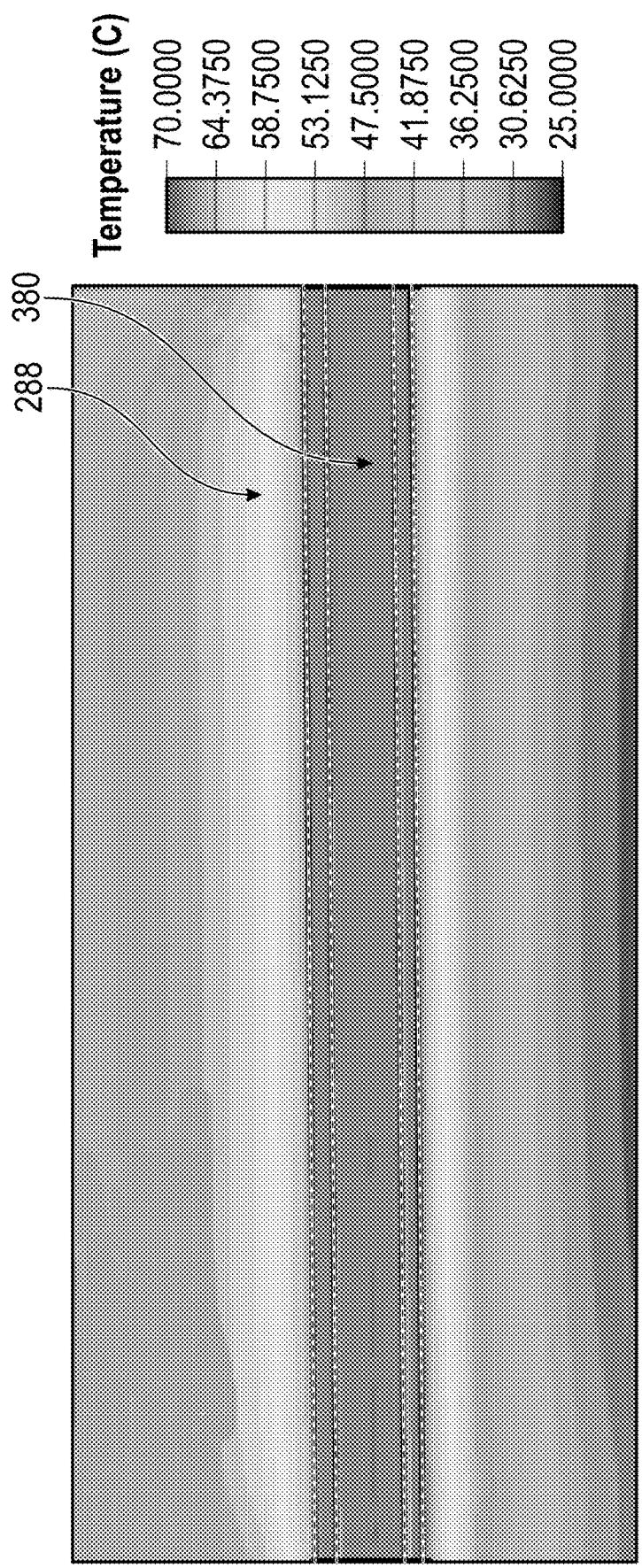
FIG. 8D illustrates a temperature gradient with heated fluid flowing through the irrigation passageway of the distal tip of FIG. 8A.

FIG. 8A illustrates a distal tip 288 of an emulsification device 286 (e.g., irrigation device), which can also be referred to as a thermal device, thermal emulsification device, thermal system, emulsification system, handpiece, thermal handpiece, irrigation device, and/or irrigation handpiece. The emulsification device 286 can include any of the features described in reference to any of the emulsification devices herein. The distal tip 288 can be made of a metal such as 316 stainless steel. The distal tip 288 can be elongate with a consistent peripheral wall with an outside diameter of 0.8 millimeters. The distal tip 288 can include an irrigation passageway 380 through which heated fluid can flow. FIG. 8B illustrates temperatures of heated saline introduced to the distal tip 288 at 70 degrees Celsius flowing distally through the irrigation passageway 380. FIG. 8C illustrates temperatures at an outside surface of the distal tip 288 with heated saline introduced at 70 degrees Celsius flowing distally through the irrigation passageway 380. During testing, the maximum temperature of the outer surface of the distal tip 288 was 69.9 degrees Celsius after 5 seconds, 10 seconds, 20 seconds, and 40 seconds of heated saline introduced to the distal tip 288 at 70 degrees Celsius flowing distally through the irrigation passageway 380. FIG. 8D illustrates a temperature gradient with heated saline introduced at 70 degrees Celsius flowing distally through the irrigation passageway 380 of the distal tip 288.

Figure 9A:
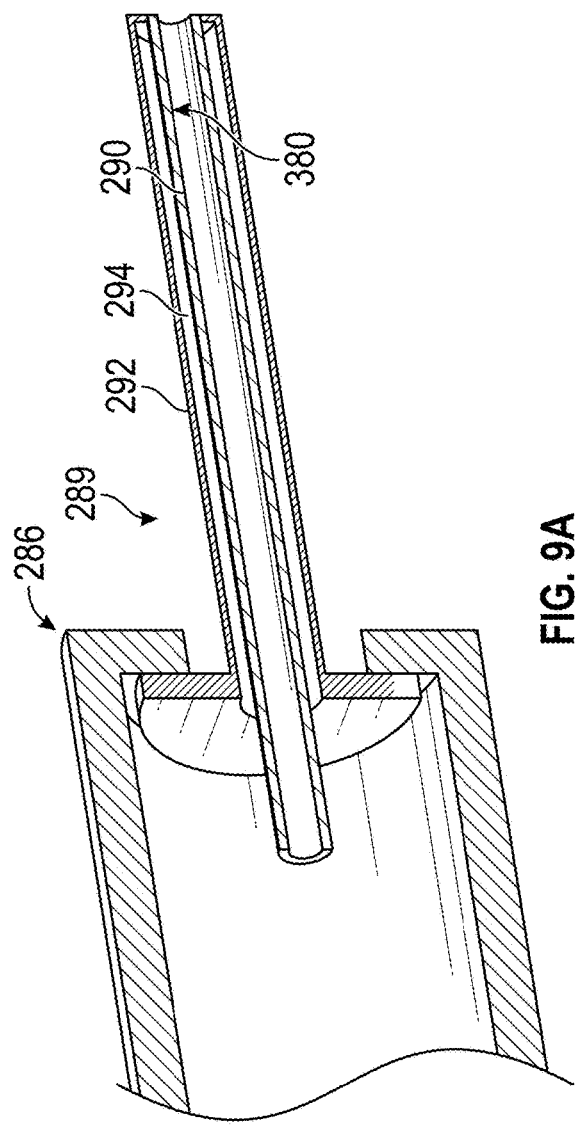
FIG. 9A illustrates a distal tip with an inner conduit with an irrigation passageway, an outer wall, and an air gap between the inner conduit and the outer wall.
Figure 9B:
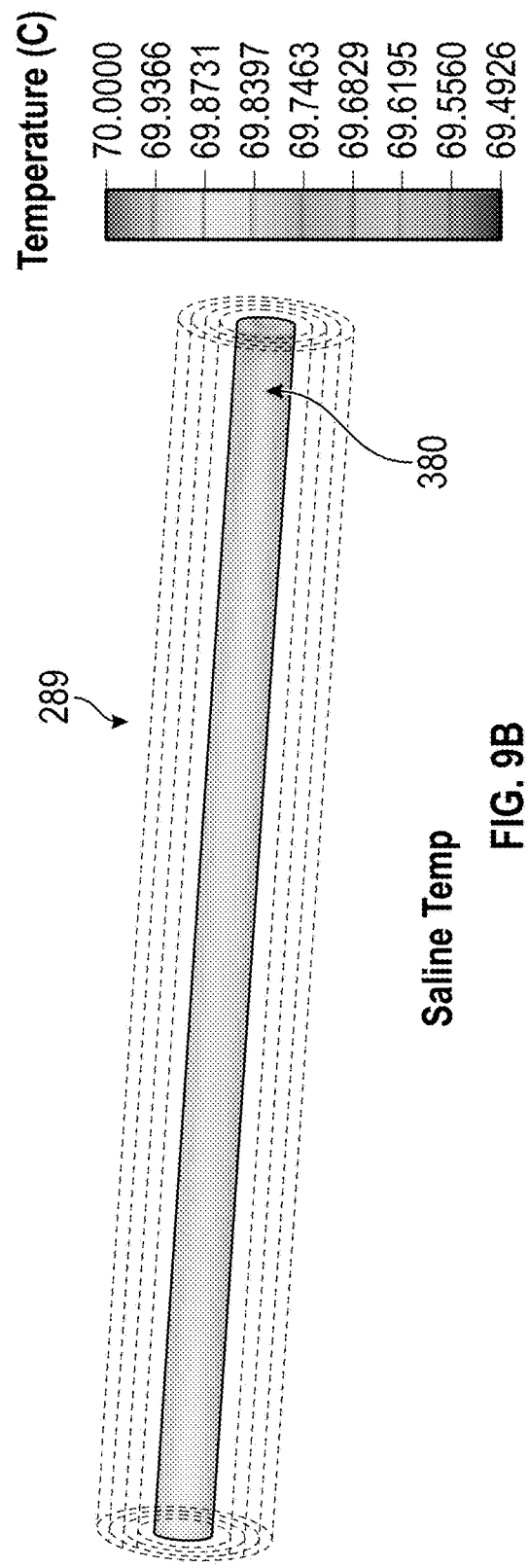
FIG. 9B illustrates temperatures of heated fluid flowing through the irrigation passageway of the distal tip of FIG. 9A.
Figure 9C:
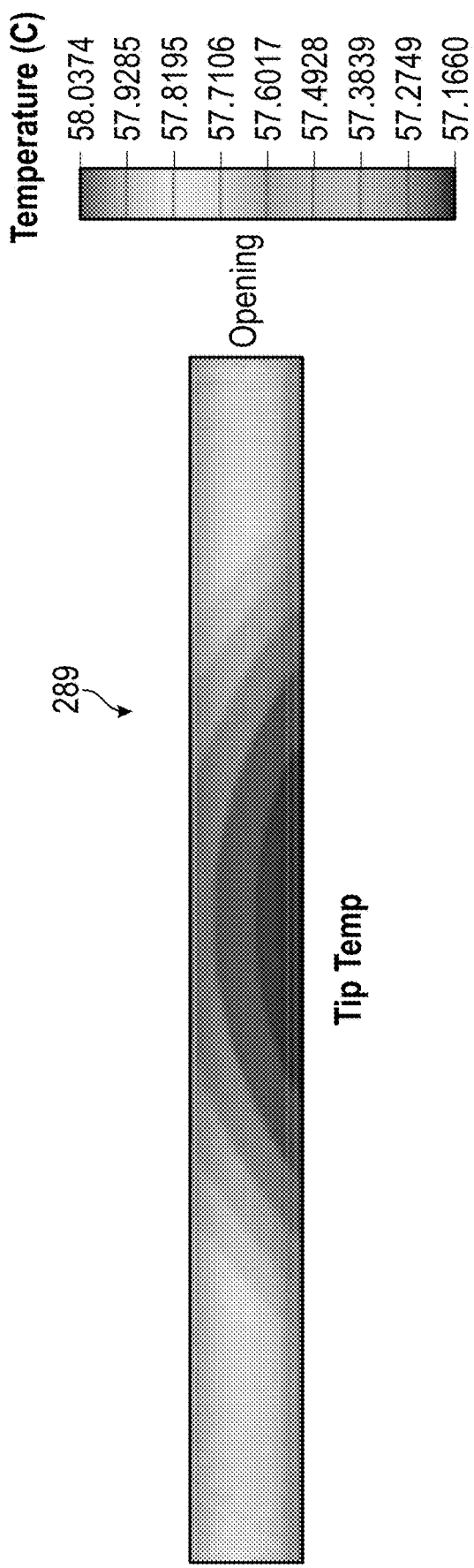
FIG. 9C illustrates temperatures at an outside surface of the outer wall of the distal tip of FIG. 9A with heated fluid flowing through the irrigation passageway.
Figure 9D:
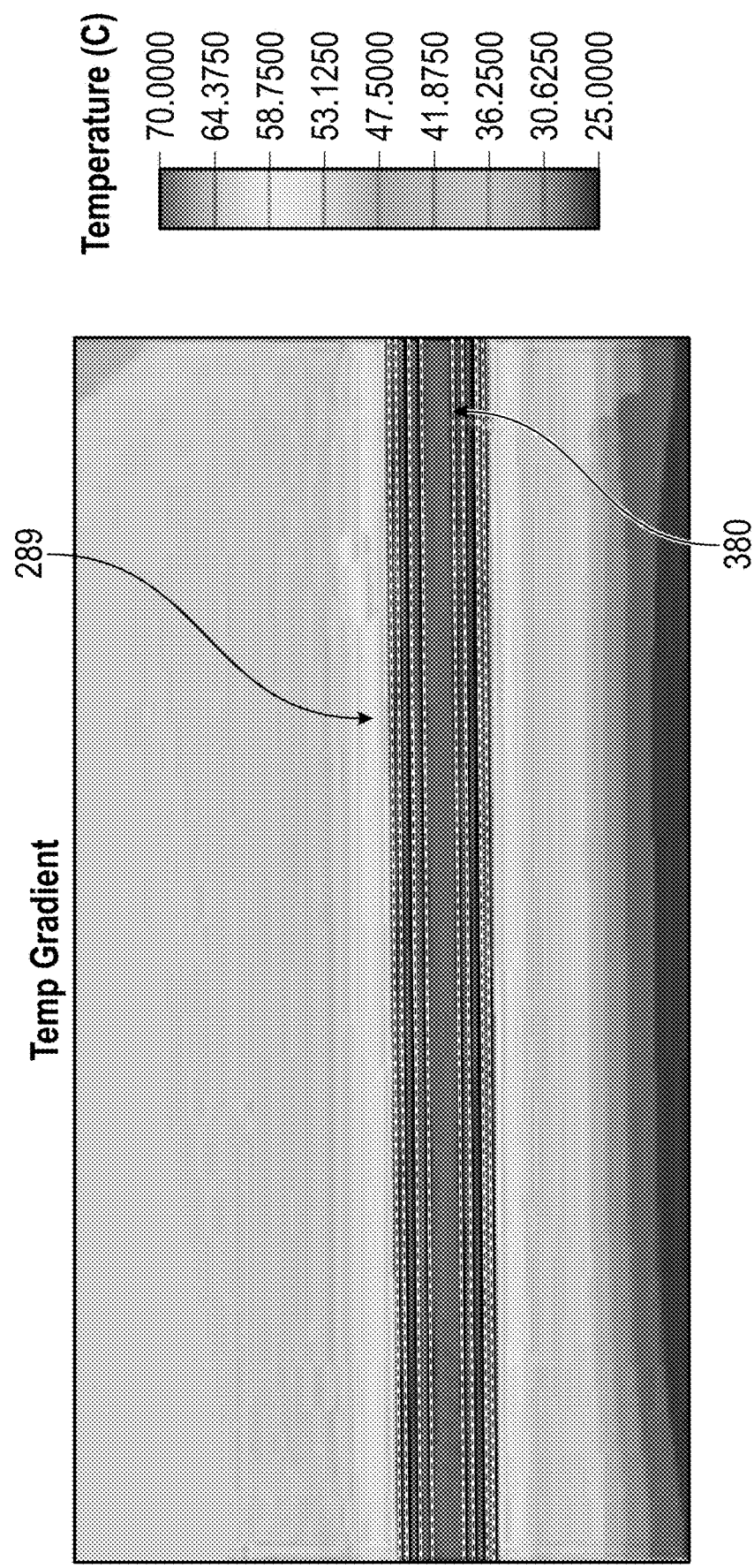
FIG. 9D illustrates a temperature gradient with heated fluid flowing through the irrigation passageway of the distal tip of FIG. 9A.

FIG. 9A illustrates a distal tip 289 of an emulsification device 286. The distal tip 289 can be elongate with a consistent peripheral wall 292 with an outside diameter of 1.6 millimeters. The distal tip 289 can be made of a metal such as 316 stainless steel. An inner conduit 290 (e.g., tube) can be disposed inside the distal tip 289. The inner conduit 290 (e.g., tube) can include an irrigation passageway 380 through which heated fluid can flow. The inner conduit 290 can be made of silicone. An air gap 294 can be disposed radially between the inner conduit 290 and the wall 292 of the distal tip 289. The air gap 294 can include a consistent size. The material of the inner conduit 290 and the air gap 294 can insulate the distal tip 289 from heat from the heated fluid flowing through the irrigation passageway 380. FIG. 9B illustrates temperatures of heated saline introduced into the inner conduit 290 at 70 degrees Celsius flowing distally through the irrigation passageway 380. FIG. 9C illustrates temperatures at an outside surface of the wall 292 of the distal tip 289 with heated saline introduced at 70 degrees Celsius flowing distally through the irrigation passageway 380. During testing, the maximum temperature of the outer surface of the wall 292 of the distal tip 289 was 45.9 degrees Celsius after 5 seconds, 53.3 degrees Celsius after 10 seconds, 57.3 degrees Celsius after 20 seconds, and 58.0 degrees Celsius after 40 seconds of heated saline introduced to the distal tip 289 at 70 degrees Celsius flowing distally through the irrigation passageway 380 of the inner conduit 290. FIG. 9D illustrates a temperature gradient with heated saline introduced at 70 degrees Celsius flowing distally through the irrigation passageway 380 of the inner conduit 290.

Figure 10C:
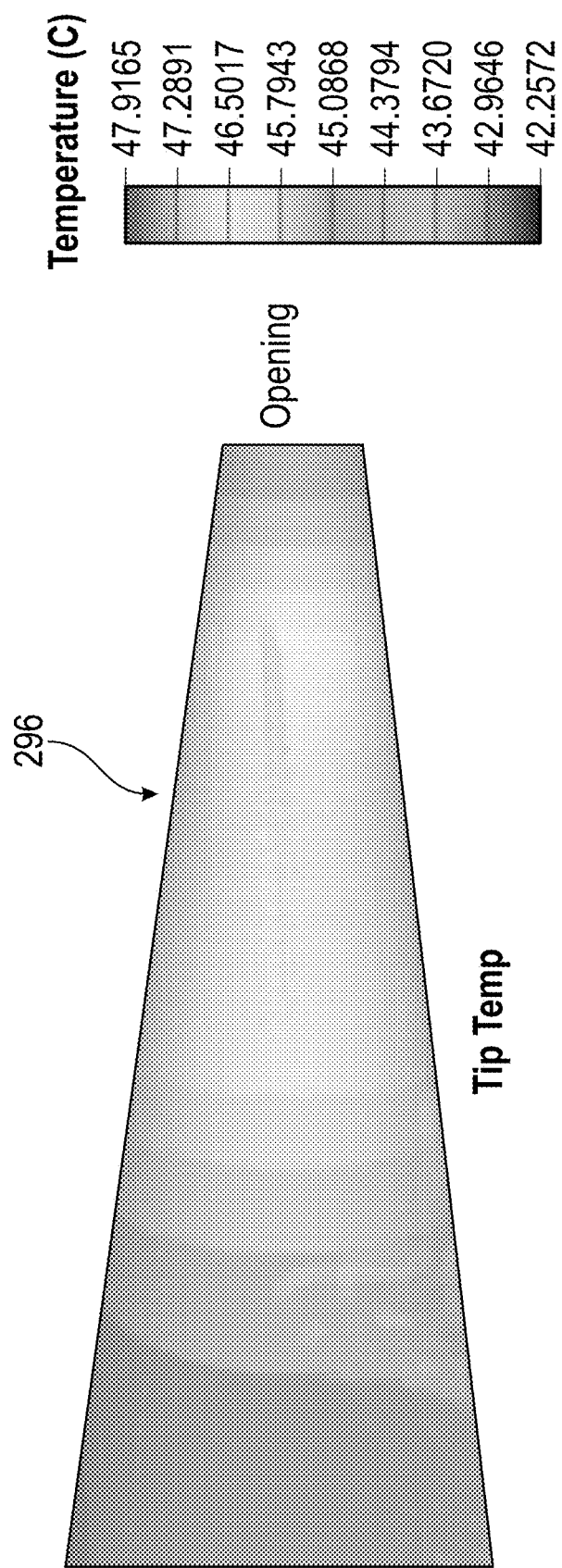
FIG. 10C illustrates temperature at an outside surface of the tapered outer wall of the distal tip of FIG. 10A.
Figure 10D:
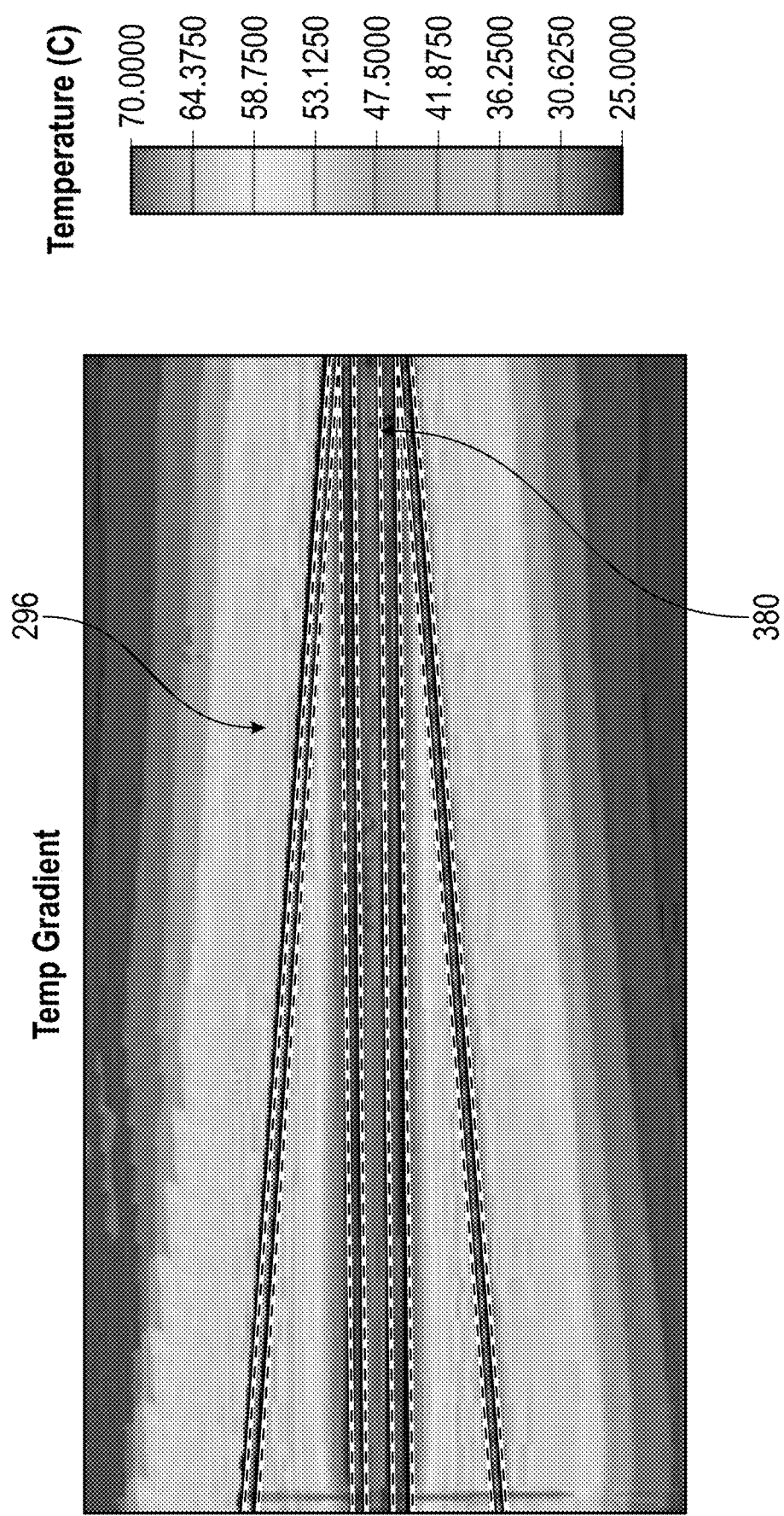
FIG. 10D illustrates a temperature gradient with heated fluid flowing through the irrigation passageway of the distal tip of FIG. 10A.

FIG. 10A illustrates a distal tip 296 of an emulsification device 286. The distal tip 296 can be elongate. The distal tip 296 can include a tapered shape defined by an outer wall 292. For example, a proximal portion of the distal tip 296 can include a first outer diameter and a distal portion of the distal tip 296 can include a second outer diameter that is smaller than the first outer diameter. The outer diameter of the distal tip 296 can gradually decrease between the first outer diameter and the second outer diameter. The outer diameter at the distal end of the distal tip 296 can be 1.6 millimeters. The distal tip 296 can be made of a metal such as 316 stainless steel. An inner conduit 290 (e.g., tube) can be disposed inside the distal tip 296. The inner conduit 290 (e.g., tube) can include an irrigation passageway 380 through which heated fluid can flow. The inner conduit 290 can be made of silicone. An air gap 294 can be disposed radially between the inner conduit 290 and the wall 292 of the distal tip 296. Due to the tapered shape of the distal tip 296, the air gap 294 can taper in radial size in a distal direction. For example, the air gap 294 between proximal portions of the wall 292 and the inner conduit 290 can be larger than the air gap 294 between distal portions of the wall 292 and the inner conduit 290. The air gap 294 can taper in size in a distal direction. The air gap 294 can be conical in shape. The material of the inner conduit 290 and the air gap 294 can insulate the distal tip 296 from heat from the heated fluid flowing through the irrigation passageway 380. FIG. 10B illustrates temperatures of heated saline introduced into the inner conduit 290 at 70 degrees Celsius flowing distally through the irrigation passageway 380. FIG. 10C illustrates temperatures at an outside surface of the wall 292 of the distal tip 296 with heated saline introduced at 70 degrees Celsius flowing distally through the irrigation passageway 380. During testing, the maximum temperature of the outer surface of the wall 292 of the distal tip 296 was 35.6 degrees Celsius after 5 seconds, 40.0 degrees Celsius after 10 seconds, 44.5 degrees Celsius after 20 seconds, and 47.9 degrees Celsius after 40 seconds of heated saline introduced to the distal tip 296 at 70 degrees Celsius flowing distally through the irrigation passageway 380 of the inner conduit 290. FIG. 10D illustrates a temperature gradient with heated saline introduced at 70 degrees Celsius flowing distally through the irrigation passageway 380 of the inner conduit 290.

Figure 11A:
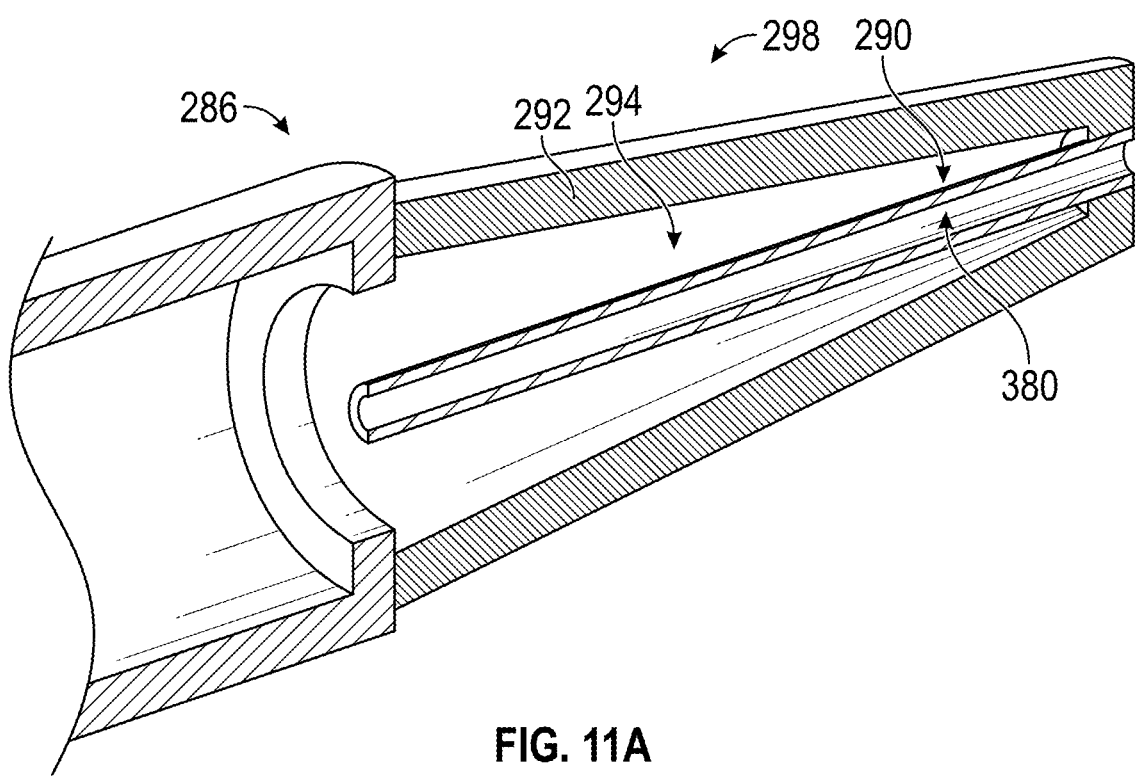
FIG. 11A illustrates a distal tip with an inner conduit with an irrigation passageway, a tapered outer wall made of polyether ether ketone (PEEK), and an air gap between the inner conduit and the tapered outer wall.
Figure 11B:
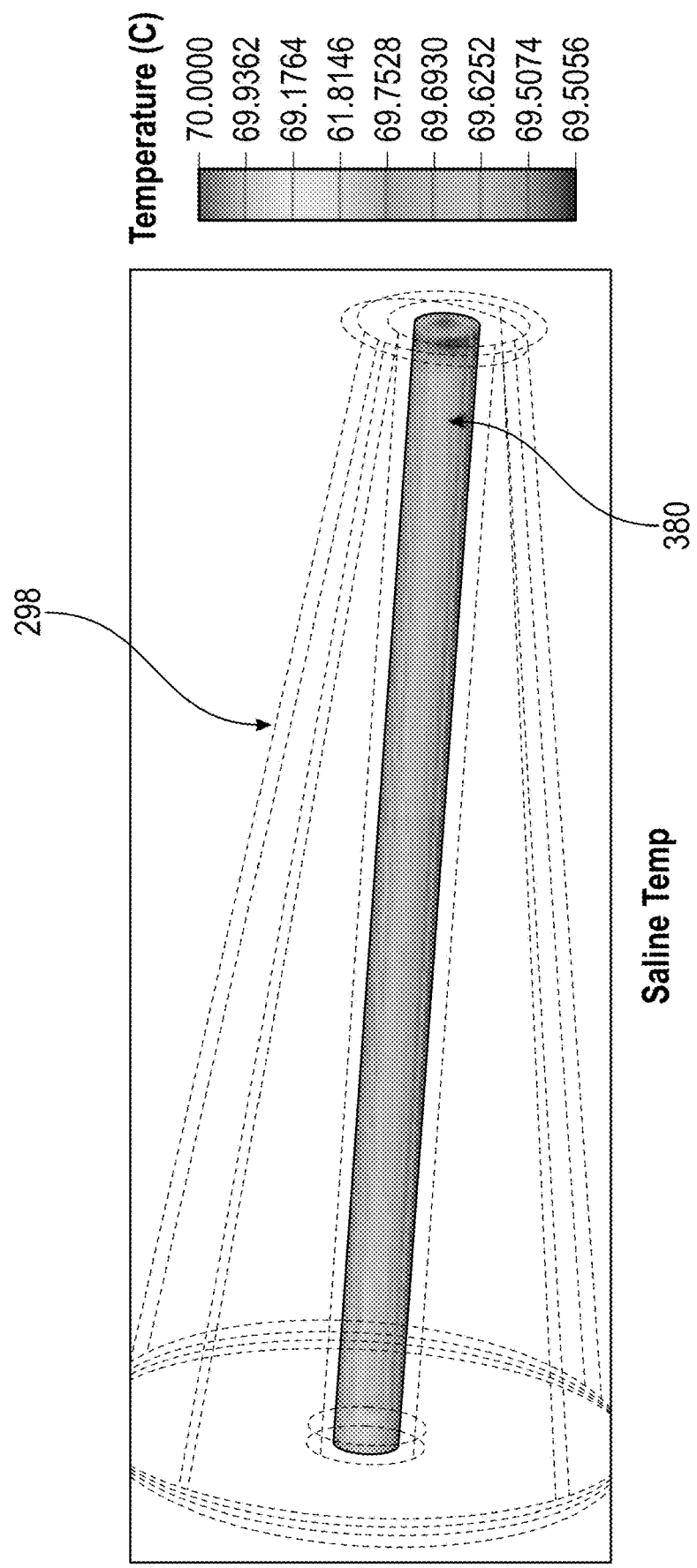
FIG. 11B illustrates a temperature of heated fluid flowing through the irrigation passageway of the distal tip of FIG. 11A.
Figure 11C:
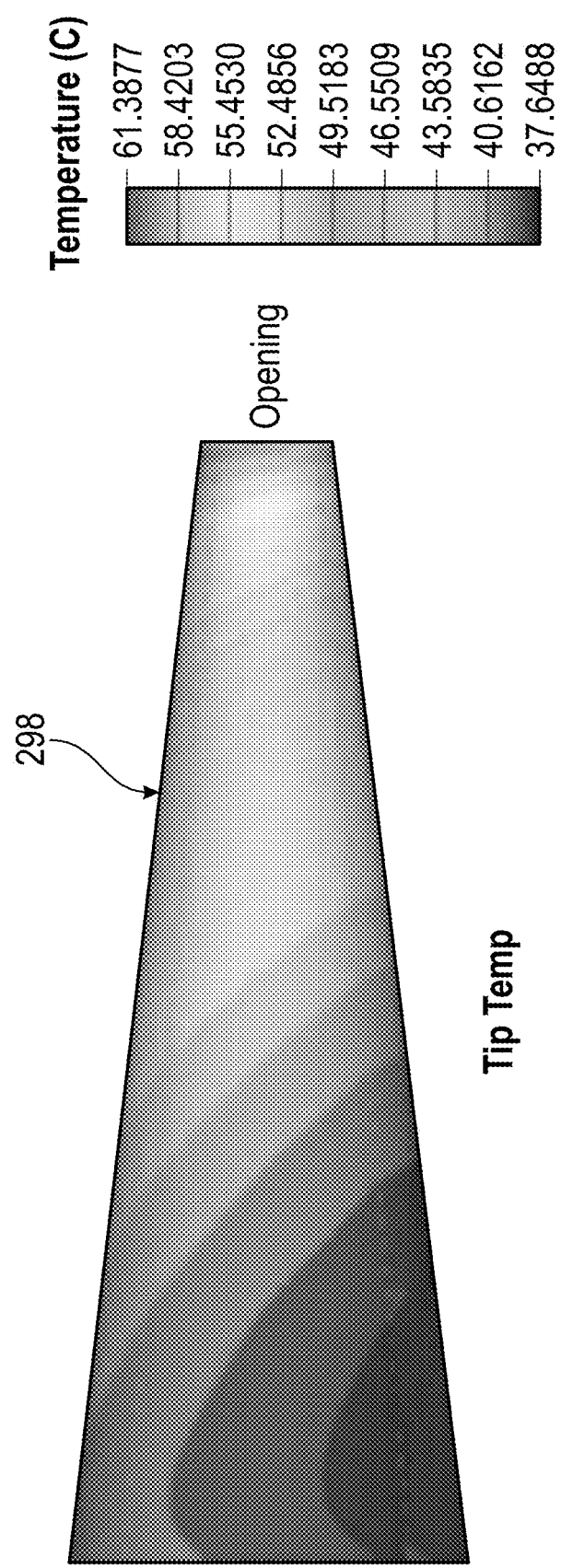
FIG. 11C illustrates temperature at an outside surface of the tapered outer wall of the distal tip of FIG. 11A.
Figure 11D:
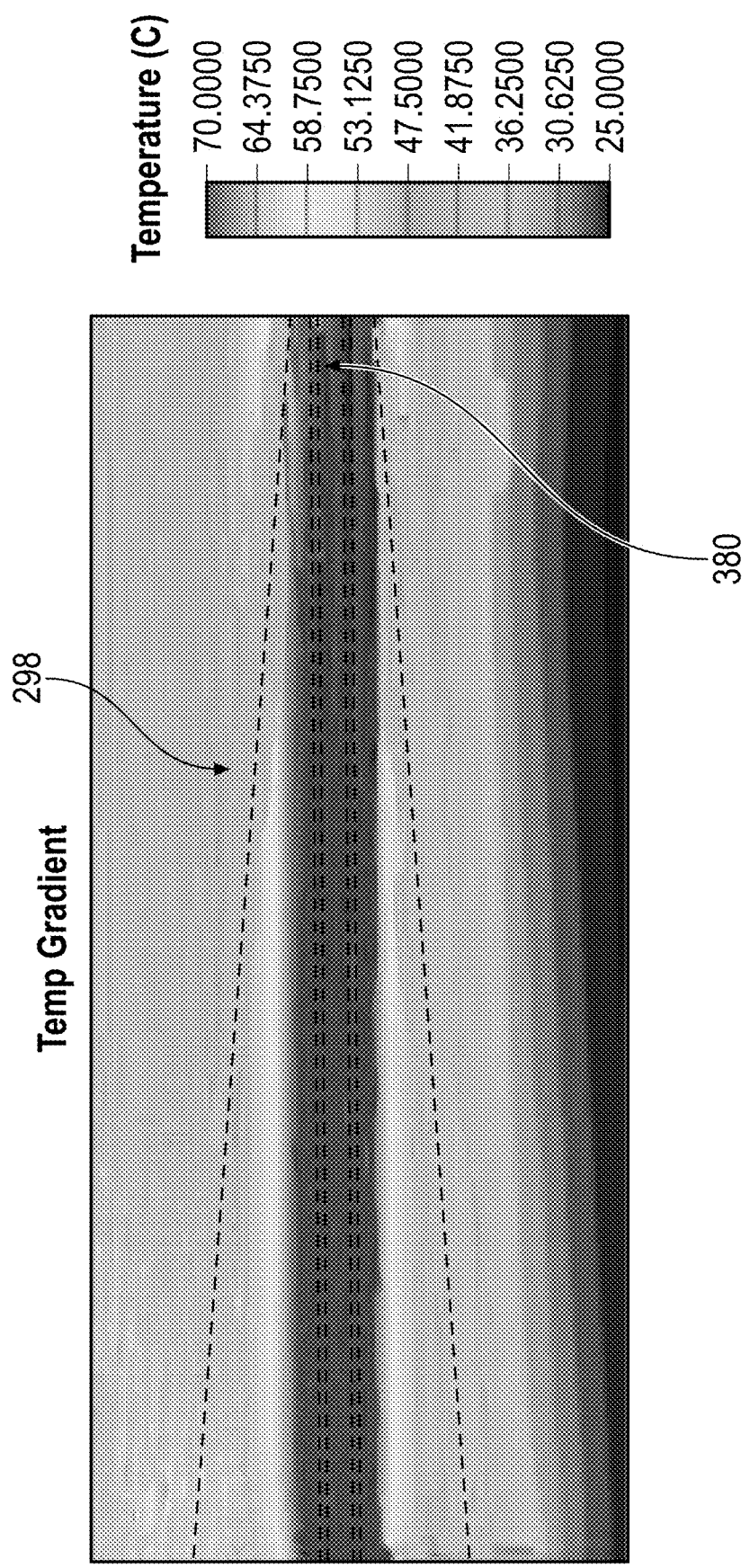
FIG. 11D illustrates a temperature gradient with heated fluid flowing through the irrigation passageway of the distal tip of FIG. 11A.

FIG. 11A illustrates a distal tip 298 of an emulsification device 286. The distal tip 298 can be elongate. The distal tip 298 can include a tapered shape defined by an outer wall 292. For example, a proximal portion of the distal tip 298 can include a first outer diameter and a distal portion of the distal tip 298 can include a second outer diameter that is smaller than the first outer diameter. The outer diameter of the distal tip 298 can gradually decrease between the first outer diameter and the second outer diameter. The outer diameter at the distal end of the distal tip 298 can be 2.8 millimeters. The distal tip 296 can be made of a polymer such as polyetheretherketone (PEEK). PEEK has a lower thermal conductivity than 316 stainless steel with PEEK at 0.24 W/m-K and 316 stainless steel at 16.3 W/m-k. PEEK has a higher heat capacity than 316 stainless steel with PEEK at 1.4 J/g-C and 316 stainless steel at 1.5 J/g-C. The outer wall 292 can have an increased thickness, which can include an increased thickness compared to the outer wall 292 of distal tip 296. An inner conduit 290 (e.g., tube) can be disposed inside the distal tip 298. The inner conduit 290 (e.g., tube) can include an irrigation passageway 380 through which heated fluid can flow. The inner conduit 290 can be made of silicone. An air gap 294 can be disposed radially between the inner conduit 290 and the wall 292 of the distal tip 296. Due to the tapered shape of the distal tip 298, the air gap 294 can taper in radial size in a distal direction. For example, the air gap 294 between proximal portions of the wall 292 and the inner conduit 290 can be larger than the air gap 294 between distal portions of the wall 292 and the inner conduit 290. The air gap 294 can taper in size in a distal direction. The air gap 294 can be conical in shape. The material of the inner conduit 290 and the air gap 294 can insulate the distal tip 296 from heat from the heated fluid flowing through the irrigation passageway 380. FIG. 11B illustrates temperatures of heated saline introduced into the inner conduit 290 at 70 degrees Celsius flowing distally through the irrigation passageway 380. FIG. 11C illustrates temperatures at an outside surface of the wall 292 of the distal tip 298 with heated saline introduced at 70 degrees Celsius flowing distally through the irrigation passageway 380. During testing, the maximum temperature of the outer surface of the wall 292 of the distal tip 298 was 55.1 degrees Celsius after 5 seconds, 59.8 degrees Celsius after 10 seconds, 61.2 degrees Celsius after 20 seconds, and 61.4 degrees Celsius after 40 seconds of heated saline introduced to the distal tip 298 at 70 degrees Celsius flowing distally through the irrigation passageway 380 of the inner conduit 290. FIG. 11D illustrates a temperature gradient with heated saline introduced at 70 degrees Celsius flowing distally through the irrigation passageway 380 of the inner conduit 290.

Figure 12A:
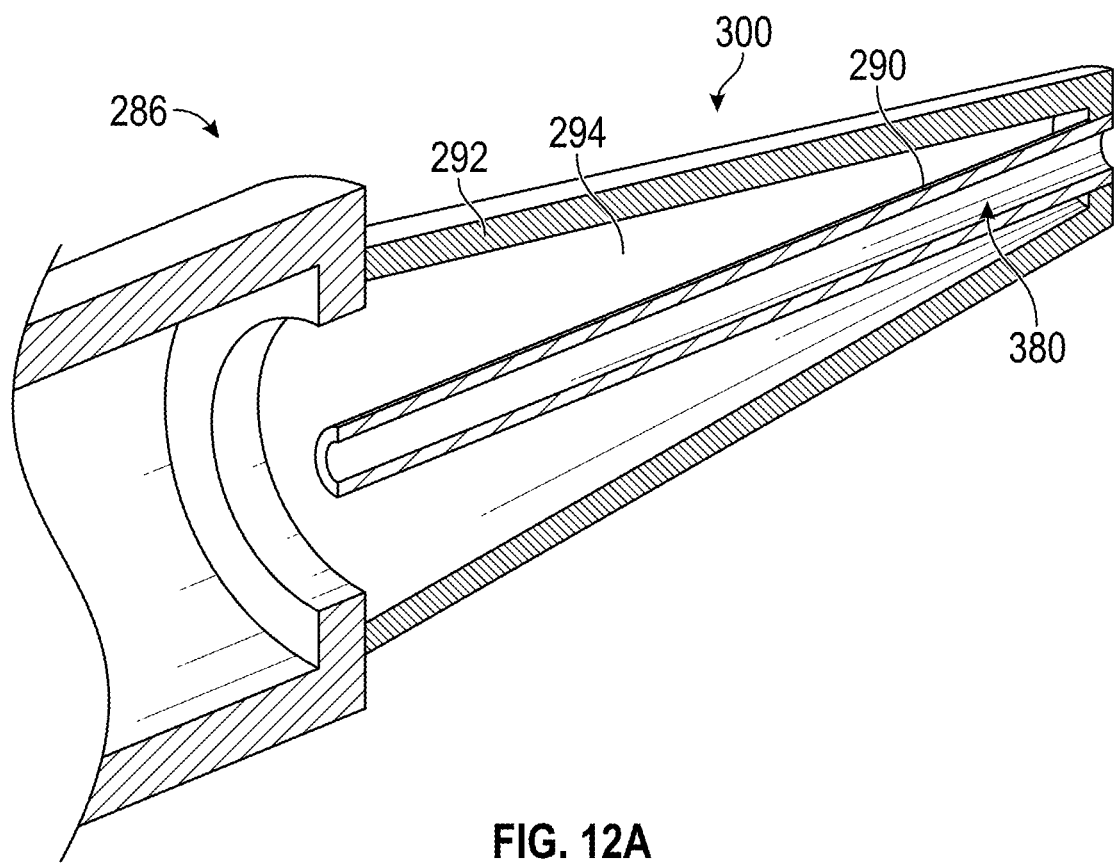
FIG. 12A illustrates a distal tip with an inner conduit with an irrigation passageway, a tapered outer wall made of metal, and an air gap between the inner conduit and the tapered outer wall.
Figure 12B:
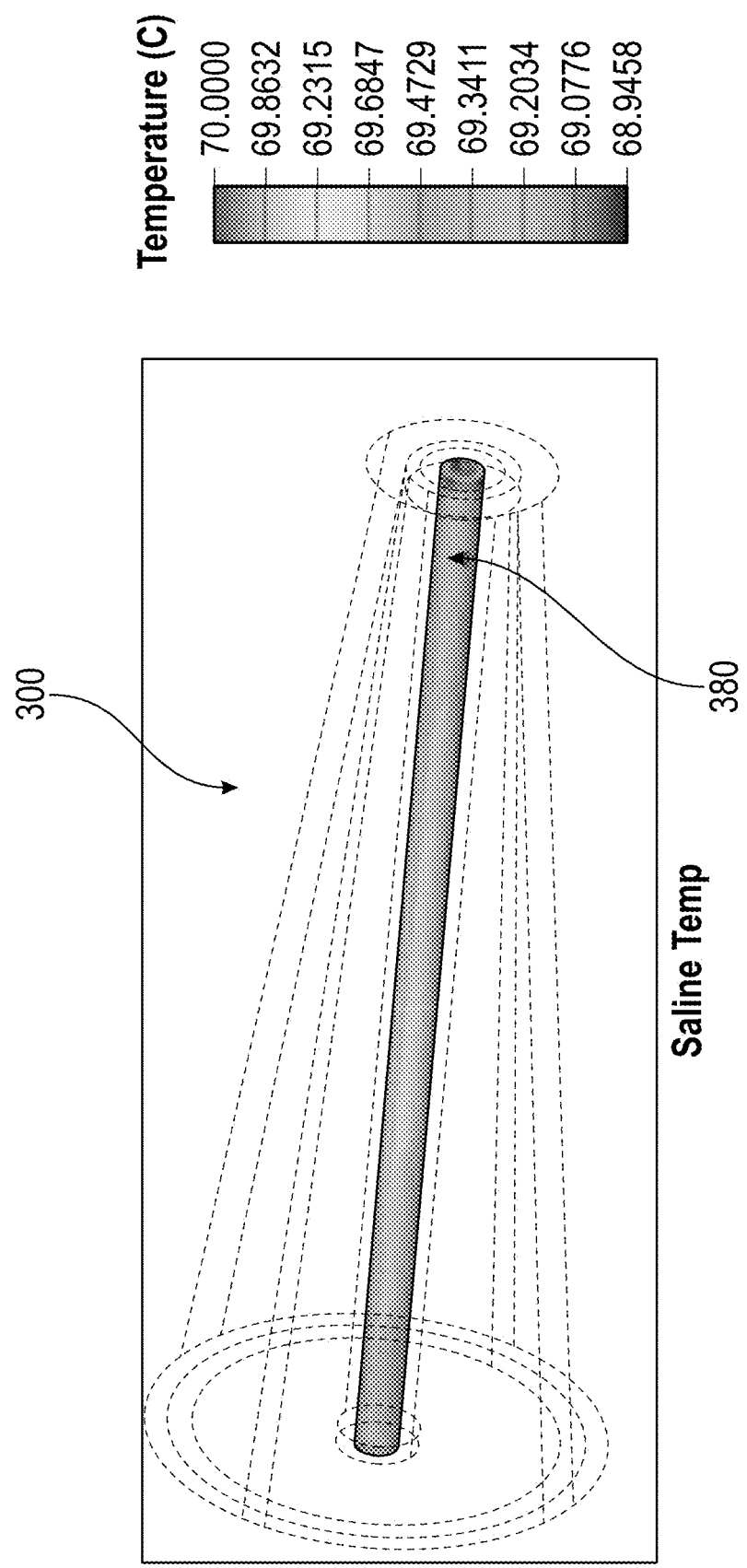
FIG. 12B illustrates a temperature of heated fluid flowing through the irrigation passageway of the distal tip of FIG. 12A.
Figure 12C:
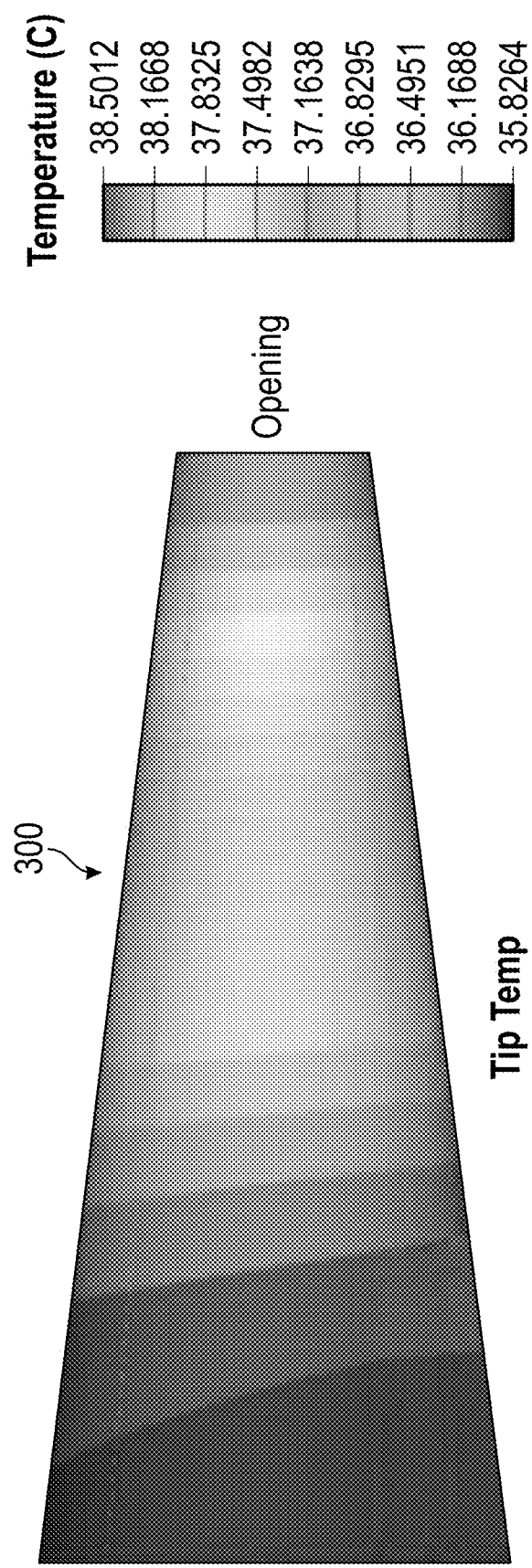
FIG. 12C illustrates temperature at an outside surface of the tapered outer wall of the distal tip of FIG. 12A.
Figure 12D:
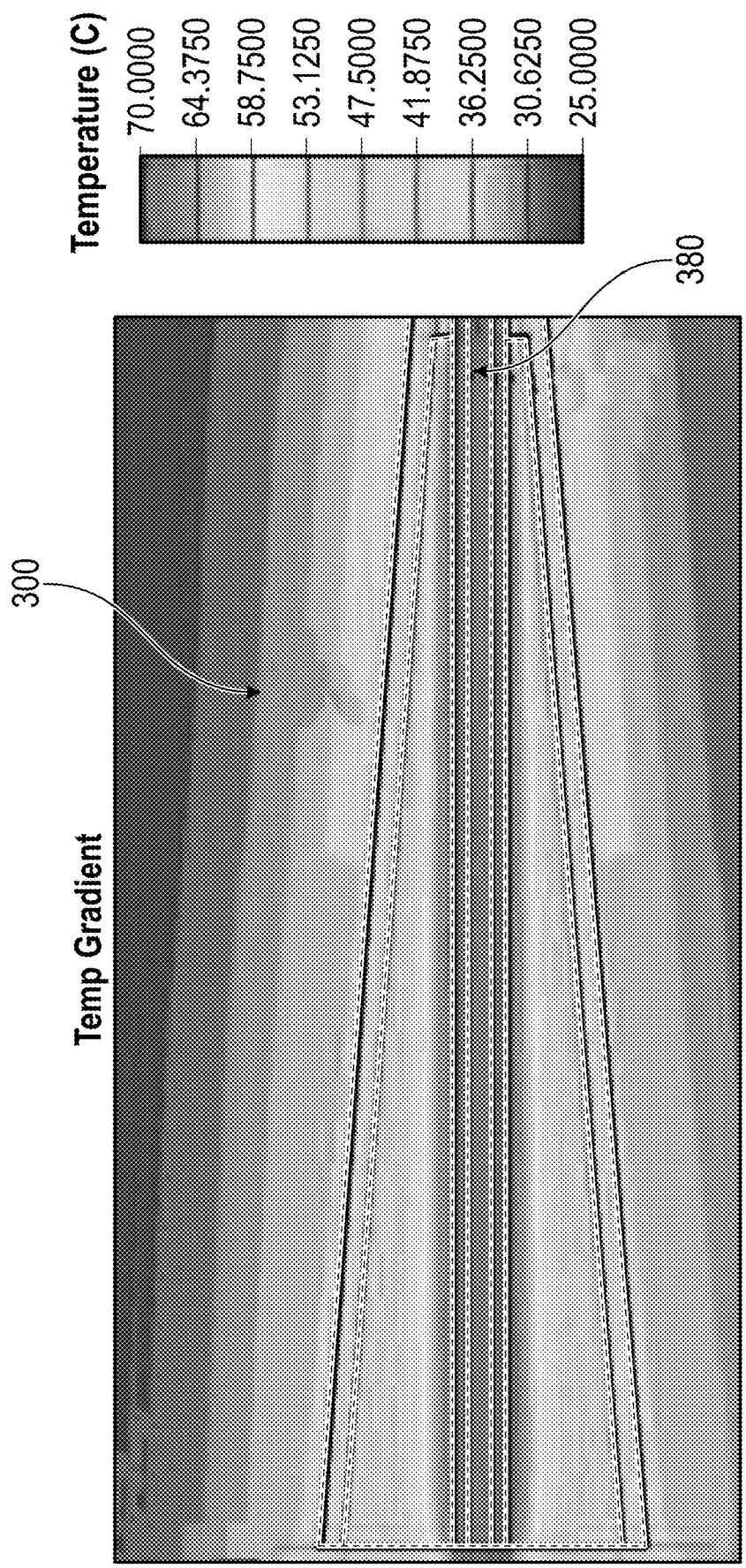
FIG. 12D illustrates a temperature gradient with heated fluid flowing through the irrigation passageway of the distal tip of FIG. 12A.

FIG. 12A illustrates a distal tip 300 of an emulsification device 286. The distal tip 300 can be elongate. The distal tip 300 can include a tapered shape defined by an outer wall 292. For example, a proximal portion of the distal tip 298 can include a first outer diameter and a distal portion of the distal tip 298 can include a second outer diameter that is smaller than the first outer diameter. The outer diameter of the distal tip 298 can gradually decrease between the first outer diameter and the second outer diameter. The outer diameter at the distal end of the distal tip 300 can be 2.1 millimeters. The distal tip 296 can be made of a metal such as 316 stainless steel. The outer wall 292 of distal tip 300 can have an increased thickness, which can include an increased thickness compared to the outer wall 292 of distal tip 296. An inner conduit 290 (e.g., tube) can be disposed inside the distal tip 300. The inner conduit 290 (e.g., tube) can include an irrigation passageway 380 through which heated fluid can flow. The inner conduit 290 can be made of a polymer such as silicone. An air gap 294 can be disposed radially between the inner conduit 290 and the wall 292 of the distal tip 300. Due to the tapered shape of the distal tip 300, the air gap 294 can taper in radial size in a distal direction. For example, the air gap 294 between proximal portions of the wall 292 and the inner conduit 290 can be larger than the air gap 294 between distal portions of the wall 292 and the inner conduit 290. The air gap 294 can taper in size in a distal direction. The air gap 294 can be conical in shape. The material of the inner conduit 290, air gap 294, and thickness of the wall 292 can insulate the distal tip 300 from heat from the heated fluid flowing through the irrigation passageway 380. FIG. 12B illustrates temperatures of heated saline introduced into the inner conduit 290 at 70 degrees Celsius flowing distally through the irrigation passageway 380. FIG. 12C illustrates temperatures at an outside surface of the wall 292 of the distal tip 300 with heated saline introduced at 70 degrees Celsius flowing distally through the irrigation passageway 380. During testing, the maximum temperature of the outer surface of the wall 292 of the distal tip 300 was 28.7 degrees Celsius after 5 seconds, 30.8 degrees Celsius after 10 seconds, 33.9 degrees Celsius after 20 seconds, and 38.5 degrees Celsius after 40 seconds of heated saline introduced to the distal tip 300 at 70 degrees Celsius flowing distally through the irrigation passageway 380 of the inner conduit 290. FIG. 12D illustrates a temperature gradient with heated saline introduced at 70 degrees Celsius flowing distally through the irrigation passageway 380 of the inner conduit 290.

Figure 13A:
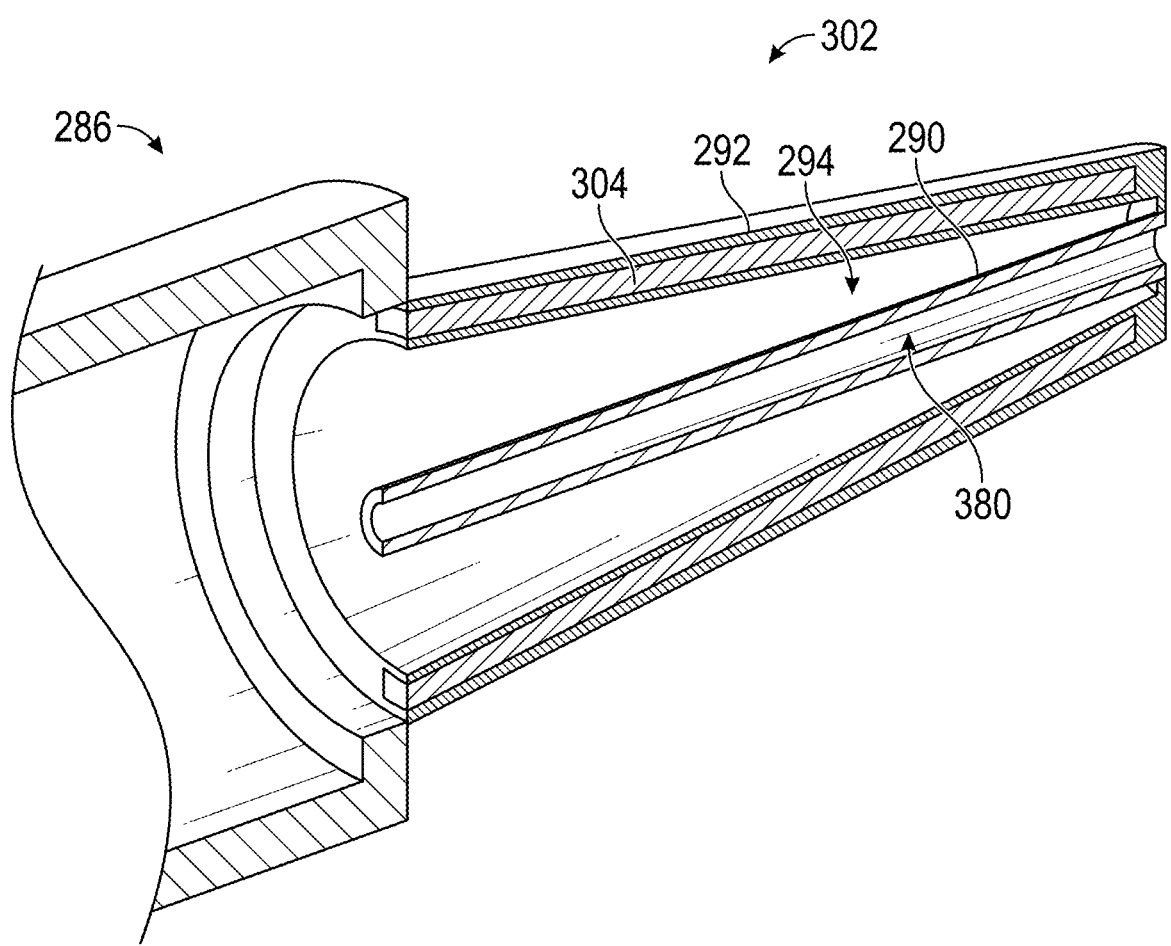
FIG. 13A illustrates a distal tip with an inner conduit with an irrigation passageway, a tapered outer wall, an air gap between the inner conduit and the tapered outer wall, and a coolant passageway within the tapered outer wall.
Figure 13B:
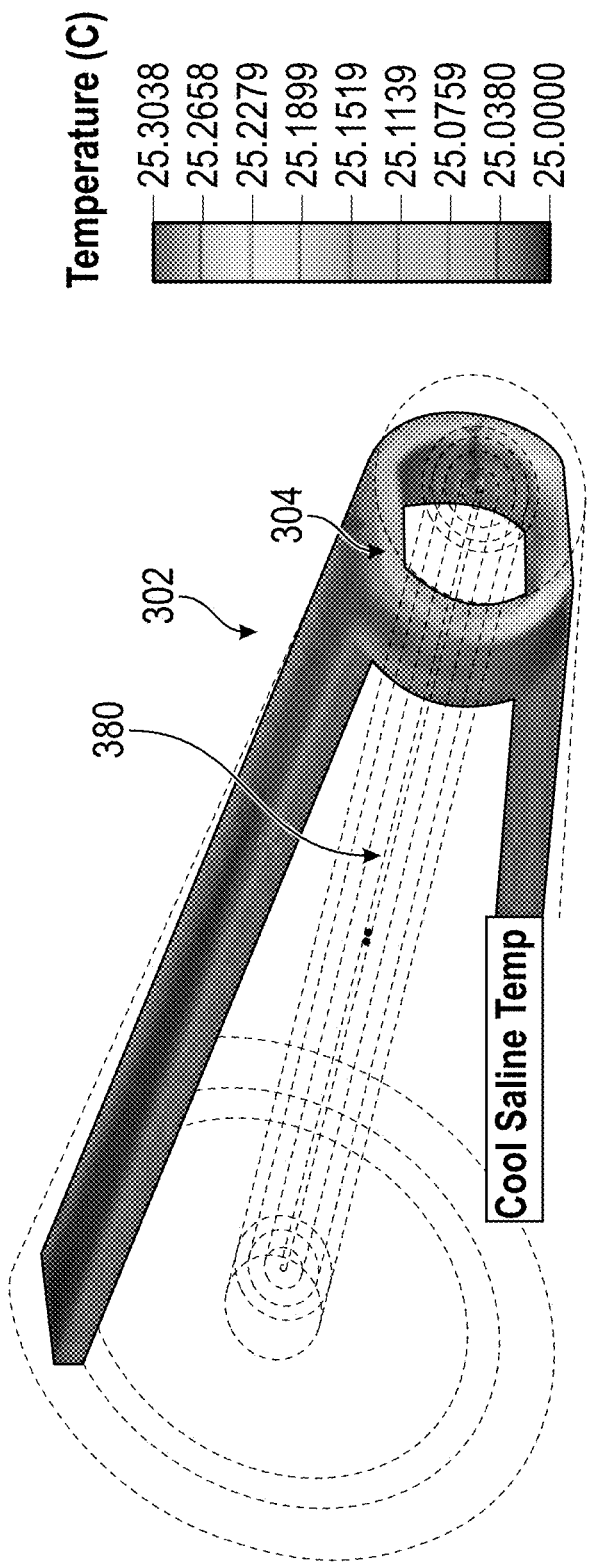
FIG. 13B illustrates temperatures of coolant fluid flowing through the coolant passageway.
Figure 13C:
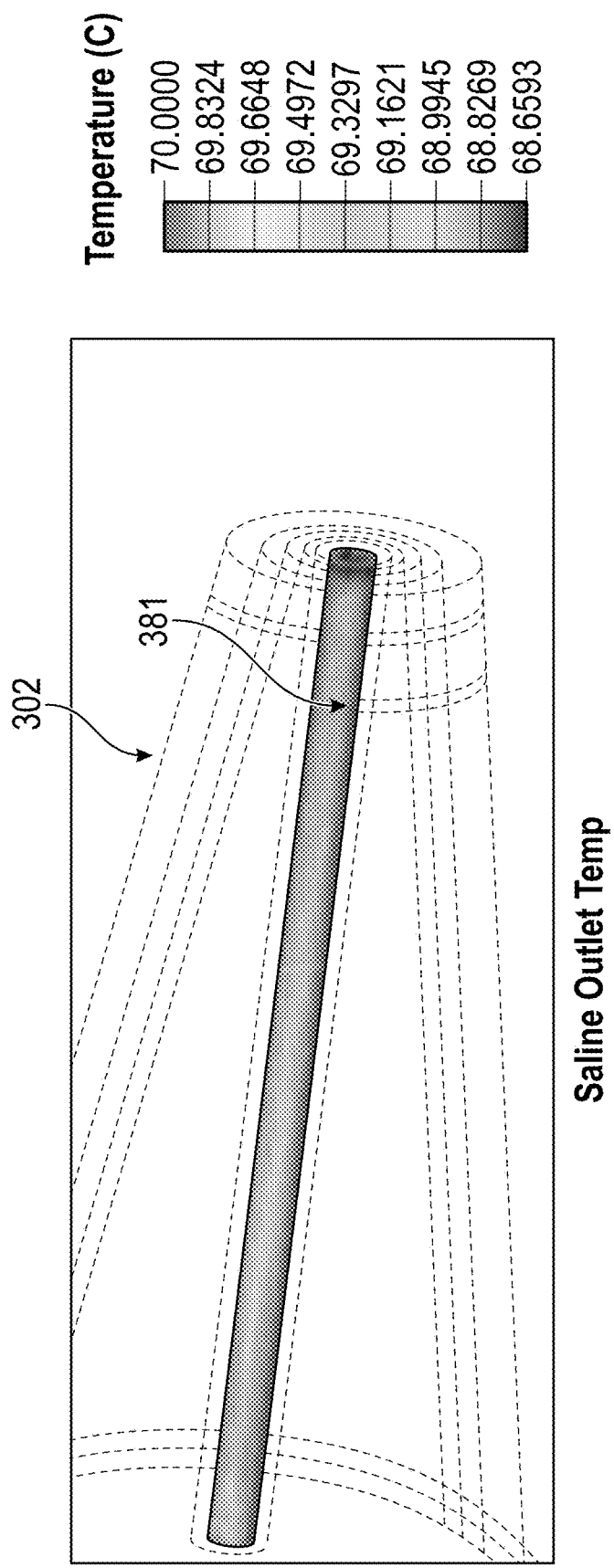
FIG. 13C illustrates a temperature of heated fluid flowing through the irrigation passageway of the distal tip of FIG. 13A.
Figure 13D:
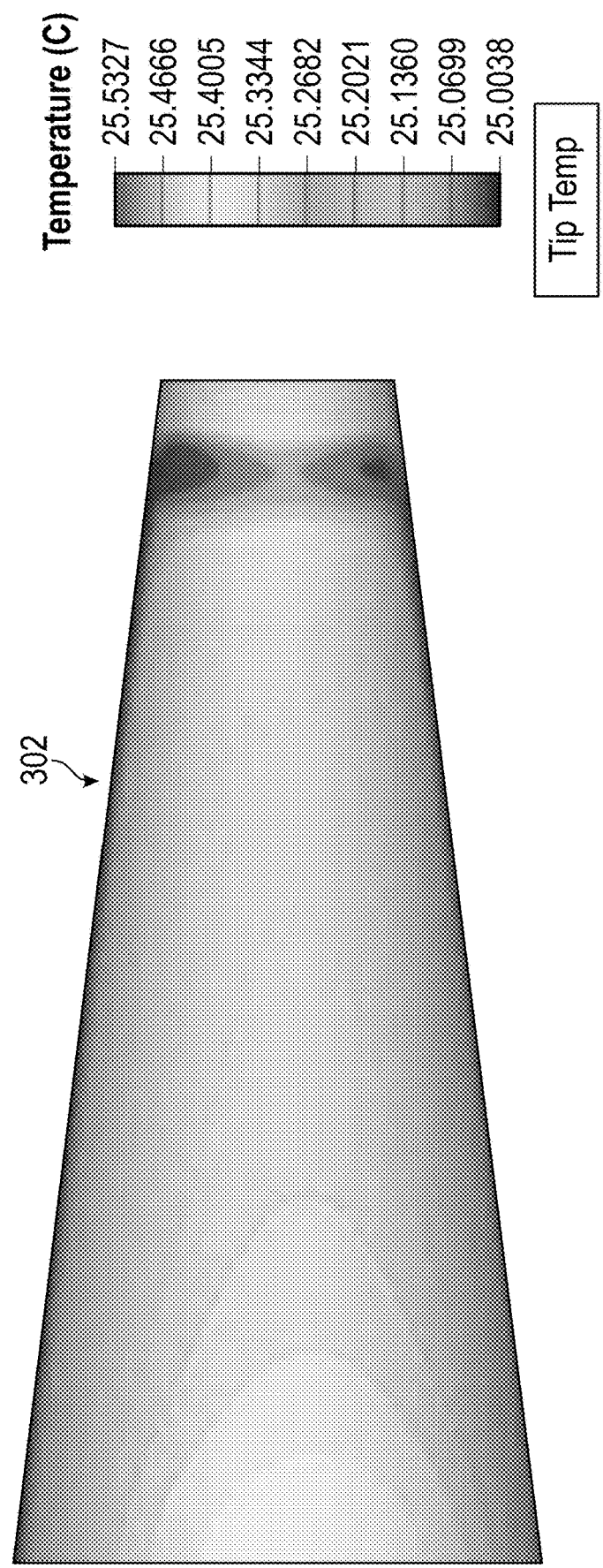
FIG. 13D illustrates temperature at an outside surface of the tapered outer wall of the distal tip of FIG. 13A.
Figure 13E:
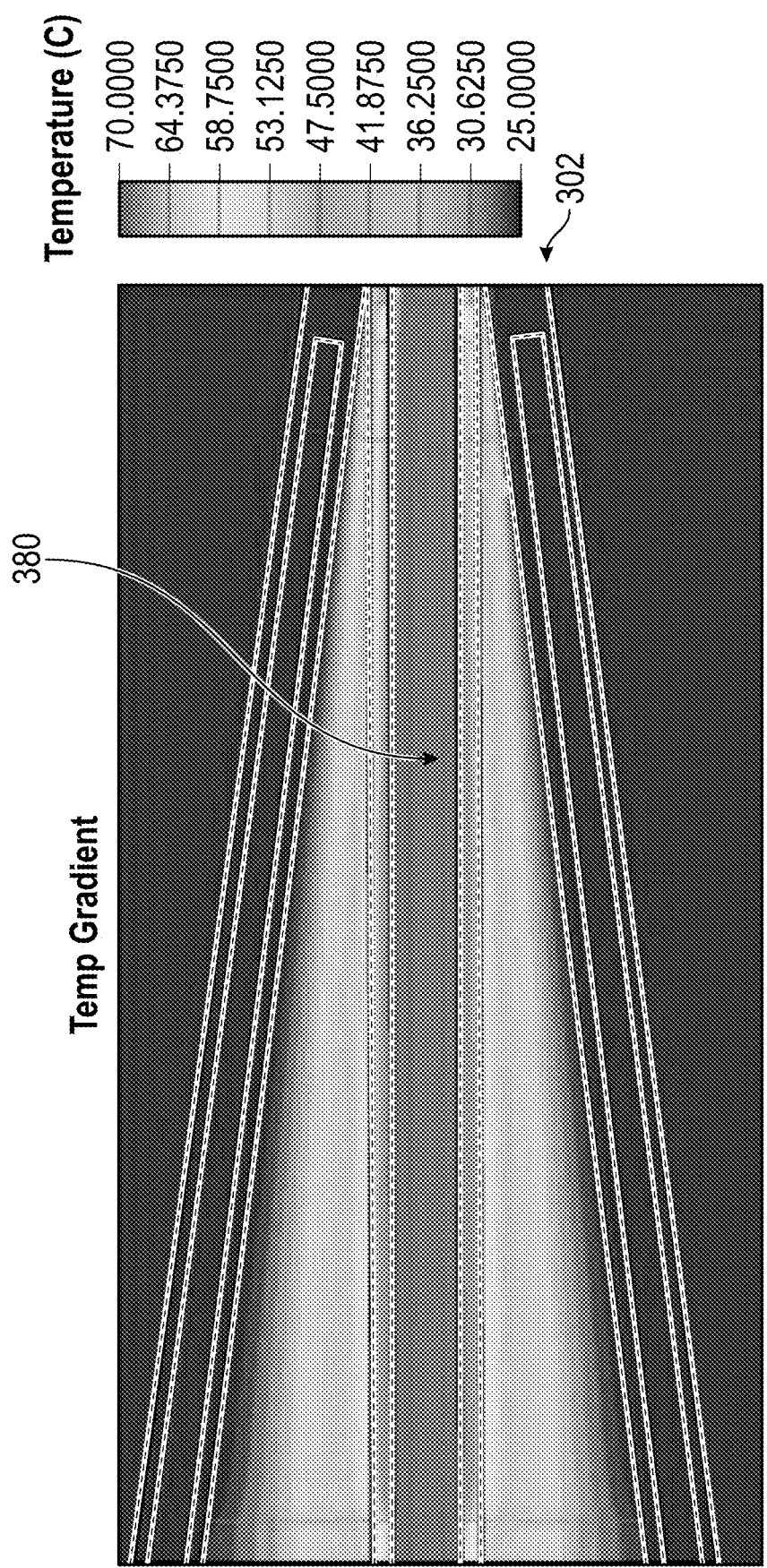
FIG. 13E illustrates a temperature gradient with heated fluid flowing through the irrigation passageway and coolant flowing through the coolant passageway of the distal tip of FIG. 13A.

FIG. 13A illustrates a distal tip 302 of an emulsification device 286. The distal tip 300 can be elongate. The distal tip 300 can include a tapered shape defined by an outer wall 292. For example, a proximal portion of the distal tip 302 can include a first outer diameter and a distal portion of the distal tip 302 can include a second outer diameter that is smaller than the first outer diameter. The outer diameter of the distal tip 302 can gradually decrease between the first outer diameter and the second outer diameter. The outer diameter at the distal end of the distal tip 302 can be 2.6 millimeters. The distal tip 302 can be made of a metal such as 316 stainless steel. The outer wall 292 of distal tip 302 can include a coolant passageway 304 therethrough. The coolant passageway 304 can be disposed in the outer wall 292. A fluid, such as saline, can be flowed through the coolant passageway 304 to cool the distal tip 302, which includes the outer wall 292. The fluid can be introduced at ambient temperature. An inner conduit 290 (e.g., tube) can be disposed inside the distal tip 302. The inner conduit 290 (e.g., tube) can include an irrigation passageway 380 through which heated fluid can flow. The inner conduit 290 can be made of a polymer such as silicone. An air gap 294 can be disposed radially between the inner conduit 290 and the wall 292 of the distal tip 302. Due to the tapered shape of the distal tip 302, the air gap 294 can taper in radial size in a distal direction. For example, the air gap 294 between proximal portions of the wall 292 and the inner conduit 290 can be larger than the air gap 294 between distal portions of the wall 292 and the inner conduit 290. The air gap 294 can taper in size in a distal direction. The air gap 294 can be conical in shape. The material of the inner conduit 290, air gap 294, and coolant passageway 304 in the outer wall 292 can insulate the distal tip 302 from heat from the heated fluid flowing through the irrigation passageway 380. In some instances, after fluid flows through the coolant passageway 304, the fluid can be heated (e.g., by the heaters described herein) and directed through the irrigation passageway 380 for delivery into an eye. FIG. 13B illustrates temperatures of saline introduced into the coolant passageway 304 at ambient temperature flowing distally through the coolant passageway 304 to the distal end of the distal tip 302 and flowing proximally away from the distal end through the coolant passageway 304 as heated saline introduced into the inner conduit 290 at 70 degrees Celsius flowing distally through the irrigation passageway 380. FIG. 13B also shows the path of the coolant passageway 304. As shown, the coolant passageway 304 can include a path that is disposed circumferentially around a distal portion of the irrigation passageway 380. FIG. 13C illustrates temperatures of heated saline introduced into the inner conduit 290 at 70 degrees Celsius flowing distally through the irrigation passageway 380 while saline is being introduced at ambient temperature and flowed through the coolant passageway 304. FIG. 13D illustrates temperatures at an outside surface of the wall 292 of the distal tip 302 with heated saline introduced at 70 degrees Celsius flowing distally through the irrigation passageway 380 and saline introduced at an ambient temperature flowing through the coolant passageway 304. During testing, the maximum temperature of the outer surface of the wall 292 of the distal tip 302 was 25.2 degrees Celsius after 5 seconds, 25.3 degrees Celsius after 10 seconds, 25.4 degrees Celsius after 20 seconds, and 25.4 degrees Celsius after 40 seconds of heated saline introduced to the distal tip 300 at 70 degrees Celsius flowing distally through the irrigation passageway 380 of the inner conduit 290 and saline introduced at an ambient temperature flowing through the coolant passageway 304. FIG. 13E illustrates a temperature gradient with heated saline introduced at 70 degrees Celsius flowing distally through the irrigation passageway 380 of the inner conduit 290 and saline introduced at an ambient temperature flowing through the coolant passageway 304.

Figure 14A:
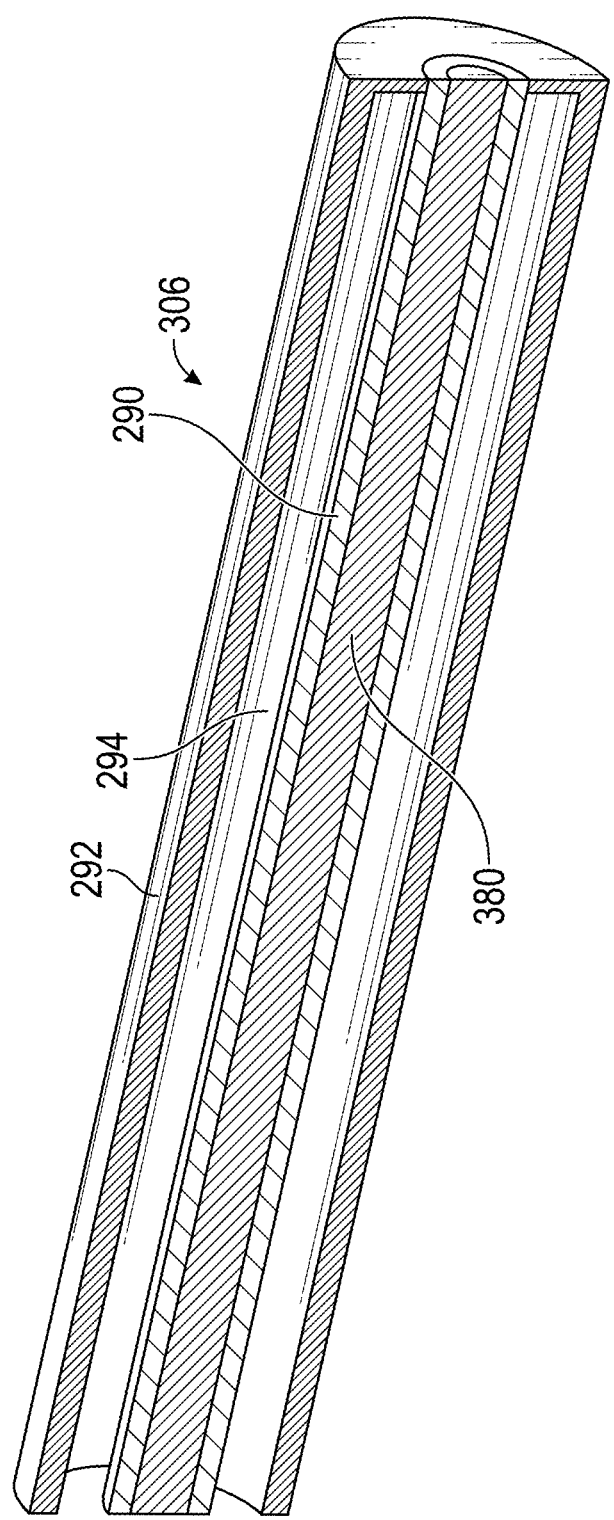
FIG. 14A illustrates a distal tip with an inner conduit with an irrigation passageway, an outer wall, and an air gap between the inner conduit and the outer wall.
Figure 14B:
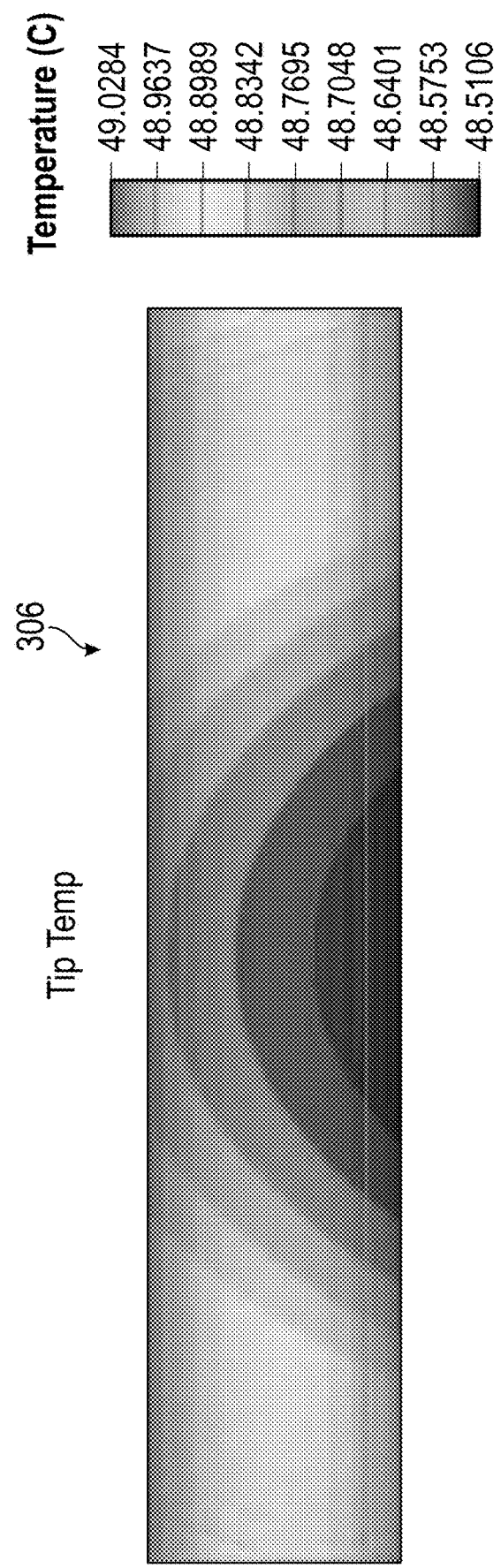
FIG. 14B illustrates temperatures at an outside surface of the outer wall of the distal tip of FIG. 14A with heated fluid flowing through the irrigation passageway.
Figure 14C:
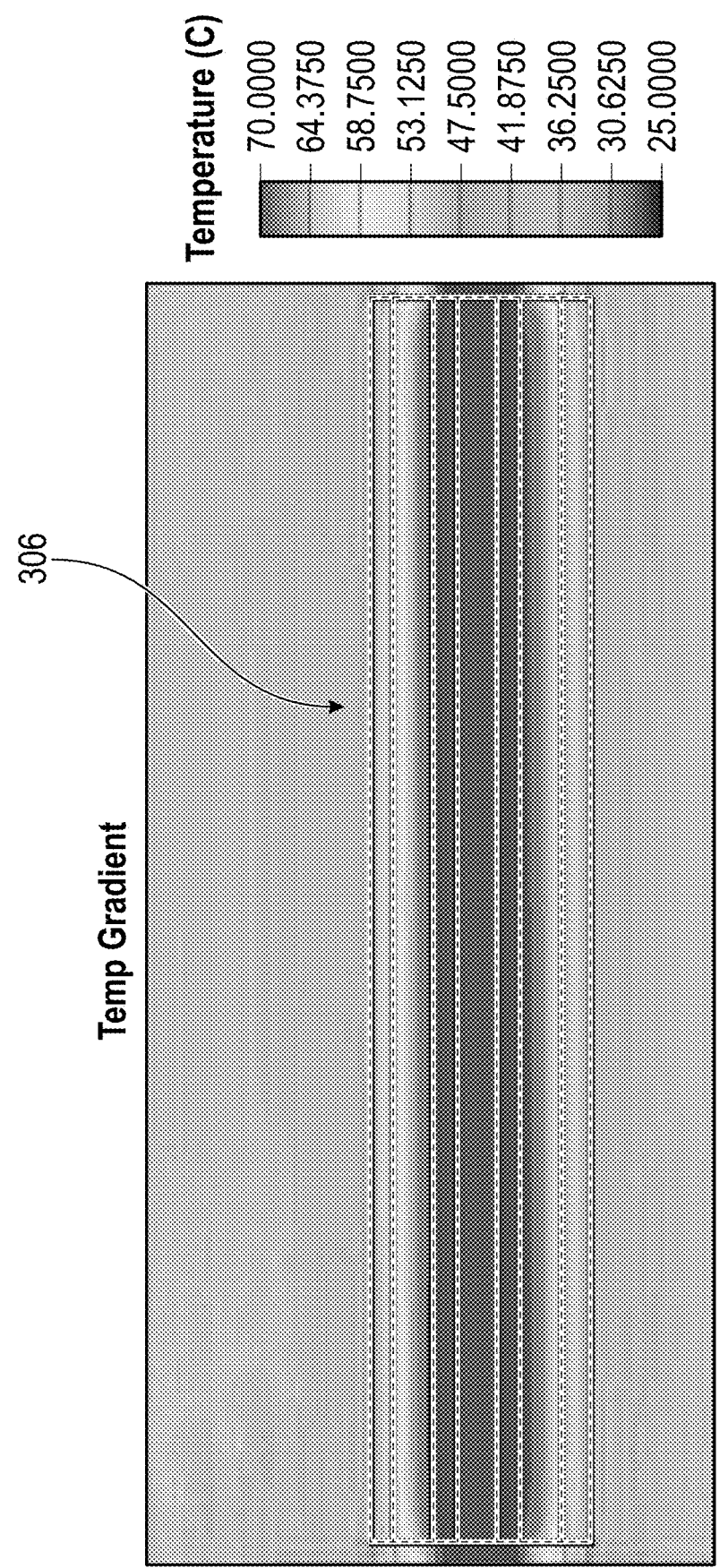
FIG. 14C illustrates a temperature gradient with heated fluid flowing through the irrigation passageway of the distal tip of FIG. 14A.

FIG. 14A illustrates a distal tip 306 of an emulsification device, which can also be referred to as a thermal device, thermal emulsification device, thermal system, emulsification system, handpiece, thermal handpiece, irrigation device, and/or irrigation handpiece. The distal tip 306 can be elongate with a consistent peripheral wall 292 with an outside diameter of 2.4 millimeters. The distal tip 306 is made of a metal such as 316 stainless steel. An inner conduit 290 (e.g., tube) can be disposed inside the distal tip 306. The inner conduit 290 (e.g., tube) can include an irrigation passageway 380 through which heated fluid can flow. The inner conduit 290 can be made of a polymer such as silicone. An air gap 294 can be disposed radially between the inner conduit 290 and the wall 292 of the distal tip 289. The air gap 294 can include a consistent size. The larger diameter of the distal tip 306 can enable the air gap 294 between the wall 292 and the inner conduit 290 to be larger than the air gap 294 of the distal tip 289 described in reference to FIGS. 9A-9D. The material of the inner conduit 290 and enlarged air gap 294 can insulate the distal tip 306 from heat from the heated fluid flowing through the irrigation passageway 380. FIG. 14B illustrates temperatures at an outside surface of the wall 292 of the distal tip 306 with heated saline introduced at 70 degrees Celsius flowing distally through the irrigation passageway 380. During testing, the maximum temperature of the outer surface of the wall 292 of the distal tip 306 was 31.5 degrees Celsius after 5 seconds, 36.6 degrees Celsius after 10 seconds, 43.2 degrees Celsius after 20 seconds, and 49 degrees Celsius after 40 seconds of heated saline introduced to the distal tip 306 at 70 degrees Celsius flowing distally through the irrigation passageway 380 of the inner conduit 290. FIG. 14C illustrates a temperature gradient with heated saline introduced at 70 degrees Celsius flowing distally through the irrigation passageway 380 of the inner conduit 290.

Figure 15A:
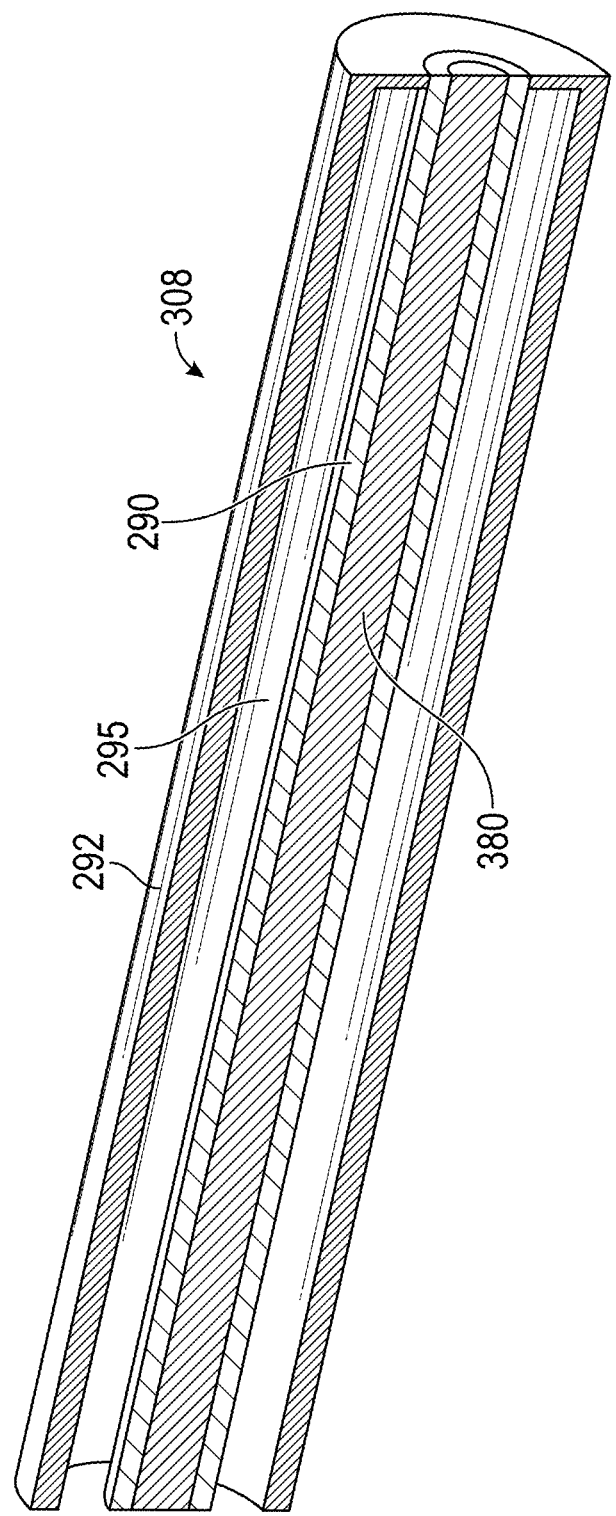
FIG. 15A illustrates a distal tip with an inner conduit with an irrigation passageway, an outer wall, and a vacuum gap between the inner conduit and the outer wall.
Figure 15B:
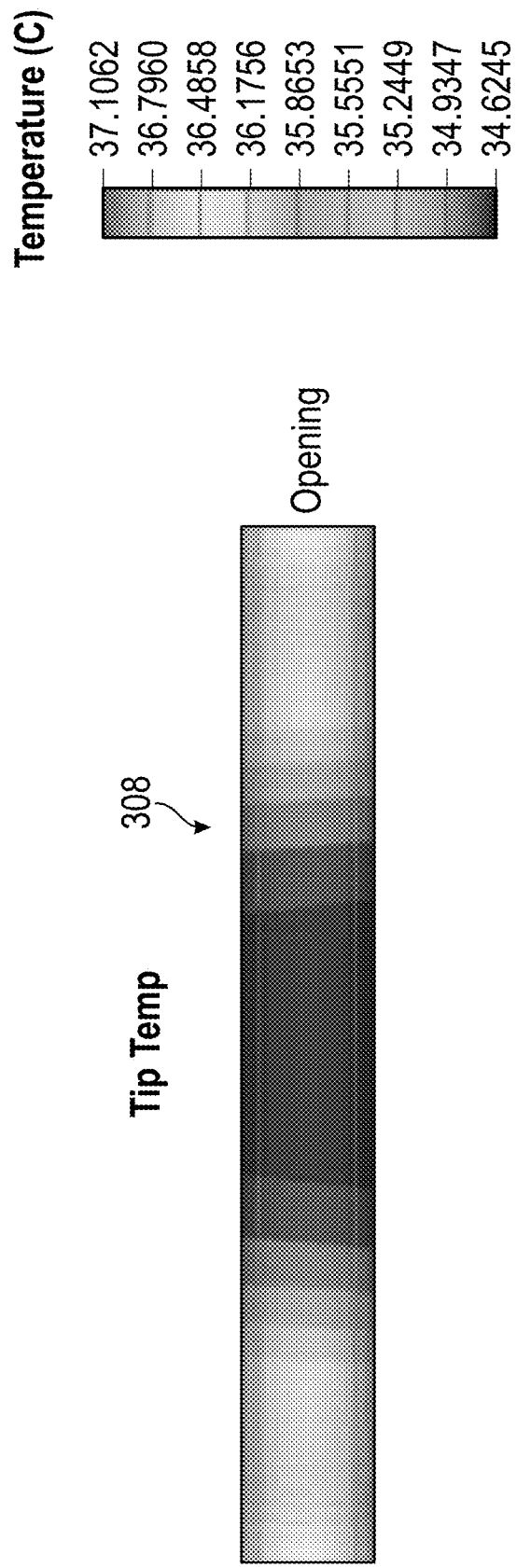
FIG. 15B illustrates temperatures at an outside surface of the outer wall of the distal tip of FIG. 15A with heated fluid flowing through the irrigation passageway.
Figure 15C:
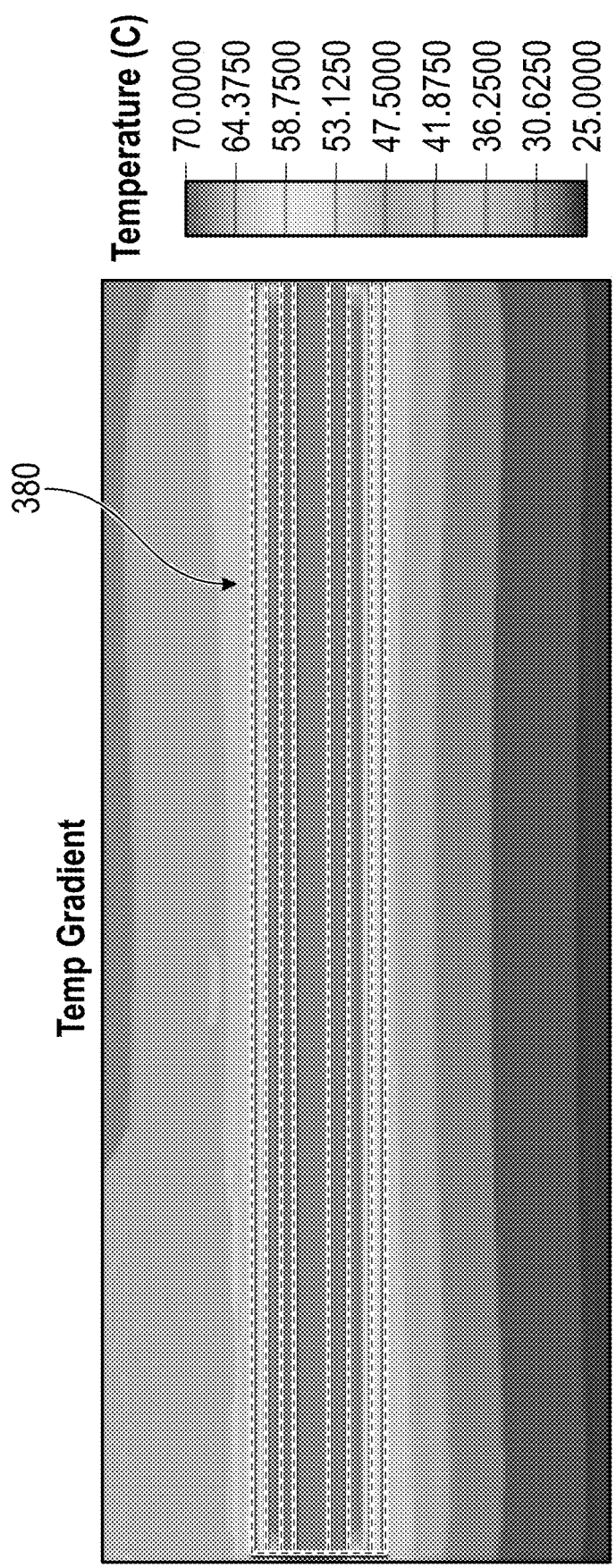
FIG. 15C illustrates a temperature gradient with heated fluid flowing through the irrigation passageway of the distal tip of FIG. 15A.

FIG. 15A illustrates a distal tip 308 of an emulsification device. The distal tip 308 can be the same as the distal tip 306 described in reference to FIG. 14A, but instead of an air gap 294, the distal tip 308 can include a vacuum gap 295 between the outer wall 292 and inner conduit 290. FIG. 15B illustrates temperatures at an outside surface of the wall 292 of the distal tip 308 with heated saline introduced at 70 degrees Celsius flowing distally through the irrigation passageway 380. During testing, the maximum temperature of the outer surface of the wall 292 of the distal tip 308 was 29.8 degrees Celsius after 5 seconds, 32 degrees Celsius after 10 seconds, 34.7 degrees Celsius after 20 seconds, and 37.1 degrees Celsius after 40 seconds of heated saline introduced to the distal tip 308 at 70 degrees Celsius flowing distally through the irrigation passageway 380 of the inner conduit 290. FIG. 15C illustrates a temperature gradient with heated saline introduced at 70 degrees Celsius flowing distally through the irrigation passageway 380 of the inner conduit 290.

Figure 16:
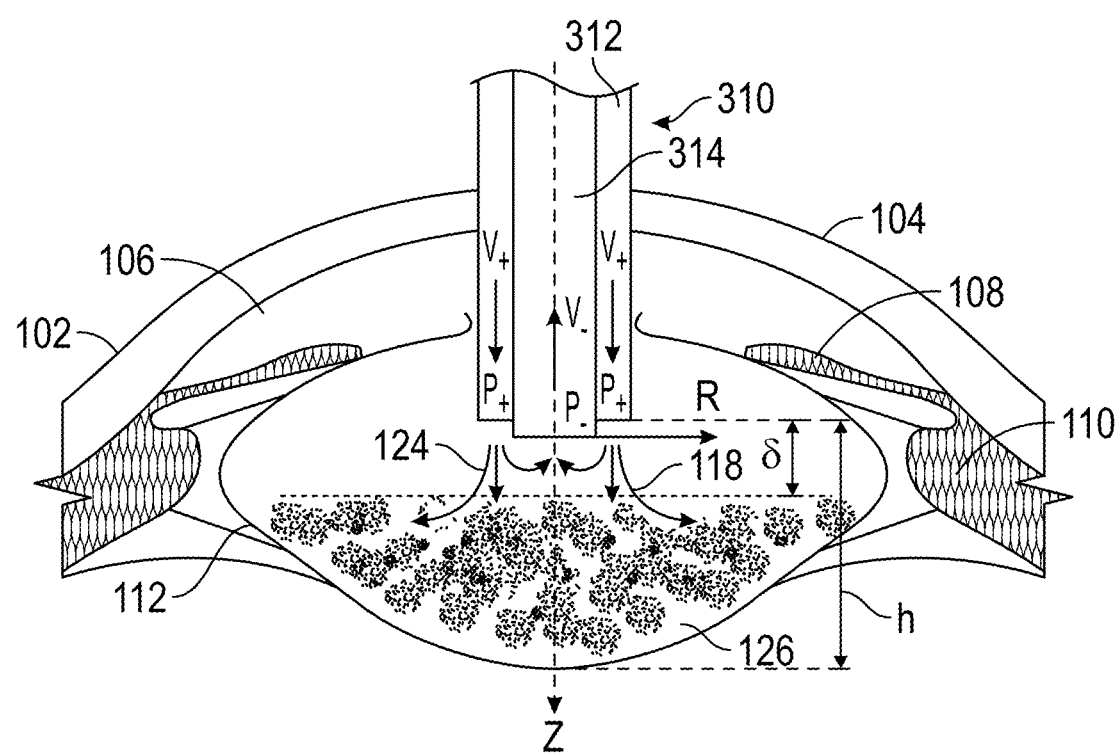
FIG. 16 illustrates a distal tip with an irrigation passageway and an aspiration passageway.

FIG. 16 illustrates a distal tip 310 for an emulsification device (e.g., irrigation and aspiration device, combination irrigation and aspiration device). The distal tip 310 can be used to irrigate heated and unheated fluid into the capsular bag 112 of the eye 102. The heated fluid can emulsify the natural lens of the eye 102. The distal tip 310 can aspirate substance, which can include the emulsified lens, lens fragments 126, heated fluid, unheated fluid, ocular fluid, and/or others. The distal tip 310 can include an irrigation conduit 312, which can also be referred to as an irrigation passageway. Heated and unheated fluid can be delivered into the capsular bag 112 by way of the irrigation conduit 312. The distal tip 310 can include an aspiration conduit 314. The aspiration conduit 314 can aspirate substance from the eye 102. The aspiration conduit 314 can be disposed within the irrigation conduit 312. In some variants, the irrigation conduit 312 can be disposed within the aspiration conduit 314. The aspiration conduit 314 can protrude distally of the irrigation conduit 312. In some variants, the irrigation conduit 312 can protrude distally of the aspiration conduit 314. In some variants, the aspiration conduit 314 and irrigation conduit 312 can include ends that are coplanar with each other. The distal tip 310 can irrigate and aspirate simultaneously and/or in sequence. The distal tip 310 can irrigate and/or aspirate in pulses. The distal tip 310 can be inserted through a hole in the cornea 104 and a hole in the capsular bag 112 to access the natural lens within the capsular bag 112.

FIGS. 17A-17E illustrate various views of an emulsification device 316 (e.g., irrigation and aspiration device, combination irrigation and aspiration device). The emulsification device 316 can include any of the features of the other emulsification devices herein. The emulsification device 316 can be used to irrigate heated and unheated fluid into the capsular bag 112. The heated fluid can emulsify the natural lens of the eye. The emulsification device 316 can aspirate substance (e.g., emulsified lens, lens fragments, heated fluid, unheated fluid, ocular fluid, and/or others) from the capsular bag 112.

Figure 17A:
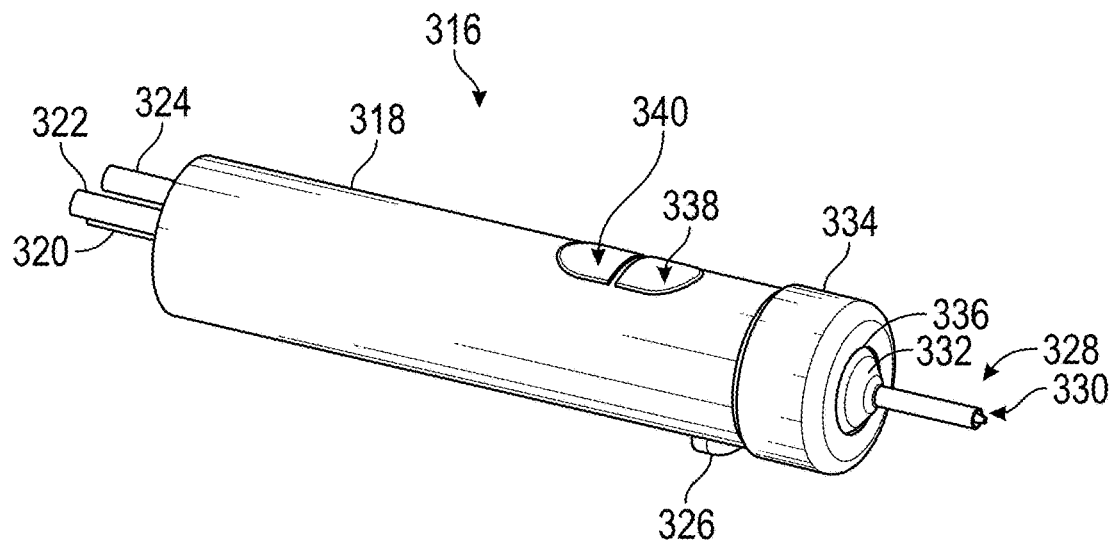
FIG. 17A illustrates a perspective view of an emulsification device.
Figure 17B:
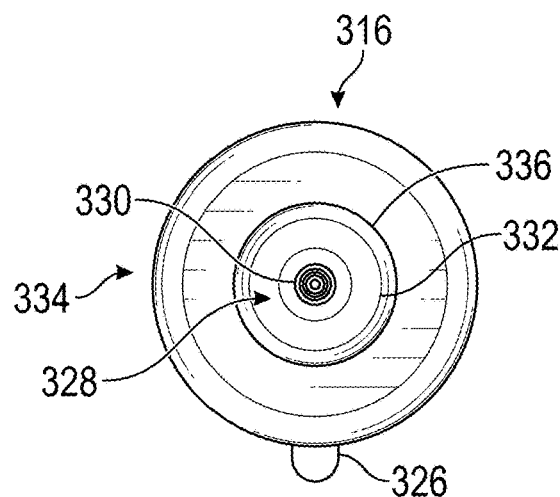
FIG. 17B illustrates a front view of the emulsification device of FIG. 17A.
Figure 17C:
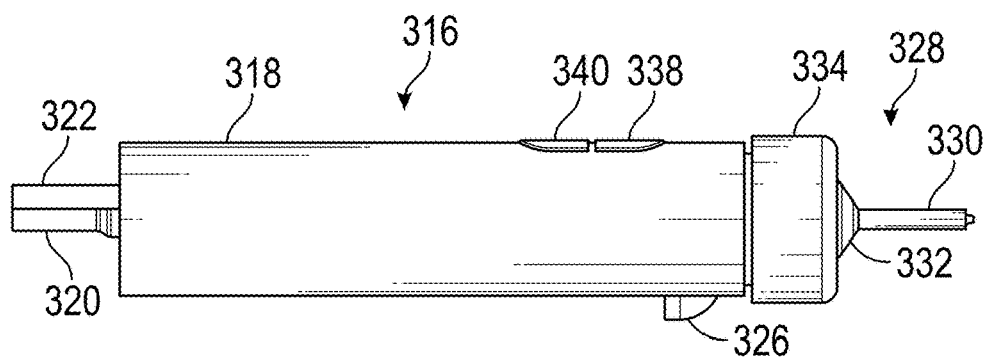
FIG. 17C illustrates a side view of the emulsification device of FIG. 17A.

As illustrated in FIGS. 17A-17C, the emulsification device 316 can include a housing 318 to house internal components of the emulsification device 316. The emulsification device 316 can include one or more user interfaces (e.g., button(s), switch(es), toggle(s), dial(s), display(s), touchscreen(s), etc.) to enable a user to control the emulsification device 316. The user interfaces can be used to control various functions of the emulsification device 316, which can at least include powering on and off the emulsification device 316, starting and stopping irrigation with heated fluid, starting and stopping irrigation with unheated fluid (e.g., fluid at an ambient temperature), increasing and deceasing a temperature of the heated fluid, starting and stopping heating fluid, increasing and decreasing irrigation flow rates, starting and stopping aspiration, increasing and decreasing aspiration rates, and/or others. For example, the emulsification device 316 can include a first button 338 and/or a second button 340. In some variants, the first button 338 and/or second button 340 can be used to control irrigation. For example, the first button 338 and/or second button 340 can enable the user to select between irrigating with heated fluid or unheated (e.g., ambient temperature) fluid.

The emulsification device 316 can include a distal tip 328. Fluid can flow out of the distal tip 328 to irrigate the capsular bag. Substance can be aspirated from the capsular bag and into the distal tip 328. The distal tip 328 can include a proximal portion 332. The proximal portion 332 can be coupled to the emulsification device 316 (e.g., housing 318). The distal tip 328 can include an elongate portion 274. The elongate portion 330 can extend distally from the proximal portion 332. The elongate portion 330 can be straight or include angled portions. The elongate portion 330 can be inserted into the eye to irrigate and/or aspirate.

The emulsification device 316 can include a distal cap 334 (e.g., collar, retention collar). The distal cap 334 can be coupled to the emulsification device 316. The distal cap 334 can include an opening 336. The distal tip 328 (e.g., proximal portion 332) can extend through the opening 336 of the distal cap 334. The distal tip 328 can be coupled to the emulsification device 316 and then the distal cap 334 coupled to the housing 318 to secure the distal tip 328 to the emulsification device 316.

The emulsification device 316 can include an irrigation conduit 320, coolant inlet conduit 322, coolant outlet conduit 324, and/or aspiration conduit 326. The irrigation conduit 320 can receive fluid (e.g., saline) from a fluid source (e.g., fluid reservoir) to be irrigated into the eye by way of the distal tip 328. As described herein, the fluid received through the irrigation conduit 320 can be irrigated into the eye without being heated or after being heated to a target temperature. The coolant inlet conduit 322 can receive fluid (e.g., saline) from a fluid source (e.g., fluid reservoir) to be circulated through the distal tip 328 to cool the distal tip 328. The fluid circulated through the distal tip 328 for cooling can exit by way of the coolant outlet conduit 324. The aspiration conduit 326 can direct substance aspirated by the distal tip 328 away from the emulsification device 316 (e.g., to a waste reservoir, waste line, etc.). The irrigation conduit 320, coolant inlet conduit 322, and/or coolant outlet conduit 324 can extend out of a proximal portion of the housing 318. The aspiration conduit 326 can extend out of a distal portion of the housing 318 (e.g., proximate the distal cap 334).

Figure 17D:
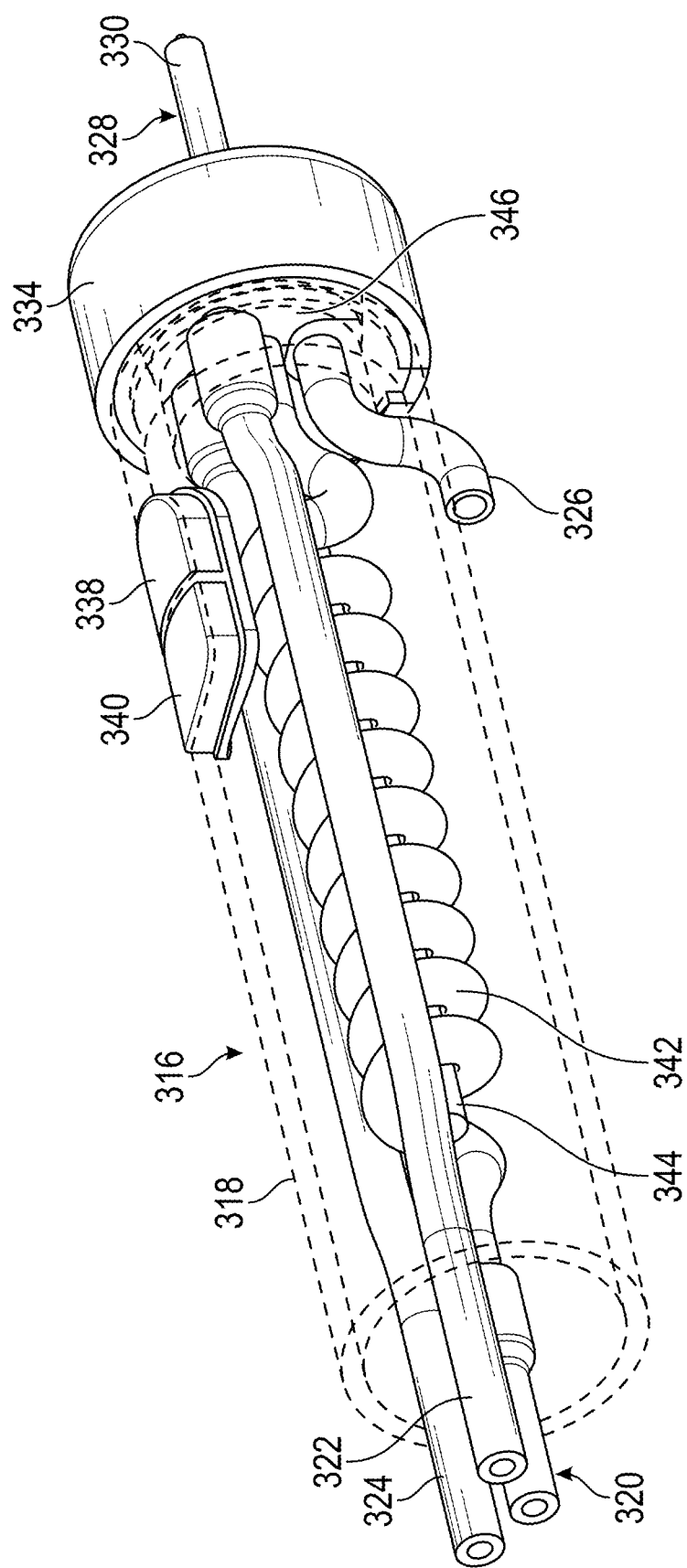
FIG. 17D illustrates a rear perspective view of the emulsification device of FIG. 17A with internal components visible.

FIG. 17D illustrates internal components of the emulsification device 316. As shown, the irrigation conduit 320 can be disposed proximate a heater 344 (e.g., cartridge heater) that can heat fluid flowing through the irrigation conduit 320. The irrigation conduit 320 can be disposed around the heater 344 to facilitate heating. In some variants, the irrigation conduit 320 can include a coil 342 disposed around the heater 344. The coil 342 can include a material (e.g., metal, metal alloy) to facilitate heat transfer. In some variants, the heater 344 can quickly change between heating and not heating fluid flowing through the irrigation conduit 320 to deliver heated and unheated fluid. In some variants, the irrigation conduit 320 can include a bypass conduit that bypasses the heater 344 to provide unheated fluid (e.g., ambient-temperature fluid) to the distal tip 328 for irrigation.

The emulsification device 316 can include a coupler 346 (e.g., manifold, interface, interface component). The coupler 346 can be disposed within the housing 318 at a distal portion thereof. The coupler 346 can fluidically couple the coolant inlet conduit 322, coolant outlet conduit 324, irrigation conduit 320, and/or aspiration conduit 326 to the distal tip 328. The distal tip 328 can be coupled to the coupler 346. The coupler 346 can include one or more materials (e.g., polymer such as silicone) which can provide a seal to prevent fluid leakage.

Figure 17E:
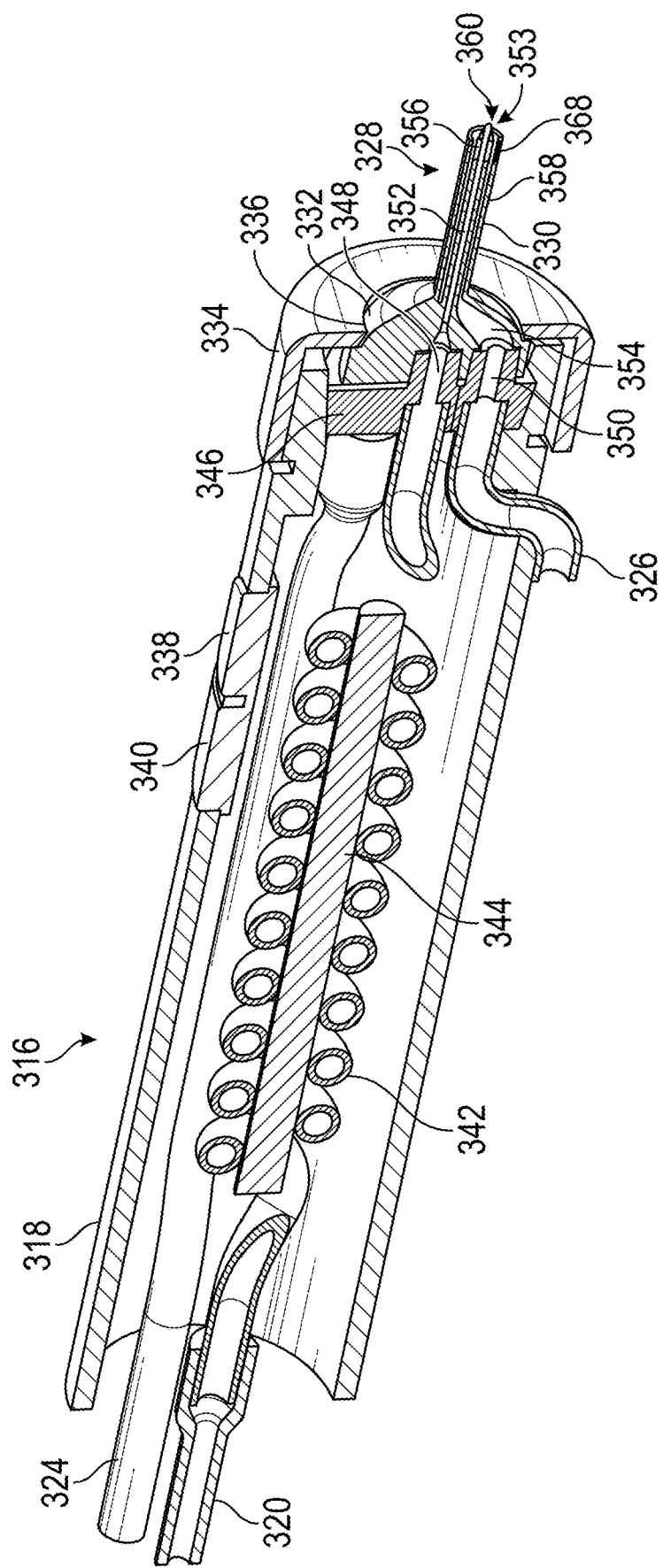
FIG. 17E illustrates a sectioned view of the emulsification device of FIG. 17A.

FIG. 17E illustrates a sectioned view of the emulsification device 316. As shown, the coupler 346 can include a plurality of conduits (e.g., passageways) to direct fluid and/or substance. The coupler 346 can include an irrigation lumen 348 through which fluid from the irrigation conduit 320 can flow. The coupler 346 can include an aspiration lumen 350 through which fluid aspirated by the distal tip 328 can flow. The coupler 346 can include a coolant inlet lumen through which coolant fluid from the coolant inlet conduit 322 can flow. The coupler 346 can include a coolant outlet lumen through which coolant fluid circulated through the distal tip 328 can flow to the coolant outlet conduit 324.

The distal tip 328 can include various passageways to facilitate circulating coolant fluid, aspirating substance from the capsular bag, and/or irrigating heated and unheated fluid into the capsular bag.

The distal tip 328 can include an irrigation passageway 352 through which heated and unheated fluid can flow. The irrigation passageway 352 can be fluidically coupled with the irrigation lumen 348 such that fluid flowing through the irrigation conduit 320 flows into the irrigation passageway 352 by way of the irrigation lumen 348 of the coupler 346. The irrigation passageway 352 can be centrally located within the distal tip 328. A proximal portion of the irrigation passageway 352 can be enlarged, which can include having a size and/or shape corresponding to the irrigation lumen 348, and taper to a consistent size. The irrigation passageway 352 can include a distal opening 353 to facilitate flowing heated and unheated fluid out of the distal tip 328 and into the eye. In some variants, the distal tip 328 can include multiple irrigation passageway 352, which can include one for heated fluid and another for unheated fluid.

The distal tip 328 can include an aspiration passageway 354. The aspiration passageway 354 can be distally open (e.g., annular opening, arcuate opening) to facilitate aspirating. The aspiration passageway 354 can be fluidically coupled with the aspiration lumen 350 of the coupler 346 such that substance aspirated from the eye into the aspiration passageway 354 flows through the aspiration lumen 350 and into the aspiration conduit 326 for removal. The aspiration passageway 354 can be disposed radially outward of the irrigation passageway 352 along the elongate portion 330. The aspiration passageway 354 can be disposed circumferentially around the irrigation passageway 352 along at least a portion of the elongate portion 330. The aspiration passageway 354 can be disposed between the irrigation passageway 352 and an outer wall 358 of the distal tip 328.

The distal tip 328 can include a coolant passageway 368. The coolant passageway 368 can circulate coolant fluid (e.g., ambient-temperature fluid, cooled fluid, saline, etc.) in the distal tip 328. The coolant passageway 368 can be disposed in the outer wall 358 of the distal tip 328. The coolant passageway 368, at least at the distal portion of the distal tip 328 (e.g., elongate portion 330) can be disposed radially outward of the aspiration passageway 354 and/or irrigation passageway 352. The coolant passageway 368 can be disposed circumferentially about a least a portion (e.g., distal portion) of the irrigation passageway 352 and/or aspiration passageway 354. The coolant passageway 368 can receive fluid from the coolant inlet conduit 322 flow fluid away from the coolant passageway 368 by way of the coolant outlet conduit 324. The coupler 346 can include a lumen through which fluid from the coolant inlet conduit 322 can flow to reach the coolant passageway 368 of the distal tip 328 and another lumen through which the fluid can be directed from the coolant passageway 368 to the coolant outlet conduit 324.

The distal tip 328 can include an air gap 356. The air gap 356 can be disposed radially outward of the irrigation passageway 352. The air gap 356 can be disposed radially inward of the aspiration passageway 354 and/or coolant passageway 368. The air gap 356 can be disposed circumferentially about at least a portion of the irrigation passageway 352. The air gap 356 can be disposed at a distal portion of the elongate portion 330. In some variants, the air gap 356 can be a vacuum gap.

The distal tip 328 can include a distal protrusion 360. The distal protrusion 360 can include a cone shape. The distal protrusion 360 can extend distal of the outer wall 358 of the distal tip 328. The distal opening 353 of the irrigation passageway 352 can be disposed in the distal protrusion 360.

The emulsification device 316 can include one or more thermocouples to monitor temperatures. The emulsification device 316 can control the heater 344 based on the sensed temperatures. For example, the emulsification device 316 can increase and decrease the energy output by the heater 344 based on the sensed temperatures. The emulsification device 316 can adjust irrigation rates, coolant flow rates, coolant temperature, aspiration rates, and/or other characteristics based on the sensed temperatures.

Figure 18B:
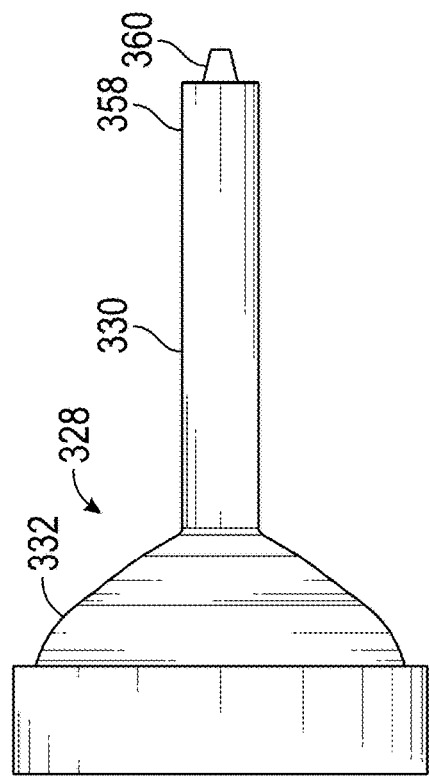
FIG. 18B illustrates a side view of the emulsification device of FIG. 17A.
Figure 18A:
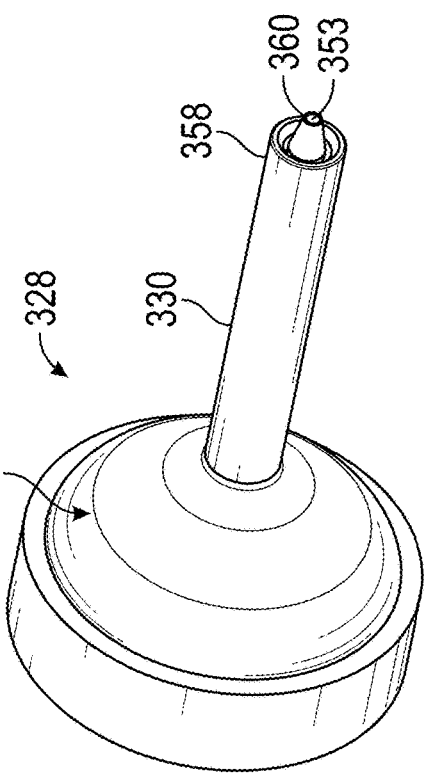
FIG. 18A illustrates a perspective view of a distal tip of the emulsification device of FIG. 17A.
Figure 18D:
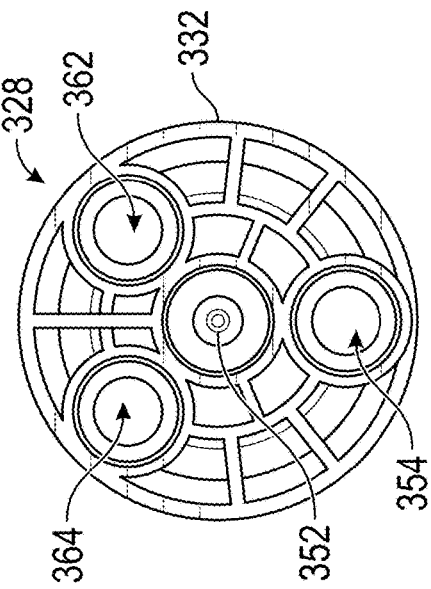
FIG. 18D illustrates a rear view of the emulsification device of FIG. 17A.
Figure 18C:
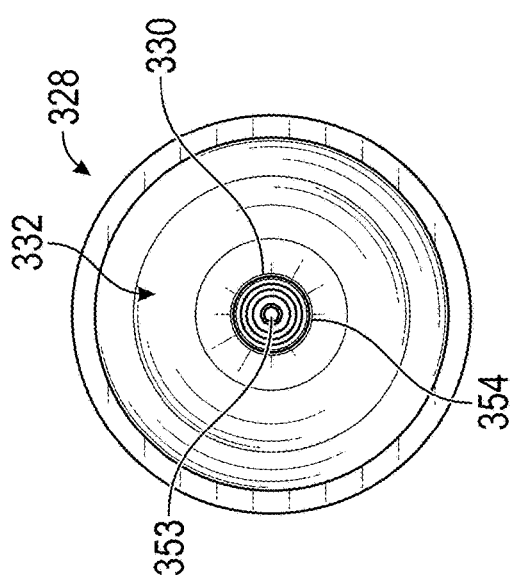
FIG. 18C illustrates a front view of the emulsification device of FIG. 17A.

FIGS. 18A-18D show various views of the distal tip 328. As shown in FIG. 18D, the distal tip 328 can include a coolant inlet 362. Coolant fluid can flow from the coolant inlet conduit 322 into the coolant passageway 368 by way of the coolant inlet 362. The distal tip 328 can include a coolant exit 364. Coolant fluid can leave the distal tip 328 by way of the coolant exit 364 to the coolant outlet conduit 324.

Figure 18F:
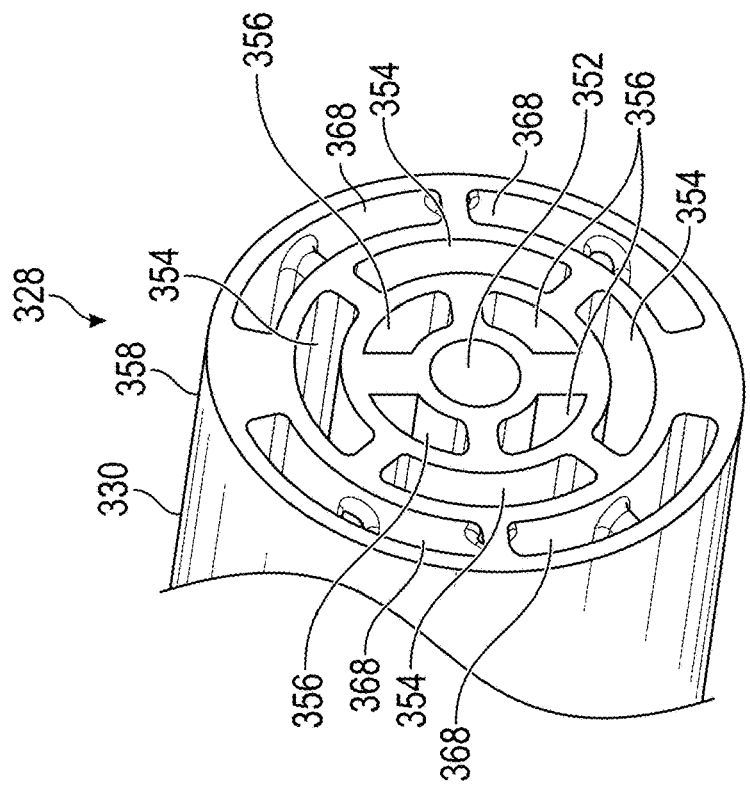
FIG. 18F illustrates a cross-section of the distal tip of the emulsification device of FIG. 17A.
Figure 18E:
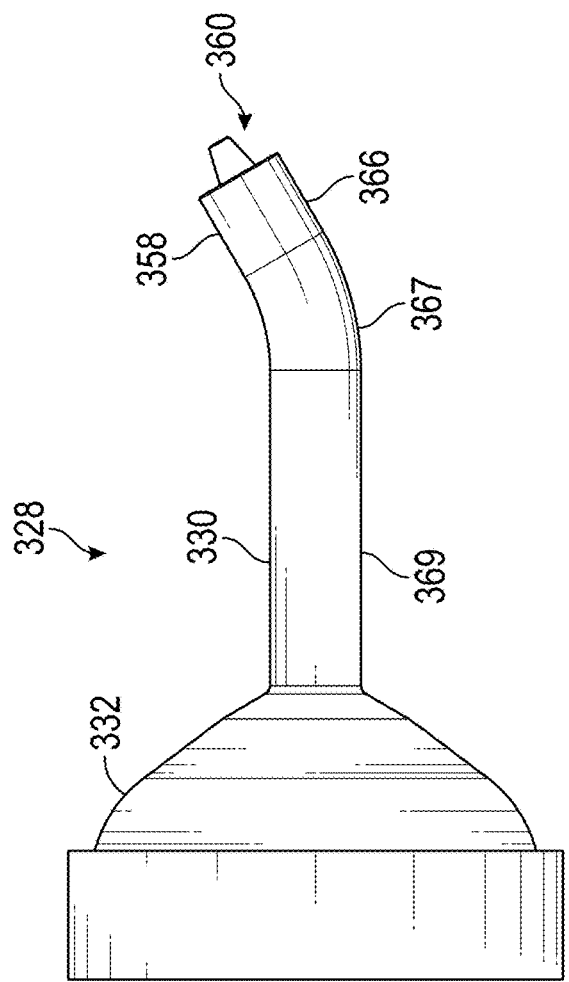
FIG. 18E illustrates the distal tip of the emulsification device of FIG. 17A with an angled portion.

As illustrated in FIG. 18E, the elongate portion 330 of the distal tip 328 can include a straight portion 369 and an angled portion 366. The angled portion 366 can be disposed at an angle (e.g., 30 degree angle) relative to the straight portion 369. For example, the central longitudinal axis of the angled portion 366 can be angled relative to the central longitudinal axis of the straight portion 369. A bend 367 can be disposed at the junction between the straight portion 369 and the angled portion 366.

FIG. 18F illustrates a cross section of the elongate portion 330 of the distal tip 328. As shown, the irrigation passageway 352 can be centrally positioned, which can include being coaxial with the central longitudinal axis of the elongate portion 330. The irrigation passageway 352 can include a circular cross section. Heated and unheated fluid can flow distally through and out of the irrigation passageway 352 to irrigate the capsular bag of the eye.

The distal tip 328 can include a plurality (e.g., 2, 3, 4, 5, 6 or more) of air gaps 356 (e.g., air pockets). In some variants, the distal tip 328 can include a single air gap 356. The air gaps 356 can be disposed radially outward of the irrigation passageway 352. The air gaps 356 can be individual air gaps (e.g., air pockets) that are not fluidically connected. In some variants, the air gaps 356 can be fluidically connected. The air gaps 356 can be circumferentially distributed about the irrigation passageway 352. The air gaps 356 can include an arcuate shape. In some variants, the air gaps 356 can be vacuum gaps.

The distal tip 328 can include a plurality (e.g., 2, 3, 4, 5, 6 or more) of aspiration passageways 354. In some variants, the distal tip 328 can include a single aspiration passageway 354. The aspiration passageways 354 can be disposed radially outward of the irrigation passageway 352 and/or air gaps 356. The aspiration passageways 354 can be fluidically connected. The aspiration passageways 354 can be circumferentially distributed about the irrigation passageway 352 and air gaps 356. The aspiration passageways 354 can include an arcuate shape. Substance (e.g., heated fluid, unheated fluid, emulsified lens, lens fragments, ocular fluid, and/or others) can be aspirated from the capsular bag by way of the aspiration passageways 354. The aspiration passageways 354 can be disposed radially outward of gaps between adjacent air gaps 356.

The distal tip 328 can include a plurality (e.g., 2, 3, 4, 5, 6 or more) of coolant passageways 368. In some variants, the distal tip 328 can include a single coolant passageway 368. The coolant passageways 368 can be disposed radially outward of the irrigation passageway 352, air gaps 356, and/or aspiration passageways 354. The coolant passageways 368 can be fluidically connected. The coolant passageways 368 can be circumferentially distributed about the irrigation passageway 352, air gaps 356, and/or aspiration passageways 354. The coolant passageways 368 can include an arcuate shape. Coolant fluid (e.g., ambient temperature fluid, cooled fluid, saline, etc.) can flow through the coolant passageways 368 to help cool the distal tip 328. The coolant passageway 368 can be radially outward of gaps between adjacent aspiration passageways 354. The aspiration passageways 354 can be disposed between the coolant passageways 368 and the air gaps 356 in a radial direction. The air gaps 356 can be disposed between the irrigation passageway 352 and the aspiration passageways 354. The air gaps 356, aspiration passageways 354, and/or coolant passageway 368 can cool a temperature of the distal tip 328. The air gaps 356, aspiration passageways 354, and/or coolant passageway 368 can insulate the outer wall 358 of the distal tip 328 from the heated fluid flowing through the irrigation passageway 352. The coolant passageways 368 can insulate the outer wall 358 of the distal tip 328 from substance, which may be at an elevated temperature, flowing through the aspiration passageways 354. The elongate portion 330 of the distal tip 328 can have an outer diameter of 2.4 millimeters.

In use, the distal tip 328 can be inserted through holes in the cornea and capsular bag to access the natural lens within the capsular bag. Irrigation fluid (e.g., ambient temperature fluid, saline, etc.) can be introduced into the irrigation conduit 320. The irrigation fluid can flow through the coil 342 and be heated by the heater 344 to a target temperature, which can at least include any temperature disclosed herein. The heated irrigation fluid can flow through the irrigation lumen 348 of the coupler 346, into the irrigation passageway 352 of the distal tip 328, and out the distal opening 353 of the irrigation passageway 352 to the natural lens. The heated fluid can emulsify the natural lens and leave the capsular bag in tact. While heated or unheated fluid is flowing through the irrigation passageway 352 of the distal tip 328, coolant fluid (e.g., ambient temperature fluid, saline, etc.) can be introduced into the coolant inlet conduit 322. The coolant fluid can flow through a lumen of the coupler 346 and into the coolant passageways 368 of the distal tip 328 by way of the coolant inlet 362. The coolant fluid can flow through the coolant passageways 368 and out the coolant exit 364 into the coolant outlet conduit 324. The coolant fluid can flow through the coolant outlet conduit 324 to a reservoir, the irrigation conduit 320, and/or a waste receptacle (e.g., drain). While heated or unheated fluid is flowing through the irrigation passageway 352, substance can be aspirated from the capsular bag of the eye by way of the aspiration passageways 354. Aspirated substance can flow through the aspiration passageways 354 to the aspiration conduit 326. The aspirated substance flowing through the aspiration conduit 326 can flow to a reservoir and/or waste receptacle. In some variants, the emulsification device 316 can irrigate without aspiration or coolant fluid flowing through the coolant passageways 368. In some variants, the emulsification device 316 can aspirate without simultaneous irrigation.

Figure 19A:
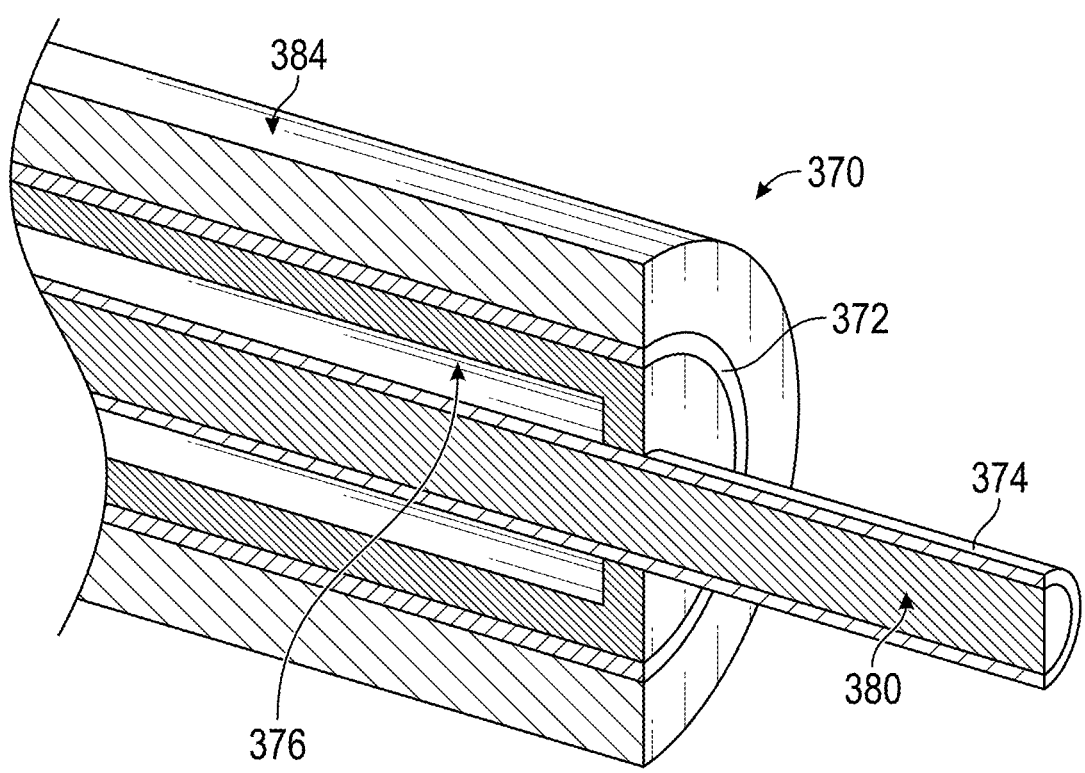
FIG. 19A illustrates a distal tip with an inner conduit with an irrigation passageway, an outer wall, a vacuum gap between the inner conduit and the outer wall, and an aspiration passageway between the vacuum gap and the outer wall.
Figure 19B:
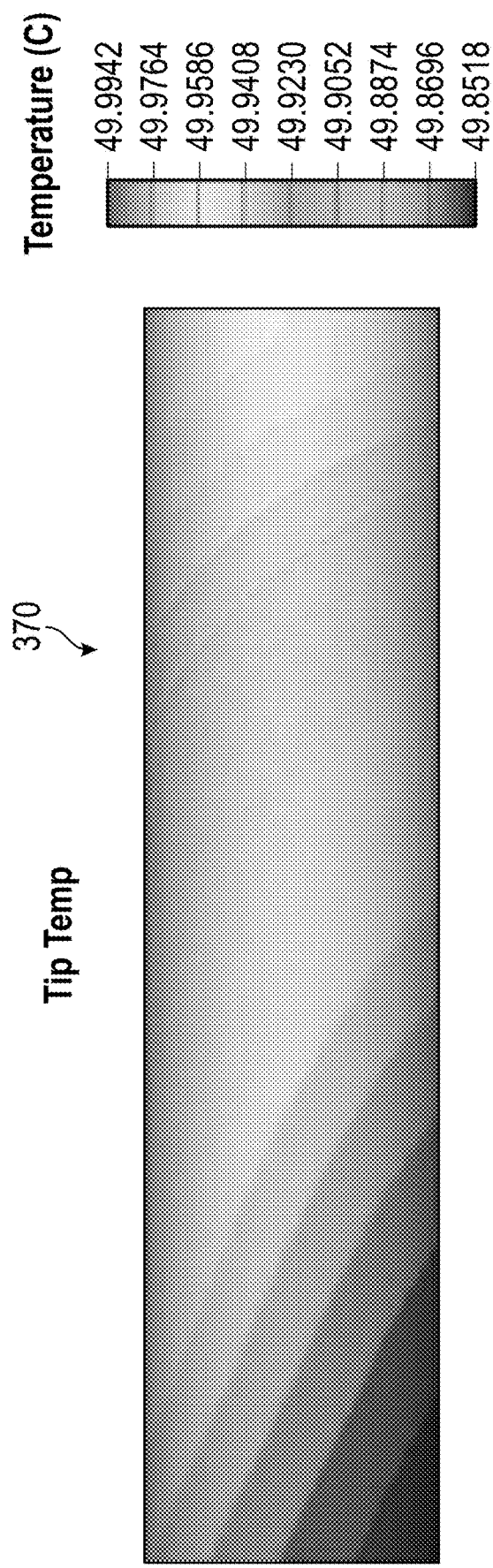
FIG. 19B illustrates temperatures at an outside surface of the outer wall of the distal tip of FIG. 19A with heated fluid flowing through the irrigation passageway and aspirated fluid flowing through the aspiration passageway.
Figure 19C:
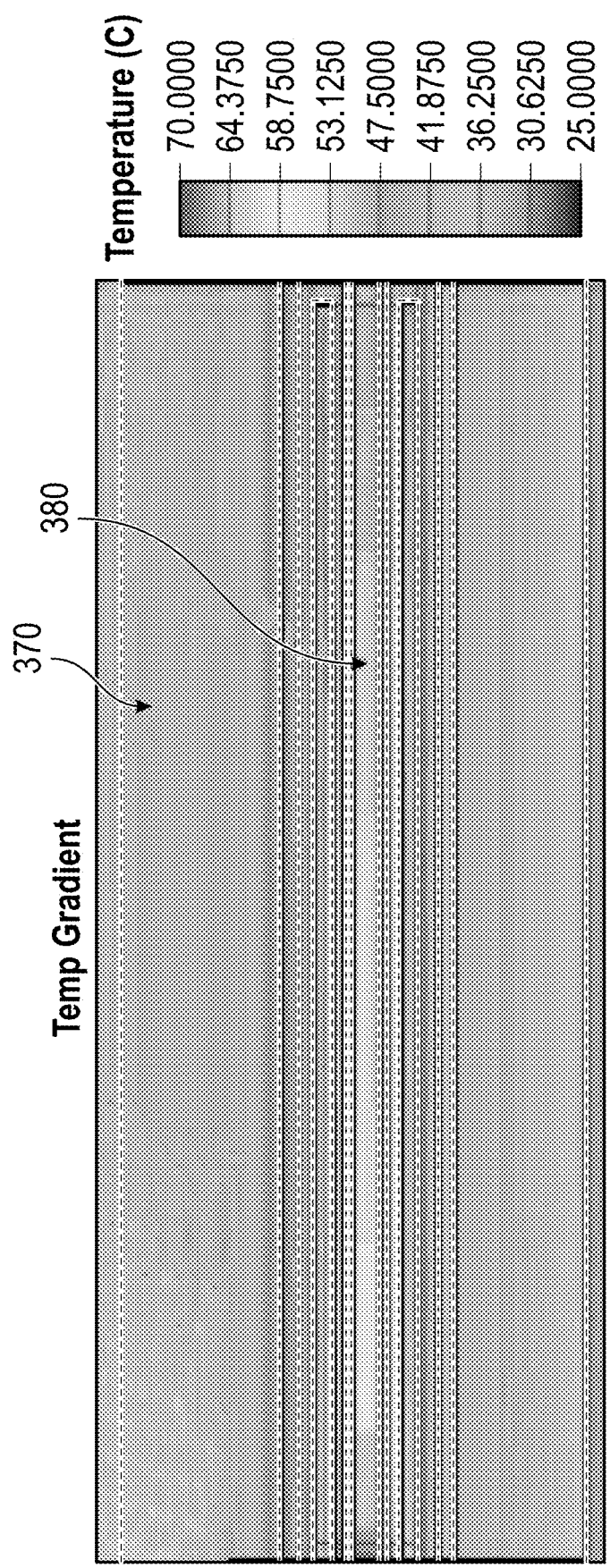
FIG. 19C illustrates a temperature gradient with heated fluid flowing through the irrigation passageway and aspirated fluid flowing through the aspiration passageway of the distal tip of FIG. 19A.

FIG. 19A illustrates a distal tip 370 of an emulsification device (e.g., irrigation and aspiration device). The distal tip 370 can be made of a metal such as 316 stainless steel. The distal tip 370 can include an irrigation conduit 374 with an irrigation passageway 380 through which heated fluid (e.g., saline) can flow to irrigate the capsular bag. The irrigation conduit 374 can protrude distally of the outer wall 384. The irrigation conduit 374 and/or irrigation passageway 380 can have a circular cross section. The irrigation conduit 374 can be made of a metal such as 316 stainless steel. The distal tip 370 can include an outer wall 384. The outer wall 384 can define an outer diameter of 2.4 millimeters. The distal tip 370 can include an aspiration passageway 372 to aspirate substance from the capsular bag. The aspiration passageway 372 can be distally open to aspirate. The aspiration passageway 372 can be disposed radially outward of the irrigation conduit 374. The aspiration passageway 372 can be circumferentially disposed around the irrigation conduit 374. The aspiration passageway 372 can include an annular shape. The distal tip 370 can include a vacuum gap 376. The vacuum gap 376 can be disposed between the aspiration passageway 372 and the irrigation conduit 374 in a radial direction. The vacuum gap 376 can be circumferentially disposed around the irrigation conduit 374. The aspiration passageway 372 and vacuum gap 376 can insulate the outer wall 384 from the heated fluid flowing distally through the irrigation passageway 380. FIG. 19B illustrates temperatures at an outside surface of the outer wall 384 of the distal tip 370 with heated saline introduced at 70 degrees Celsius flowing distally through the irrigation passageway 380 and aspirated saline introduced at 50 degrees Celsius flowing proximally through the aspiration passageway 372. During testing, the maximum temperature of the outer surface of the wall 384 of the distal tip 370 was 48.2 degrees Celsius after 5 seconds, 50.0 degrees Celsius after 10 seconds, 50.0 degrees Celsius after 20 seconds, and 50 degrees Celsius after 40 seconds of heated saline introduced to the distal tip 370 at 70 degrees Celsius flowing distally through the irrigation passageway 380 and aspirated saline introduced at 50 degrees Celsius flowing proximally through the aspiration passageway 372. FIG. 19C illustrates a temperature gradient with heated saline introduced at 70 degrees Celsius flowing distally through the irrigation passageway 380 and aspirated saline introduced at 50 degrees Celsius flowing proximally through the aspiration passageway 372.

Figure 20A:
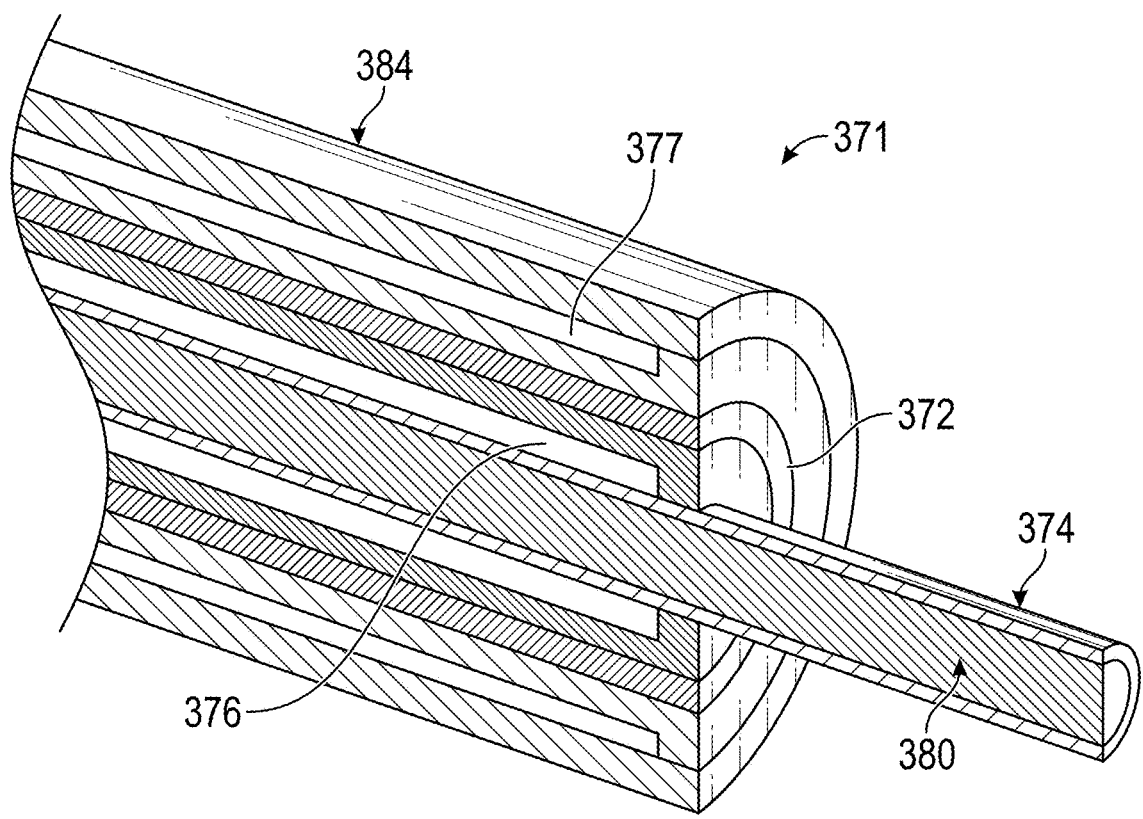
FIG. 20A illustrates a distal tip with an inner conduit with an irrigation passageway, an aspiration passageway, a first vacuum gap between the inner conduit and the aspiration passageway, an outer wall, and a second vacuum gap between the aspiration passageway and the outer wall.
Figure 20B:
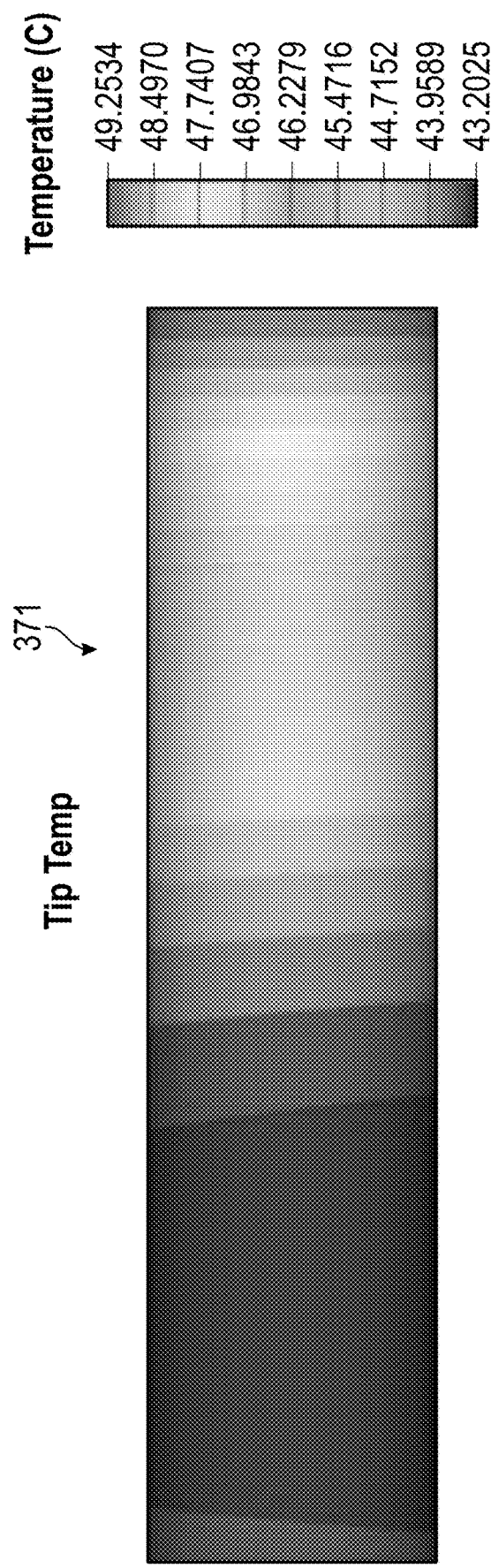
FIG. 20B illustrates temperatures at an outside surface of the outer wall of the distal tip of FIG. 20A with heated fluid flowing through the irrigation passageway and aspirated fluid flowing through the aspiration passageway.
Figure 20C:
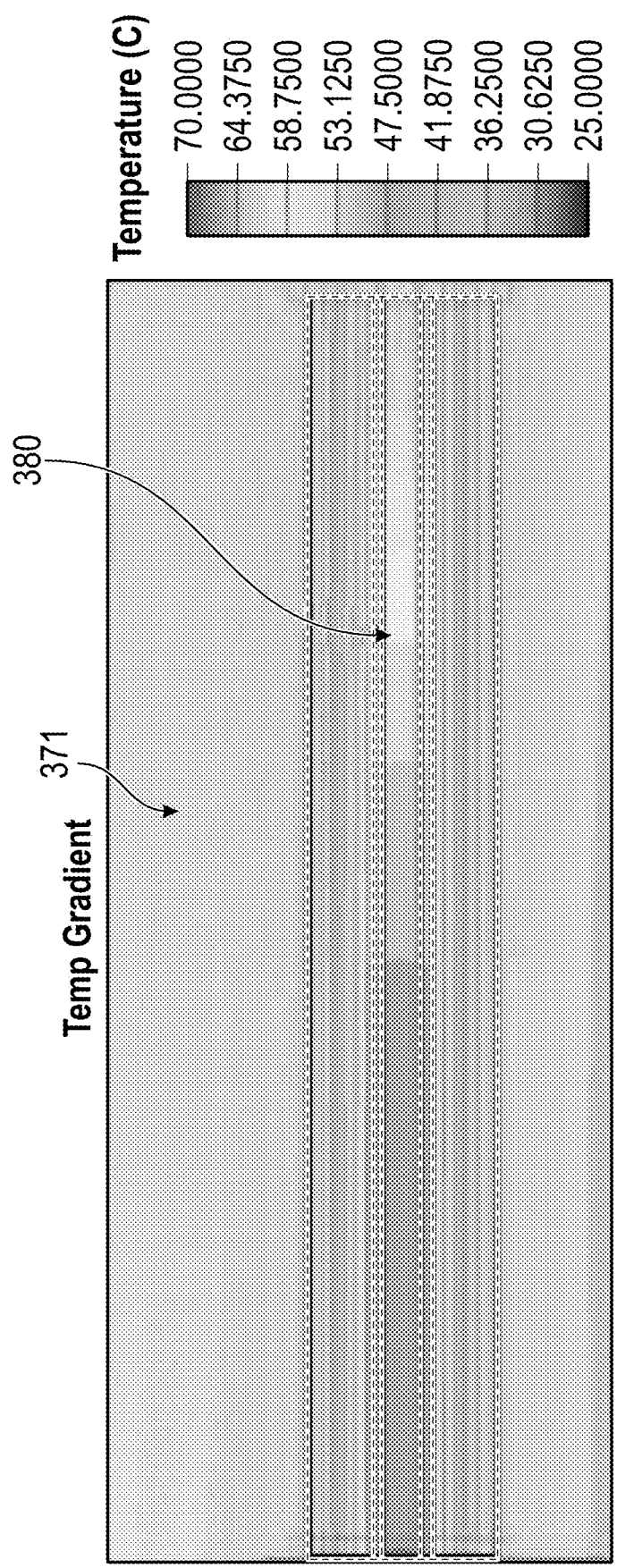
FIG. 20C illustrates a temperature gradient with heated fluid flowing through the irrigation passageway and aspirated fluid flowing through the aspiration passageway of the distal tip of FIG. 20A.

FIG. 20A illustrates a distal tip 371 of an emulsification device (e.g., irrigation and aspiration device). The distal tip 371 can be the same as distal tip 370 but the distal tip 371 can include a vacuum gap 377. The vacuum gap 377 can be disposed radially outward of the irrigation conduit 374, vacuum gap 376, and/or aspiration passageway 372. The vacuum gap 377 can be disposed radially inward of an outer surface of the outer wall 384. The vacuum gap 377 can be disposed between the aspiration passageway 372 and the outer surface of the outer wall 384 in a radial direction. The vacuum gap 377 can insulate the outer surface of the outer wall 384 from fluids flowing through the aspiration passageway 372 and irrigation conduit 374. FIG. 20B illustrates temperatures at an outside surface of the outer wall 384 of the distal tip 371 with heated saline introduced at 70 degrees Celsius flowing distally through the irrigation passageway 380 and aspirated saline introduced at 50 degrees Celsius flowing proximally through the aspiration passageway 372. During testing, the maximum temperature of the outer surface of the wall 384 of the distal tip 371 was 43.5 degrees Celsius after 5 seconds, 48.4 degrees Celsius after 10 seconds, 50.2 degrees Celsius after 20 seconds, and 50.2 degrees Celsius after 40 seconds of heated saline introduced to the distal tip 371 at 70 degrees Celsius flowing distally through the irrigation passageway 380 and aspirated saline introduced at 50 degrees Celsius flowing proximally through the aspiration passageway 372. FIG. 20C illustrates a temperature gradient with heated saline introduced at 70 degrees Celsius flowing distally through the irrigation passageway 380 and aspirated saline introduced at 50 degrees Celsius flowing proximally through the aspiration passageway 372.

FIG. 21A illustrates a distal tip 373 of an emulsification device (e.g., irrigation and aspiration device). The distal tip 373 can be the same as the distal tip 371 but the distal tip 373 can omit the vacuum gap 377 and instead include a coolant passageway 378. Coolant fluid (e.g., ambient temperature fluid, saline, etc.) can circulate through the coolant passageway 378. The coolant passageway 378 can be disposed radially outward of the irrigation conduit 374, vacuum gap 376, and/or aspiration passageway 372. The coolant passageway 378 can be disposed radially inward of an outer surface of the outer wall 384. The coolant passageway 378 can be disposed between the aspiration passageway 372 and the outer surface of the outer wall 384 in a radial direction. The coolant passageway 378 can insulate the outer surface of the outer wall 384 from fluids flowing through the aspiration passageway 372 and irrigation conduit 374. The coolant passageway 378 can include various cross-sectional shapes and/or flow rates to insulate (e.g., insulate more or less). The coolant passageway 378 can include a plurality of passageways that are fluidically connected. For example, as illustrated in FIG. 21B, the coolant passageway 378 can include two passageways disposed on opposing sides of the irrigation passageway 380. The coolant passageways 378 can include rectangular cross sections. As illustrated in FIG. 21C, the coolant passageways 378 can include arcuate cross sections.

Figure 21D:
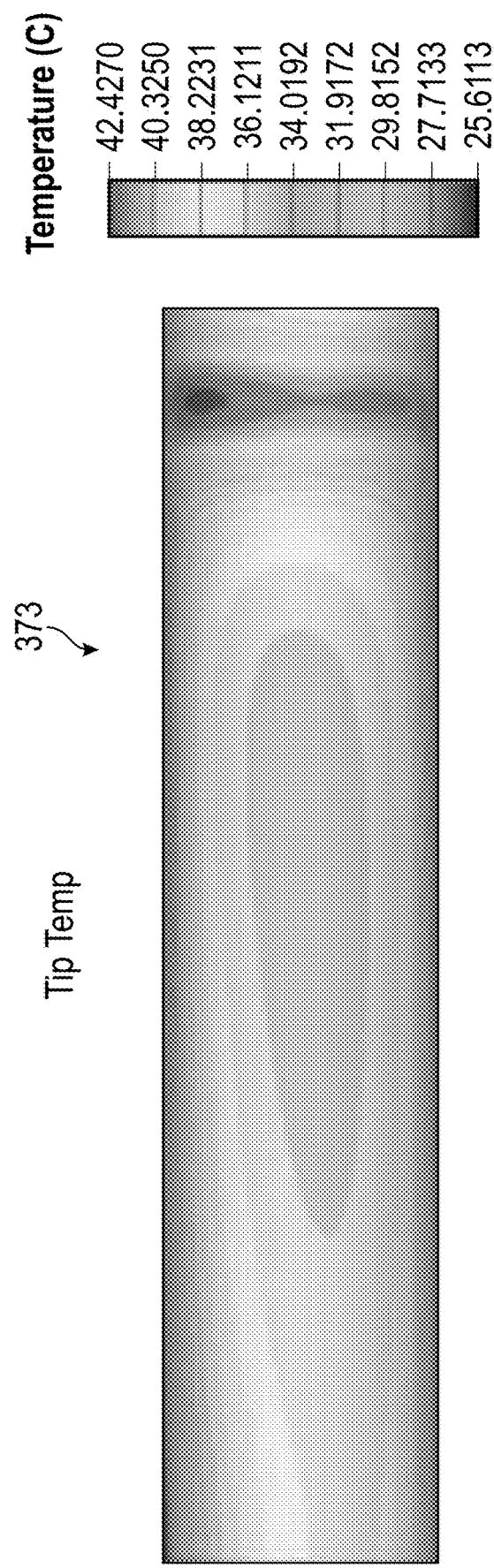
FIG. 21D illustrates temperatures at an outside surface of the outer wall of the distal tip of FIG. 20A with heated fluid flowing through the irrigation passageway and aspirated fluid flowing through the aspiration passageway.
Figure 21E:
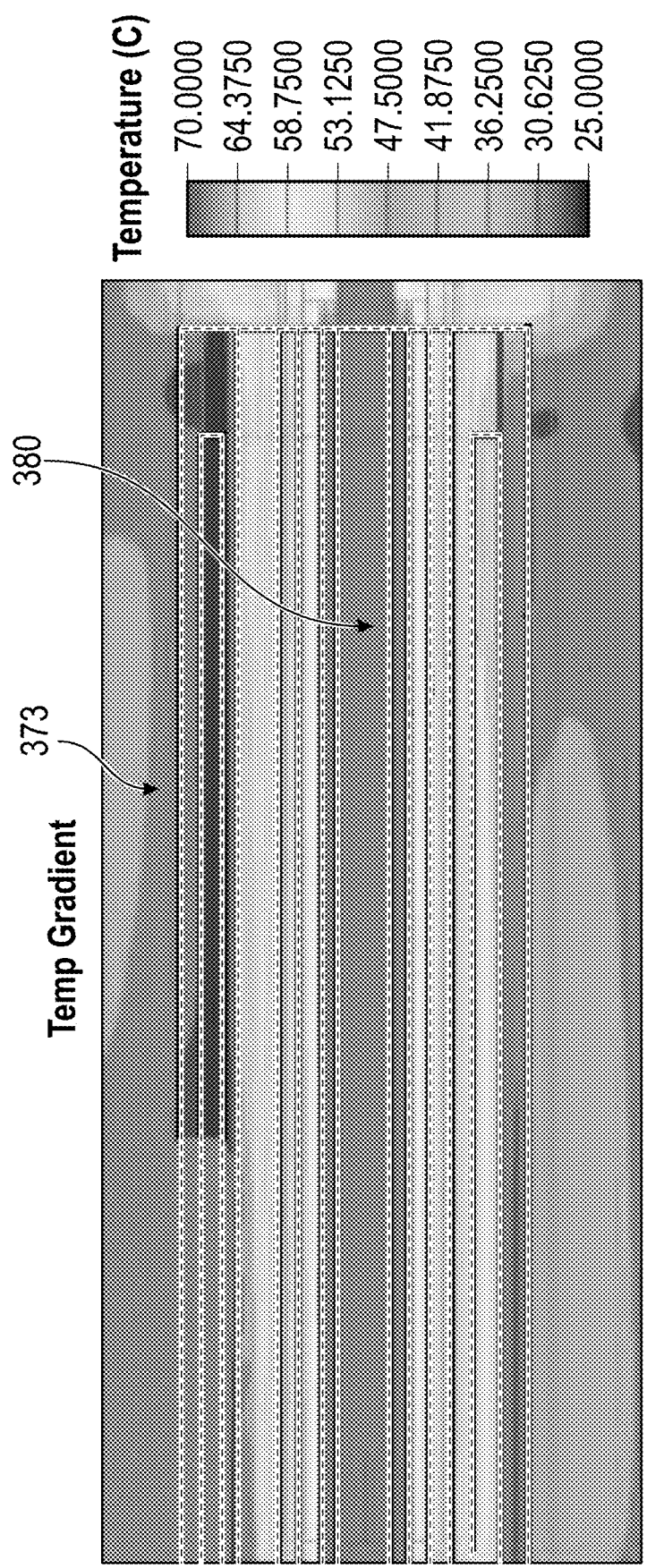
FIG. 21E illustrates a temperature gradient with heated fluid flowing through the irrigation passageway and aspirated fluid flowing through the aspiration passageway of the distal tip of FIG. 20A.

FIG. 21D illustrates temperatures at an outside surface of the outer wall 384 of the distal tip 371 with heated saline introduced at 70 degrees Celsius flowing distally through the irrigation passageway 380, aspirated saline introduced at 50 degrees Celsius flowing proximally through the aspiration passageway 372, and coolant saline introduced at 25 degrees Celsius circulating through the coolant passageway 378 (e.g., flowing distally and then proximally). During testing, the maximum temperature of the outer surface of the wall 384 of the distal tip 373 was 32.5 degrees Celsius after 5 seconds, 42.4 degrees Celsius after 10 seconds, 42.4 degrees Celsius after 20 seconds, and 42.2 degrees Celsius after 40 seconds of heated saline introduced to the distal tip 373 at 70 degrees Celsius flowing distally through the irrigation passageway 380, aspirated saline introduced at 50 degrees Celsius flowing proximally through the aspiration passageway 372, and coolant saline introduced at 25 degrees Celsius circulating through the coolant passageway 378. FIG. 21E illustrates a temperature gradient with heated saline introduced to the distal tip 373 at 70 degrees Celsius flowing distally through the irrigation passageway 380, aspirated saline introduced at 50 degrees Celsius flowing proximally through the aspiration passageway 372, and coolant saline introduced at 25 degrees Celsius circulating through the coolant passageway 378.

Figure 22A:
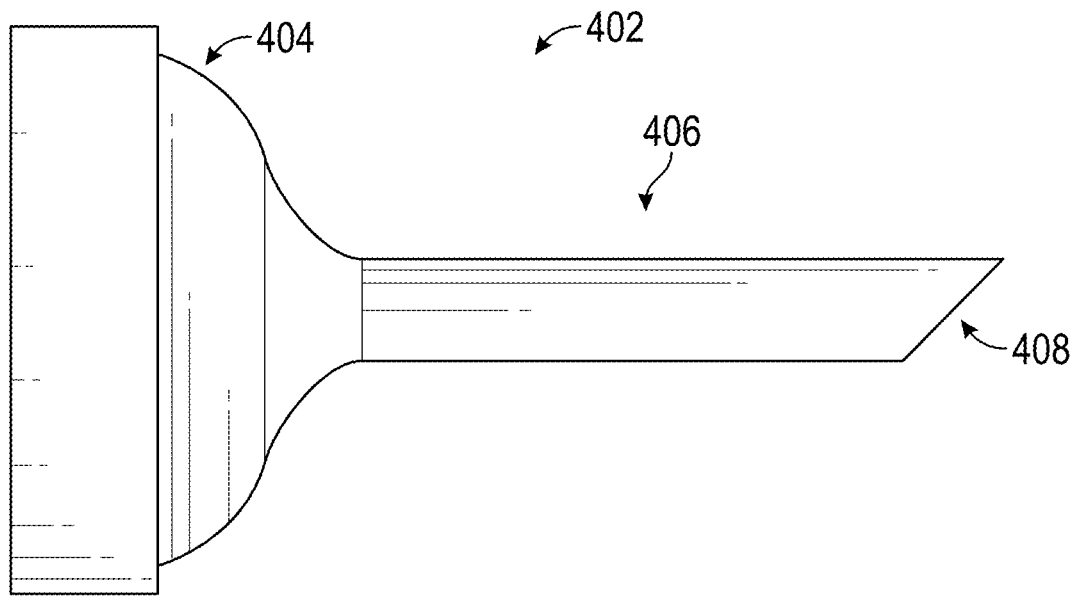
FIG. 22A illustrates a distal tip for an emulsification device.
Figure 22B:
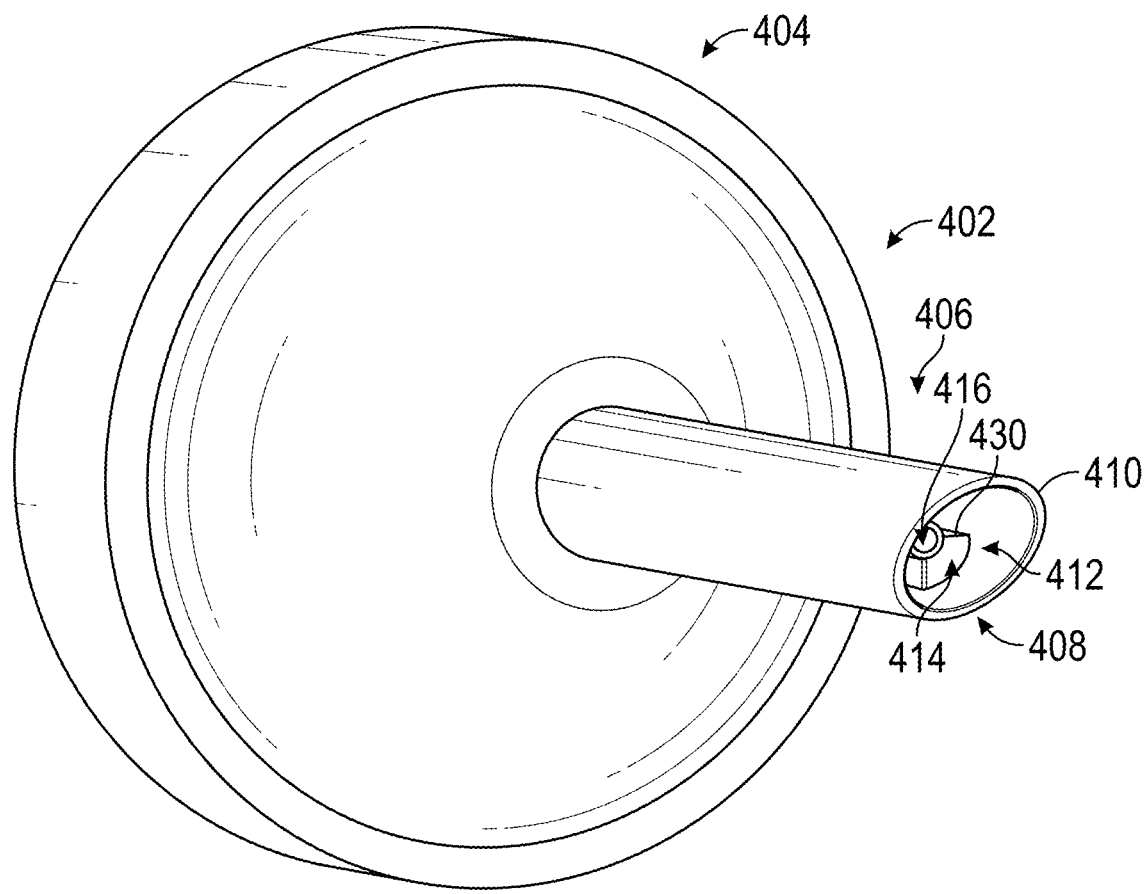
FIG. 22B illustrates another view of the distal tip of FIG. 22A.
Figure 22C:
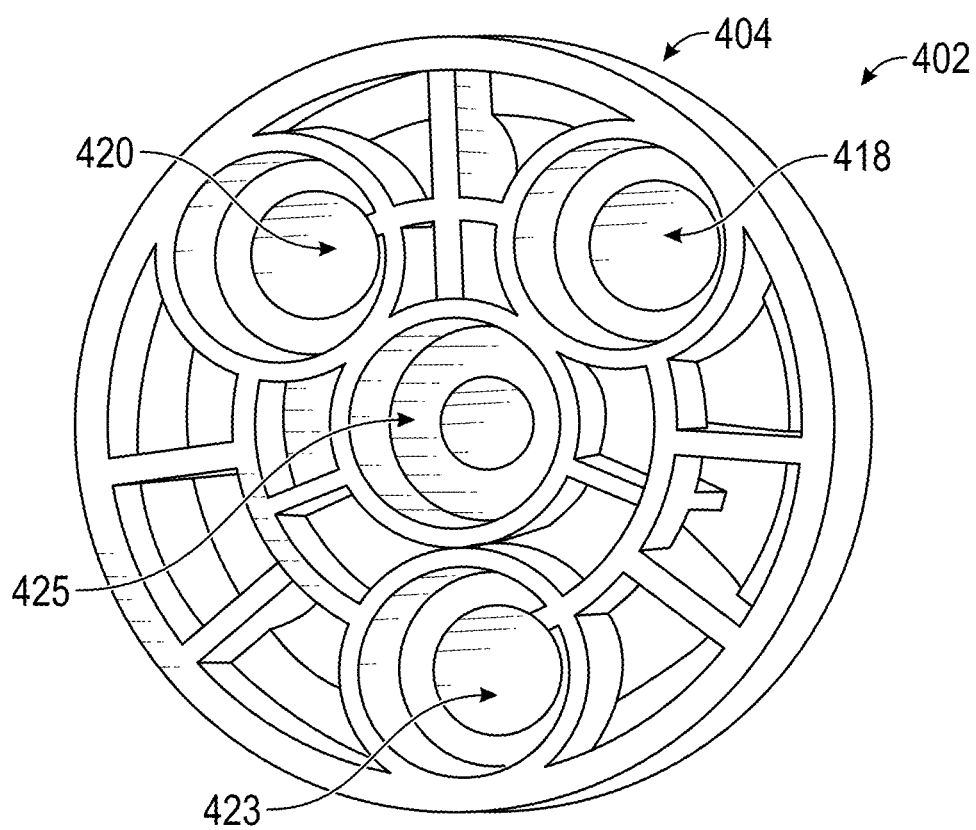
FIG. 22C illustrates another view of the distal tip of FIG. 22A.

FIGS. 22A-22C illustrate various views of a distal tip 402 (e.g., tip, distal attachment, cap, distal piece, insertion portion). The distal tip 402 can be used with any of the emulsification devices described herein. For example, the distal tip 402 can be coupled to any of the emulsification devices described herein. The distal tip 402 can include any of the features of any of the other distal tips described herein. The distal tip 402 can include a proximal portion 404, which can be coupled (e.g., via a collar, threaded connection, etc.) to one or more of the emulsification devices herein. The distal tip 402 can include an elongate portion 406. The elongate portion 406 can extend distally from the proximal portion 404. The elongate portion 406 can be straight. In some variants, the elongate portion 406 can curve and/or include angled portions. The elongate portion 406 can include a circular periphery.

The distal tip 402 can include a distal end 408, which can be the distal end 408 of the elongate portion 406. The distal end 408 can be angled, which can help a clinician operating an emulsification device with the distal tip 402 to avoid irrigating and/or aspirating nontarget regions of the lens and/or capsular bag. As illustrated in FIG. 22B, the distal end 408 can include an opening 412. The opening 412 can be defined by a wall 410 of the elongate portion 406. The opening 412 can be circular or other shapes, such as oval or elliptical. The distal tip 402 can include an irrigation outlet 416 and/or aspiration inlet 414, which can be proximal of the opening 412. The aspiration inlet 414 can be disposed radially outward relative to the irrigation outlet 416. The aspiration inlet 414 can be disposed circumferentially about the irrigation outlet 416. The aspiration inlet 414 can have an annular shape that is disposed about the irrigation outlet 416. An inner surface of the wall 410 and an outer surface of the irrigation outlet 416 can define the annular shape of the aspiration inlet 414. One or more supports 430 (e.g., struts, fins, members, flanges) can extend between an inner surface of the wall 410 and the irrigation outlet 416, which can support the irrigation outlet 416 in position. The one or more supports 430 can be distributed circumferentially about the irrigation outlet 416, which can include being evenly distributed. The one or more supports 430 can include 1, 2, 3, 4, 5, 6 or more supports 430. The irrigation outlet 416 can be disposed distal of the aspiration inlet 414. The irrigation outlet 416 can be coaxial with a central longitudinal axis of the elongate portion 406.

FIG. 22C illustrates features of the proximal portion 404 of the distal tip 402. The proximal portion 404 can include a rounded periphery. The distal tip 402 (e.g., proximal portion 404) can include an irrigation inlet 425, coolant inlet 420, coolant outlet 418, and/or aspiration outlet 423. The irrigation inlet 425 can be in fluid communication with the irrigation outlet 416 such that fluid can be received through the irrigation inlet 425 and directed to and out the irrigation outlet 416 for delivery into the eye. The aspiration outlet 423 can be in fluid communication with the aspiration inlet 414 such that the contents of the capsular bag (e.g., fluid, heated fluid, ocular fluid, lens material, and/or other contents) can be aspirated through the aspiration inlet 414 into the distal tip 402 and out the aspiration outlet 423 to be directed away from the distal tip 402, which can include being directed to a receptacle for disposal and/or analysis. The irrigation inlet 425 can be centrally positioned, which can include being coaxially aligned with a central longitudinal axis of the distal tip 402. The aspiration outlet 423 can be disposed radially outward of the irrigation inlet 425, which can include being disposed below the irrigation inlet 425. The coolant inlet 420 can be in fluid communication with the coolant outlet 418 such that fluid (e.g., coolant fluid such as saline) received into the distal tip 402 through the coolant inlet 420 can flow distally through the distal tip 402 and back proximally to exit the distal tip 402 through the coolant outlet 418, which can cool (e.g., lower a temperature of) the wall 410. The coolant inlet 420 and/or coolant outlet 418 can be disposed radially outward of the irrigation inlet 425.

Figure 22D:
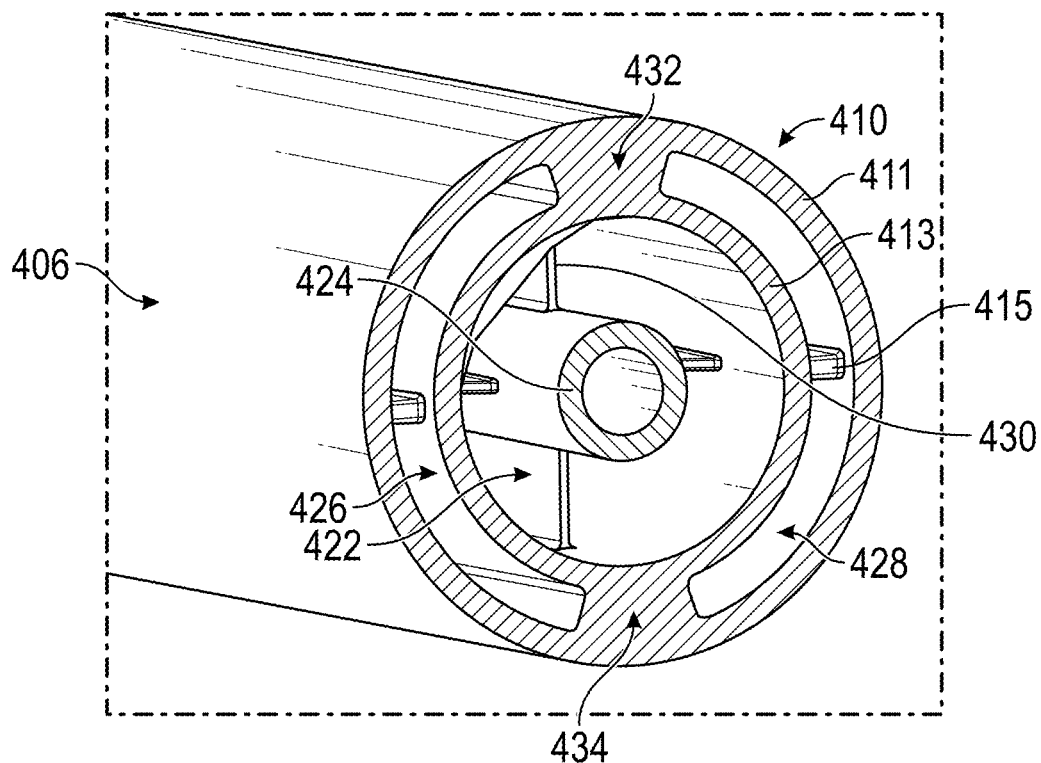
FIG. 22D illustrates a section view of an elongate portion of the distal tip of FIG. 22A looking proximally.

FIG. 22D illustrates a section view of the elongate portion 406 looking proximally. As illustrated, the distal tip 402 can include an irrigation lumen 424 (e.g., tube, channel, conduit, duct). The irrigation lumen 424 can facilitate fluid communication between the irrigation inlet 425 and the irrigation outlet 416. Fluid, such as heated fluid, cooled fluid, and/or ambient fluid, can flow distally through the irrigation lumen 424 and out the irrigation outlet 416 for delivery within the eye. The irrigation lumen 424 can have a circular shape. As described herein, one or more supports 430 can span between an inner wall 413 (e.g., inner surface) of the wall 410 and the irrigation lumen 424, which can maintain a position of the irrigation lumen 424.

The distal tip 402 can include an aspiration lumen 422 (e.g., tube, channel, conduit, duct). The aspiration lumen 422 can facilitate fluid communication between the aspiration inlet 414 and aspiration outlet 423. The contents of the capsular bag (e.g., fluid, heated fluid, ocular fluid, lens material, emulsified lens material, and/or other contents) can be aspirated into the aspiration lumen 422 through the aspiration inlet 414 and exit the aspiration lumen 422 through the aspiration outlet 423. The aspiration lumen 422 can be disposed radially outward of the irrigation lumen 424. The aspiration lumen 422 can be disposed between the irrigation lumen 424 and the inner wall 413 of the wall 410. The aspiration lumen 422 can have an annular shape. The one or more supports 430 can extend through the aspiration lumen 422 as described herein. The one or more supports 430 can include one or more gaps to promote flow around the aspiration lumen 422. The temperature of the aspirated contents flowing through the aspiration lumen 422 can be lower than that of the heated fluid flowing through the irrigation lumen 424, which can help to lower a temperature (e.g., cool) an exterior of the distal tip 402 (e.g., elongate portion 406).

Figure 22E:
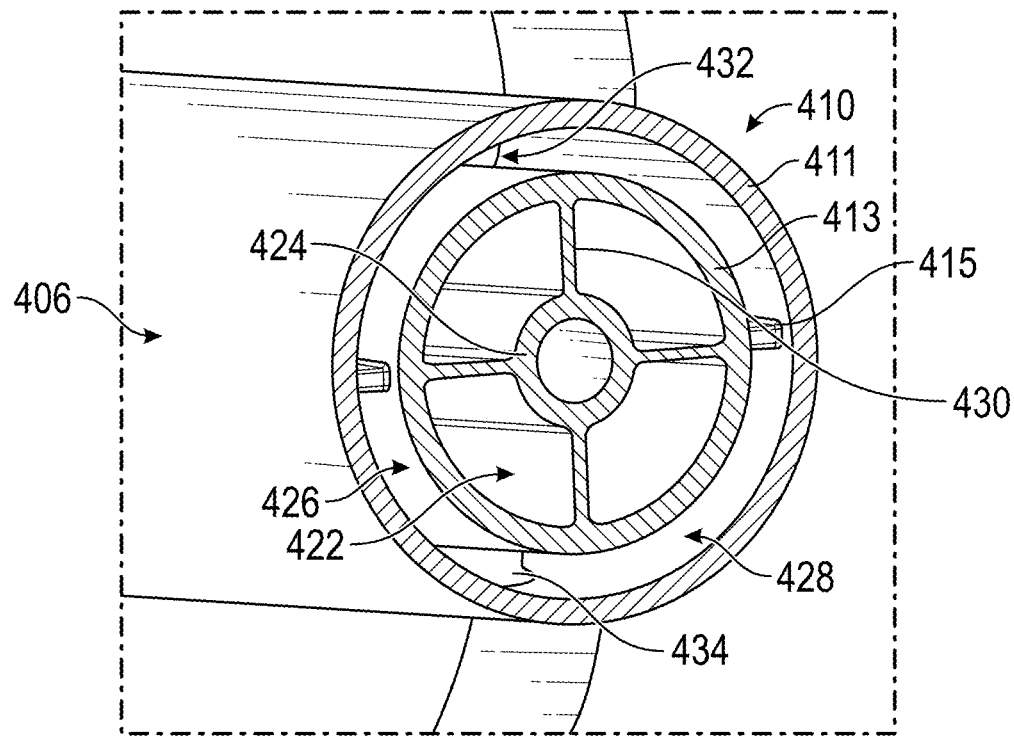
FIG. 22E illustrates another section view of the elongate portion of the distal tip of FIG. 22A but more distal to the section view in FIG. 22D and still looking proximally.
Figure 22F:
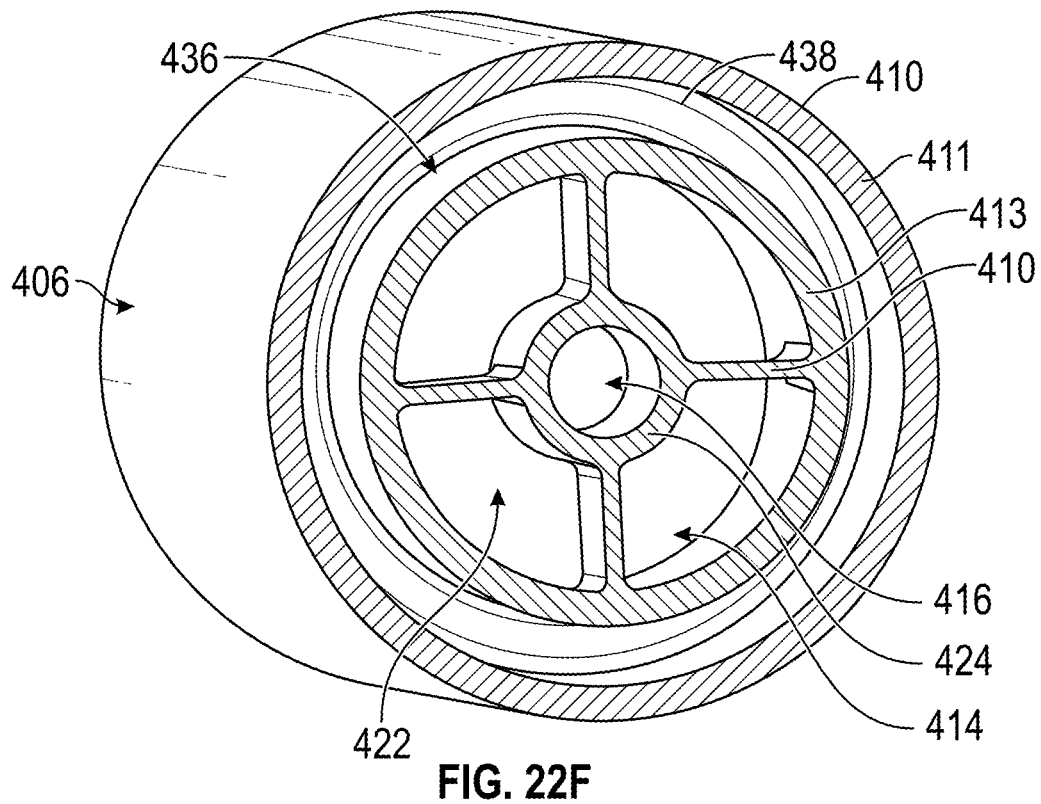
FIG. 22F illustrates another section view of the elongate portion of the distal tip of FIG. 22A looking distally.

The distal tip 402 can include a first coolant lumen 428 and a second coolant lumen 426. The first coolant lumen 428 and second coolant lumen 426 can be disposed in the wall 410, which can include being disposed between the inner wall 413 (e.g., inner surface) and outer wall 411 (e.g., outer surface) of the wall 410. The first coolant lumen 428 can have a C-shaped cross-section. The second coolant lumen 426 can have a C-shaped cross-section, which can be in a mirrored configuration relative to the first coolant lumen 428. The first coolant lumen 428 can receive coolant fluid (e.g., saline, ambient fluid, cooled fluid) from the coolant inlet 420. The first coolant lumen 428 can direct coolant fluid distally through the distal tip 402. The first coolant lumen 428 can be in fluid communication with the second coolant lumen 426, which can include being in fluid communication at a distal region of the distal tip 402. The second coolant lumen 426 can receive coolant fluid from the first coolant lumen 428 and direct the coolant fluid proximally through the distal tip 402. Coolant fluid flowing proximally through the second coolant lumen 426 can exit the distal tip 402 by way of the coolant outlet 418. The first coolant lumen 428 and second coolant lumen 426 can be separated by a first partition 432 (e.g., wall) and/or a second partition 434 (e.g., wall) as coolant fluid flows distally through the first coolant lumen 428. The first coolant lumen 428 and second coolant lumen 426 can be separated by the first partition 432 and the second partition 434 as coolant fluid flows proximally through the second coolant lumen 426. At a distal position, the first partition 432 and second partition 434 can terminate as shown in FIGS. 22E and 22F, which can allow the coolant fluid moving distally through the first coolant lumen 428 to flow into the second coolant lumen 426 and back proximally through the second coolant lumen 426. A coolant channel 436, as illustrated in FIG. 22F, can facilitate fluid communication from the first coolant lumen 428 to the second coolant lumen 426. The coolant channel 436 can have an annular shape, which can facilitate flow from the first coolant lumen 428 to the second coolant lumen 426 from two directions. A wall 438 (e.g., distal wall, surface) can prevent the coolant fluid in the first coolant lumen 428, coolant channel 436, and/or second coolant lumen 426 from flowing distally out of the elongate portion 406. The first coolant lumen 428, coolant channel 436, and/or second coolant lumen 426 can be disposed in the wall 410, which can reduce a temperature of (e.g., cool) the outer wall 411 as heated fluid is flowing through the irrigation lumen 424. Fluid can flow through the first coolant lumen 428, coolant channel 436, and/or second coolant lumen 426 to cool an exterior (e.g., outer wall 411) of the distal tip 402 as heated fluid is flowing through the irrigation lumen 424), which can be while heated fluid is flowing through the irrigation lumen 424 and aspirated contents are flowing through the aspiration lumen 422.

Figure 22G:
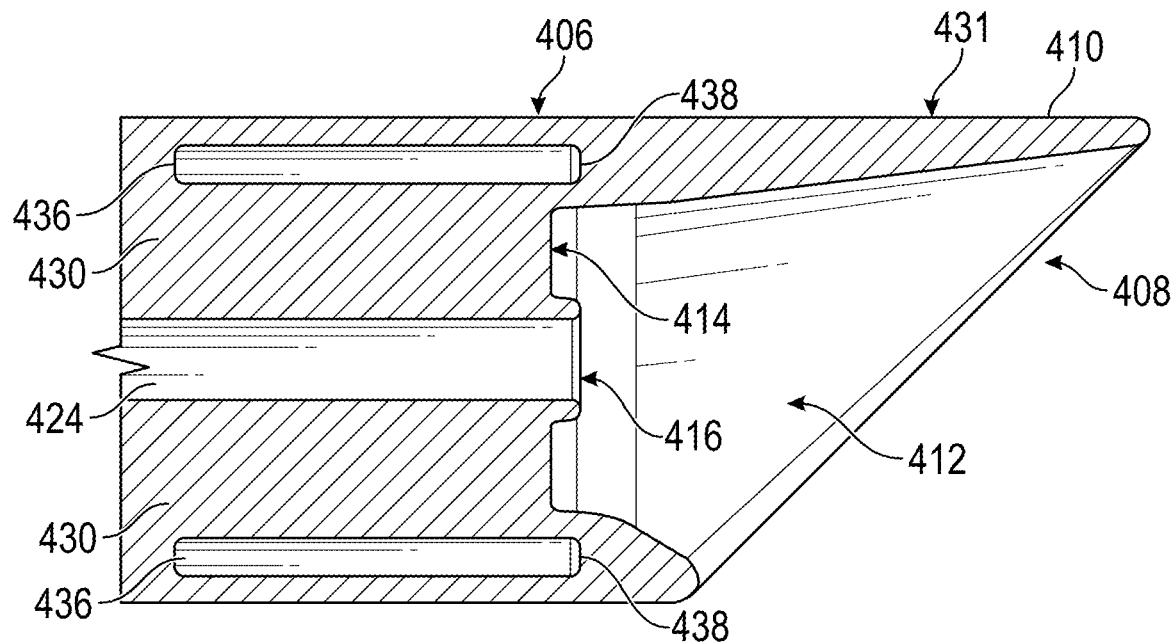
FIG. 22G illustrates another section view of the elongate portion of the distal tip of FIG. 22A.

As described herein, the distal end 408 can be angled, as shown in FIG. 22G. The wall 410 can extend beyond the aspiration inlet 414 and/or irrigation outlet 416. The opening 412 at the distal end 408 can be defined by the wall 410. The opening 412 can be disposed distal of the aspiration inlet 414 and/or irrigation outlet 416. The wall 410 can be tapered, which can include the wall 410 decreasing in thickness as the wall 410 extends distally. A distal end of the wall 410 can be rounded. The wall 410 can define the rounded periphery of the elongate portion 406. The distal end 408 (e.g., distal end of the wall 410) can be coplanar with a plane that is oriented at an angle other than perpendicular relative to a longitudinal axis of the elongate portion 406 (e.g., irrigation lumen 424). The opening 412 can be disposed on a plane that is disposed at an angle other than perpendicular relative to a longitudinal axis of the irrigation lumen 424. A first portion of the opening 412 can be disposed farther distally relative to the irrigation outlet 416 compared to a second portion of the opening 412 (e.g., the first portion and the second portion can be disposed one hundred and eighty degrees apart from each other). The wall 410 of the distal end 408 can extend farther distally relative to the irrigation outlet 416 and/or aspiration inlet 414 on one side compared to another. The angle of the distal end 408, which can result from the wall 410 extending distally different distances relative to the irrigation outlet 416 and/or aspiration inlet 414 at different circumferential portions, can form a hood for the irrigation outlet 416. The wall 410 can be disposed circumferentially about a longitudinal axis of the irrigation lumen 424. The wall 410 can extend distally different distances relative to the irrigation outlet 416 at different circumferential locations of the opening 412 defined by the wall 410 at the distal end 408. The portion of the wall 410 that extends farther distally relative to the irrigation outlet 416 can form a hood portion 431 (e.g., shield portion), which a clinician can use to shield features of the eye from the heated fluid flowing out of the irrigation outlet 416. For example, the clinician can position the hood portion 431 between nearby non-target anatomy (e.g., portion of capsular bag) and the irrigation outlet 416 to shield the nearby non-target anatomy. The hood portion 431 can help guide the flow of heated fluid that has exited the irrigation outlet 416. In some variants, the distal end 408 may not be angled as described above, which can include the distal end 408 (e.g., distal end of the wall 410) being coplanar with a plane that is oriented at a perpendicular angle relative to a longitudinal axis of the elongate portion 406 (e.g., irrigation lumen 424).

In use, heated fluid can be received through the irrigation inlet 425, flow through the irrigation lumen 424, and out the irrigation outlet 416 to a natural lens of the eye to break down (e.g., emulsify) the natural lens. The contents of the capsular bag (e.g., lens material, emulsified lens, fluid, heated fluid, ocular fluid, etc.) can be aspirated through the aspiration inlet 414 into the aspiration lumen 422 and out the aspiration outlet 423. In some variants, the aspiration inlet 414 can aspirate (e.g., suck) a portion of the natural lens to be positioned proximate the distal end 408 (e.g., irrigation outlet 416) such that the portion of the natural lens is disposed proximate the irrigation outlet 416, which can facilitate heated fluid exiting the irrigation outlet 416 to flow to the portion of the natural lens. Coolant fluid (e.g., saline, ambient fluid, cooled fluid), as described herein, can circulate through the distal tip 402 (e.g., elongate portion 406) to reduce a temperature (e.g., cool) an exterior (e.g., outer wall 411) of the distal tip 402 (e.g., elongate portion 406). For example, coolant fluid can be received through the coolant inlet 420, flow distally through the first coolant lumen 428 of the distal tip 402, flow to the second coolant lumen 426 at a distal portion of the elongate portion 406 (e.g., flow through the coolant channel 436 from the first coolant lumen 428 to the second coolant lumen 426), flow proximally through the second coolant lumen 426, and exit through the coolant outlet 418.

FIGS. 23A-28 illustrate features of an emulsification device 440 (e.g., thermal device, thermal emulsification device, thermal systems, thermal emulsification system, irrigation device, irrigation and aspiration device, combination irrigation and aspiration device, handpiece, etc.). The emulsification device 440 can include any of the features of the other devices herein. The emulsification device 440 can be used to irrigate heated and unheated (e.g., ambient, cooled) fluid to the natural lens of the eye (e.g., within the capsular bag). The heated fluid can emulsify the natural lens of the eye. The emulsification device 440 can aspirate contents (e.g., emulsified lens, lens fragments, heated fluid, unheated fluid, ocular fluid, and/or others) from the capsular bag. The emulsification device 440 can include pathways (e.g., tubes, lumens) to circulate coolant fluid (e.g., saline, ambient fluid, cooled fluid) through a distal tip of the emulsification device 440 to cool an exterior of the distal tip to avoid damaging the anatomy of the eye.

Figure 23A:
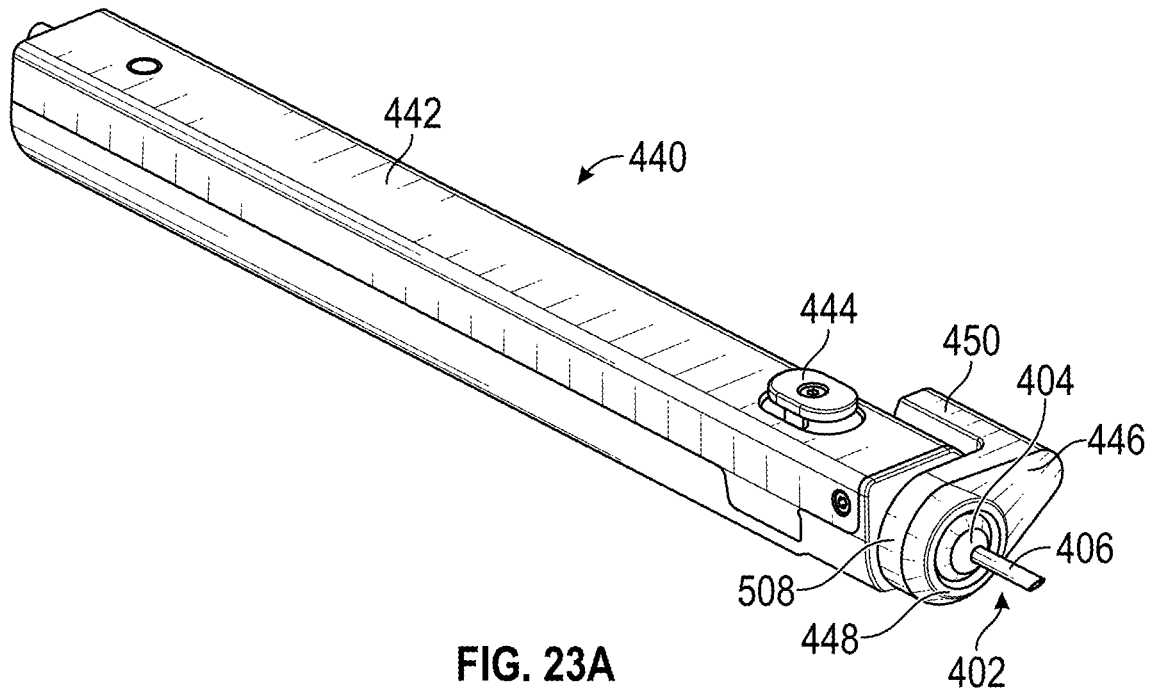
FIG. 23A illustrates an emulsification device with the distal tip of FIG. 22A.

As illustrated in FIG. 23A, the emulsification device 440 can be used in cooperation with the distal tip 402 (e.g., the distal tip 402 can be coupled to the emulsification device 440, which can include a distal portion of the emulsification device 440). The emulsification device 440 can be used in cooperation with any of the other distal tips described herein. The distal tip 402 can be coupled to the emulsification device 440 with a collar 508. For example, the collar 508 can be coupled to (e.g., threaded onto) the emulsification device 440 with the proximal portion 404 of the distal tip 402 disposed therebetween to couple the distal tip 402 to the emulsification device 440.

The collar 508, in some variants, can include a vibration component 446 (e.g., vibration motor, vibration mechanism). With the distal tip 402 outside the eye, the vibration component 446 can be activated to vibrate the distal tip 402, which can help dislodge clogs in the lumens of the distal tip 402. The collar 508 can include a connector 450, which can be used to connect to a power source and/or other feature. As described herein, flow through the aspiration lumen 422 can be reversed to help dislodge a clog in the aspiration lumen 422.

The emulsification device 440 can include a user interface 444, which can include a button, slide, dial, switch, etc. The user, such as a clinician, can interact with (e.g., press) the user interface 444 to control aspects of the emulsification device 440. For example, the user can interact with (e.g., press) the user interface 444 to control the flow of fluid out of the irrigation outlet 416. The user can interact with the user interface 444 to switch between heated fluid flowing through the irrigation outlet 416 and other fluid (e.g., unheated fluid, ambient fluid, cooled fluid). In some variants, when the user is not pressing the user interface 444 (e.g., button), fluid (e.g., unheated fluid, ambient fluid, cooled fluid) can flow out the irrigation outlet 416, and when the user is pressing the user interface 444 (e.g., button), heated fluid can flow out the irrigation outlet 416.

The emulsification device 440 can include a housing 442. The housing 442 can house internal components of the emulsification device 440. The housing 442 can be a handle that can be held by hand. The housing 442 can be ergonomic. The housing 442 can be a variety of shapes and/or sizes as described herein.

Figure 23B:
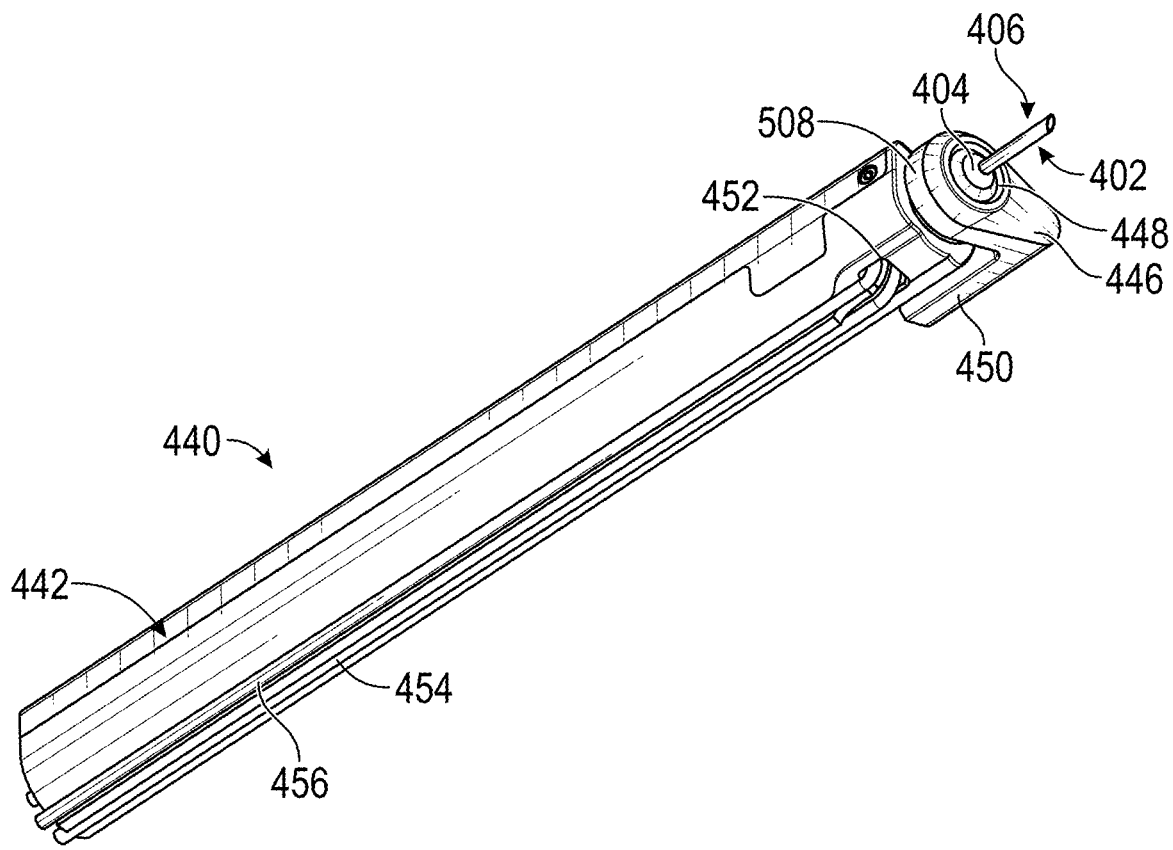
FIG. 23B illustrates another view of the emulsification device of FIG. 23A.

As illustrated in FIG. 23B, the emulsification device 440 can include an aspiration line 454 (e.g., aspiration tubing, aspiration conduit). The aspiration line 454 can be in fluid communication with the distal tip 402 (e.g., aspiration lumen 422 of the distal tip 402), which can include the aspiration line 454 being coupled to the aspiration outlet 423. Contents of the capsular bag aspirated into the distal tip 402 can flow away from the distal tip 402 by way of the aspiration line 454. The aspiration line 454 can be put under a pressure less than atmospheric (e.g., vacuum) to provide an aspiration force at the aspiration inlet 414. The aspiration line 454 can exit the housing 442 by way of an opening 452 of the housing 442, which can be disposed on a bottom side of the housing 442 (e.g., opposite the user interface 444).

The aspiration line 454 can be disposed along a bottom side of the housing 442, which can include being disposed in a channel (e.g., recess) along a bottom side of the housing 442.

The emulsification device 440 can include a third fluid line 456 (e.g., third fluid conduit, third fluid tubing, heat dump line, diverting line). The third fluid line 456 can divert heated fluid away from the distal tip 402 when other fluid (e.g., unheated fluid, ambient fluid, cooled fluid) is flowing through the irrigation lumen 424 of the distal tip 402. For example, with the user not pressing the user interface 444, the other fluid (e.g., unheated fluid, ambient fluid, cooled fluid) can flow through the irrigation lumen 424 of the distal tip 402 and the heated fluid can be diverted to flow away from the distal tip 402 by way of the third fluid line 456. The third fluid line 456 can exit the housing 442 by way of an opening 452 of the housing 442, which can be disposed on a bottom side of the housing 442 (e.g., opposite the user interface 444). The third fluid line 456 can be disposed along a bottom side of the housing 442, which can include being disposed in a channel (e.g., recess) along a bottom side of the housing 442.

Figure 23C:
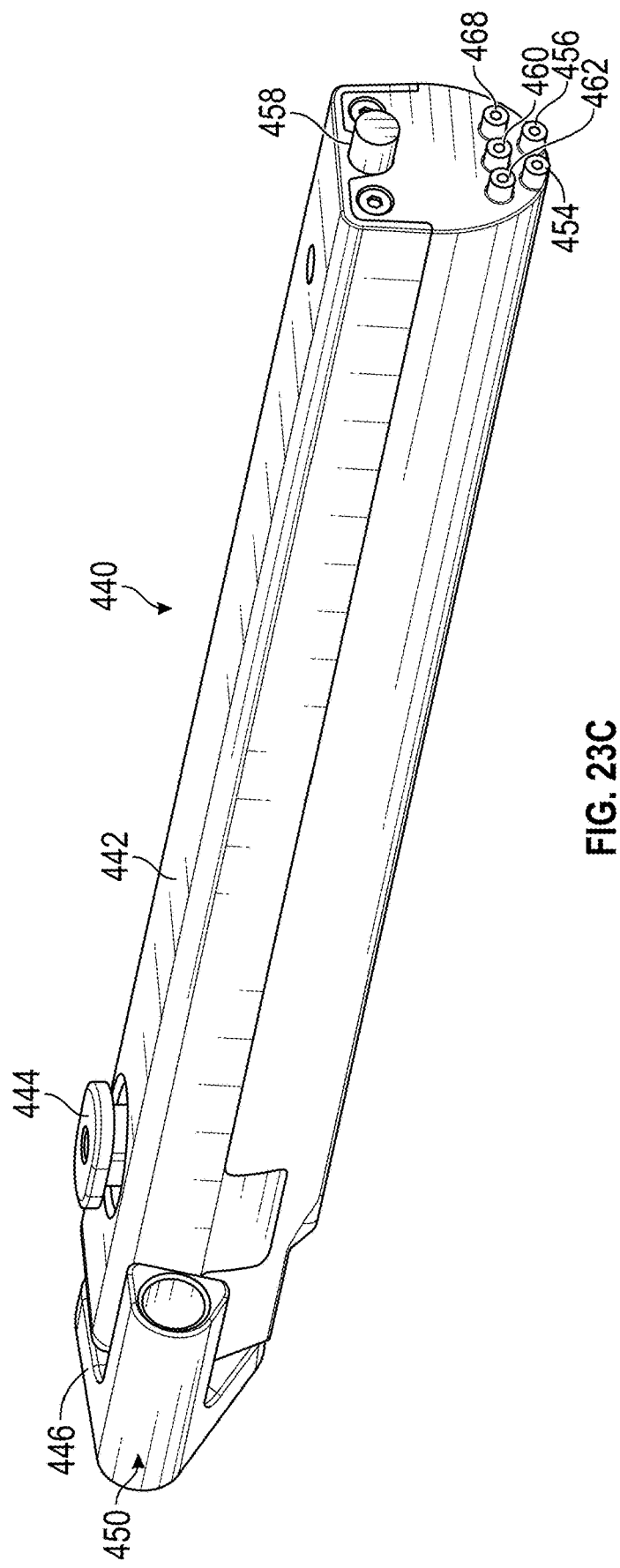
FIG. 23C illustrates another view of the emulsification device of FIG. 23A.

As illustrated in FIG. 23C, the emulsification device 440 can include a cord 458, which can be connected to a power source to power the emulsification device 440. The cord 458 can extend from a proximal portion of the housing 442. The emulsification device 440, in some variants, can include a battery (e.g., disposable, rechargeable) to power the emulsification device 440, which can be recharged by way of the cord 458.

The emulsification device 440 can include a first fluid line 462 (e.g., fluid supply line, first fluid conduit, first fluid tubing). The first fluid line 462 can provide fluid (e.g., saline, unheated fluid, ambient fluid, cooled fluid) for irrigation to the capsular bag through the irrigation lumen 424 of the distal tip 402 and/or to circulate through the distal tip 402 for cooling an exterior of the distal tip 402. The first fluid line 462 can be in fluid communication with the irrigation lumen 424 of the distal tip 402 (e.g., irrigation inlet 425) and/or the first coolant lumen 428 of the distal tip 402 (e.g., coolant inlet 420). The first fluid line 462 can enter the housing 442 through a proximal portion thereof and extend distally therethrough.

The emulsification device 440 can include a second fluid line 460 (e.g., fluid supply line, second fluid conduit, second fluid tubing, heated fluid line). The second fluid line 460 can provide fluid (e.g., saline, unheated fluid, ambient fluid, cooled fluid) for irrigation in the capsular bag through the irrigation lumen 424 of the distal tip 402. The fluid provided by the second fluid line 460 can, in some variants, be heated by the emulsification device 440 (e.g., heated inside the housing 442). In some variants, the fluid provided by the second fluid line 460 can be heated prior to delivery to the emulsification device 440 (e.g., in a heated reservoir and/or between the reservoir and the emulsification device 440). The second fluid line 460 can enter the housing 442 through a proximal portion thereof and extend distally therethrough. The second fluid line 460 can be in fluid communication with the irrigation lumen 424 of the distal tip 402 (e.g., irrigation inlet 425) and/or the third fluid line 456.

The emulsification device 440 can include a coolant return line 468 (e.g., fluid return line, coolant return conduit, coolant return tubing). The coolant return line 468 can carry fluid circulated through the distal tip 402 away (e.g., proximally away) from the distal tip 402. The coolant return line 468 can be in fluid communication with the second coolant lumen 426 (e.g., be coupled to the coolant outlet 418). The coolant return line 468 can exit the housing 442 through a proximal portion thereof and extend distally therethrough.

Figure 24:
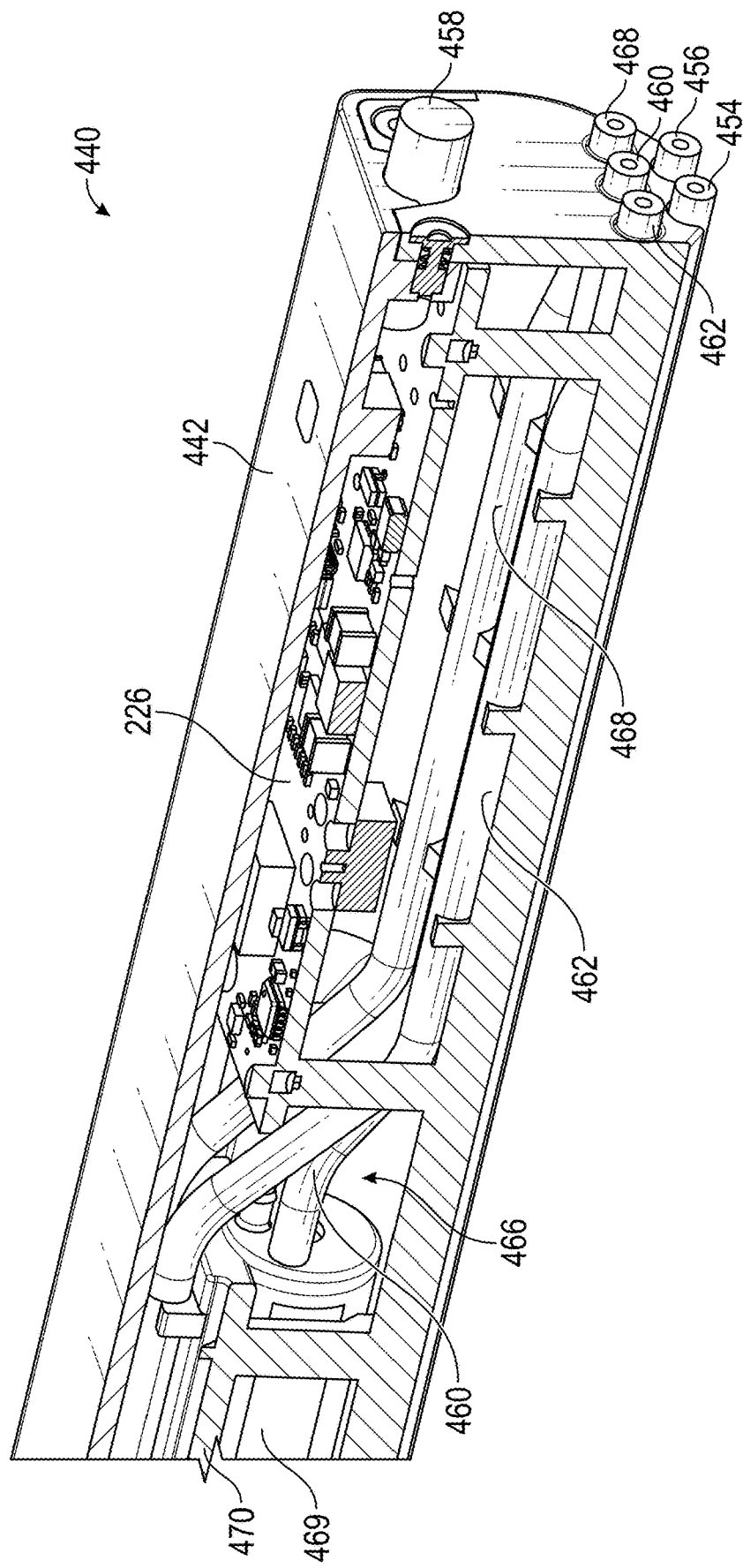
FIG. 24 illustrates a section view of the emulsification device of FIG. 23A.

As illustrated in FIG. 24, the cord 458 can be connected to an electronics board 266 of the emulsification device 440, which can be disposed in an interior 466 of the housing 442. The electronics board 266 can be disposed on a frame.

The second fluid line 460 can direct fluid flowing therethrough to a heating unit 469. The heating unit 469 can heat fluid flowing through the second fluid line 460 to a target temperature and/or temperature range.

The first fluid line 462 and/or coolant return line 468 can bypass the heating unit 469. For example, the emulsification device 440 can include a partition 470 (e.g., frame, wall) that can separate the heating unit 469 from the first fluid line 462 and/or coolant return line 468. The partition 470 can suspend the first fluid line 462 and/or coolant return line 468 above the heating unit 469.

Figure 25:
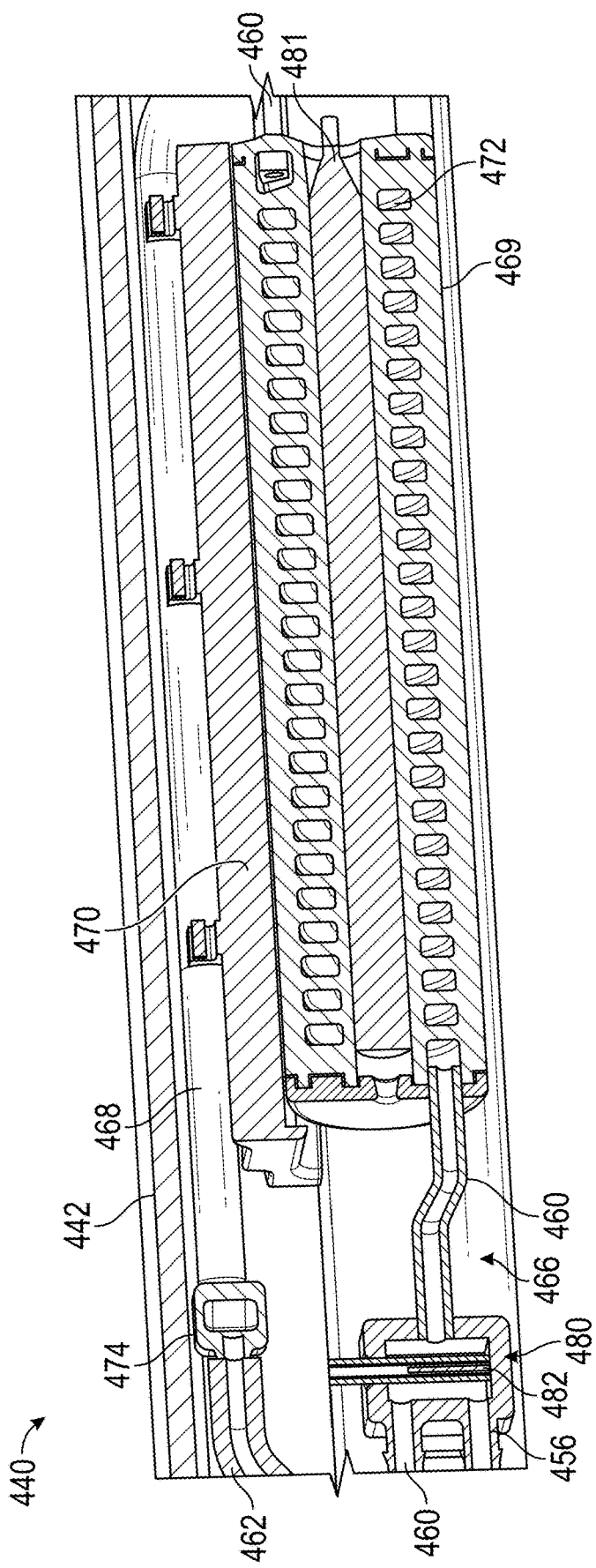
FIG. 25 illustrates a section view of the emulsification device of FIG. 23A.

As illustrated in FIG. 25, the heating unit 469 can include a heater 481 (e.g., heater cartridge). The heater 481 can generate heat from an input of electrical energy. The heater 481 can heat fluid flowing through the second fluid line 460 to a target temperature. In some variants, the heating unit 469 can include a coiled pathway 472 (e.g., coil flow path), which can be disposed around (e.g., coiled around) the heater 481. Fluid flowing through the second fluid line 460 can flow into the coiled pathway 472 to be heated by the heater 481. The fluid flowing through the coiled pathway 472 can continue to flow distally from the heating unit 469 along the second fluid line 460. In some variants, the heating unit 469 can include a material to promote heat transfer between the heater 481 and the fluid flowing through the second fluid line 460 and/or coiled pathway 472.

The emulsification device 440 can include a temperature sensor 482 (e.g., thermistor, thermocouple). The temperature sensor 482 can be disposed along the second fluid line 460 downstream of the heating unit 469. The temperature sensor 482 can detect (e.g., monitor) the temperature of the fluid in the second fluid line 460. The emulsification device 440 and/or a device operatively connected to the emulsification device 440 can control the heater 481 based on the temperature of the fluid in the second fluid line 460. For example, if the temperature is below a threshold, the heater 481 can increase heat output to heat the fluid in the second fluid line 460 to a higher temperature. If the temperature is above a threshold, the heater 481 can decrease heat output (e.g., cease heating) to lower the temperature of the fluid in the second fluid line 460. The emulsification device 440 and/or a device operatively connected to the emulsification device 440 can alert the user if the temperature of the fluid in the second fluid line 460 is above or below a threshold. The emulsification device 440 and/or a device operatively connected to the emulsification device 440 can alert the user when the temperature of the fluid in the second fluid line 460 has reached a target. The emulsification device 440 and/or a device operatively connected to the emulsification device 440 can alert the user when the temperature of the fluid in the second fluid line 460 is increasing at a rate above a threshold rate (e.g., temperature spike), which can indicate that there is an obstruction along the second fluid line 460 and/or third fluid line 456. The alert can be an audible alert and/or visual alert (e.g., indication on display screen, light alert, etc.).

The emulsification device 440 can include a splitter 480 (e.g., Y piece, flow divider, flow distributor). The splitter 480 can be disposed on the second fluid line 460 distal of the heating unit 469. The splitter 480 can split the third fluid line 456 from the second fluid line 460. In some variants, the temperature sensor 482 can be disposed at (e.g., within) the splitter 480.

Figure 26B:
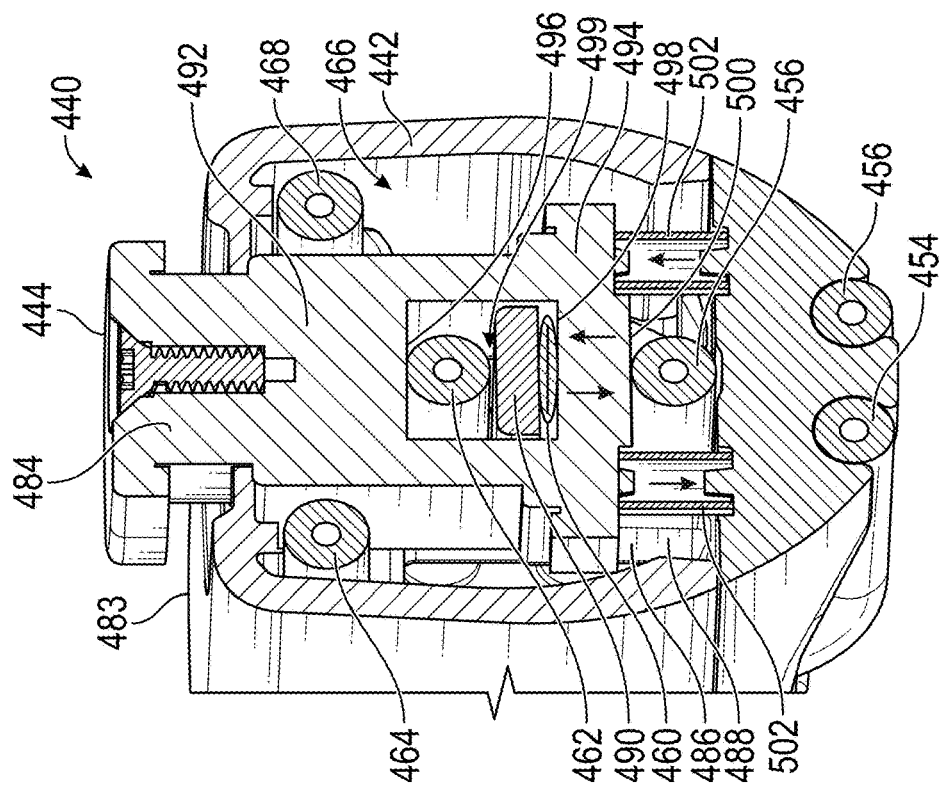
FIG. 26B illustrates a section view of the emulsification device of FIG. 23A to show features of the valve unit.
Figure 26A:
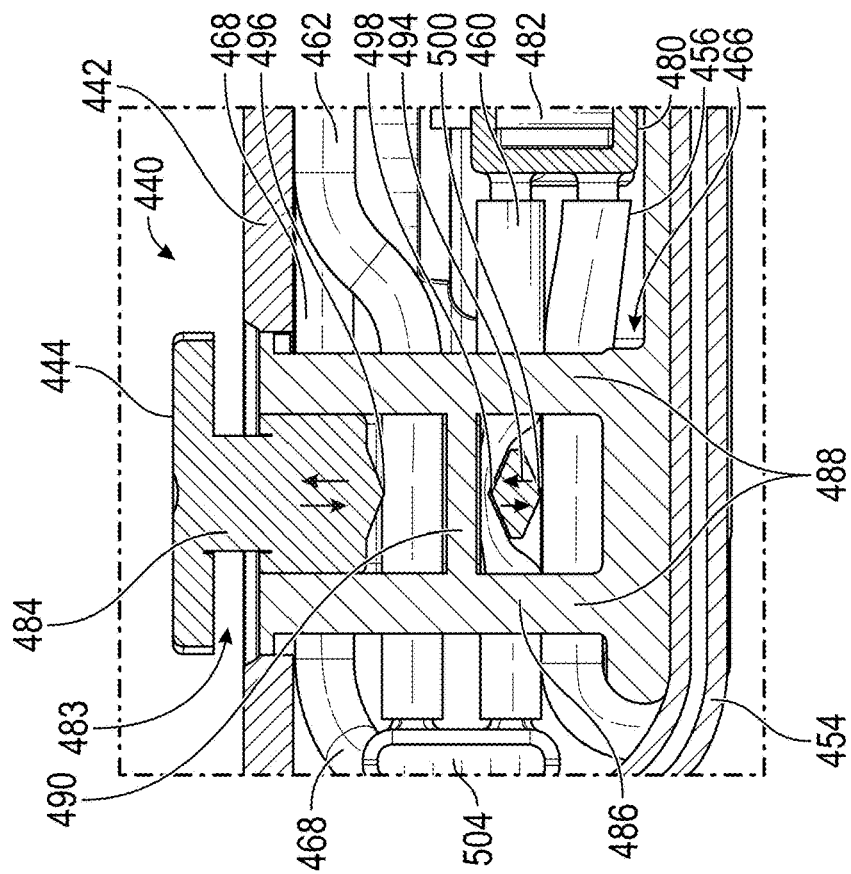
FIG. 26A illustrates a section view of the emulsification device of FIG. 23A to show features of a valve unit.

As illustrated in FIGS. 26A and 26B, the emulsification device 440 can include a valve unit 483 (e.g., valve, pinch valve). The valve unit 483 can be controlled by a user with the user interface 444 (e.g., button). The valve unit 483 can be used to control flow through the first fluid line 462, second fluid line 460, and/or third fluid line 456. The valve unit 483 can be used to control flow to the irrigation outlet 416 of the distal tip 402. A coolant delivery line 464 and the coolant return line 468 can bypass the valve unit 483, which can enable fluid to be continuously circulated through the distal tip 402 for cooling during operation of the emulsification device 440. The valve unit 483, in some variants, can pinch the first fluid line 462, second fluid line 460, and/or third fluid line 456 closed to control flow.

The valve unit 483 can include a frame 486, which can include vertical portions 488 (e.g., vertical supports, vertical members) and a cross member 490 (e.g., horizontal strut, cross bar). The cross member 490 can span from one of the vertical portions 488 to the other of the vertical portions 488. The cross member 490 can be disposed between the first fluid line 462 and second fluid line 460, which can include being vertically disposed between the first fluid line 462 and second fluid line 460.

The valve unit 483 can include features that can be moved to control flow as described herein. For example, the valve unit 483 can include features that can be moved with respect to the frame 486. The valve unit 483 can include a structure 484 that can be coupled to the user interface 444 (e.g., button). The structure 484 can include an upper portion 492 and/or a lower portion 494. The upper portion 492 can be disposed above the first fluid line 462 such that the first fluid line 462 is disposed between the cross member 490 of the frame 486 and the upper portion 492 of the structure 484 of the valve unit 483. The lower portion 494 can be disposed below the cross member 490 of the frame 486. The lower portion 494 can be disposed between (e.g., vertically between) the second fluid line 460 and third fluid line 456. The second fluid line 460 can be disposed between the lower portion 494 and the cross member 490. The structure 484 can define an opening 499 through which the first fluid line 462, cross member 490, and second fluid line 460 can pass, as illustrated in FIG. 26B. The top of the opening 499 can be the upper portion 492 and the bottom of the opening 499 can be the lower portion 494.

The valve unit 483 can include one or more biasing members 502 (e.g., springs, helical springs), which can include one, two, three, or more biasing members. The one or more biasing members 502 can bias the valve unit 483 into the first configuration illustrated in FIGS. 26A and 26B. As shown, the one or more biasing members 502 can bias the valve unit 483 to impede flow through the second fluid line 460 and permit flow through the first fluid line 462 to the irrigation lumen 424 and through the third fluid line 456. For example, the one or more biasing members 502 can bias the valve unit 483 to divert flow from the second fluid line 460 to the third fluid line 456. For example, the one or more biasing members 502 can bias the structure 484 upward such that the lower portion 494 pinches (e.g., squeezes) the second fluid line 460 closed between the lower portion 494 and cross member 490. The lower portion 494 can include an edge 498 (e.g., top edge, upper edge) that can help concentrate pressure applied by the lower portion 494 on the second fluid line 460 to close the second fluid line 460. The one or more biasing members 502 can bias the structure 484 upward to move the lower portion 494 away from the third fluid line 456 to permit flow therethrough. The one or more biasing members 502 can bias the structure 484 upward to move the upper portion 492 away from the first fluid line 462 to permit flow therethrough.

A clinician operating the emulsification device 440 can interact with (e.g., push) the user interface 444 to overcome the biasing force of the one or more biasing members 502 to position the valve unit 483 in a second configuration. In the second configuration, the valve unit 483 can impede (e.g., block, stop) flow through the first fluid line 462 and third fluid line 456 and permit flow through the second fluid line 460 (e.g., heated fluid) to the irrigation lumen 424. For example, the clinician can push the user interface 444 downward to overcome the biasing force of the one or more biasing members 502 to move the structure 484 downward. With the downward movement of the structure 484, the upper portion 492 can move downward to pinch (e.g., squeeze) the first fluid line 462 closed between the upper portion 492 and cross member 490, which can impede (e.g., block, stop) flow through the first fluid line 462 to the irrigation lumen 424. With the downward movement of the structure 484, the lower portion 494 can move downward to pinch (e.g., squeeze) the third fluid line 456 closed between the lower portion 494 and another surface, such as a wall of the housing 442, to impede (e.g., block, stop) flow through third fluid line 456. The upper portion 492 can include an edge 496 that can help concentrate pressure applied by the upper portion 492 on the first fluid line 462 to close the first fluid line 462. The lower portion 494 can include an edge 500 (e.g., bottom edge, lower edge) that can help concentrate pressure applied by the lower portion 494 on the third fluid line 456 to close the third fluid line 456. When the clinician releases the user interface 444, the one or more biasing members 502 can move the valve unit 483 back to the first configuration.

Figure 27:
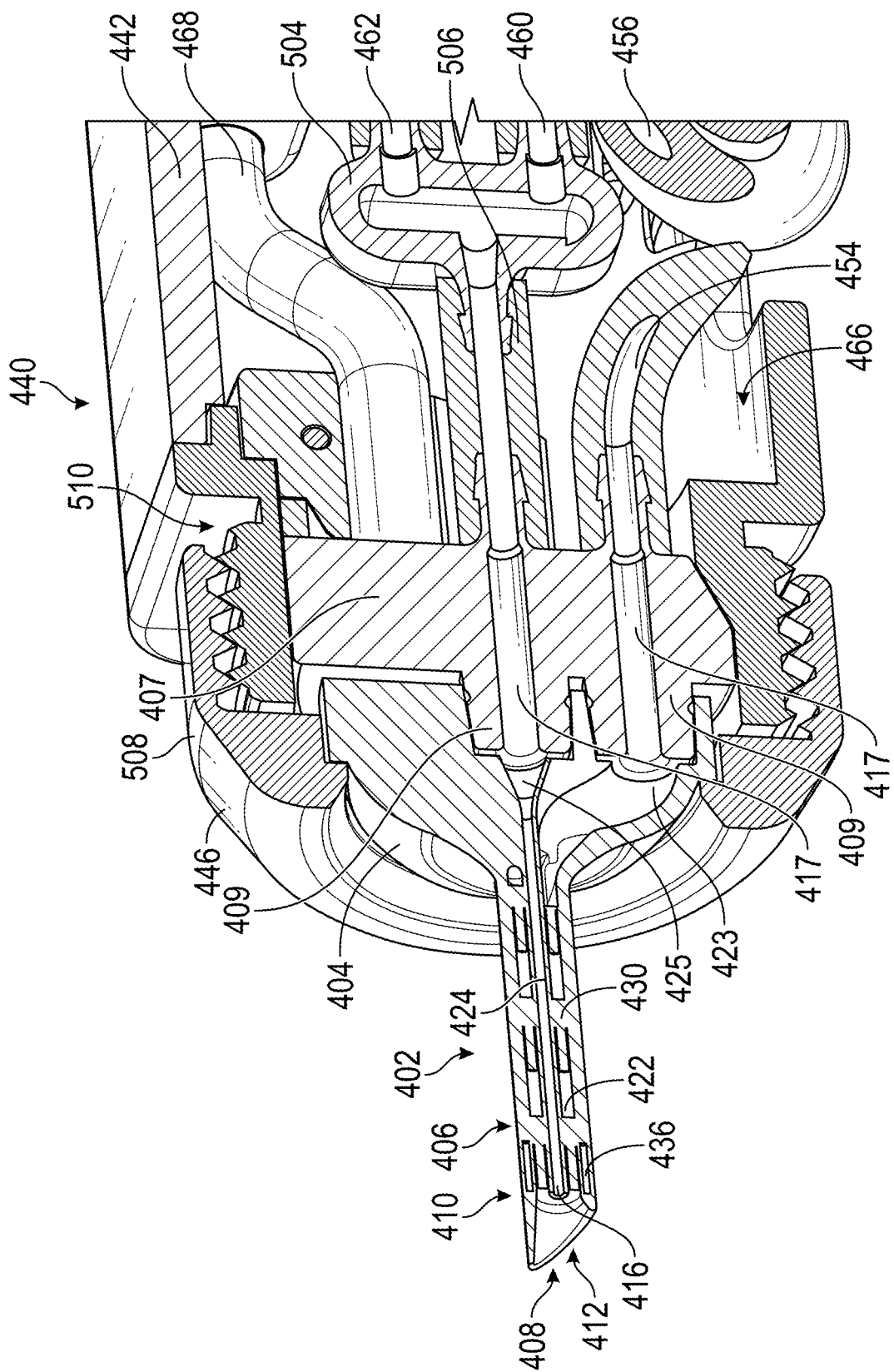
FIG. 27 illustrates a section view of a distal portion of the emulsification device of FIG. 23A.

FIG. 27 illustrates a section view of a distal portion of the emulsification device 440 (e.g., downstream of the valve unit 483). As shown, the first fluid line 462 and second fluid line 460 can be in fluid communication with the irrigation outlet 416 of the distal tip 402 downstream of the valve unit 483. Based on the configuration of the valve unit 483, the first fluid line 462 and second fluid line 460 can alternately deliver heated fluid or other fluid (e.g., unheated fluid, ambient fluid, cooled fluid) to the irrigation outlet 416 for delivery (e.g., irrigation) within the capsular bag. In some variants, a junction 504 (e.g., flow junction, flow combiner, converging junction) disposed downstream of the valve unit 483 can direct the first fluid line 462 and second fluid line 460 into a single irrigation line 506 that is in fluid communication with the irrigation outlet 416. In some variants, a temperature sensor (e.g., thermistor, thermocouple) can be disposed at (e.g., within) the junction 504 and/or single irrigation line 506. The single irrigation line 506 can detect a temperature of the fluid flowing through the junction 504 and/or single irrigation line 506, which can be used to indicate (e.g., visual alert, audible alert, message, etc.) to the clinician the temperature of the fluid flowing through the irrigation lumen 424 of the distal tip 402 and into the eye (e.g., heated or unheated fluid). In some variants, the temperature sensor can be used to detect if the temperature of the fluid is at or above a threshold, which can be used to determine and/or indicate if heated fluid or unheated fluid is flowing out of the irrigation outlet 416. In some variants, the temperature sensor can be used to detect if the temperature of the fluid is at or below a threshold.

As shown in FIG. 27, the aspiration line 454 can be in fluid communication with the aspiration lumen 422 to facilitate directing aspirated contents of the capsular bag away from the distal tip 402. The aspiration line 454 can be coupled to the aspiration outlet 423.

As shown in FIG. 27, the distal tip 402 can be coupled to the emulsification device 440 with a collar 508. The collar 508 can be coupled (e.g., threaded) to the distal portion 510 of the emulsification device 440 with the proximal portion 404 of the distal tip 402 therebetween. The collar 508 can include a vibration component 446 that can vibrate the distal tip 402, which can help dislodge clogs in one or more lumens of the distal tip 402. In some variants, the aspiration line 454 can reverse flow (e.g., urge the contents of the aspiration line 454 distally out through the aspiration lumen 422) to clear the aspiration lumen 422, which can be in combination with the vibration component 446 vibrating the distal tip 402. The emulsification device 440 and/or a supporting component can detect clogs with flow meters detecting abnormal flow rates, pressure sensors detecting abnormal pressures, and/or temperature sensors detecting abnormal temperature spikes.

The emulsification device 440 can include a coupler 407 (e.g. tip interface, interface, interface component), which can be disposed at the distal portion 510 of the emulsification device 440. The coupler 407 can include one or more protrusions 409 that correspond in size, shape, and/or location to the coolant inlet 420, coolant outlet 418, irrigation inlet 425, and/or aspiration outlet 423 of the distal tip 402. The coupler 407 can include one or more lumens 417, which can be aligned with the one or more protrusions 409. When coupling the distal tip 402 to the emulsification device 440, the distal tip 402 can be placed at the distal portion 510 such that the one or more protrusions 409 interface with (e.g., are disposed in) the coolant inlet 420, coolant outlet 418, irrigation inlet 425, and/or aspiration outlet 423 of the distal tip 402, which can fix the rotational orientation of the distal tip 402 relative to the emulsification device 440. The single irrigation line 506, coolant return line 468, aspiration line 454, and/or coolant delivery line 464 can be coupled to the coupler 407. The one or more lumens 417 can permit flow through the coupler 407 between the single irrigation line 506, coolant return line 468, aspiration line 454, and/or coolant delivery line 464 and the irrigation inlet 425, coolant outlet 418, aspiration outlet 423, and/or coolant inlet 420 of the distal tip 402. The coupler 407 can be coupled to the single irrigation line 506, coolant return line 468, aspiration line 454, and/or coolant delivery line 464. The collar 508 can be coupled to the distal portion 510 of the emulsification device 440 with the proximal portion 404 of the distal tip 402 disposed therebetween, which can couple the distal tip 402 to the emulsification device 440.

Figure 28:
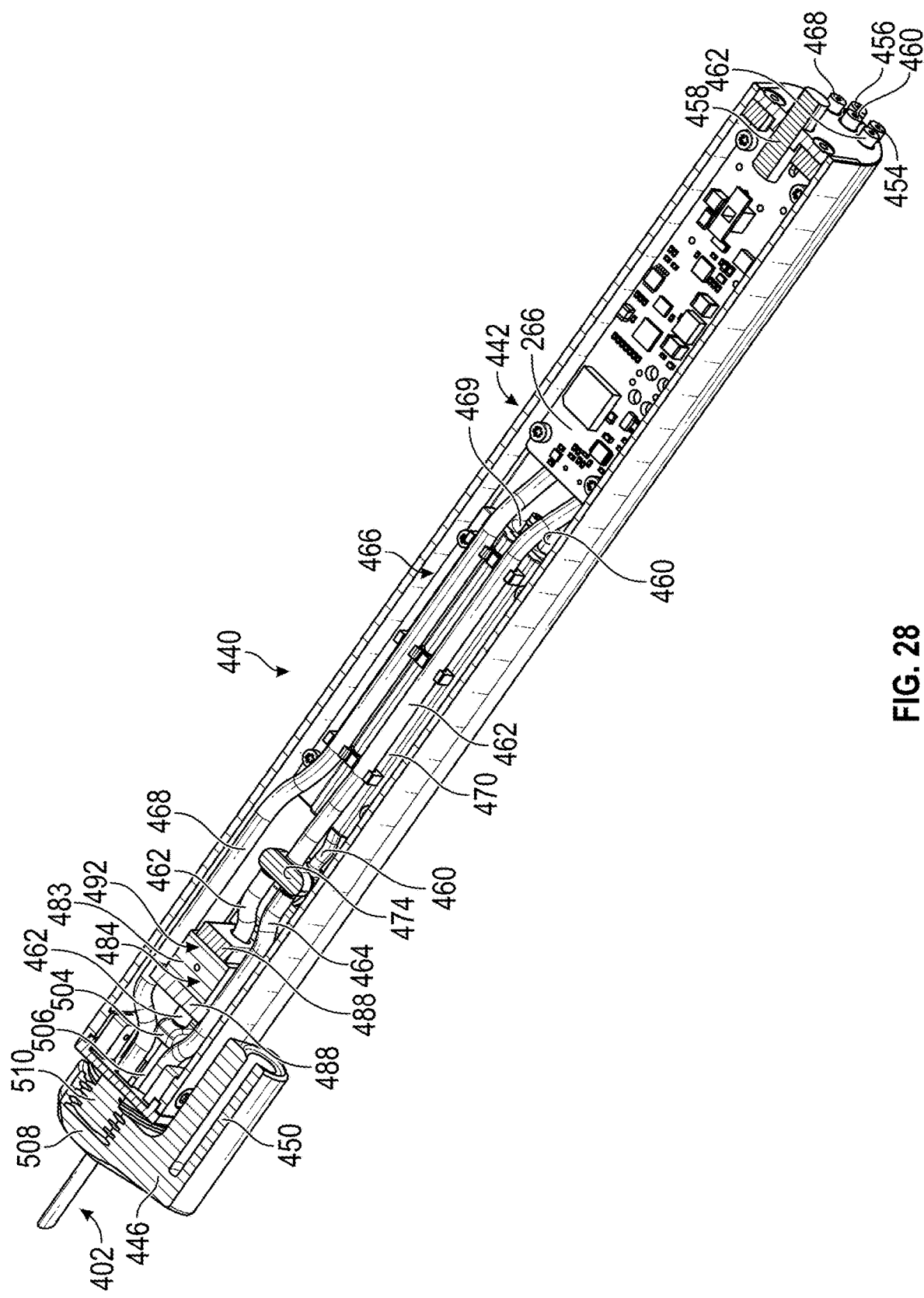
FIG. 28 illustrates a section view of the emulsification device of FIG. 23A.

As shown in FIG. 28, the coolant delivery line 464 can split off (e.g., divert from), which can include splitting off at the splitter 474, the first fluid line 462 to deliver fluid to the first coolant lumen 428 of the distal tip 402 (e.g., by way of the coolant inlet 420). The coolant return line 468 can carry fluid from second coolant lumen 426 (e.g., coolant outlet 418) distally away from the distal tip 402.

Figure 29A:
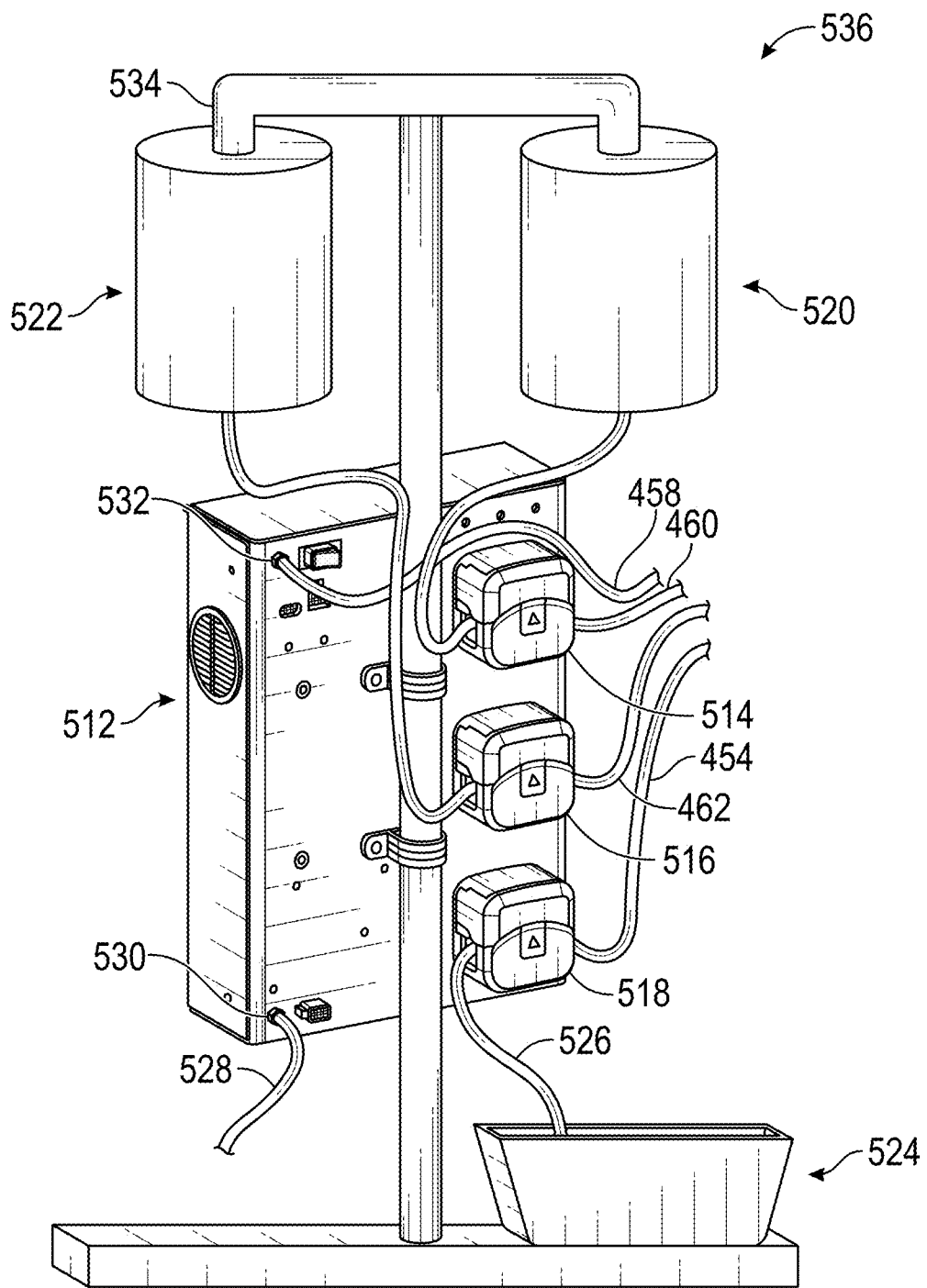
FIG. 29A illustrates a console for the emulsification device of FIG. 23A.
Figure 29C:
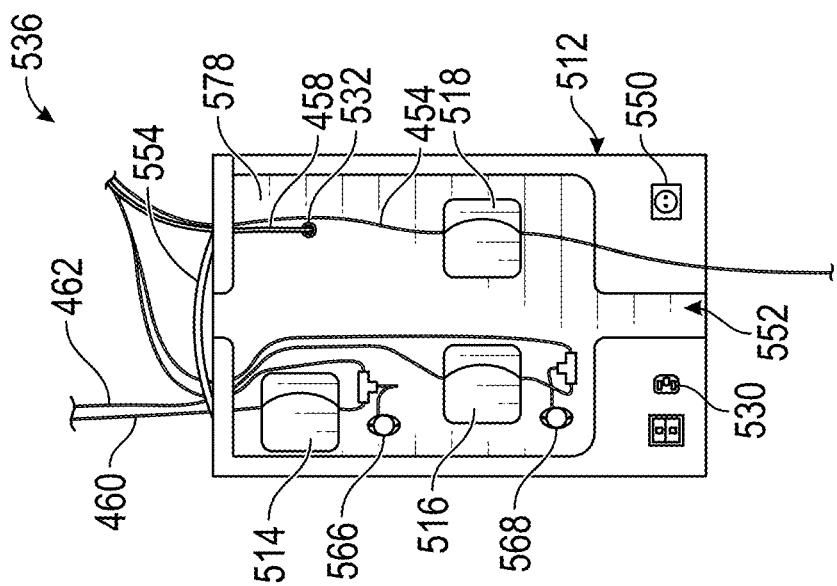
FIG. 29C illustrates features of the console of FIG. 29A.
Figure 29B:
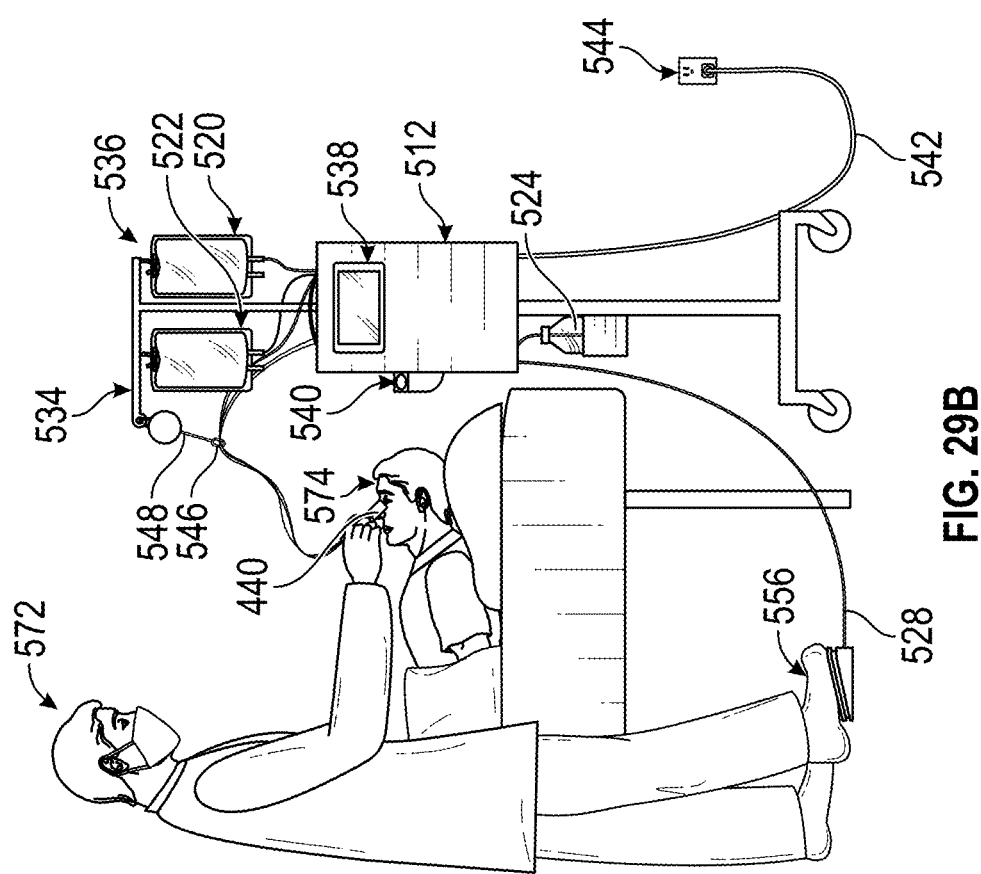
FIG. 29B illustrates the console of FIG. 29A with the emulsification device of FIG. 23A in use.

FIGS. 29A-29C illustrate a system 536 (e.g., console, base). The system 536 can support the emulsification devices described herein such as the emulsification device 440. Features of the system 536 can be mounted on a stand 534 (e.g., pole, IV pole, IV stand), which can be wheeled to facilitate moving the system 536.

The system 536 can include a console 512. The console 512 can include a controller, display screen, touch screen, loudspeaker, microphone, light source, light indicators (e.g., LEDs), user interfaces (e.g., buttons, foot pedals, switches, dials, touch screens, etc.), power source (e.g., battery), processor, and/or other hardware to carry out the functions described herein. The console 512 can be mounted on the stand 534. The console 512 can provide electrical power to the emulsification device 440. The console 512 can include a connection 532 (e.g., power connection) that can connect with the cord 458 (e.g., conduit) that delivers electrical power to the emulsification device 440. The console 512 can include a connection 530 for conductor(s) 528 for one or more foot pedals, which can enable a clinician to control the pump 514, pump 516, pump 518, and/or vibration component 446.

The system 536 can include a pump 514, pump 516, and/or pump 518. The pump 514 can be disposed on the second fluid line 460. The pump 514 can control flow through the second fluid line 460. The pump 516 can be disposed on the first fluid line 462. The pump 516 can control flow through the first fluid line 462. The pump 518 can be disposed on the aspiration line 454. The pump 518 can control flow through the aspiration line 454. The pump 514, pump 516, and/or pump 518 can be peristaltic pump(s), which can enable the pump 514, pump 516, and/or pump 518 to control flow without contacting the fluid flowing through the second fluid line 460, first fluid line 462, and/or aspiration line 454. Accordingly, peristaltic pumps can improve cleanliness and/or reduce maintenance needs of the system 536. The pump 514, pump 516, and/or pump 518 can adjust flow rates based on user input by way of the console 512 (e.g., foot pedal operatively connected to the console 512) and/or based on sensor feedback, such as one or more pressure sensor(s), flow sensor(s), and/or temperature sensor(s).

As illustrated in FIG. 29A, the aspiration line 454 can include an outlet 526 that directs aspirated contents into a receptacle 524 (e.g., vessel, bottle, bladder), which can be coupled to the stand 534. The aspirated contents can be disposed of and/or analyzed.

The system 536 can include one or more reservoirs of fluid for the emulsification device 440. For example, the system 536 can include a reservoir 522 (e.g., vessel, bottle, bag) that can hold fluid (e.g., saline) for the first fluid line 462. The first fluid line 462 can be in fluid communication with the reservoir 522. Fluid from the reservoir 522 can flow through the first fluid line 462. In some variants, fluid from the third fluid line 456 can be delivered to the reservoir 522 to be directed through the first fluid line 462. In some variants, fluid from the coolant return line 468 can be delivered to the reservoir 522. In some variants, fluid from the third fluid line 456 can be delivered to the receptacle 524 or another receptacle. In some variants, fluid from the coolant return line 468 can be delivered to the receptacle 524 or another receptacle. In some variants, the reservoir 520 can include a device (e.g., chilling device) to cool fluid within the reservoir 520.

The system 536 can include a reservoir 520 (e.g., vessel, bottle, bag) that can hold fluid (e.g., saline) for the second fluid line 460, which can include heated fluid, unheated fluid, ambient fluid, and/or cooled fluid. The second fluid line 460 can be in fluid communication with the reservoir 520. Fluid from the reservoir 520 can flow through the second fluid line 460. In some variants, fluid within the reservoir 520 can be heated therein, which can be via one or more heating techniques (e.g., heated element, etc.). In some variants, the system 536 can include a reservoir that holds fluid for both the second fluid line 460 and first fluid line 462 instead of having two separate reservoirs. In some variants, the fluid in the reservoir 522 and/or reservoir 520 can include one or more therapeutic agents (e.g., medicaments, hormones, vitamins, nutrients, etc.). The reservoir 522 and/or reservoir 520 can be coupled to (e.g., mounted, suspended on) the stand 534.

The second fluid line 460 can connect the reservoir 520 and emulsification device 440 to provide fluid from the reservoir 520 to the emulsification device 440. The first fluid line 462 can connect the reservoir 522 and the emulsification device 440 to provide fluid from the reservoir 522 to the emulsification device 440.

FIG. 29B illustrates the system 536 in use. As shown, a clinician 572 can hold the emulsification device 440 to position the distal tip 402 into the capsular bag of the eye of a patient 574 to access the natural lens for removal. When the emulsification device 440 is not in use, the emulsification device 440 can be placed on a mount 540 of the console 512 for storage. The system 536 can include a cord 542 (e.g., power cord) that can operatively connect with a power source 544 (e.g., wall outlet) to power the system 536 (e.g., console 512, emulsification device 440, pump 514, pump 516, and/or pump 518).

The system 536 can include a support device 548 to support the first fluid line 462, second fluid line 460, aspiration line 454, and/or cord 458 between the system 536 and the emulsification device 440, which can include a coupler 546 (e.g., hook, loop, ring) that organizes the first fluid line 462, second fluid line 460, aspiration line 454, and/or cord 458.

The clinician 572 can interact with the user interface(s) of the console 512 to operate the system 536 and/or emulsification device 440, which can include heating the heater 481, instructing the heater 481 to heat fluid within the second fluid line 460 to a target temperature or temperature range, and/or operating the pump 514, pump 516, and/or pump 518. In some variants, the clinician 572 can input information about a patient, such as a cataract grade of the natural lens, which the system 536 can use to adjust flow rates provided by the pump 514, pump 516, and/or pump 518 and/or temperatures of the fluid in the second fluid line 460.

As described herein, the system 536 can include a foot pedal 556 that can be used to control one or more features of the emulsification device 440 and/or console 512, such as the pump 518. For example, in some variants, the foot pedal 556 can be used to control the pump 518 to control aspiration by the emulsification device 440.

As illustrated, the console 512 can include a display 538 (e.g., touch screen). The display 538 can display information about the system 536, such as the emulsification device 440. The display 538 can indicate if heated fluid or unheated fluid is flowing through the irrigation lumen 424 of the distal tip 402 into the eye. The display 538 can indicate a temperature of the heated fluid flowing through the second fluid line 460 downstream of the heating unit 469. The display 538 can indicate a temperature of the unheated irrigation fluid flowing to the distal tip 402. The display 538 can indicate a target temperature of the heated fluid. The display 538 can indicate information about a patient, such as the cataract grade of the lens of a patient. The display 538 can indicate flow rates and/or pressures within the second fluid line 460, first fluid line 462, and/or aspiration line 454. The display 538 can indicate alerts to the clinician 572. In some variants, the display 538 can receive user instruction with a touch screen functionality.

In use, the distal tip 402 of the emulsification device 440 can be inserted into the capsular bag to access the natural lens of the eye. In some variants, an aperture (e.g., capsulotomy) can be formed in the capsular bag to provide access for the distal tip 402. With the distal tip 402 inside the capsular bag, fluid in the reservoir 522 can flow through the first fluid line 462 to the emulsification device 440 and/or fluid in the reservoir 520 can flow through the second fluid line 460 to the emulsification device 440. As described herein, fluid flowing through the second fluid line 460 can be heated by the heating unit 469 to a target temperature before being directed to the irrigation lumen 424 of the distal tip 402 for irrigation into the eye. Fluid flowing through the first fluid line 462 can bypass the heating unit 469 and direct fluid to the irrigation lumen 424 of the distal tip 402 for irrigation into the eye and circulation through the first coolant lumen 428, coolant channel 436, and/or second coolant lumen 426 of the distal tip 402 to cool an exterior of the distal tip 402. The emulsification device 440 can include a valve unit 483 that can be controlled by the clinician 572 as described herein to control the flow of fluid through the second fluid line 460 and first fluid line 462 to the irrigation lumen 424 of the distal tip 402 for irrigation into the eye, which can include alternately permitting flow through the second fluid line 460 and first fluid line 462 to the irrigation lumen 424 of the distal tip 402. When the heated flow through the second fluid line 460 to the irrigation lumen 424 of the distal tip 402 is impeded, the flow through the second fluid line 460 can be diverted through the third fluid line 456 as described herein. The heated fluid provided by the second fluid line 460 to the irrigation lumen 424 of the distal tip 402 can emulsify the natural lens. The contents of the capsular bag, such as the emulsified natural lens, heated fluid, fluid, and/or ocular fluid, can be aspirated through the aspiration lumen 422 of the distal tip 402 and into the aspiration line 454 for delivery to the receptacle 524. The clinician 572 can use the foot pedal 556 to control aspiration (e.g., control the pump 518). In some variants, the receptacle 524 can be couped to the stand 534.

FIG. 29C illustrates additional features that can be incorporated into the system 536. For example, the console 512 can include an interior 578 that can house one or more features. For example, the pump 514, pump 516, and/or pump 518 can be disposed in the interior 578. In some variants, a pressure sensor 566 can be disposed on the second fluid line 460 to measure a pressure within the second fluid line 460, which can be used to control the pump 514. In some variants, a pressure sensor 568 can be disposed on the first fluid line 462 to measure a pressure within the first fluid line 462, which can be used to control the pump 516. In some variants, the console 512 can include an opening 552 (e.g., channel) into the interior 578 such that the stand 534 can extend through the opening 552 and interior 578 to facilitate coupling the console 512 to the stand 534.

In some variants, the console 512 can include a handle 554, which can facilitate handling. In some variants, console 512 can include a connection 550 (e.g., power connection) to connect the cord 542.

Figure 29D:
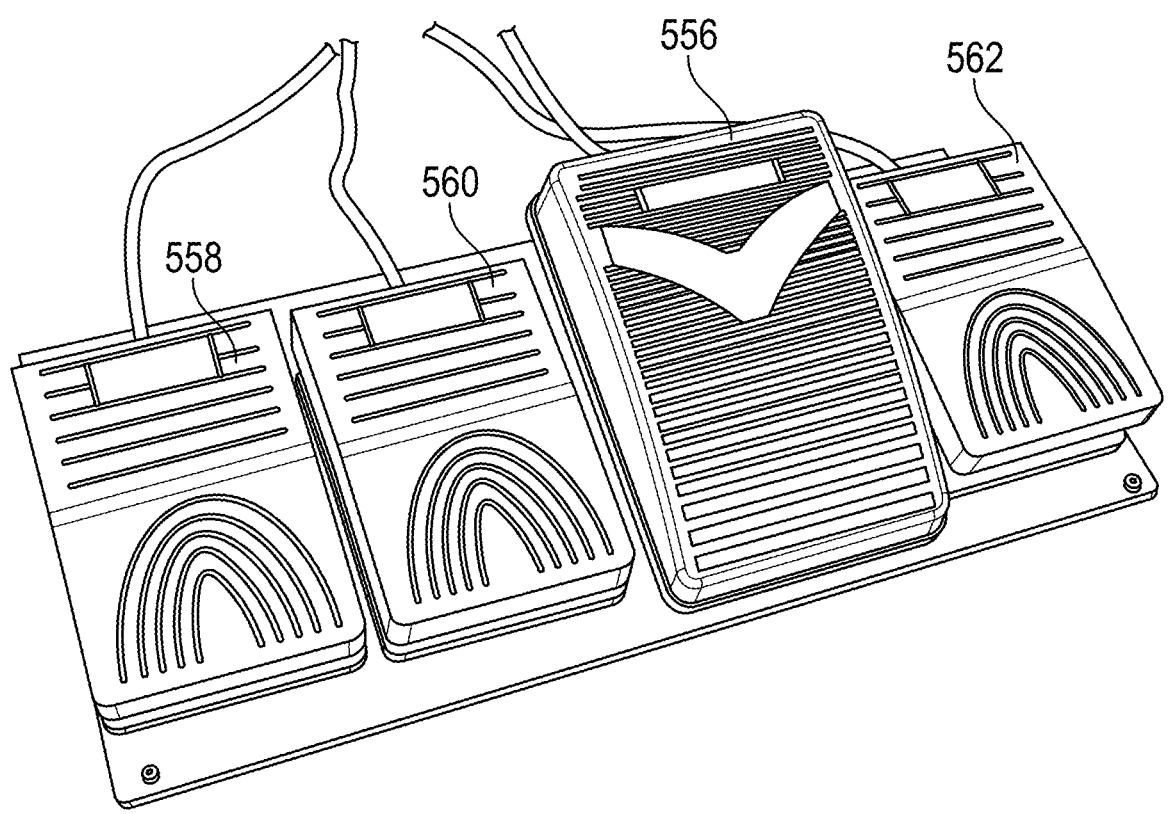
FIG. 29D illustrates foot pedals that can be used by a clinician to operate features of the console and/or emulsification device.

FIG. 29D illustrates various foot pedals that can be used to control features of the system 536 and/or emulsification device 440, which can be considered part of the system 536. As illustrated, the foot pedal 556 can be used to control the pump 518 to control aspiration, which can include controlling a strength of the aspiration along a continuum (e.g., pushing the foot pedal 556 father down results in greater aspiration). The foot pedal 562 can be used to control the pump 516, which can control flow through the first fluid line 462. The foot pedal 560 can be used to control the vibration component 446. The foot pedal 558 can be used to control the pump 518 to reverse a flow through the aspiration line 454 to flow distally, which can include flowing out of the aspiration inlet 414 of the distal tip 402 to unclog the aspiration line 454 and/or aspiration lumen 422 of the distal tip 402. The distal tip 402 can simultaneously be vibrated with the vibration component 446 to help unclog the aspiration lumen 422 of the distal tip 402.

Figure 30B:
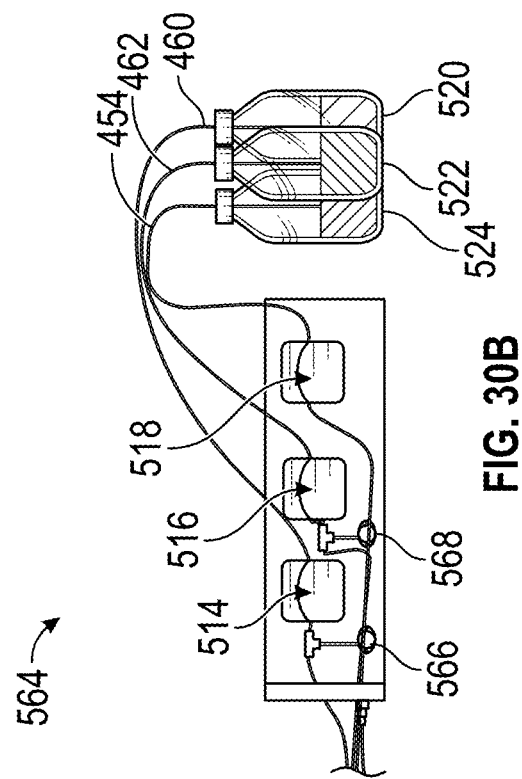
FIG. 30B illustrates features of the console of FIG. 30A.
Figure 30A:
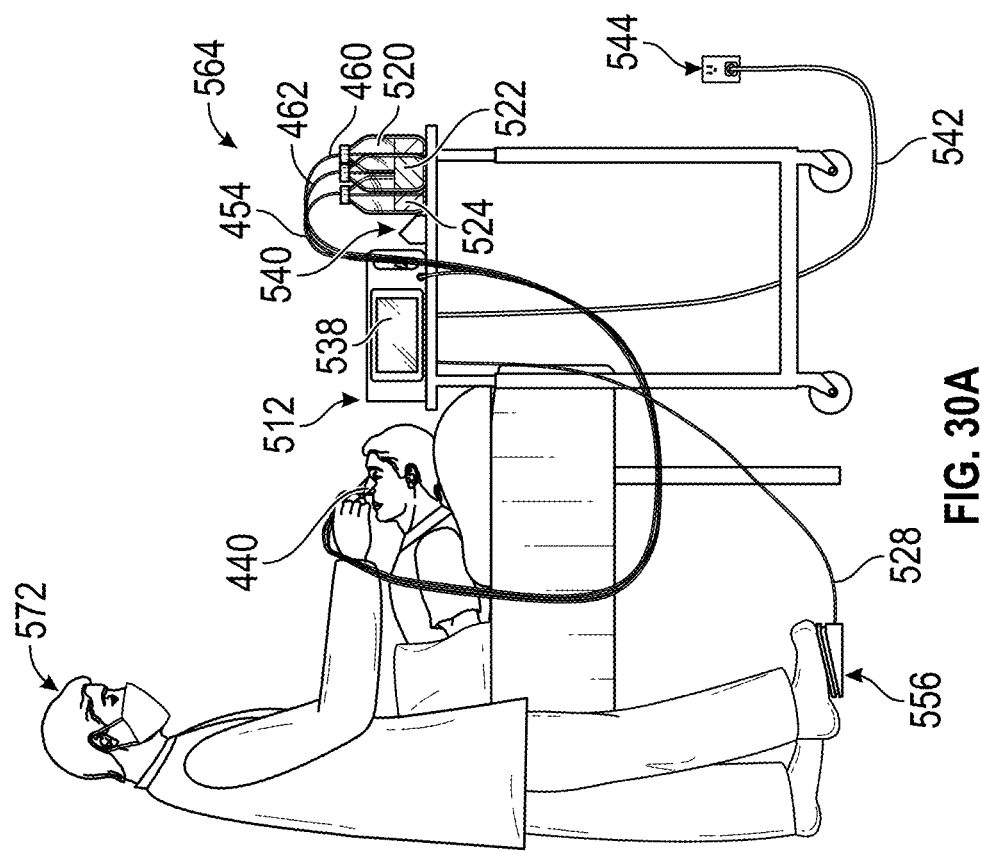
FIG. 30A illustrates another console with the emulsification device of FIG. 23A in use.

FIGS. 30A and 30B illustrate a system 564 (e.g., console, base). The system 536 can support the emulsification devices described herein such as the emulsification device 440. The system 536 can include any of the features of the system 536

The system 564 can be a tabletop system, which can include the console 512 resting on a supporting surface. The system 564 can include a mount 540 for the emulsification device 440 when not in use that is separate from the console 512. The pump 514, pump 516, pump 518, pressure sensor 566, and/or pressure sensor 568 can be disposed on an exterior of the console 512 or within an interior thereof. The receptacle 524, reservoir 522, and/or reservoir 520 can, in some variants, be bottles or the like. The receptacle 524, reservoir 522, and/or reservoir 520 can sit on a supporting surface, such as a tabletop. The receptacle 524, reservoir 522, and/or reservoir 520 can be separate from the console 512.

Figure 31B:
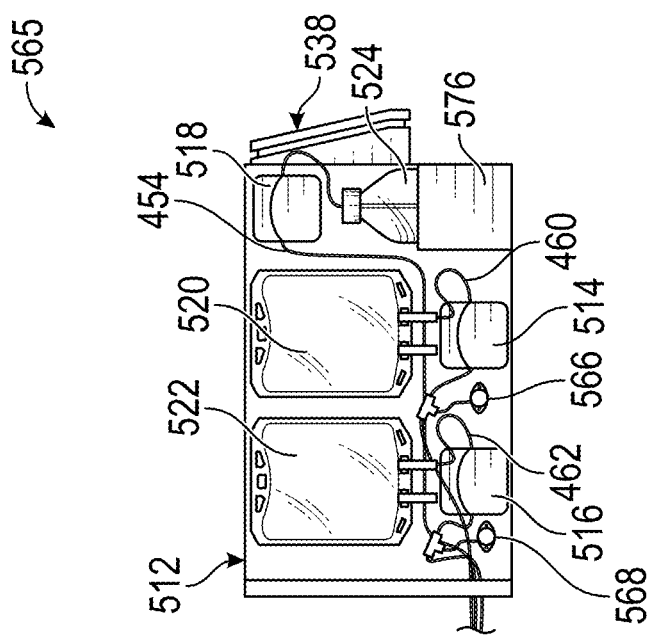
FIG. 31B illustrates features of the console of FIG. 31A.
Figure 31A:
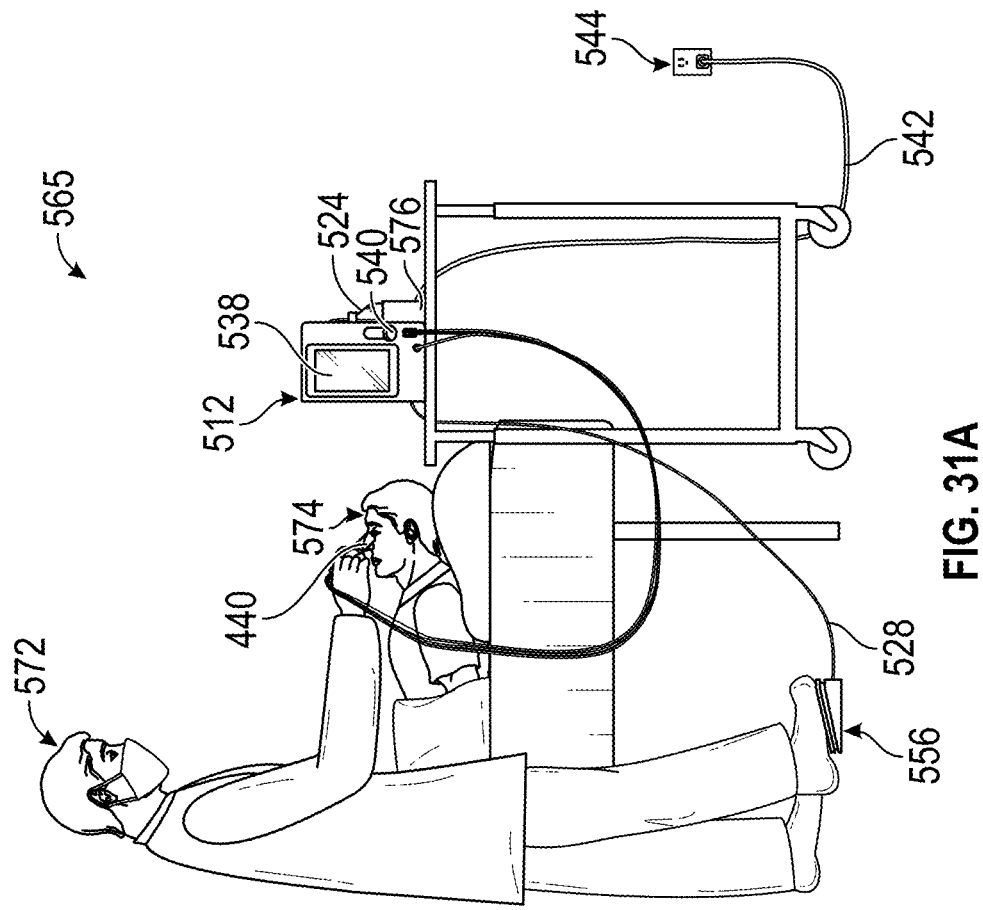
FIG. 31A illustrates another console with the emulsification device of FIG. 23A in use.

FIGS. 31A and 31B illustrate a system 565 (e.g., console, base). The system 565 can support the emulsification devices described herein such as the emulsification device 440. The system 565 can include any of the features of the systems 536, 564.

The system 565 can be a tabletop system, which can include the console 512 resting on a supporting surface. The system 565 can include a mount 540 for the emulsification device 440 that is part of the console 512. The pump 514, pump 516, pump 518, pressure sensor 566, and/or pressure sensor 568 can be disposed on an exterior of the console 512 or within an interior thereof. The reservoir 520 and/or reservoir 522 can be bladder(s), which can be suspended on the console 512. The receptacle 524 can, in some variants, be a bottle or the like. The console 512 can include a holding feature 576 that can hold the receptacle 524. The display 538, as shown in FIG. 31B, can be disposed at an angle.

Figure 32B:
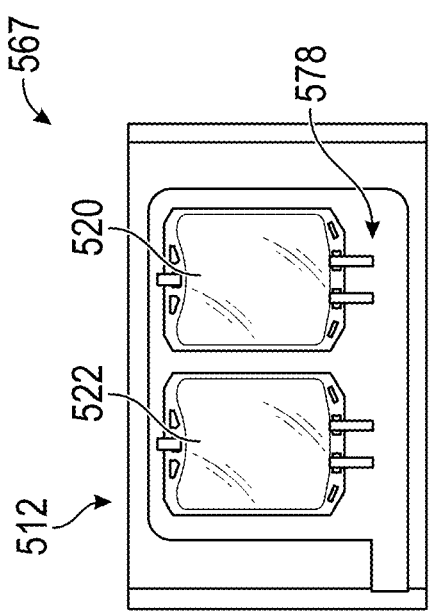
FIG. 32B illustrates features of the console of FIG. 32A.
Figure 32C:
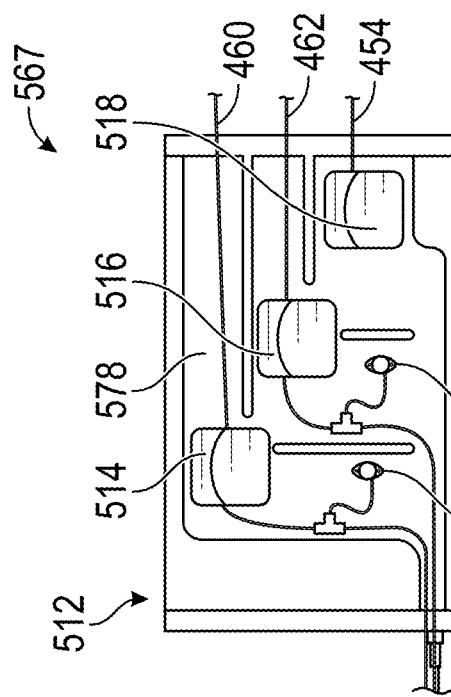
FIG. 32C illustrates features of the console of FIG. 32A.
Figure 32A:
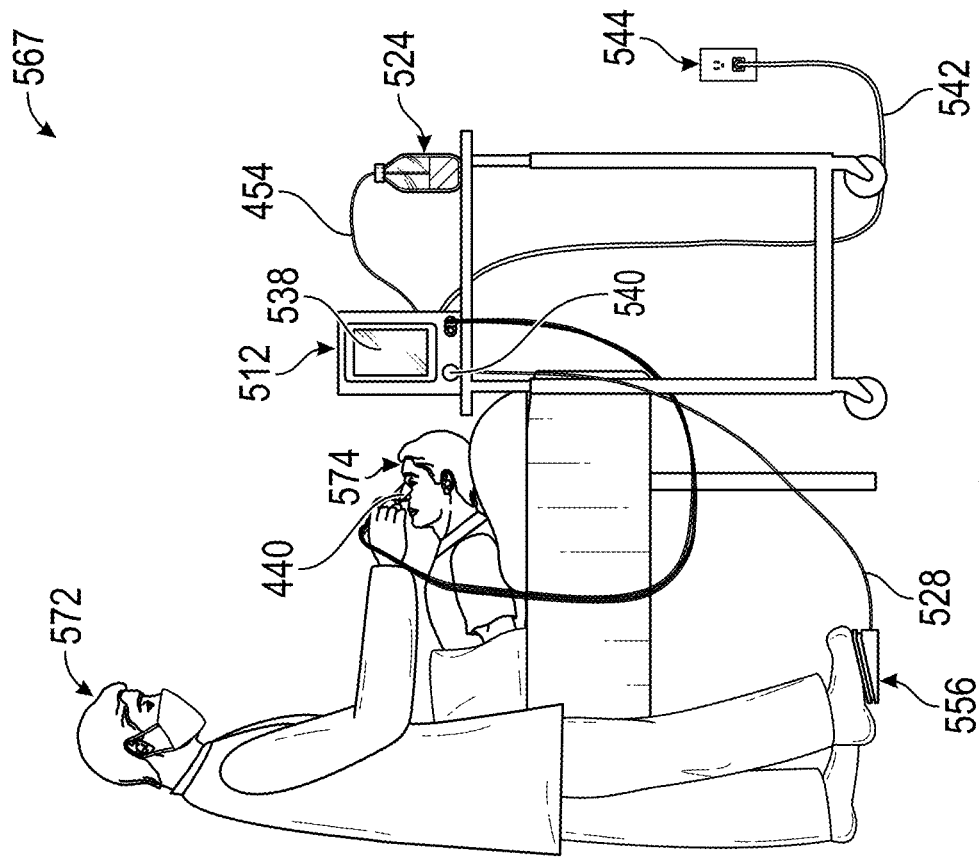
FIG. 32A illustrates another console with the emulsification device of FIG. 23A in use.

FIGS. 32A-32C illustrate a system 567 (e.g., console, base). The system 567 can support the emulsification devices described herein such as the emulsification device 440. The system 567 can include any of the features of the systems 536, 564, 565.

The system 567 can be a tabletop system, which can include the console 512 resting on a supporting surface. The pump 514, pump 516, pump 518, pressure sensor 566, and/or pressure sensor 568 can be disposed within an interior of the console 512. The reservoir 520 and/or reservoir 522 can be bladder(s) that can be disposed in the console 512, which can include being suspended in the console 512. The receptacle 524 can, in some variants, be a bottle or the like. The receptacle 524 can rest on a supporting surface (e.g., tabletop) proximate the console 512.

Figure 33B:
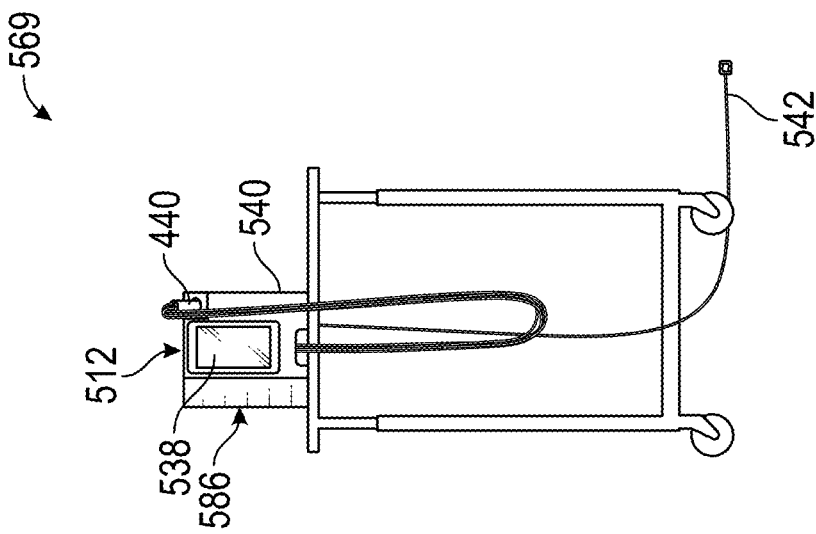
FIG. 33B illustrates the console of FIG. 33A in a stowed configuration.
Figure 33A:
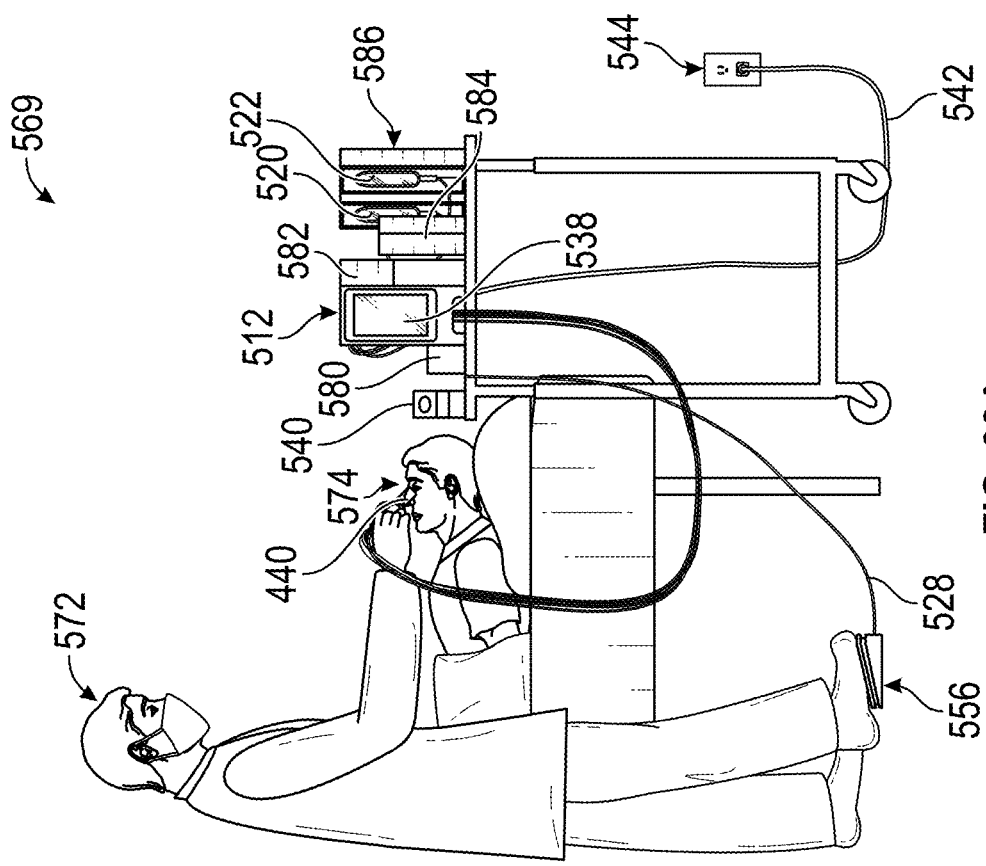
FIG. 33A illustrates another console with the emulsification device of FIG. 23A in use.

FIGS. 33A and 33B illustrate a system 569 (e.g., console, base). The system 569 can support the emulsification devices described herein such as the emulsification device 440. The system 569 can include any of the features of the systems 536, 564, 565, 567.

The system 569 can be a tabletop system, which can include the console 512 resting on a supporting surface. The console 512 of the system 569 can be modular, which can be assembled (shown in FIG. 33B) and disassembled (shown in FIG. 33A). For example, the console 512 can include a mount 540 for the emulsification device 440 when not in use that can be received by a region 582 (e.g., recess, receiving portion) of the console 512. The console 512 can include a separable component 586 (e.g., separable portion) that can house the reservoir 520 and/or reservoir 522. The separable component 586 can be coupled to and decoupled from the console 512. The console 512 can include a separable component 584 (e.g., separable portion) that can house the receptacle 524. The separable component 584 can be coupled to and decoupled from the console 512.

Figure 34B:
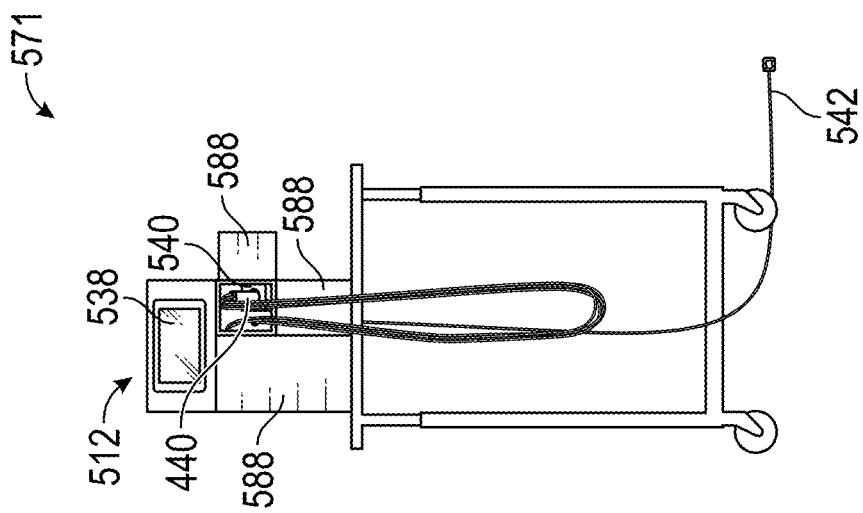
FIG. 34B illustrates the console of FIG. 34A in a stowed configuration.
Figure 34A:
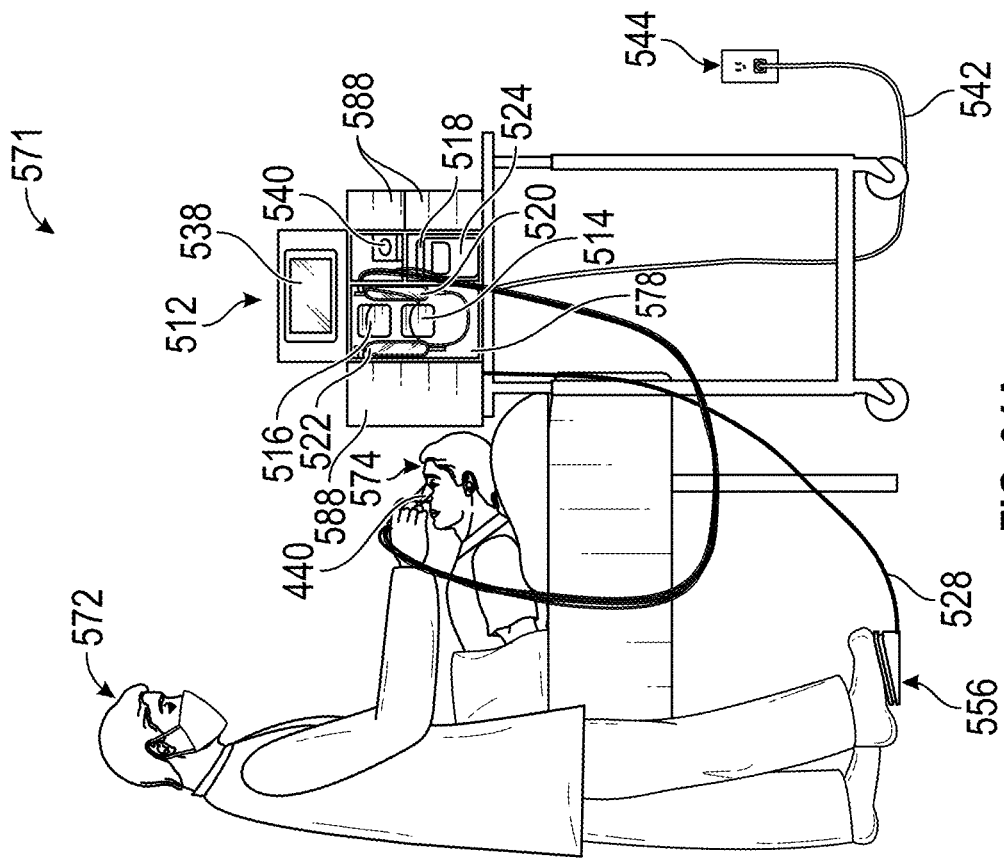
FIG. 34A illustrates another console with the emulsification device of FIG. 23A in use.

FIGS. 34A and 34B illustrate a system 571 (e.g., console, base). The system 571 can support the emulsification devices described herein such as the emulsification device 440. The system 571 can include any of the features of the systems 536, 564, 565, 567, 569.

The system 571 can be a tabletop system, which can include the console 512 resting on a supporting surface (e.g., tabletop). The console 512 can include an interior 578, which can include different compartments for storing features of the system 571. For example, the reservoir 522, pump 516, pump 514, reservoir 520, receptacle 524, pump 518, and/or mount 540 can be disposed in the interior 578. The console 512 can include doors 588 that can open and close to provide access into the interior 578, which can include opening and closing to impede or provide access into discrete compartments within the interior 578. The reservoir 522, pump 516, pump 514, and/or reservoir 520 can be disposed in a first shared compartment of the interior 578 with a door 588 that opens and closes. The pump 518 and/or receptacle 524 can be disposed in a second shared compartment of the interior 578 with a door 588 that opens and closes. The mount 540 can be disposed in a third compartment of the interior 578 with a door 588 that opens and closes.

Figure 35A:
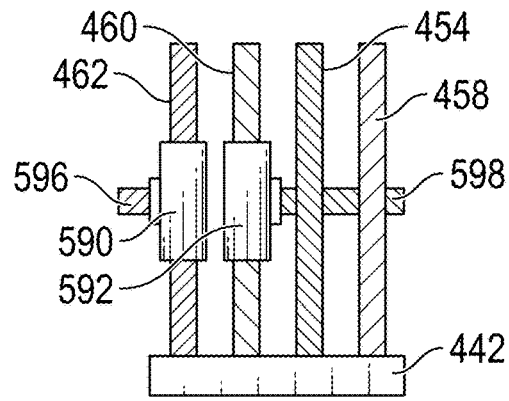
FIG. 35A illustrates fittings on the first fluid line and second fluid line to facilitate pressure sensing.
Figure 35B:
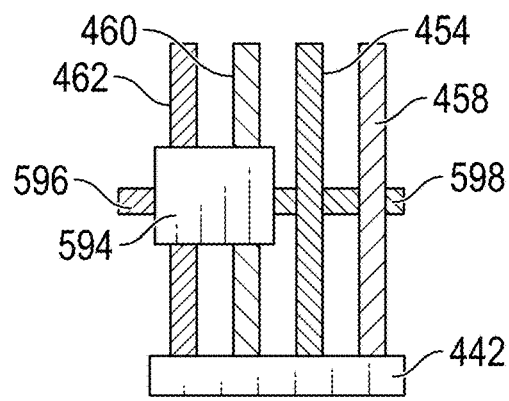
FIG. 35B illustrates a manifold for the first fluid line and second fluid line to facilitate pressure sensing.
Figure 35C:
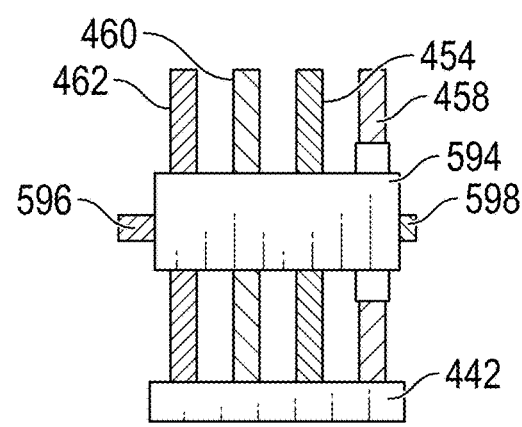
FIG. 35C illustrates a manifold for the first fluid line, second fluid line, aspiration line, and power cord for organization and pressure sensing on the first fluid line and second fluid line.

FIGS. 35A-35C illustrate different features to facilitate measuring pressure within the first fluid line 462 and second fluid line 460 proximal of the housing 442 of the emulsification device 440. As shown in FIG. 35A, a fitting 590 (e.g., tee fitting) can be disposed on the first fluid line 462 to direct a portion of flow to a pressure line 596 to a pressure sensor to measure pressure within the first fluid line 462. A fitting 592 (e.g., tec fitting) can be disposed on the second fluid line 460 to direct a portion of flow to a pressure line 598 to a pressure sensor to measure pressure within the second fluid line 460. As shown in FIG. 35B, a manifold 594 can be disposed on the first fluid line 462 and second fluid line 460 to direct portions of flow to the pressure line 596 and pressure line 598 to pressure sensors to measure pressures within the first fluid line 462 and second fluid line 460. As shown in FIG. 35C, a manifold 594 can be disposed on the first fluid line 462, second fluid line 460, aspiration line 454, and/or cord 458. The manifold 594 can direct portions of flow from the fluid line 462 and second fluid line 460 to the pressure line 596 and pressure line 598 to pressure sensors to measure pressures within the first fluid line 462 and second fluid line 460. The manifolds, in some variants, can help to organize the first fluid line 462, second fluid line 460, aspiration line 454, and/or cord 458 proximal of the housing 442.

FIGS. 36A-45 illustrate various emulsification devices with different housing configurations. Each of these emulsification devices can include any of the features of the other emulsification devices described herein. Each of these emulsification devices can operate with the distal tip 402 and/or other distal tips described herein. The distal tip 402 can be coupled to the emulsification devices (e.g., the housings thereof) with a collar 612. Each of the emulsification devices can include a user interface 444 (e.g., button) to operate a valve unit, such as the valve unit 483, as described herein to control the irrigation of fluid through the distal tip 402.

Figure 36A:
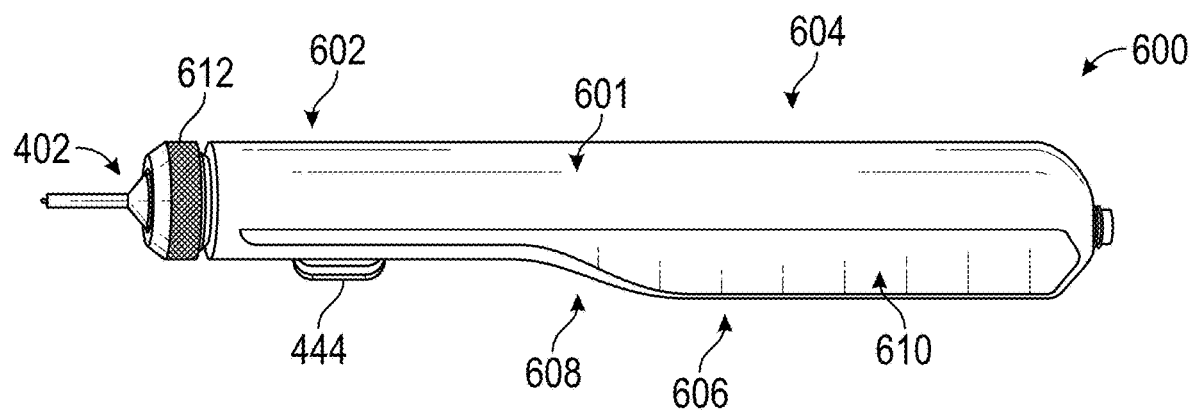
FIG. 36A illustrates a housing variation for an emulsification device.
Figure 36B:
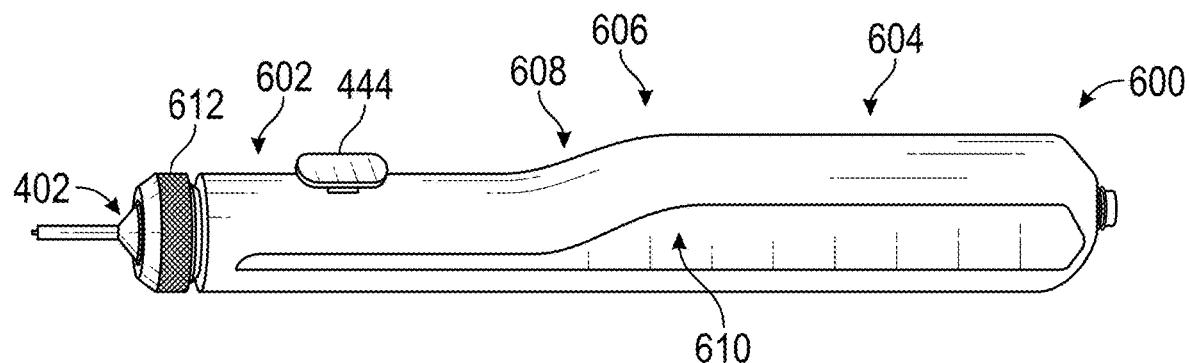
FIG. 36B illustrates another view of the housing variation for the emulsification device of FIG. 36A.

FIGS. 36A and 36B illustrate an emulsification device 600. The emulsification device 600 includes a housing 601, which can be a handle for a clinician. The housing 601 can include a distal portion 602 and a proximal portion 604. The proximal portion 604 can include a cross-section that is larger than that of the distal portion 602. The proximal portion 604 can include a bulge 606 (e.g., enlarged portion), which can be disposed on one side of the proximal portion 604 but not the other. The housing 601 can include a slope 608 (e.g., gradual transition) between the distal portion 602 and proximal portion 604, which can be disposed on one side of the housing 601 but not the other. The housing 601 can have a generally rounded shape. The housing 601 can include a flat surface 610, which can include a flat surface 610 being disposed on opposite sides of the housing 601. The flat surface 610 can span from the distal portion 602 to the proximal portion 604. The distal portion 602 and proximal portion 604 can be disposed on a common axis.

Figure 37A:
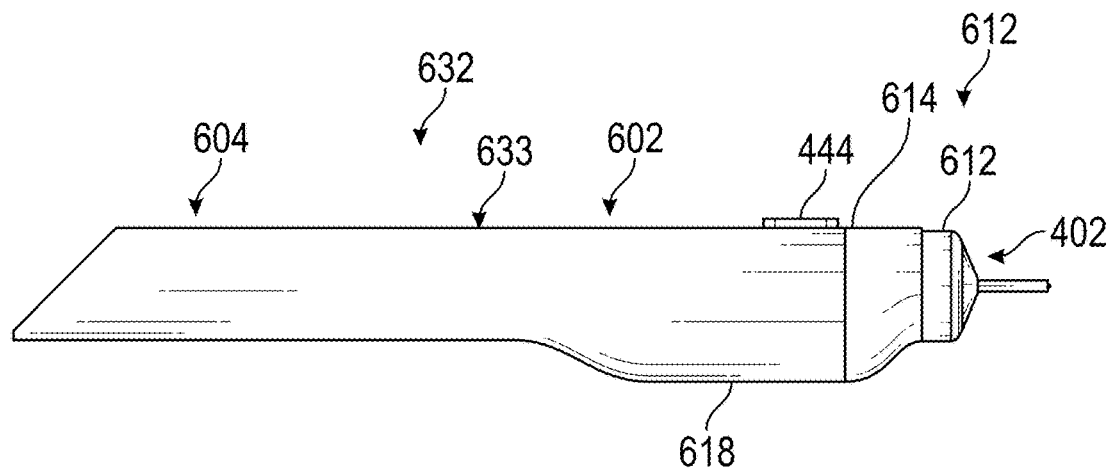
FIG. 37A illustrates a housing variation for an emulsification device.
Figure 37B:
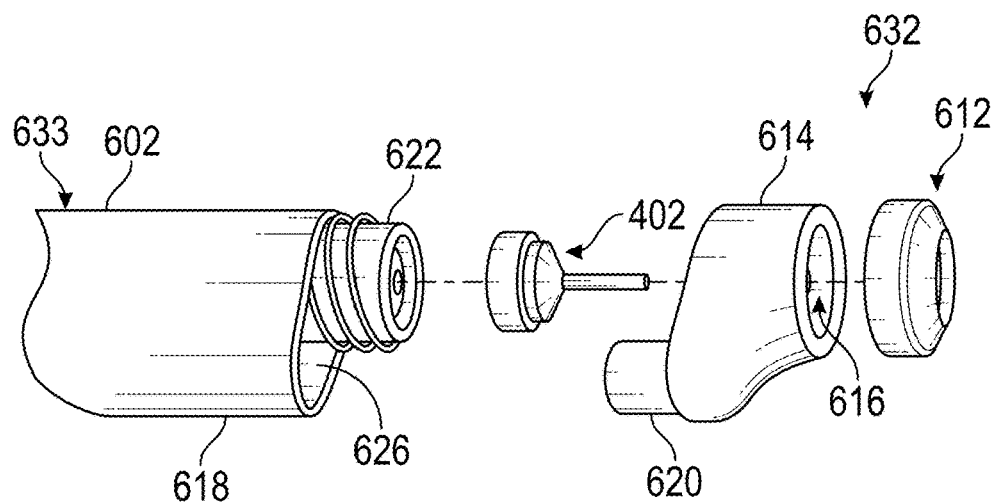
FIG. 37B illustrates an exploded view of some features of the emulsification device of FIG. 37A.

FIGS. 37A and 37B illustrate an emulsification device 632. The emulsification device 632 can include a housing 633, which can be a handle for a clinician. The housing 633 can include a distal portion 602 and a proximal portion 604. The distal portion 602 can include a cross-section that is larger than that of the proximal portion 604. The distal portion 602 can include a bulge 618 (e.g., enlarged portion), which can be disposed on one side of the distal portion 602 but not the other. The housing can include a slope (e.g., gradual transition between the distal portion 602 and proximal portion 604, which can be disposed on one side of the housing 633 but not the other. The distal portion 602 and proximal portion 604 can be disposed on the same axis.

The emulsification device 632 can include a vibration component 614, which can be disposed proximal of the distal tip 402. The vibration component 614 can vibrate the distal tip 402, as described herein, to help dislodge clogs in the distal tip 402. As shown in the partially exploded view in FIG. 37B, the distal tip 402 can be disposed at a distal portion 622 of the emulsification device 632. The vibration component 614 can include an opening 616 through which the distal tip 402 can pass as the vibration component 614 is disposed around the distal portion 622. The vibration component 614 can include a protrusion 620 (e.g., connector) that can be disposed within an interior 626 of the housing 633. With the vibration component 614 disposed around the distal portion 622, the collar 612 can be disposed over the distal tip 402 and coupled to the distal portion 622, which can hold the vibration component 614 and/or distal tip 402 on the distal portion 622.

Figure 38:
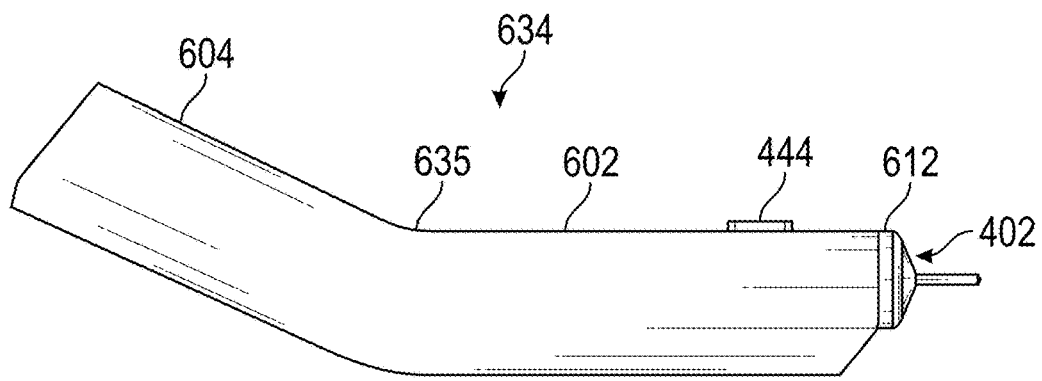
FIG. 38 illustrates a housing variation for an emulsification device.

FIG. 38 illustrates an emulsification device 634. The emulsification device 634 includes a housing 635, which can be a handle for a clinician. The housing 635 can include a distal portion 602 and a proximal portion 604. The distal portion 602 and proximal portion 604 can include cross-sections of the same size. The proximal portion 604 can be disposed at an angle (e.g., 20-70 degrees) relative to the distal portion 602. For example, a central longitudinal axis of the proximal portion 604 can be disposed at an angle (e.g., 20-70 degrees) relative to a central longitudinal axis of the distal portion 602. The distal portion 602 can be longer than the proximal portion 604.

Figure 39:
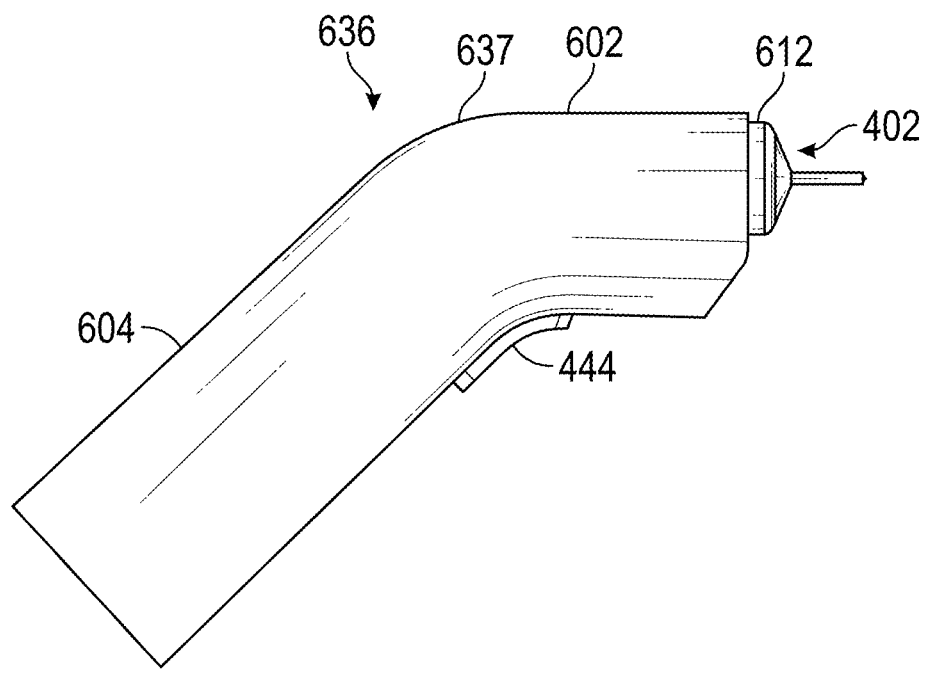
FIG. 39 illustrates a housing variation for an emulsification device.

FIG. 39 illustrates an emulsification device 636. The emulsification device 636 includes a housing 637, which can be a handle for a clinician. The housing 637 can include a distal portion 602 and a proximal portion 604. The distal portion 602 and proximal portion 604 can include cross-sections of the same size. The proximal portion 604 can be disposed at an angle (e.g., 30-80 degrees) relative to the distal portion 602. For example, a central longitudinal axis of the proximal portion 604 can be disposed at an angle (e.g., 30-80 degrees) relative to a central longitudinal axis of the distal portion 602. The proximal portion 604 can be longer than the distal portion 602.

Figure 40:
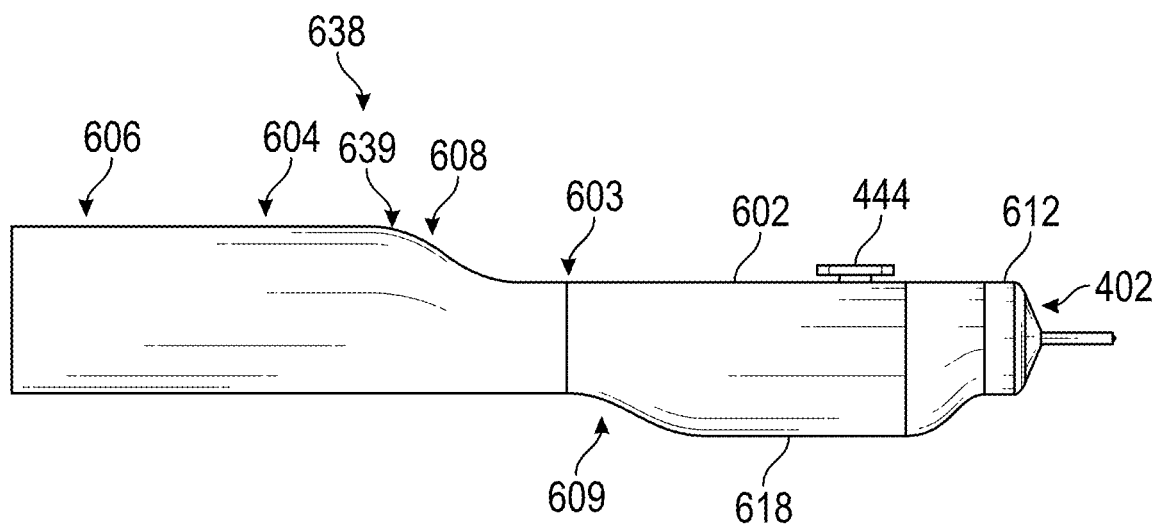
FIG. 40 illustrates a housing variation for an emulsification device.

FIG. 40 illustrates an emulsification device 638. The emulsification device 638 includes a housing 639, which can be a handle for a clinician. The housing 639 can include a distal portion 602, proximal portion 604, and intermediate portion 603 between the distal portion 602 and proximal portion 604. The distal portion 602 and proximal portion 604 can include cross-sections of the same size. The intermediate portion 603 can include a cross-section that is smaller than the distal portion 602 and proximal portion 604. The distal portion 602 can include a bulge 618 (e.g., enlarged portion), which can be disposed on one side of the distal portion 602 but not the other. The distal portion 602 can include a slope 609 (e.g., gradual transition) between the cross-section of the intermediate portion 603 and that of the distal portion 602. The proximal portion 604 can include a bulge 606 (e.g., enlarged portion), which can be disposed on one side of the proximal portion 604 but not the other. The proximal portion 604 can include a slope 608 (e.g., gradual transition) between the cross-section of the intermediate portion 603 and that of the proximal portion 604. The bulge 618 and bulge 606 can be disposed on opposite sides of the housing 639, which can include the bulge 618 being disposed on a bottom portion and the bulge 606 being disposed on a top portion. The distal portion 602, intermediate portion 603, and proximal portion 604 can be disposed on the same axis.

Figure 41:
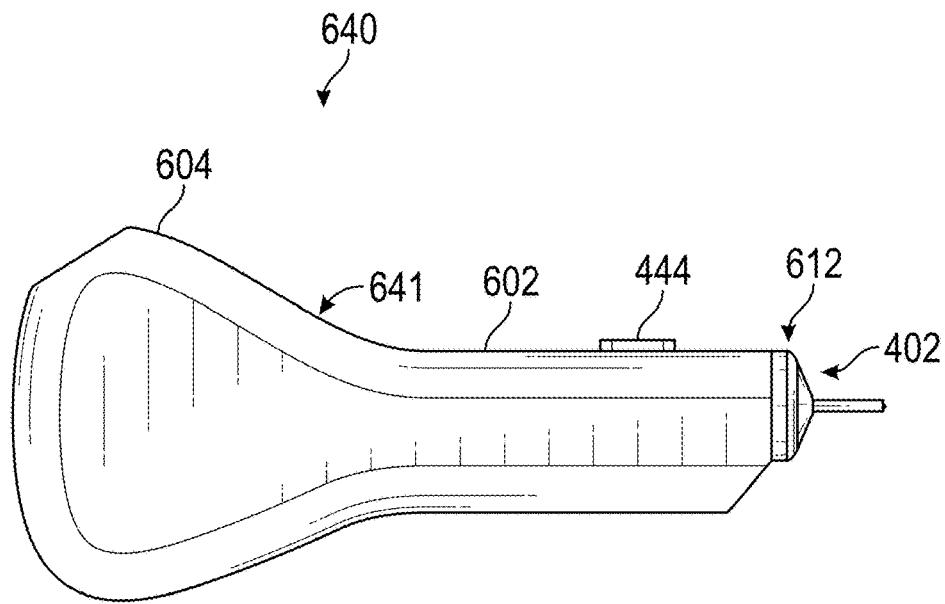
FIG. 41 illustrates a housing variation for an emulsification device.

FIG. 41 illustrates an emulsification device 640. The emulsification device 640 includes a housing 641, which can be a handle for a clinician. The housing 641 can include a distal portion 602 and a proximal portion 604. The proximal portion 604 can include an enlarged cross-section compared to that of the distal portion 602. The proximal portion 604 can include a flared shape, which can include a fan shaped periphery.

Figure 42:
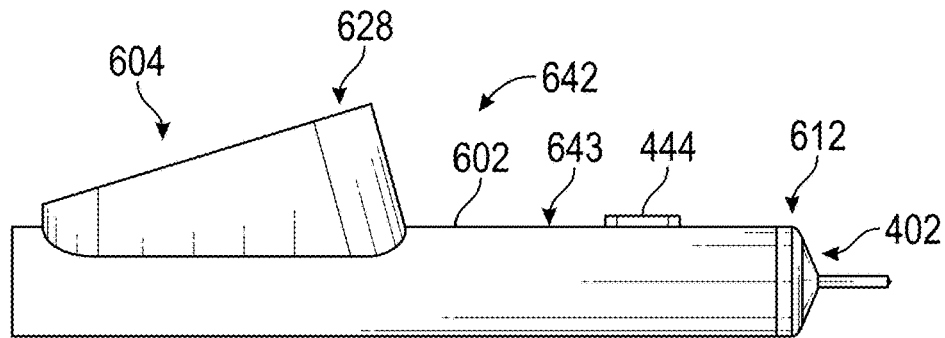
FIG. 42 illustrates a housing variation for an emulsification device.

FIG. 42 illustrates an emulsification device 642. The emulsification device 642 includes a housing 643, which can be a handle for a clinician. The housing 641 can include a distal portion 602 and a proximal portion 604. The proximal portion 604 can include a protrusion 628 (e.g., projection). The protrusion 628 can project from the periphery of the housing 641, which can include projecting radially outward from the periphery of the housing 641.

Figure 43:
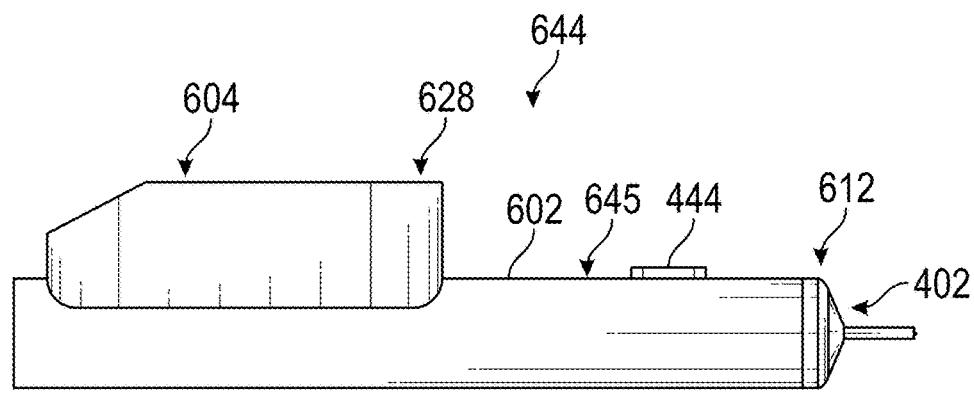
FIG. 43 illustrates a housing variation for an emulsification device.

FIG. 43 illustrates an emulsification device 644. The emulsification device 644 includes a housing 645, which can be a handle for a clinician. The housing 645 can include a distal portion 602 and a proximal portion 604. The proximal portion 604 can include a protrusion 628 (e.g., projection). The protrusion 628 can project from the periphery of the housing 641, which can include projecting radially outward from the periphery of the housing 641.

Figure 44:
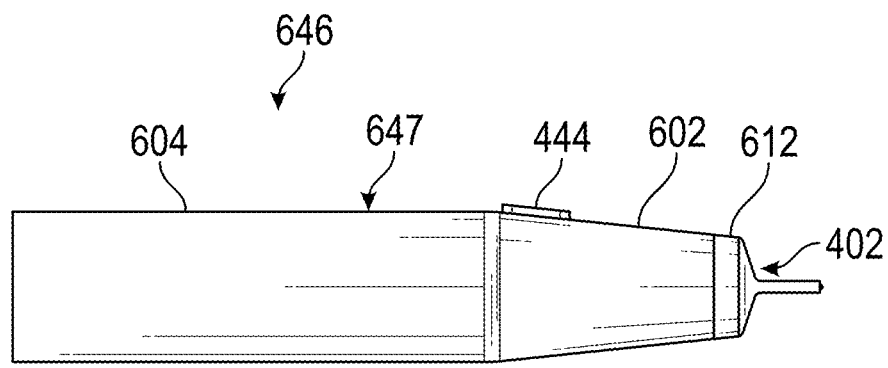
FIG. 44 illustrates a housing variation for an emulsification device.

FIG. 44 illustrates an emulsification device 646. The emulsification device 646 includes a housing 647, which can be a handle for a clinician. The housing 647 can include a distal portion 602 and a proximal portion 604. The distal portion 602 can include a cross-sectional size that gradually tapers in a distal direction to a reduced cross-section, which can be about the same as that of the collar 612. The distal portion 602 and proximal portion 604 can be disposed on the same axis.

Figure 45:
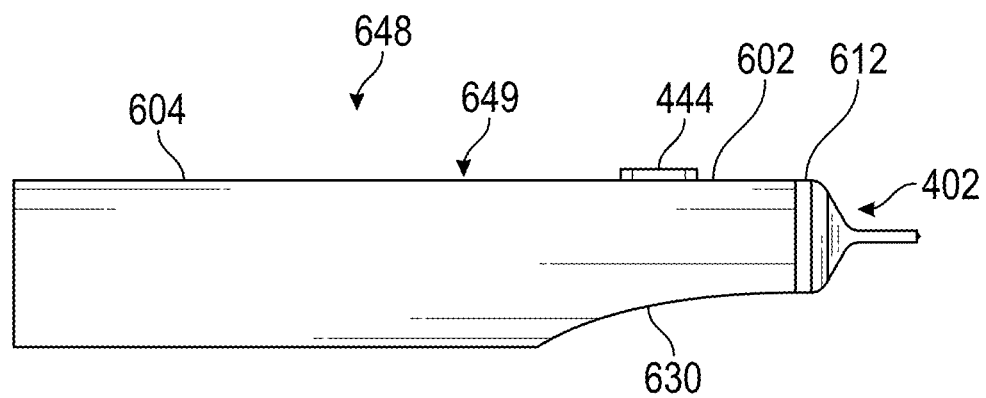
FIG. 45 illustrates a housing variation for an emulsification device.

FIG. 45 illustrates an emulsification device 648. The emulsification device 648 includes a housing 649, which can be a handle for a clinician. The housing 649 can include a distal portion 602 and a proximal portion 604. The distal portion 602 can include a cutout 630, which can gradually decrease a cross-sectional size of the distal portion 602 in a distal direction (e.g., decrease to about the same cross-sectional size as the collar 612). The distal portion 602 and proximal portion 604 can be disposed on the same axis.

Certain Examples

Below is a list of non-limiting examples described herein. These examples are for illustrative purposes and should not be viewed to restrict or limit the disclosure herein in any way.

In a 1st Example, an emulsification device for irrigating inside a capsular bag of a patient to emulsify a natural lens of an eye, the emulsification device comprising: a housing configured to be held by hand; a first irrigation fluid conduit configured to receive an irrigation fluid; a heater disposed proximate the first irrigation fluid conduit, the heater configured to heat the irrigation fluid within the first irrigation fluid conduit; and a distal tip configured to be coupled to the housing in fluid communication with the first irrigation fluid conduit and placed within the capsular bag of the patient to irrigate the capsular bag with heated irrigation fluid to emulsify the natural lens of the eye.

In a 2nd Example, the emulsification device of Example 1, wherein the first irrigation fluid conduit is disposed around the heater.

In a 3rd Example, the emulsification device of any of the preceding Examples, wherein the first irrigation fluid conduit comprises a coil disposed around the heater.

In a 4th Example, the emulsification device of Example 3, wherein the coil comprises a metal material to facilitate heat transfer between the heater and the irrigation fluid in the first irrigation fluid conduit.

In a 5th Example, the emulsification device of Example 1, wherein the first irrigation fluid conduit comprises a reservoir proximate the heater.

In a 6th Example, the emulsification device of any of the preceding Examples, further comprising a thermocouple configured to monitor a temperature of the heated irrigation fluid.

In a 7th Example, the emulsification device of Example 6, wherein the emulsification device is configured to adjust an output of the heater based on the temperature of the heated irrigation fluid.

In an 8th Example, the emulsification device of any of the preceding examples, further comprising a thermocouple configured to monitor a temperature of the distal tip.

In a 9th Example, the emulsification device of Example 8, wherein the emulsification device is configured to adjust an output of the heater based on the temperature of the distal tip.

In a 10th Example, the emulsification device of any of the preceding examples, further comprising a second irrigation fluid conduit configured to receive the irrigation fluid and bypass the heater to avoid the irrigation fluid received by the second irrigation fluid conduit being heated by the heater, wherein the distal tip is configured to be in coupled to the housing in fluid communication with the second irrigation fluid conduit and placed within the capsular bag of the patient to irrigate the capsular bag with the irrigation fluid that is received within the second irrigation fluid conduit.

In an 11th Example, the emulsification device of Example 10, further comprising one or more valves to control flow of the irrigation fluid through the first irrigation fluid conduit and the second irrigation fluid conduit.

In a 12th Example, the emulsification device of any of Examples 10-11, further comprising a valve assembly to control flow through the first irrigation fluid conduit and the second irrigation fluid conduit.

In a 13th Example, the emulsification device of any of Examples 10-12, wherein the valve assembly comprises a spring biasing the valve assembly to impede flow through the first irrigation fluid conduit and permit flow through the second irrigation fluid conduit.

In a 14th Example, the emulsification device of Example 13, wherein the valve assembly comprises a user interface configured to be interacted with by the user to overcome a biasing force of the spring to permit flow through the first irrigation fluid conduit and impede flow through the second irrigation fluid conduit.

In a 15th Example, the emulsification device of Example 14, wherein the user interface comprises a button that is biased by the spring, the button configured to be pushed by the user to overcome the biasing force of the spring.

In a 16th Example, the emulsification device of Example 15, further comprising a lever, the lever configured to be pushed by the user to push the button to overcome the biasing force of the spring.

In a 17th Example, the emulsification device of Example 12, wherein the valve assembly comprises a member biased by the spring that is configured to pinch closed the first irrigation fluid conduit and the second irrigation fluid conduit.

In an 18th Example, the emulsification device of any of the preceding Examples, further comprising an aspiration fluid conduit, wherein the distal tip is configured to be coupled to the housing in fluid communication with the aspiration fluid conduit and placed within the capsular bag of the patient to aspirate the emulsified natural lens from the capsular bag.

In a 19th Example, the emulsification device of any of the preceding Examples, further comprising a coolant inlet conduit and a coolant outlet conduit, wherein the coolant inlet conduit is configured to direct coolant fluid to the distal tip to circulate therein to cool the distal tip, and wherein the coolant outlet conduit is configured to direct coolant fluid away from the distal tip.

In a 20th Example, the emulsification device of any of the preceding Examples, wherein the distal tip comprises an irrigation passageway and an aspiration passageway, wherein the aspiration passageway is disposed radially outward of the irrigation passageway.

In a 21st Example, the emulsification device of Example 20, wherein the distal tip comprises a coolant passageway.

In a 22nd Example, the emulsification device of Example 21, wherein the coolant passageway is disposed radially outward of the aspiration passageway.

In a 23rd Example, the emulsification device of any of Examples 20-22, wherein the distal tip comprises an air gap.

In a 24th Example, the emulsification device of Example 23, wherein the air gap is disposed between the irrigation passageway and the aspiration passageway in a radial direction.

In a 25th Example, the emulsification device of any of Examples 20-24, wherein the distal tip comprises a vacuum gap.

In a 26th Example, an emulsification device for irrigating inside a capsular bag of a patient, the emulsification device comprising: a housing configured to be held by hand, the housing configured to be coupled to a distal tip; a first irrigation fluid conduit configured to receive an irrigation fluid; and a heater disposed proximate the first irrigation fluid conduit, the heater configured to heat the irrigation fluid within the first irrigation fluid conduit for irrigation with the distal tip in the capsular bag.

In a 27th Example, the emulsification device of Example 26, wherein the first irrigation fluid conduit is disposed around the heater.

In a 28th Example, the emulsification device of Example 26, wherein the first irrigation fluid conduit comprises a coil disposed around the heater.

In a 29th Example, the emulsification device of any of Examples 26-28, further comprising a second irrigation fluid conduit configured to receive the irrigation fluid and bypass the heater to avoid the irrigation fluid received by the second irrigation fluid conduit being heated by the heater prior to irrigation with the distal tip in the capsular bag.

In a 30th Example, the emulsification device of Example 29, further comprising a valve assembly to control flow through the first irrigation fluid conduit and the second irrigation fluid conduit.

In a 31st Example, the emulsification device of Example 30, wherein the valve assembly comprises a spring biasing the valve assembly to impede flow through the first irrigation fluid conduit and permit flow through the second irrigation fluid conduit.

In a 32nd Example, the emulsification device of any of Examples 26-30, further comprising an aspiration fluid conduit configured to be in fluid communication with the distal tip to aspirate within the capsular bag.

In a 33rd Example, the emulsification device of any of Examples 26-31, further comprising a coolant inlet conduit and a coolant outlet conduit, wherein the coolant inlet conduit is configured to be in fluid communication with the distal tip to direct coolant fluid to the distal tip to circulate therein to cool the distal tip, and wherein the coolant outlet conduit is configured to be in fluid communication with the distal tip to direct coolant fluid away from the distal tip.

In a 34th Example, an emulsification device for irrigating inside a capsular bag of a patient to emulsify a natural lens of an eye, the emulsification device comprising: a housing configured to be held by hand; a first irrigation fluid conduit configured to receive an irrigation fluid; an aspiration fluid conduit; a heater disposed proximate the first irrigation fluid conduit, the heater configured to heat the irrigation fluid within the first irrigation fluid conduit; and a distal tip configured to be coupled to the housing in fluid communication with the first irrigation fluid conduit and the aspiration fluid conduit, the distal tip configured to be placed within the capsular bag of the patient to irrigate the capsular bag with heated irrigation fluid to emulsify and aspirate the natural lens of the eye.

In a 35th Example, the emulsification device of Example 34, further comprising any feature of any of the Examples herein.

In a 36th Example, An emulsification device for irrigating inside a capsular bag of a patient to emulsify a natural lens of an eye, the emulsification device comprising: a housing configured to be held by hand; a first irrigation fluid conduit configured to receive an irrigation fluid; an aspiration fluid conduit; a coolant inlet conduit configured to receive coolant fluid and a coolant outlet conduit; a heater disposed proximate the first irrigation fluid conduit, the heater configured to heat the irrigation fluid within the first irrigation fluid conduit; and a distal tip configured to be coupled to the housing in fluid communication with the first irrigation fluid conduit, the aspiration fluid conduit, the coolant inlet conduit, and the coolant outlet conduit, the distal tip configured to be placed within the capsular bag of the patient to irrigate the capsular bag with heated irrigation fluid to emulsify and aspirate the natural lens of the eye, wherein the coolant inlet conduit is configured to deliver the coolant fluid to the distal tip to circulate therein to cool the tip, and wherein the coolant outlet conduit is configured to direct the coolant fluid away from the distal tip.

In a 37th Example, a method of emulsifying a natural lens of an eye, the method comprising: positioning a distal tip of an emulsification device within a capsular bag of the eye; heating irrigation fluid with a heater; irrigating a capsular bag with the heated irrigation fluid through the distal tip to emulsify the natural lens; aspirating the emulsified natural lens through the distal tip; and circulating coolant fluid in the distal tip to cool the distal tip.

In a 38th Example, the method of Example 37, further comprising sensing a temperature of the heated irrigation fluid and adjusting an output of the heater based on the temperature.

In a 39th Example, the method of Example 37 or 38, further comprising irrigating the capsular bag with irrigation fluid that bypasses the heater to avoid heating.

In a 40th Example, a distal tip for a thermal irrigating device, the distal tip comprising: an irrigation passageway configured to direct a flow of heated fluid distally out of the distal tip; an aspiration passageway configured to direct a flow of aspirated substance proximally out of the distal tip; and a coolant passageway configured to circulate a flow of coolant fluid distally into and proximally out of the distal tip to cool the distal tip.

In a 41st Example, the distal tip of Example 40, wherein the aspiration passageway is disposed radially outward of the irrigation passageway.

In a 42nd Example, the distal tip of Example 40 or 41, wherein the coolant passageway is disposed radially outward of the aspiration passageway.

In a 43rd Example, the distal tip of any of Examples 40-42, further comprising an air gap.

In a 44th Example, the distal tip of Example 43, wherein the air gap is disposed between the irrigation passageway and the aspiration passageway in a radial direction.

In a 45th Example, the distal tip of any of the Examples of 40-44, further comprising a vacuum gap.

In a 46th Example, the distal tip of any of the Examples of 40-45, wherein the irrigation passageway is centrally disposed.

In a 47th Example, the distal tip of any of the Examples of 40-46, wherein the aspiration passageway comprises a plurality of passageways in fluid communication.

In a 48th Example, the distal tip of any of the Examples of 40-47, wherein the coolant passageway comprises a plurality of passageways in fluid communication.

In a 49th Example, the distal tip of any of the Examples of 40-48, wherein the distal tip comprises an angled portion.

In a 50th Example, the distal tip of any of the Examples of 40-49, wherein the distal tip comprises a tapered periphery.

In a 51st Example, the distal tip of any of the Examples of 40-50, further comprising an irrigation conduit comprising a polymer material, wherein the irrigation passageway flows through the irrigation conduit.

In a 52nd Example, a distal tip for a thermal irrigating device, the distal tip comprising: an irrigation passageway configured to direct a flow of heated fluid distally out of the distal tip; and a coolant passageway configured to circulate a flow of coolant fluid distally into and proximally out of the distal tip to cool the distal tip.

In a 53rd Example, the distal tip of Example 52, further comprising an air gap between the irrigation passageway and the coolant passageway.

In a 54th Example, the distal tip of Example 53, wherein the air gap comprises a cone shape.

In a 55th Example, A distal tip for a thermal irrigating device, the distal tip comprising: an irrigation passageway configured to direct a flow of heated fluid distally out of the distal tip; and an air gap disposed radially of the irrigation passageway.

In a 56th Example, the distal tip of Example 55, wherein the air gap comprises a cone shape.

In a 57th Example, A distal tip for a device to remove a lens from a capsular bag of an eye, the distal tip comprising: an irrigation lumen configured to deliver heated fluid to the lens within the capsular bag; and an aspiration lumen configured to aspirate contents of the capsular bag.

In a 58th Example, the distal tip of Example 57, wherein the irrigation lumen comprises a distal outlet through which the heated fluid flows to the lens.

In a 59th Example, the distal tip of Example 57 or 58, wherein the aspiration lumen is disposed radially outward of the irrigation lumen.

In a 60th Example, the distal tip of any of Examples 57-59, wherein the aspiration lumen is circumferentially disposed around the irrigation lumen.

In a 61st Example, the distal tip of Example 60, wherein the aspiration lumen comprises a distal inlet through which the contents of the capsular bag are aspirated enter into the aspiration lumen.

In a 62nd Example, the distal tip of any of Examples 57-61, further comprising a coolant lumen configured to direct coolant fluid to circulate through the distal tip.

In a 63rd Example, the distal tip of Example 62, wherein the coolant lumen is closed distally such that the coolant fluid flowing through the coolant lumen does not flow distally out of the distal tip to the lens.

In a 64th Example, the distal tip of Example 62 or 63, wherein the coolant lumen comprises a proximal inlet and a proximal outlet, the coolant lumen configured to receive the coolant fluid through the proximal inlet, direct the coolant fluid distally through the distal tip, direct the coolant fluid proximally back through the distal tip, and discharge the coolant fluid out through the proximal outlet.

In a 65th Example, the distal tip of any of Examples 62-64, wherein the coolant lumen is disposed radially outward of the aspiration lumen.

In a 66th Example, the distal tip of any of Examples 62-65, wherein the coolant fluid comprises a saline solution.

In a 67th Example, the distal tip of any of Examples 57-66, further comprising an angled distal end.

In a 68th Example, the distal tip of Example 67, wherein the angled distal end is coplanar with a plane that is oriented at an angle other than perpendicular relative to a longitudinal axis of the irrigation lumen.

In a 69th Example, the distal tip of any of Examples 57-68, further comprising an outer wall, the outer wall extending distally beyond a distal end of the irrigation lumen.

In a 70th Example, the distal tip of Example 69, wherein the outer wall defines an opening distal of a distal end of the irrigation lumen and a distal end of the aspiration lumen.

In a 71st Example, the distal tip of Example 69 or 70, wherein the opening defined by the outer wall is disposed on a plane that is disposed at an angle other than perpendicular relative to a longitudinal axis of the irrigation lumen.

In a 72nd Example, the distal tip of Example 70 or 71, wherein the opening is disposed at an angle such that a first portion of the opening is disposed farther distally from the distal end of the irrigation lumen compared to a second portion of the opening.

In a 73rd Example, the distal tip of any of Examples 69-72, wherein the outer wall is disposed circumferentially about a longitudinal axis of the irrigation lumen, and wherein the outer wall extends distally different distances relative to the distal end of the irrigation lumen at different circumferential locations of the opening defined by the outer wall.

In a 74th Example, A device for removing a lens from a capsular bag of an eye, the device comprising: a distal tip configured to be inserted into the eye; a heater unit; a first fluid line configured to direct a first fluid portion to the distal tip for delivery into the capsular bag; a second fluid line configured to direct a second fluid portion to the distal tip for delivery into the capsular bag, wherein the heater unit is configured to heat the second fluid portion; a third fluid line that splits from the second fluid line downstream of the heater unit to direct the second fluid portion away from the distal tip; a valve unit comprising a first configuration and a second configuration; wherein, in the first configuration, the valve unit is configured to permit the first fluid portion to flow through the first fluid line to the distal tip, impede the second fluid portion from flowing through the second fluid line to the distal tip, and permit the second fluid portion to flow through the third fluid line away from the distal tip; and wherein, in the second configuration, the valve unit is configured to impede the first fluid portion from flowing through the first fluid line to the distal tip, permit the second fluid portion to flow through the second fluid line to the distal tip, and impede the second fluid portion from flowing through the third fluid line away from the distal tip.

In a 75th Example, the device of Example 74, further comprising an aspiration line configured to direct lens material aspirated through the distal tip away from the distal tip.

In a 76th Example, the device of Example 74 or 75, further comprising a coolant delivery line and a coolant return line, the coolant delivery line configured to direct a third fluid portion to the distal tip to circulate through the distal tip to reduce a temperature of a periphery of the distal tip, and the coolant return line configured to direct the third fluid portion away from the distal tip.

In a 77th Example, the device of Example 76, wherein the coolant delivery line splits from the first fluid line.

In a 78th Example, the device of Example 76 or 77, wherein the third fluid portion comprises a portion of the first fluid portion.

In a 79th Example, the device of any of Examples 74-78, wherein the first fluid line is configured to direct the first fluid portion to an irrigation lumen of the distal tip, and wherein the second fluid line is configured to direct the second fluid portion to the same irrigation lumen of the distal tip.

In an 80th Example, the device of any of Examples 74-79, wherein the valve is disposed downstream of the heater on the first fluid line, the second fluid line, and the third fluid line.

In an 81st Example, the device of any of Examples 74-80, wherein, in the first configuration, the valve unit is configured to pinch the second fluid line closed.

In an 82nd Example, the device of any of Examples 74-81, wherein, in the second configuration, the valve unit is configured to pinch the first fluid line closed and the third fluid line closed.

In an 83rd Example, the device of any of Examples 74-82, wherein the valve unit is biased to the first configuration.

In an 84th Example, the device of Example 83, wherein the valve unit comprises one or more springs biasing the valve unit to the first configuration.

In an 85th Example, the device of any of Examples 74-84, further comprising a first pump and a second pump, the first pump configured to control a flow of the first fluid portion, and the second pump configured to control a flow of the second fluid portion.

In an 86th Example, the device of Example 85, wherein the first pump is a peristaltic pump and the second pump is a peristaltic pump.

In an 87th Example, the device of Example 85 or 86, wherein the first pump is disposed on the first fluid line and the second pump is disposed on the second fluid line.

In an 88th Example, the device of any of Examples 75-86, further comprising a third pump configured to control a flow of the aspirated lens material.

In an 89th Example, the device of Example 88, wherein the third pump is a peristaltic pump.

In an 90th Example, the device of Example 88 or 89, wherein the third pump is disposed on the aspiration fluid line.

In a 91st Example, the device of any of Examples 74-90, wherein the first fluid line is configured to receive the first portion of fluid from a first reservoir.

In a 92nd Example, the device of any of Examples 74-91, wherein the second fluid line is configured to receive the second portion of fluid from a second reservoir.

In a 93rd Example, the device of any of Examples 74-92, wherein the aspiration fluid line is configured to direct aspirated lens material to a receptacle.

In a 94th Example, the device of any of Examples 74-93, further comprising a first temperature sensor configured to detect a first temperature of the first fluid portion or the second fluid portion downstream of the valve unit.

In a 95th Example, the device of Example 94, further comprising a controller configured to provide an alert signal indicating that the temperature sensor detected that the first temperature is at or above a threshold.

In a 96th Example, the device of any of Examples 74-95, further comprising a second temperature sensor configured to detect a second temperature of the second fluid portion upstream of the valve unit.

In a 97th Example, the device of Example 96, further comprising a controller configured to provide instructions to the heater unit.

In a 98th Example, the device of Example 97, wherein the controller is configured to instruct the heater unit to decrease heat output or cease heat output when the second temperature is at or above an upper threshold.

In a 99th Example, the device of Example 96 or 97 wherein the controller is configured to configured to instruct the heater unit to increase heat output when the second temperature is at or below a lower threshold.

In a 100th Example, the device of any of Examples 96-98, wherein the controller is configured to instruct the heater unit to decrease heat output or cease heat output when the second temperature is increasing at a rate above a threshold.

In a 101st Example, the device of any of Examples 74-100, further comprising a vibration motor configured to vibrate the distal tip.

In a 102nd Example, the device of any of Examples 74-101, wherein the distal tip comprises an irrigation lumen and an aspiration lumen, the irrigation lumen configured to alternatively receive the first fluid portion and the second fluid portion for delivery into the eye, and the aspiration lumen disposed radially outward of the irrigation lumen.

In a 103rd Example, the device of any of Examples 74-102, wherein the distal tip comprises a coolant lumen configured to circulate the third fluid portion through the distal tip, the coolant lumen disposed radially outward of the aspiration lumen.

In a 104th Example, the device of any of Examples 74-101, wherein the distal tip comprises any of the features of Examples 57-73.

In a 105th Example, A device for removing a lens from a capsular bag of an eye, the device comprising: a distal tip comprising an irrigation lumen, an aspiration lumen, and a coolant lumen, the distal tip configured to be inserted into the eye; a first fluid line configured to direct a first fluid portion to the irrigation lumen for delivery into the capsular bag; a second fluid line configured to direct a second heated fluid portion to the irrigation lumen for delivery into the capsular bag; an aspiration line configured to direct lens material aspirated through the aspiration lumen away from the distal tip; a coolant delivery line configured to direct a third fluid portion to the coolant lumen to circulate through the distal tip to reduce a temperature of a periphery of the distal tip; and a coolant return line configured to direct the third fluid portion away from the distal tip.

In a 106th Example, the device of Example 105, further comprising a valve unit comprising a first configuration and a second configuration, wherein the valve unit is configured to permit the first fluid portion to flow to the irrigation lumen and impede the second fluid portion from flowing to the irrigation lumen in the first configuration, and wherein the valve unit is configured to impede the first fluid portion from flowing to the irrigation lumen and permit the second fluid portion to flow to the irrigation lumen in the second configuration.

In a 107th Example, the device of Example 106, wherein the valve unit is biased to the first configuration.

In a 108th Example, the device of Example 106 or 107, wherein the valve unit is configured to direct the second fluid portion to flow through a third fluid line away from the distal tip in the first configuration.

In a 109th Example, the device of any of Examples 105-108, wherein the aspiration lumen is disposed radially outward of the irrigation lumen and the coolant lumen is disposed radially outward of the aspiration lumen.

In a 110th Example, the device of any of Examples 105-109, further comprising a first pump and a second pump, the first pump configured to control a flow of the first fluid portion, and the second pump configured to control a flow of the second fluid portion.

In a 111th Example, the device of Example 110, wherein the first pump is a peristaltic pump and the second pump is a peristaltic pump.

In a 112th Example, the device of Example 110 or 111, wherein the first pump is disposed on the first fluid line and the second pump is disposed on the second fluid line.

In a 113th Example, the device of any of Examples 105-112, further comprising a third pump configured to control a flow of the aspirated lens material.

In a 114th Example, the device of Example 113, wherein the third pump is a peristaltic pump.

In a 115th Example, the device of Example 113 or 114, wherein the third pump is disposed on the aspiration line.

In a 116th Example, the device of any of Examples 105-115, further comprising a first temperature sensor configured to detect a first temperature of the first fluid portion or the second fluid portion flowing to the irrigation lumen.

In a 117th Example, the device of Example 116, further comprising a controller configured to provide an alert signal indicating that the temperature sensor detected that the first temperature is at or above a threshold.

In a 118th Example, the device of any of Examples 105-117, further comprising any of the features of Examples 1-104.

In a 119th Example, A method of removing a lens from a capsular bag of an eye, the method comprising: placing a distal tip of a device within the capsular bag of the eye; aspirating within the capsular bag to bring a lens portion closer to the distal tip; directing a flow of heated fluid at the lens portion to emulsify the lens portion; and aspirating the emulsified lens portion from the capsular bag.

In a 120th Example, the method of Example 119, further comprising adjusting a temperature of the heated fluid based on one or more characteristics of the lens portion.

In a 121st Example, the method of Example 120, wherein the one or more characteristics comprises cataract grade.

In a 122nd Example, the method of any of Examples 119-121, further comprising circulating a coolant fluid through the distal tip to cool a periphery of the distal tip.

Terminology

Although the systems and methods have been disclosed in the context of certain embodiments and examples, it will be understood by those skilled in the art that the systems and methods extend beyond the specifically disclosed embodiments to other alternative embodiments and/or uses of the embodiments and certain modifications and equivalents thereof. Various features and aspects of the disclosed embodiments can be combined with or substituted for one another in order to form varying modes of the thermal systems, devices, and methods disclosed herein. The scope of this disclosure should not be limited by the particular disclosed embodiments described herein.

Methods of using the foregoing system(s) (including device(s), apparatus(es), assembly (ies), structure(s) or the like) are included; the methods of use can include using or assembling any one or more of the features disclosed herein to achieve functions and/or features of the system(s) as discussed in this disclosure. Methods of manufacturing the foregoing system(s) are included; the methods of manufacture can include providing, making, connecting, assembling, and/or installing any one or more of the features of the system(s) disclosed herein to achieve functions and/or features of the system(s) as discussed in this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Some embodiments have been described in connection with the accompanying drawings. Components can be added, removed, and/or rearranged. Orientation references such as, for example, "top" and "bottom" are for ease of ease of discussion and may be rearranged such that top features are proximate the bottom and bottom features are proximate the top. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various embodiments and examples of thermal systems, devices, and methods have been disclosed. Although the systems and methods have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

What is claimed is:

1. A device for removing a lens from a capsular bag of an eye, the device comprising:
   a distal tip configured to be inserted into the eye;
   a heater unit;
   a first fluid line configured to direct a first fluid portion to the distal tip for delivery into the capsular bag;

a second fluid line configured to direct a second fluid portion to the distal tip for delivery into the capsular bag, wherein the heater unit is configured to heat the second fluid portion;

a third fluid line that splits from the second fluid line downstream of the heater unit to direct the second fluid portion away from the distal tip;

a valve unit comprising a first configuration and a second configuration;

wherein, in the first configuration, the valve unit is configured to permit the first fluid portion to flow through the first fluid line to the distal tip, impede the second fluid portion from flowing through the second fluid line to the distal tip, and permit the second fluid portion to flow through the third fluid line away from the distal tip; and wherein, in the second configuration, the valve unit is configured to impede the first fluid portion from flowing through the first fluid line to the distal tip, permit the second fluid portion to flow through the second fluid line to the distal tip, and impede the second fluid portion from flowing through the third fluid line away from the distal tip.

2. The device of claim 1, further comprising an aspiration line configured to direct lens material aspirated through the distal tip away from the distal tip.

3. The device of claim 1, further comprising a coolant delivery line and a coolant return line, the coolant delivery line configured to direct a third fluid portion to the distal tip to circulate through the distal tip to reduce a temperature of a periphery of the distal tip, and the coolant return line configured to direct the third fluid portion away from the distal tip.

4. The device of claim 3, wherein the coolant delivery line splits from the first fluid line.

* * * * *